United States Patent
Moloney et al.

(10) Patent No.: US 11,037,361 B2
(45) Date of Patent: Jun. 15, 2021

(54) PATH PLANNING USING SPARSE VOLUMETRIC DATA

(71) Applicant: Movidius Ltd., Schiphol-Rijk (NL)

(72) Inventors: David Macdara Moloney, Dublin (IE); Jonathan David Byrne, Ashbourne (IE)

(73) Assignee: Movidius Ltd., Schiphol-Rijk (NL)

( * ) Notice: Subject to any disclaimer, the term of this patent is extended or adjusted under 35 U.S.C. 154(b) by 191 days.

(21) Appl. No.: 16/326,674

(22) PCT Filed: Aug. 19, 2017

(86) PCT No.: PCT/US2017/047697
§ 371 (c)(1),
(2) Date: Feb. 19, 2019

(87) PCT Pub. No.: WO2018/035508
PCT Pub. Date: Feb. 22, 2018

(65) Prior Publication Data
US 2020/0158514 A1    May 21, 2020

Related U.S. Application Data

(60) Provisional application No. 62/377,471, filed on Aug. 19, 2016.

(51) Int. Cl.
*G06T 15/08* (2011.01)
*G06T 17/00* (2006.01)
(Continued)

(52) U.S. Cl.
CPC .............. *G06T 15/08* (2013.01); *G01C 21/20* (2013.01); *G01C 21/30* (2013.01); *G05D 1/0214* (2013.01);
(Continued)

(58) Field of Classification Search
CPC .......... G06T 15/08; G06T 1/20; G06T 15/06; G06T 17/005; G06T 17/05; G06T 19/00;
(Continued)

(56) References Cited

U.S. PATENT DOCUMENTS 9,754,405 B1    9/2017   Young et al.
10,748,326 B2 *  8/2020   Caulfield ............ G06F 9/30029
(Continued)

FOREIGN PATENT DOCUMENTS

WO    2013057077 A2    4/2013
WO    2018035505 A1    2/2018
(Continued)

OTHER PUBLICATIONS

EPO; Extended European Search Report issued in EP Patent Application No. 17842252.3, dated Aug. 7, 2020; 11 pages.
(Continued)

*Primary Examiner* — Gertrude Arthur Jeanglaude
(74) *Attorney, Agent, or Firm* — Alliance IP, LLC

(57) ABSTRACT

A view of geometry captured in image data generated by an imaging sensor is compared with a description of the geometry in a volumetric data structure. The volumetric data structure describes the volume at a plurality of levels of detail and includes entries describing voxels defining subvolumes of the volume at multiple levels of detail. The volumetric data structure includes a first entry to describe voxels at a lowest one of the levels of detail and further includes a number of second entries to describe voxels at a higher, second level of detail, the voxels at the second level of detail representing subvolumes of the voxels at the first level of detail. Each of these entries include bits to indicate whether a corresponding one of the voxels is at least partially occupied with the geometry. One or more of these entries are used in the comparison with the image data.

21 Claims, 80 Drawing Sheets

(51) Int. Cl.
  *G06T 19/00* (2011.01)
  *G05D 1/02* (2020.01)
  *G01C 21/20* (2006.01)
  *G06T 17/05* (2011.01)
  *G06K 9/00* (2006.01)
  *G06N 3/04* (2006.01)
  *G01C 21/30* (2006.01)
  *G06F 9/30* (2018.01)
  *G06T 15/06* (2011.01)
  *G06T 1/20* (2006.01)
  *G06F 17/16* (2006.01)

(52) U.S. Cl.
  CPC ....... *G05D 1/0274* (2013.01); *G06F 9/30029* (2013.01); *G06F 17/16* (2013.01); *G06K 9/0063* (2013.01); *G06K 9/00201* (2013.01); *G06N 3/04* (2013.01); *G06N 3/0454* (2013.01); *G06T 1/20* (2013.01); *G06T 15/06* (2013.01); *G06T 17/005* (2013.01); *G06T 17/05* (2013.01); *G06T 19/00* (2013.01); *G06T 19/006* (2013.01); *G06N 3/0481* (2013.01); *G06T 2200/04* (2013.01); *G06T 2200/28* (2013.01); *G06T 2210/08* (2013.01); *G06T 2210/36* (2013.01); *G06T 2219/004* (2013.01)

(58) Field of Classification Search
  CPC ............... G06T 19/006; G06T 2200/04; G06T 2200/28; G06T 2210/08; G06T 2210/36; G06T 2219/004; G01C 21/20; G01C 21/30; G05D 1/0214; G05D 1/0274; G06F 9/30029; G06F 17/16; G06K 9/00201; G06K 9/0063; G06N 3/04; G06N 3/0454; G06N 3/0481
  USPC ........................................................ 701/446
  See application file for complete search history.

(56) References Cited

U.S. PATENT DOCUMENTS

| | | |
|---|---|---|
| 2010/0104199 A1 | 4/2010 | Zhang et al. |
| 2015/0109298 A1 | 4/2015 | Panteleev et al. |
| 2015/0268058 A1 | 9/2015 | Samarasekera et al. |
| 2015/0294500 A1 | 10/2015 | Tucker et al. |
| 2016/0236683 A1 | 8/2016 | Eggert et al. |
| 2019/0180409 A1 | 6/2019 | Moloney et al. |
| 2019/0180499 A1 | 6/2019 | Caulfield et al. |
| 2019/0188899 A1 | 6/2019 | Moloney et al. |

FOREIGN PATENT DOCUMENTS

| | | |
|---|---|---|
| WO | 2018035506 A1 | 2/2018 |
| WO | 2018035507 A1 | 2/2018 |

OTHER PUBLICATIONS

Erik Einhorn et al: "Finding the adequate resolution for grid mapping—Cell sizes locally adapting on-the-fly", Robotics and Automation (ICRA), 2011 IEEE International Conference on, IEEE, May 9, 2011; pp. 1843-1848 (6 pages).
Li You et al: "Building variable resolution occupancy grid map from stereoscopic system—A quadtree based appr", 2013 IEEE Intelligent Vehicles Symposium (IV), IEEE, Jun. 23, 2013, pp. 744-749 (6 pages).
PCT International Search Report and Written Opinion in PCT Application Serial No. PCT/US2017/047697 dated Nov. 29, 2017.
PCT International Preliminary Report on Patentability in PCT International Application Serial No. PCT/US2017/047697 dated Feb. 19, 2019.

* cited by examiner

1000

| AlexNet | # weights | # zeros (avg) | # zeros (min) | # zeros (max) | % zeros |
|---|---|---|---|---|---|
| Relu1 | 8192 | 1859.3 | 912 | 4425 | 23% |
| Relu2 | 8192 | 4459.2 | 3700 | 4873 | 54% |
| Relu3 | 4096 | 3465.6 | 3079 | 3722 | 85% |

Note: results obtained using 10,000 CIFAR-10 test-images

FIG. 10

FIG. 30 (PART 1)

FIG. 30
| FIG. 30 (PART 1) | FIG. 30 (PART 2) |

3D to 2D Z-projection Hardware

FIG. 30 (PART 2)

| z2 | | | | | | | | | | | | | | | | z3 | | | | | | | | | | | | | | | |
|---|---|---|---|---|---|---|---|---|---|---|---|---|---|---|---|---|---|---|---|---|---|---|---|---|---|---|---|---|---|---|---|
| y0 | | | | y1 | | | | y2 | | | | y3 | | | | y0 | | | | y1 | | | | y2 | | | | y3 | | | |
| x0 | x1 | x2 | x3 | x0 | x1 | x2 | x3 | x0 | x1 | x2 | x3 | x0 | x1 | x2 | x3 | x0 | x1 | x2 | x3 | x0 | x1 | x2 | x3 | x0 | x1 | x2 | x3 | x0 | x1 | x2 | x3 |
| 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |

3000

FROM FIG. 30 (PART 1)

FIG. 31

| FIG. 31 (PART 1) | FIG. 31 (PART 2) |
|---|---|

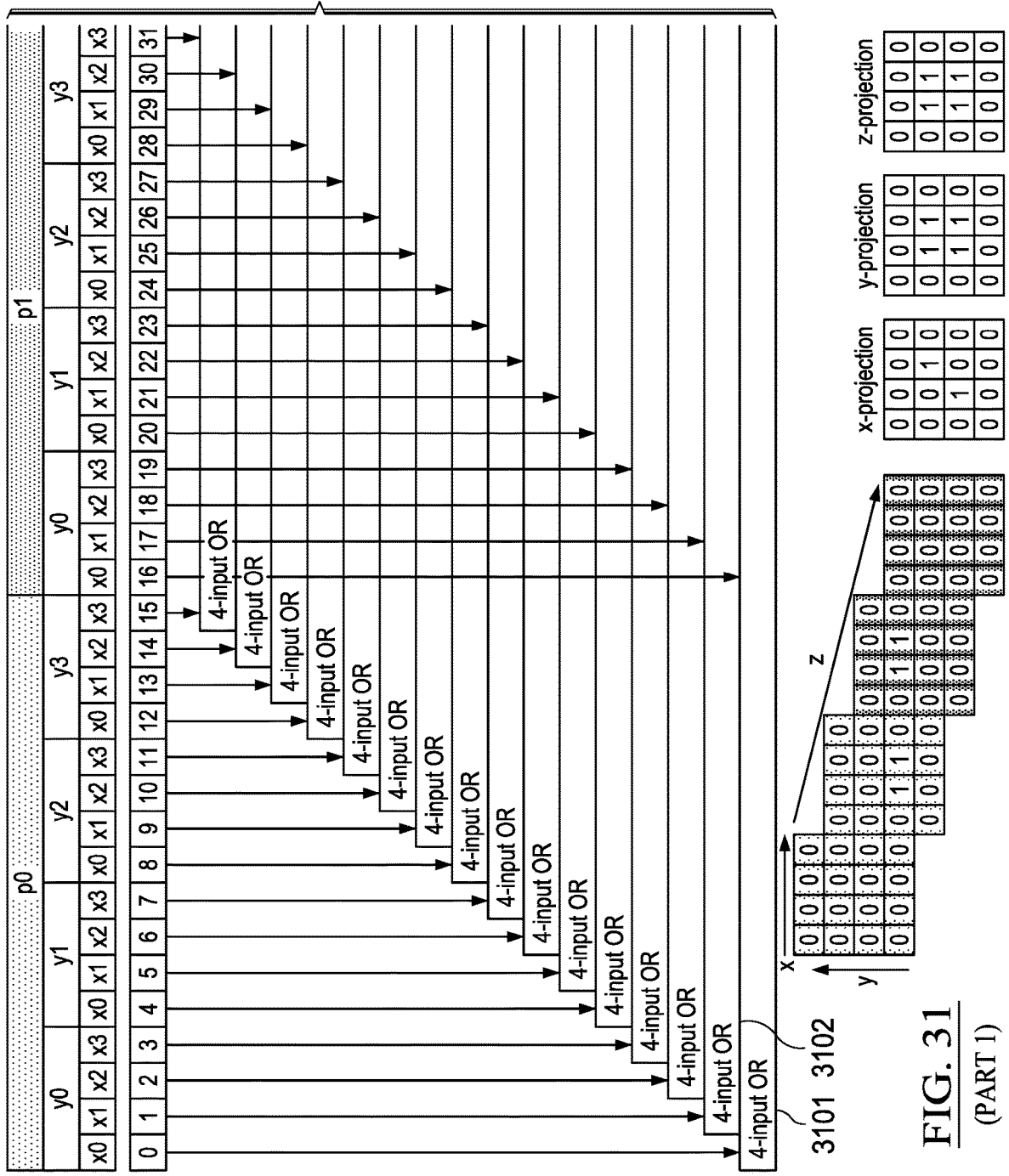
FIG. 31 (PART 1)

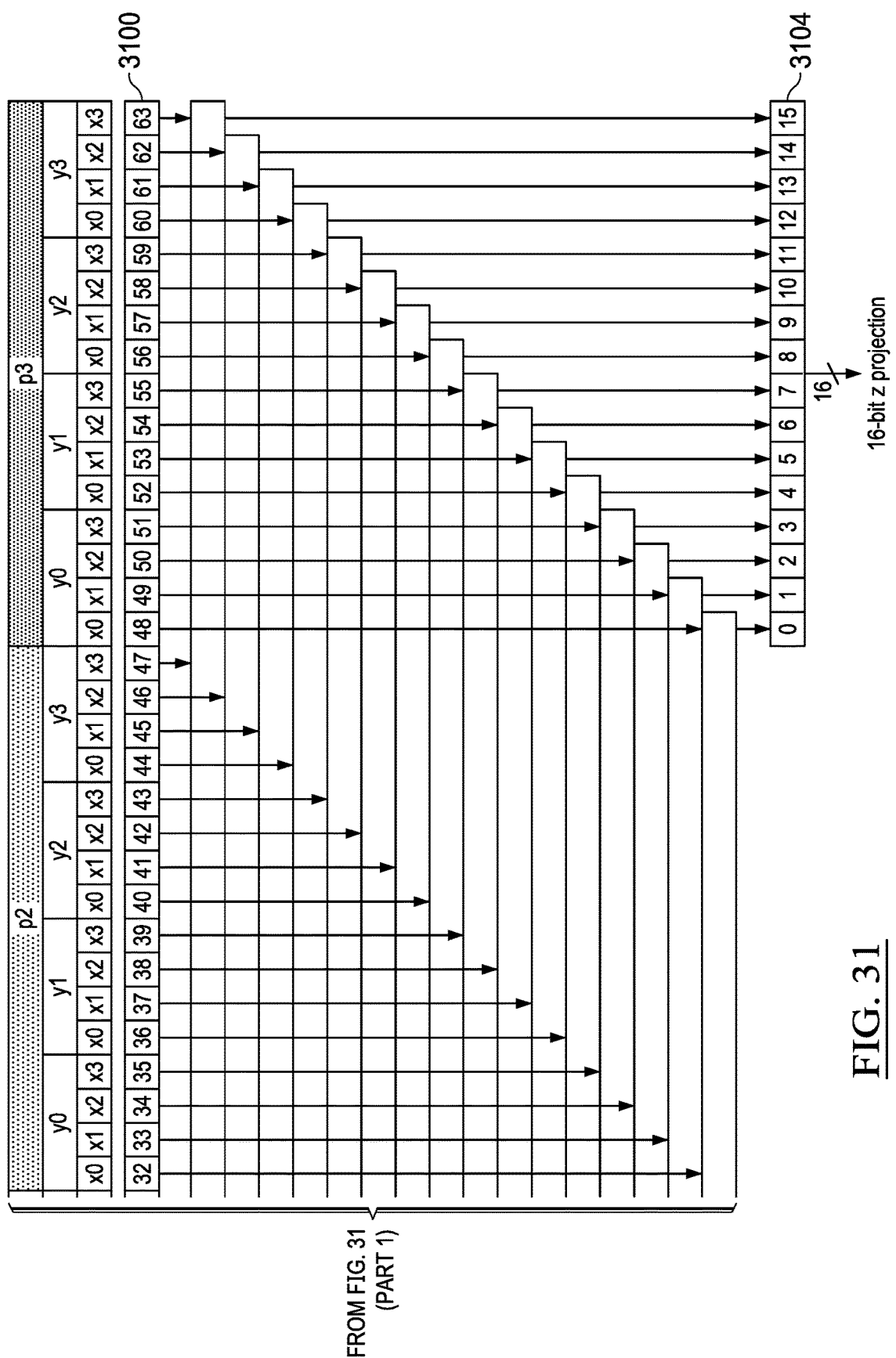
FIG. 31 (PART 2)

FIG. 34 (PART 1) | FIG. 34 (PART 2)

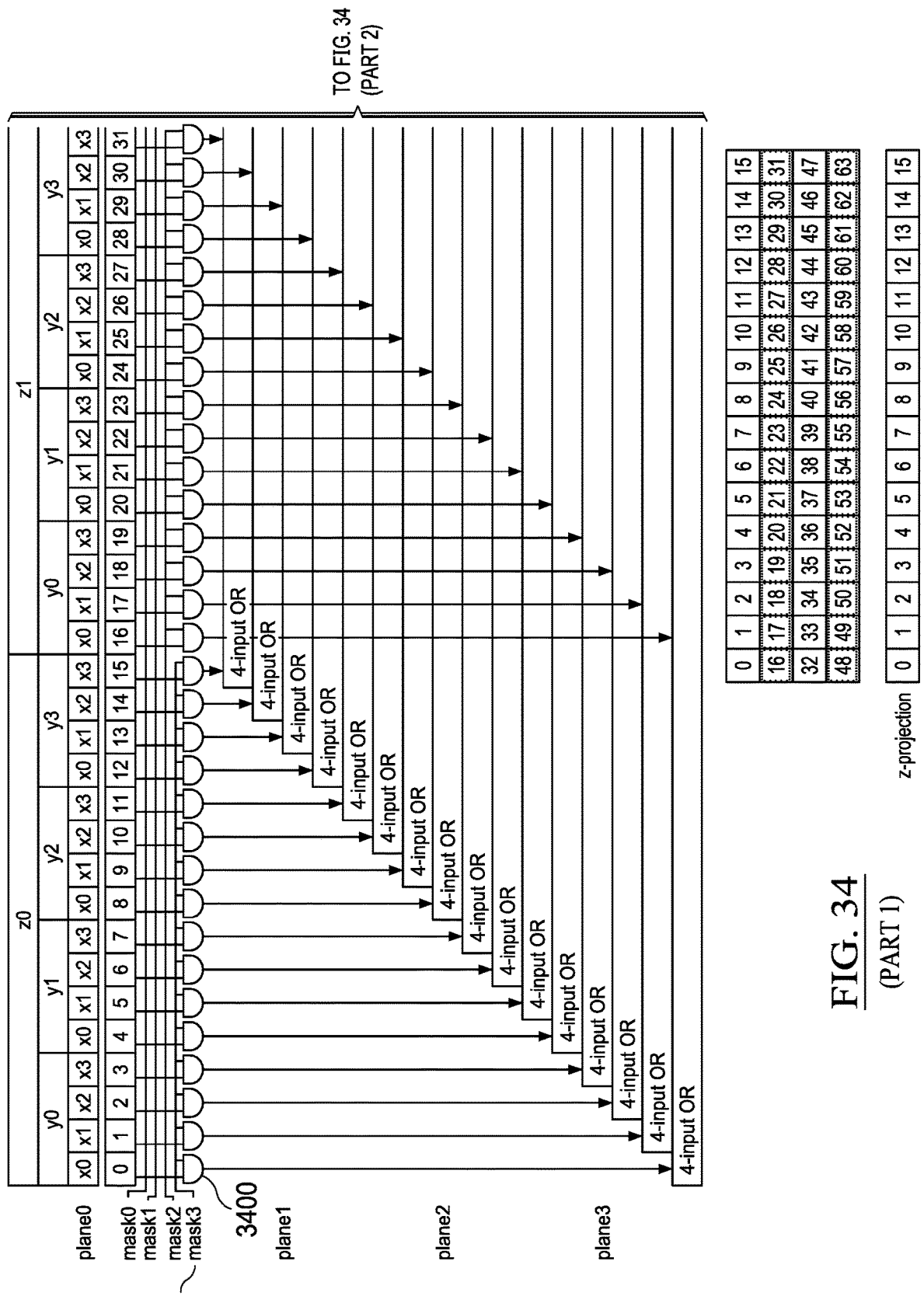
FIG. 34 (PART 1)

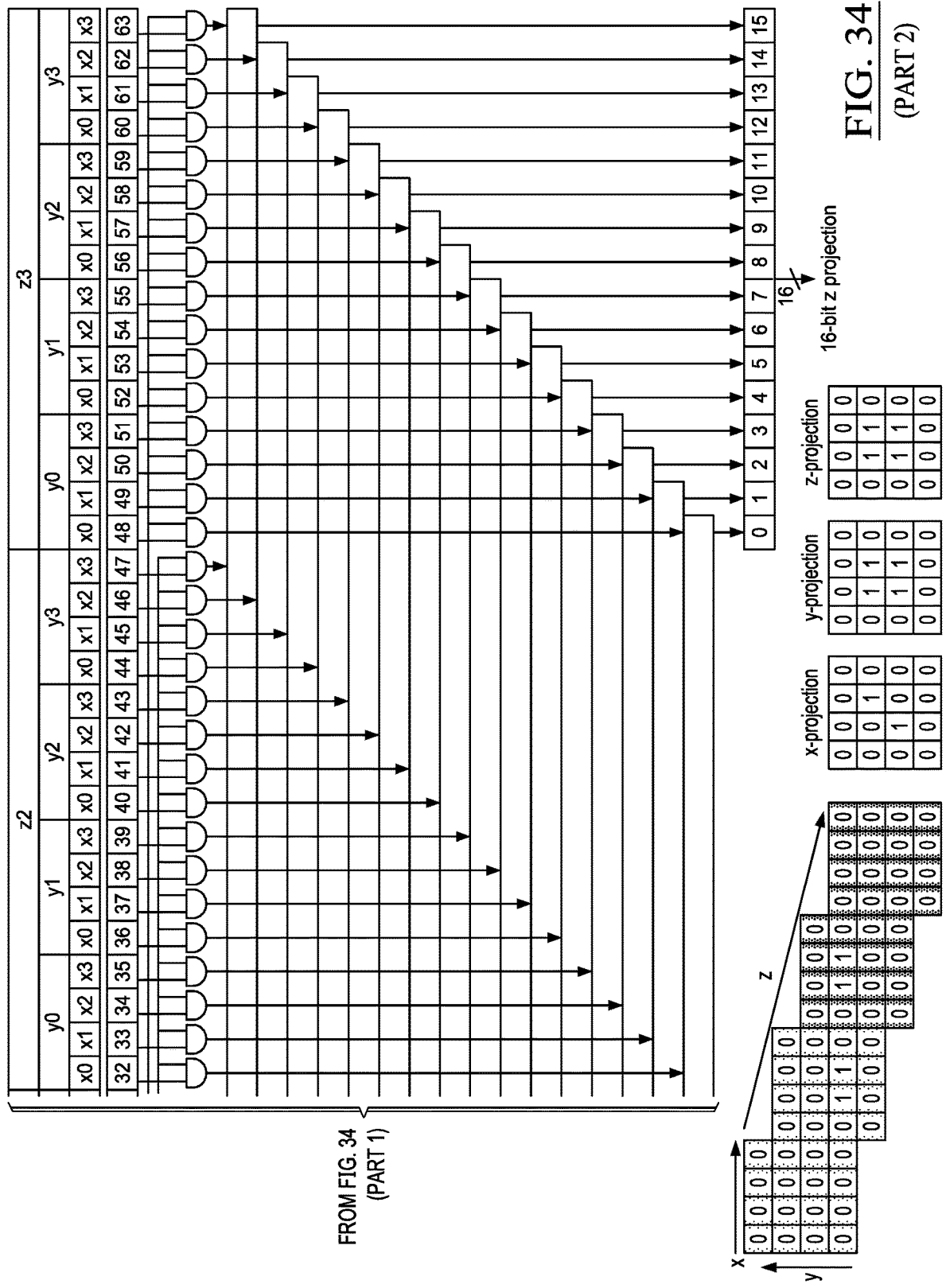
FIG. 34 (PART 2)

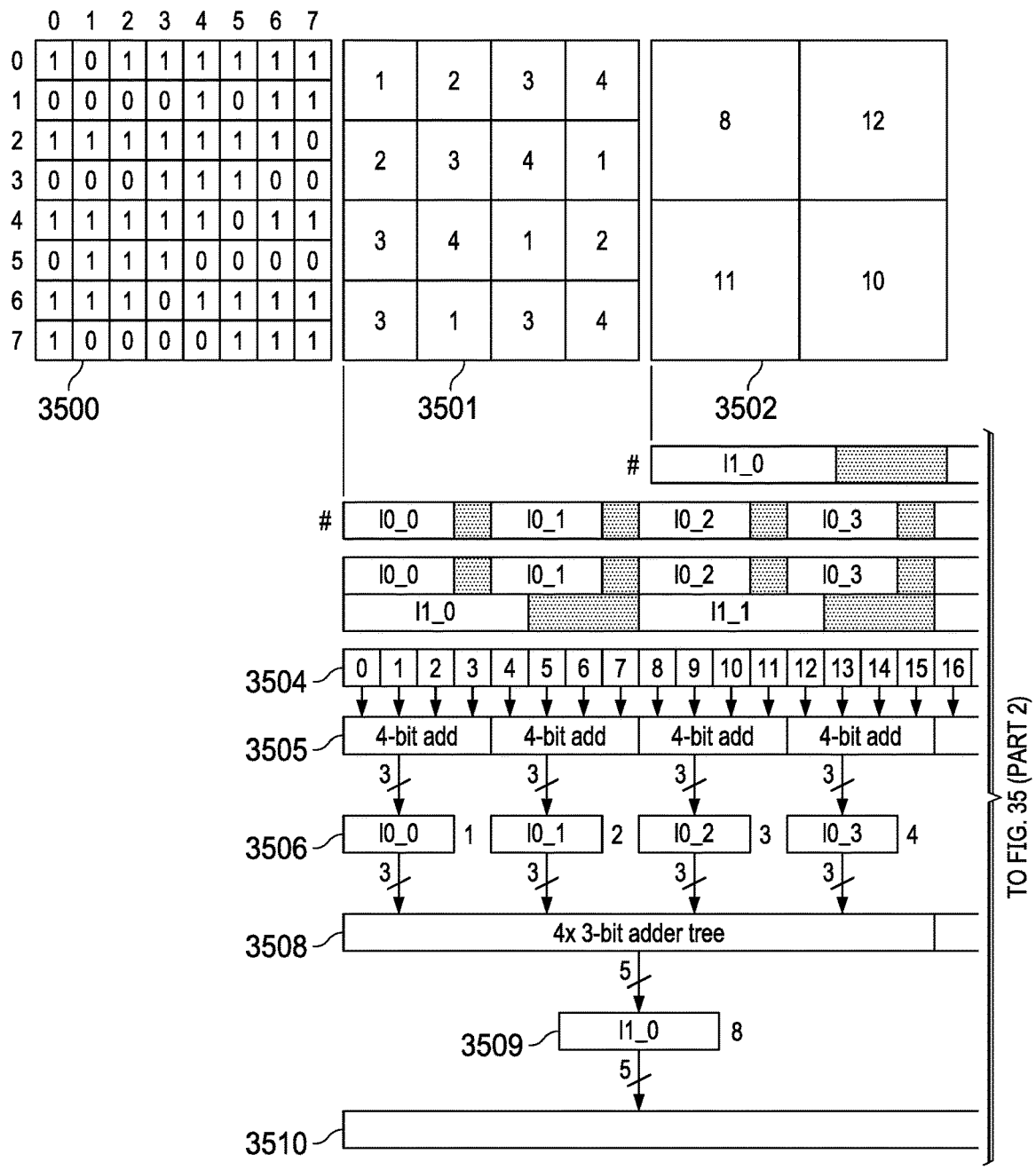
FIG. 35 (PART 1)

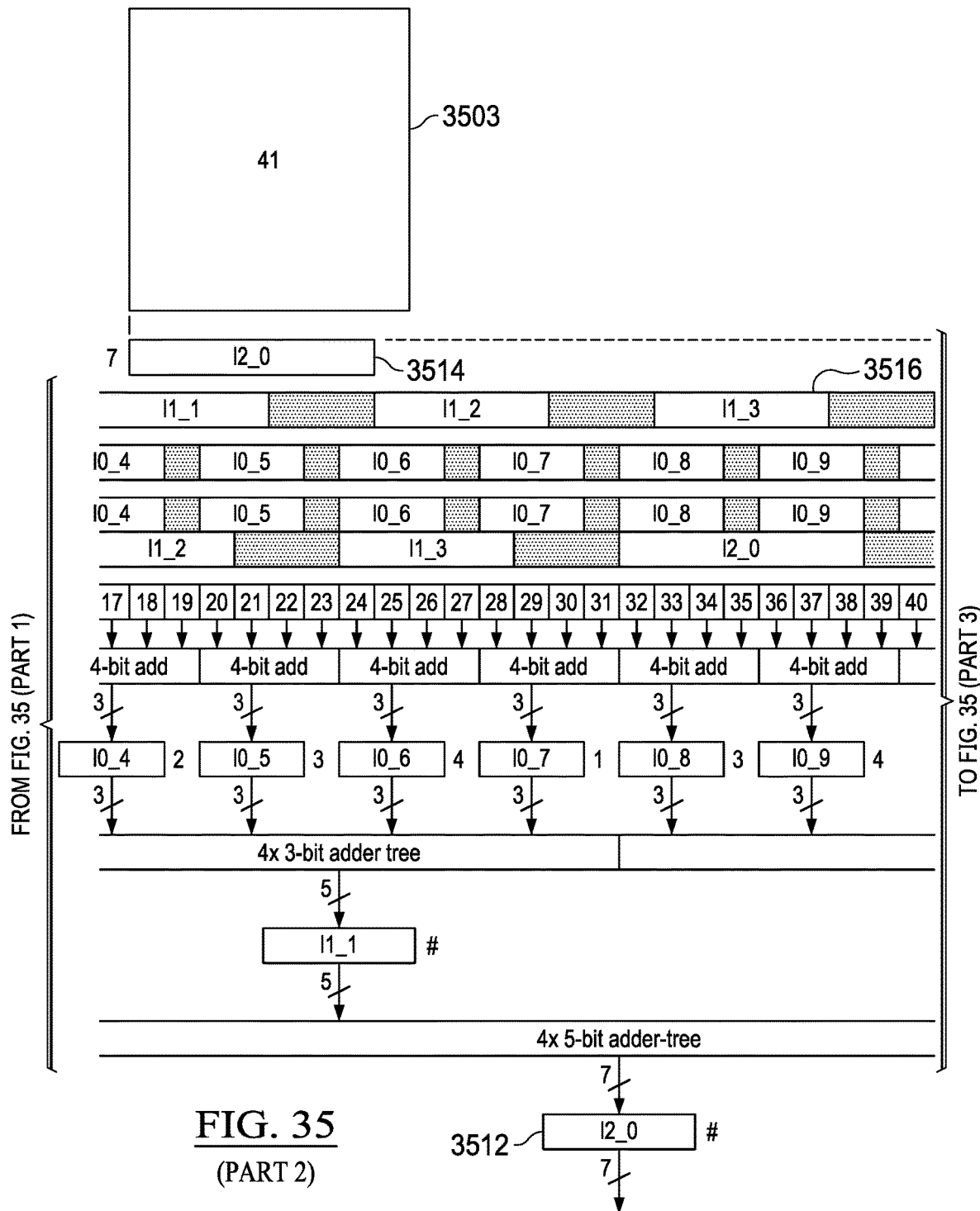
FIG. 35 (PART 2)

(PART 3)

(PART 1)

(PART 2)

(PART 3)

(PART 4)

| FIG. 37 | FIG. 37 |
| (PART 1) | (PART 2) |

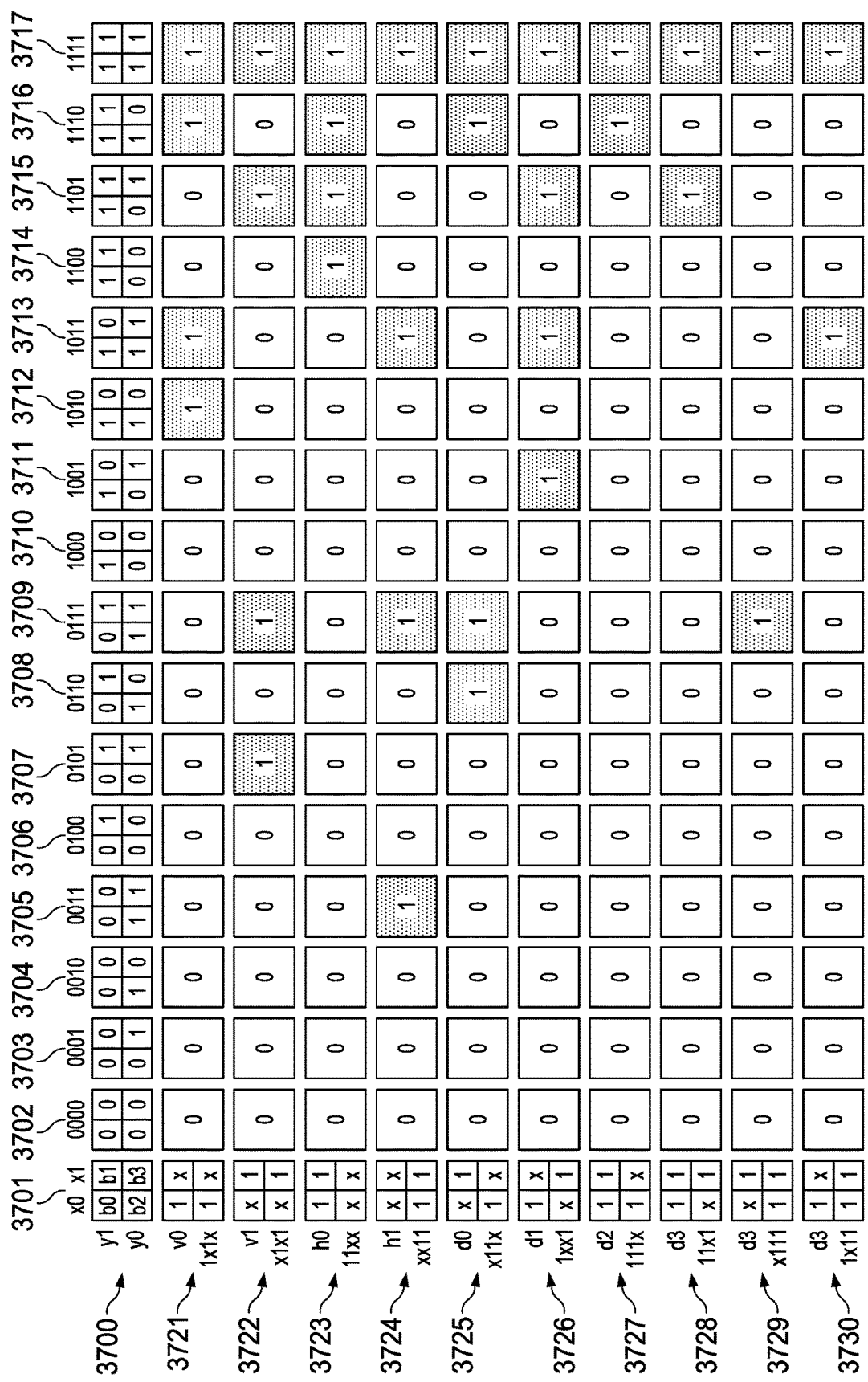

FIG. 37 (PART 2)

FIG. 38 (PART 1) | FIG. 38 (PART 2)

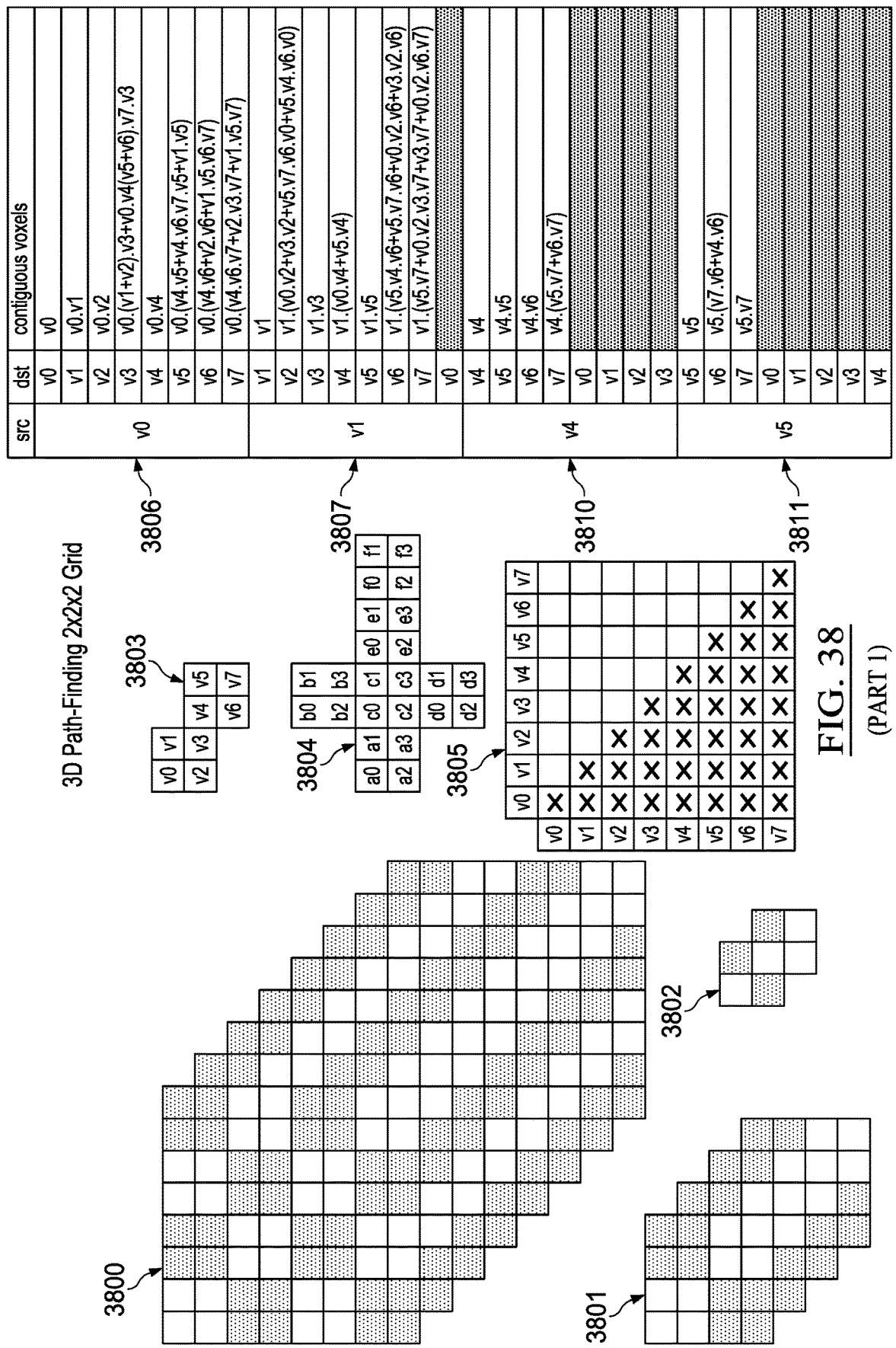
FIG. 38 (PART 1)

| src | dst | contiguous voxels |
|---|---|---|
| v2 | v2 | v2 |
| | v3 | v2.v3 |
| | v4 | v2.(v6.v4+v0.v4) |
| | v5 | v2.(v0.v4.v5+v0.v1.v5+v6.v7.v5+v6.v4.v5) |
| | v6 | v2.v6 |
| | v7 | v2.(v6.v7+v3.v7) |
| | v0 | |
| | v1 | |
| v3 | v3 | v3 |
| | v4 | v3.(v1.v0.v4 + v2.v0.v4 +v7.v6.v4 + v7.v5.v4) |
| | v5 | v3.(v7.v5 + v1.v5) |
| | v6 | v3.(v7.v6 + v2.v6) |
| | v7 | v3.v7 |
| | v0 | |
| | v1 | |
| | v2 | |
| v6 | v6 | v6 |
| | v7 | v6.v7 |
| | v0 | |
| | v1 | |
| | v2 | |
| | v3 | |
| | v4 | |
| | v5 | |
| v7 | v7 | v7 |
| | v0 | |
| | v1 | |
| | v2 | |
| | v3 | |
| | v4 | |
| | v5 | |
| | v6 | |

3808 → v2
3809 → v3
3812 → v6
3813 → v7

FIG. 38 (PART 2)

PATH PLANNING USING SPARSE VOLUMETRIC DATA

RELATED APPLICATIONS

This application is a national stage application under 35 U.S.C. § 371 of PCT International Application Serial No. PCT/US2017/047697, filed on Aug. 19, 2017 and entitled PATH PLANNING USING SPARSE VOLUMETRIC DATA, which application claims benefit to U.S. Provisional Patent Application Ser. No. 62/377,471, filed Aug. 19, 2016. The disclosures of the prior applications are considered part of and are incorporated by reference in the disclosure of this Application.

TECHNICAL FIELD

This disclosure relates in general to the field of computer systems and, more particularly, to computer vision and augmented or mixed reality systems.

BACKGROUND

The worlds of computer vision and graphics are rapidly converging with the emergence of Augmented Reality (AR), Virtual Reality (VR) and Mixed-Reality (MR) products such as those from MagicLeap™, Microsoft™ HoloLens™, Oculus™ Rift™, and other VR systems such as those from Valve™ and HTC™. The incumbent approach in such systems is to use a separate graphics processing unit (GPU) and computer vision subsystem, which run in parallel. These parallel systems can be assembled from a pre-existing GPU in parallel with a computer vision pipeline implemented in software running on an array of processors and/or programmable hardware accelerators.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labelled in every figure. Nor is every component of each embodiment of the disclosed subject matter shown where illustration is not necessary to allow those of ordinary skill in the art to understand the disclosed subject matter.

FIG. 10 illustrates the experimental results from analysis of example test images in accordance with some embodiments;

FIG. 30 illustrates example operations involving an example volumetric data structure;

FIG. 31 shows the hardware organization of an example 3D to 2D projection in accordance with some embodiments;

DETAILED DESCRIPTION OF EXAMPLE EMBODIMENTS

Figure 1:
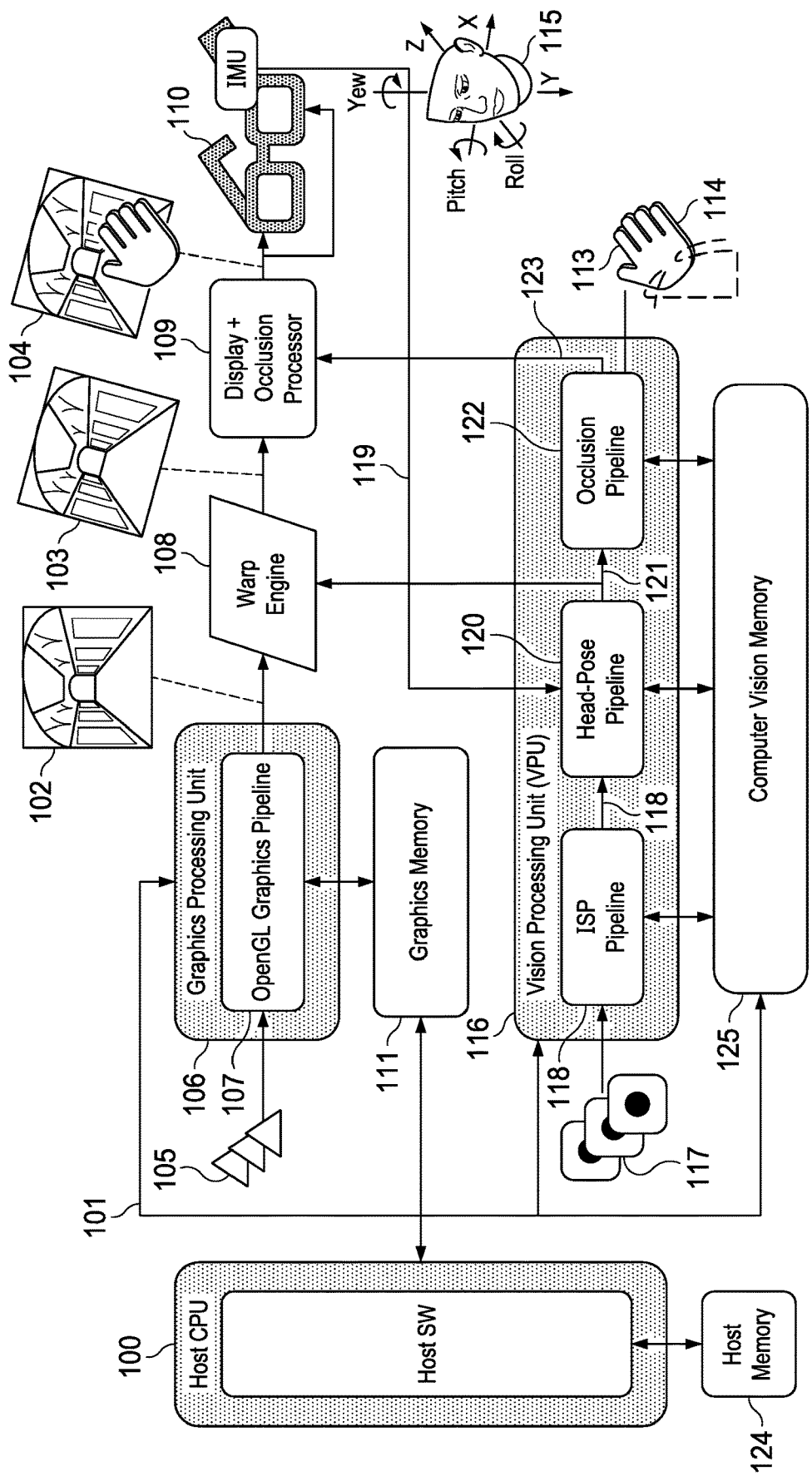
FIG. 1 illustrates a conventional augmented or mixed reality rendering system.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments provided below are exemplary, and that it is contemplated that there are other systems and methods that are within the scope of the disclosed subject matter.

A variety of technologies are emerging based on and incorporating augmented reality, virtual reality, mixed reality, autonomous devices, and robots, which may make use of data models representing volumes of three-dimensional space and geometry. The description of various real and virtual environments using such 3D or volumetric data has traditionally involved large data sets, which some computing systems have struggled to process in a desirable manner. Further, as devices, such as drones, wearable devices, virtual reality systems, etc., grow smaller, the memory and processing resources of such devices may also be constrained. As an example, AR/VR/MR applications may demand high-frame rates for the graphical presentations generated using supporting hardware. However, in some applications, the GPU and computer vision subsystem of such hardware may need to process data (e.g., 3D data) at high rates, such as up to 130 fps (7 msecs), in order to produce desirable results (e.g., to generate a believable graphical scene with frame rates that produce a believable result, prevent motion sickness of the user due to excessive latency, among other example goals. Additional application may be similarly challenged to satisfactorily process data describing large volumes, while meeting constraints in processing, memory, power, application requirements of the corresponding system, among other example issues.

In some implementations, computing systems may be provided with logic to generate and/or use sparse volumetric data, defined according to a format. For instance, a defined volumetric data-structure may be provided to unify computer vision and 3D rendering in various systems and applications. Such volumetric data structures may be implemented as a Sparse Sexaquaternary Tree (SST) with a defined storage format allowing a volume to be described as a sparse tree with multiple levels of detail. A volumetric representation of an object may be captured using an optical sensor, such as a stereoscopic camera or depth camera, for example. The volumetric representation of the object may include multiple voxels. An improved volumetric data structure may be defined that enables the corresponding volumetric representation to be subdivided recursively to obtain a target resolution of the object. During the subdivision, empty space in the volumetric representation, which may be included in one or more of the voxels, can be culled from the volumetric representation (and supporting operations). The empty space may be an area of the volumetric representation that does not include a geometric property of the object.

Accordingly, in an improved volumetric data structure, individual voxels within a corresponding volume may be tagged as "occupied" (by virtue of some geometry being present within the corresponding volumetric space) or as "empty" (representing that the corresponding volume consists of empty space). Such tags may additionally be interpreted as designating that one or more of its corresponding subvolumes is also occupied (e.g., if the parent or higher level voxel is tagged as occupied) or that all of its subvolumes are empty space (i.e., in the case of the parent, or higher level voxel being tagged empty). In some implementations, tagging a voxel as empty may allow the voxel and/or its corresponding subvolume voxels to be effectively removed from the operations used to generate a corresponding volumetric representation. Further, such an approach to a sparse volumetric data structure may utilize comparatively less storage space than is traditionally used to store volumetric representations of objects. Additionally, compression of volumetric data may increase the viability of transmission of such representations and enable faster processing of such representations, among other example benefits.

The volumetric data-structure can be hardware accelerated to rapidly allow updates to a 3D renderer, eliminating delay that may occur in separate computer vision and graphics systems. Such delay can incur latency, which may induce motion sickness in users among other additional disadvantages when used in AR, VR, MR, and other applications. The capability to rapidly test voxels for occupancy of a geometric property in an accelerated data-structure allows for construction of a low-latency AR, VR, MR, or other system, which can be updated in real time.

In some embodiments, the capabilities of the volumetric data-structure may also provide intra-frame warnings. For example, in AR, VR, MR, and other applications, when a user is likely to collide with a real or synthetic object in an imaged scene, or in computer vision applications for drones or robots, when such devices are likely to collide with a real or synthetic object in an imaged scene, the speed of processing provided by the volumetric data structure allows for warning of the impending collision.

Embodiments of the present disclosure may relate to the storage and processing of volumetric data in applications such as robotics, head-mounted displays for augmented and mixed reality headsets as well as phones and tablets. Embodiments of the present disclosure represent each volumetric element (e.g., voxel) within a group of voxels, and optionally physical quantities relating to the voxel's geometry, as a single bit. Additional parameters related to a group of 64 voxels may be associated with the voxels, such as corresponding red-green-blue (RGB) or other coloration encodings, transparency, truncated signed distance function (TSDF) information, etc. and stored in an associated and optional 64-bit data-structure (e.g., such that two or more bits are used to represent each voxel). Such a representation scheme may realize a minimum memory requirement. Moreover, representing voxels by a single bit allows for the performance of many simplified calculations to logically or mathematically combine elements from a volumetric representation. Combining elements from a volumetric representation can include, for example, ORing planes in a volume to create 2D projections of 3D volumetric data, and calculating surface areas by counting the number of occupied voxels in a 2.5D manifold, among others. For comparisons XOR logic may be used to compare 64-bit sub-volumes (e.g., 4^3 sub-volumes), and volumes can be inverted, where objects can be merged to create hybrid objects by ORing them together, among other examples.

FIG. 1 illustrates a conventional augmented or mixed reality system consisting of parallel graphics rendering and computer-vision subsystems with a post-rendering connection apparatus to account for changes due to rapid head movement and changes in the environment which can produce occlusions and shadows in the rendered graphics. In one example implementation, a system may include a host processor 100 supported by host memory 124 to control the execution of a graphics pipeline, computer vision pipeline, and post-rendering correction apparatus by interconnection via bus 101, on-chip network on-chip, or other interconnection. The interconnection allows the host processor 100 running appropriate software to control the execution of the graphics processing unit (GPU) 106, associated graphics memory 111, computer vision pipeline 116, and associated computer vision memory 124. In one example, rendering of graphics using the GPU 106 via an OpenGL graphics shader 107 (e.g., operating on a triangle list 105) may take place at a slower rate than the computer vision pipeline. As a result, post rendering correction via a warp engine 108 and display/occlusion processor 109 may be performed to account for changes in head pose and occluding scene geometry that may have occurred since the graphics was rendered by the GPU 106. The output of the GPU 106 is time-stamped so that it can be used in conjunction with the correct control signals 121 and 123 from the head pose pipeline 120 and occlusion pipeline 123 respectively to produce the correct graphics output to take account of any changes in head pose 119 and occluding geometry 113, among other examples.

In parallel with the GPU 106, a plurality of sensors and cameras (e.g., including active and passive stereo cameras for depth and vision processing 117) may be connected to the computer vision pipeline 116. The computer vision pipeline 116 may include one or more of at least three stages, each of which may contain multiple stages of lower level processing. In one example, the stages in the computer vision pipeline 116 may be the image signal processing (ISP) pipeline 118, head-pose pipeline 120, and occlusion pipeline 122. The ISP pipeline 118 may take the outputs of the input camera sensors 117 and condition them so they can be used for subsequent head-pose and occlusion processing. The head-pose pipeline 120 may take the output of the ISP pipeline 118 and use it together with the output 119 of the inertial measurement unit (IMU) in the headset 110 to compute a change in head-pose since the corresponding output graphics frame was rendered by the GPU 106. The output 121 of the head-pose pipeline (HPP) 120 may be applied to the warp engine 108 along with a user specified mesh to distort the GPU output 102 so that it matches the updated head-pose position 119. The occlusion pipeline 122 may take the output of head-pose pipeline 121 and look for new objects in the visual field such as a hand 113 (or other example object) entering the visual field which should produce a corresponding shadow 114 on the scene geometry. The output 123 of the occlusion pipeline 122 may be used by the display and occlusion processor 109 to correctly overlay the visual field on top of the output 103 of the warp engine 108. The display and occlusion processor 109 produces a shadow mask for synthetic shadows 114 using the computed head-pose 119, and the display and occlusion processor 109 may composite the occluding geometry of the hand 113 on top of the shadow mask to produce a graphical shadow 114 on top of the output 103 of the warp engine 108 and produce the final output frame(s) 104 for display on the augmented/mixed reality headset 110, among other example use cases and features.

Figure 2:
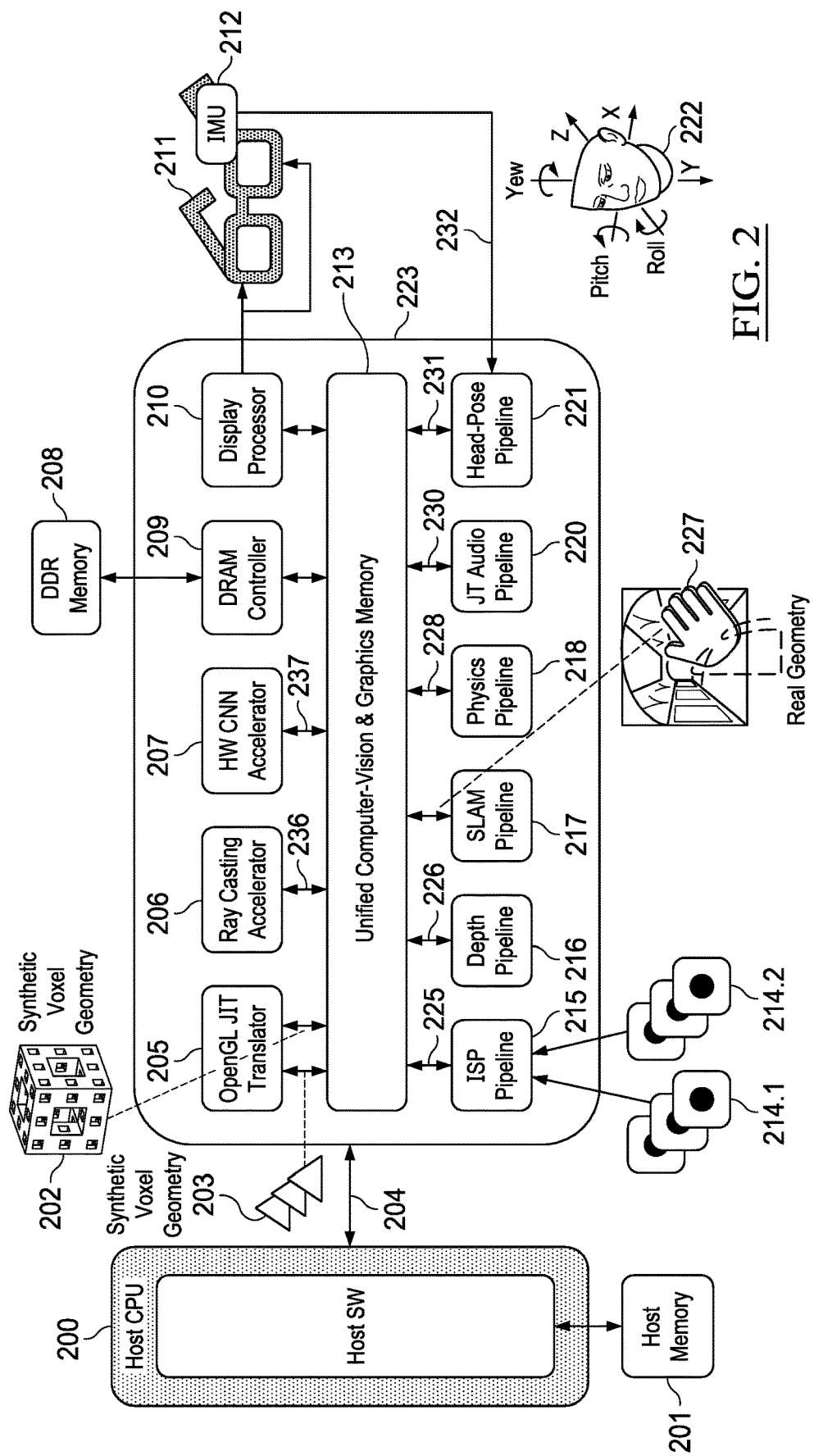
FIG. 2 illustrates a voxel-based augmented or mixed reality rendering system in accordance with some embodiments.

FIG. 2 illustrates a voxel-based augmented or mixed reality rendering system in accordance with some embodiments of the present disclosure. The apparatus depicted in FIG. 2 may include a host system composed on host CPU 200 and associated host memory 201. Such a system may communicate via a bus 204, on-chip network or other communications mechanism, with the unified computer vision and graphics pipeline 223 and associated unified computer vision and graphics memory 213 containing the real and synthetic voxels to be rendered in the final scene for display on a head-mounted augmented or mixed reality display 211. The AR/MR display 211 may also contain a plurality of active and passive image sensors 214 and an inertial measurement unit (IMU) 212, which is used to measure changes to head pose 222 orientation.

In the combined rendering pipeline, synthetic geometry may be generated starting from a triangle list 204 which is processed by an OpenGL JiT (Just-in-Time) translator 205 to produce synthetic voxel geometry 202. The synthetic voxel geometry may be generated, for instance, by selecting a main plane of a triangle from a triangle list. 2D rasterization of each triangle in the selected plane may then be performed (e.g., in the X and Z direction). The third coordinate (e.g., Y) may be created as an attribute to be interpolated across the triangle. Each pixel of the rasterized triangle may result in the definition of a corresponding voxel. This processing can be performed by either a CPU or GPU. When performed by a GPU, each rasterized triangle may be read back from the GPU to create a voxel where the GPU drew a pixel, among other example implementations. For instance, a synthetic voxel may be generated using a 2D buffer of lists, where each entry of the list stores the depth information of a polygon rendered at that pixel. For instance, a model can be rendered using an orthographic viewpoint (e.g., top-down). For example, every (x, y) provided in an example buffer may represent the column at (x, y) in a corresponding voxel volume (e.g., from (x,y,0) to (x,y,4095)). Each column may then be rendered from the information as 3D scanlines using the information in each list.

Continuing with the example of FIG. 2, in some implementations the synthetic voxel geometry 202 may be combined with measured geometry voxels 227 constructed using a simultaneous localization and mapping (SLAM) pipeline 217. The SLAM pipeline may use active sensors and/or passive image sensors 214 (e.g., 214.1 and 214.2) which are first processed using an image signal processing (ISP) pipeline 215 to produce an output 225, which may be converted into depth images 226 by a depth pipeline 216. Active or passive image sensors 214 (214.1 and 214.2) may include active or passive stereo sensors, structured light sensors, time-of-flight sensors, among other examples. For instance, the depth pipeline 216 can process either depth data from a structured light or time-of-flight sensor 214.1 or alternately a passive stereo sensors 214.2. In one example implementation, stereo sensors 214.2 may include a passive pair of stereo sensors, among other example implementations.

Depth images generated by the depth pipeline 215 may be processed by a dense SLAM pipeline 217 using a SLAM algorithm (e.g., Kinect Fusion) to produce a voxelized model of the measured geometry voxels 227. A ray-tracing accelerator 206 may be provided that may combine the measured geometry voxels 227 (e.g., real voxel geometry) with the synthetic voxel geometry 202 to produce a 2D rendering of the scene for output to a display device (e.g., a head mounted display 211 in a VR or AR application) via a display processor 210. In such an implementation, a complete scene model may be constructed from real voxels of measured geometry voxels 227 and synthetic geometry 202. As a result, there is no requirement for warping of 2D rendered geometry (e.g., as in FIG. 1). Such an implementation may be combined with head-pose tracking sensors and corresponding logic to correctly align the real and measured geometry. For instance, an example head-pose pipeline 221 may process head-pose measurements 232 from an IMU 212 mounted in the head mounted display 212 and the output 231 of the head-pose measurement pipeline may be taken into account during rendering via the display processor 210.

In some examples, a unified rendering pipeline may also use the measured geometry voxels 227 (e.g., a real voxel model) and synthetic geometry 202 (e.g., a synthetic voxel model) in order to render audio reverberation models and model the physics of a real-world, virtual, or mixed reality scene. As an example, a physics pipeline 218 may take the measured geometry voxels 227 and synthetic geometry 202 voxel geometry and compute the output audio samples for left and right earphones in a head mounted display (HMD) 211 using the ray casting accelerator 206 to compute the output samples 230 using acoustic reflection coefficients built into the voxel data-structure. Similarly, the unified voxel model consisting of 202 and 227 may also be used to determine physics updates for synthetic objects in the composite AR/MR scene. The physics pipeline 218 takes the composite scene geometric as inputs and computes collisions using the ray-casting accelerator 206 before computing updates 228 to the synthetic geometry 202 for rendering and as a basis for future iterations of the physics models.

In some implementations, a system, such as the system shown in FIG. 2, may be additionally provided with one or more hardware accelerators to implement and/or utilize convolutional neural networks (CNNs) that can process either RGB video/image inputs from the output of the ISP pipeline 215, volumetric scene data from the output of the SLAM pipeline 217, among other examples. Neural network classifiers can run either exclusively using the hardware (HW) convolutional neural network (CNN) accelerator 207 or in a combination of processors and HW CNN accelerator 207 to produce an output classification 237. The availability of a HW CNN accelerator 207 to do inference on volumetric representations may allow groups of voxels in the measured geometry voxels 227 to be labelled as belonging to a particular object class, among other example uses.

Labeling voxels (e.g., using a CNN and supporting hardware acceleration) may allow those objects to which those voxels belong to be recognized by the system as corresponding to the known object and the source voxels can be removed from the measured geometry voxels 227 and replaced by a bounding box corresponding to the object and/or information about the object's origin, object's pose, an object descriptor, among other example information. This may result in a much more semantically meaningful description of the scene that can be used, for example, as an input by a robot, drone, or other computing system to interact with objects in the scene, or an audio system to look up the sound absorption coefficient of objects in the scene and reflect them in the acoustic model of the scene, among other example uses.

One or more processor devices and hardware accelerators may be provided to implement the pipelines of the example system shown and described in FIG. 2. In some implementations, all of the hardware and software elements of the combined rendering pipeline may share access to a DRAM controller 209 which in turn allows data to be stored in a shared DDR memory device 208, among other example implementations.

Figure 3:
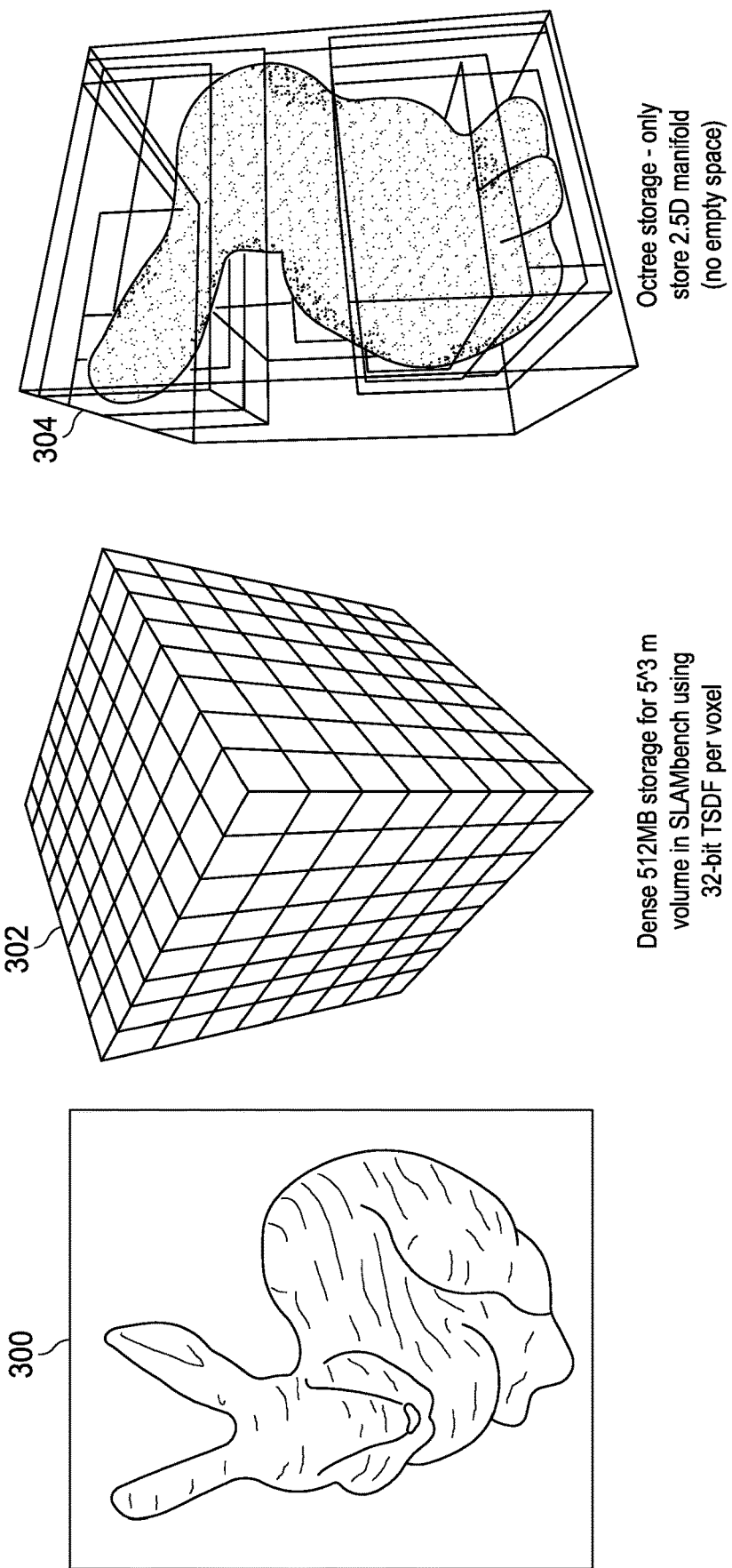
FIG. 3 illustrates the difference between dense and sparse volumetric representations in accordance with some embodiments.

FIG. 3 is presented to illustrate a difference between dense and sparse volumetric representations in accordance with some embodiments. As shown in the example of FIG. 3, a real world or synthetic object 300 (e.g., a statue of a rabbit) can be described in terms of voxels either in a dense manner as shown in 302 or in a sparse manner as shown in 304. The advantage of the dense representation such as 302 is uniform speed of access to all voxels in the volume, but the downside is the amount of storage that may be required. For example, for a dense representation, such as a $512^3$ element volume (e.g., corresponding to a 5 m in 1 cm resolution for a volume scanned using a Kinect sensor), 512 Mbytes to store a relatively small volume with a 4 Byte truncated signed distance function (TSDF) for each voxel. An octree representation 304 embodying a sparse representation, on the other hand, may store only those voxels for which there is actual geometry in the real world scene, thereby reducing the amount of data needed to store the same volume.

Figure 4:
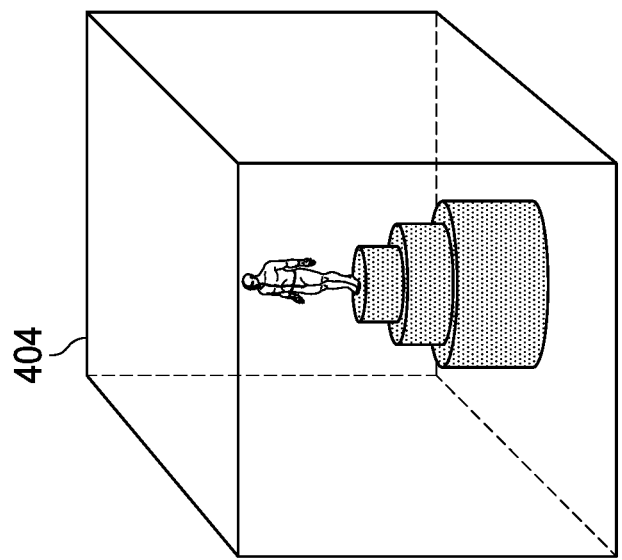
FIG. 4 illustrates a composite view of a scene in accordance with some embodiments.
Figure 4:
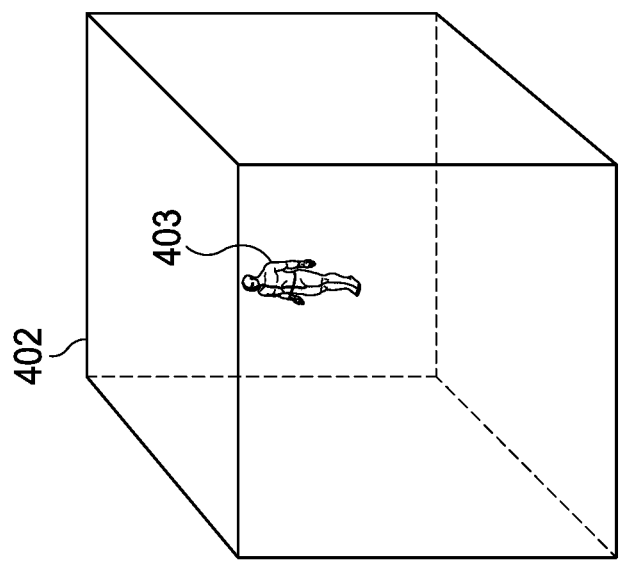
Figure 4:
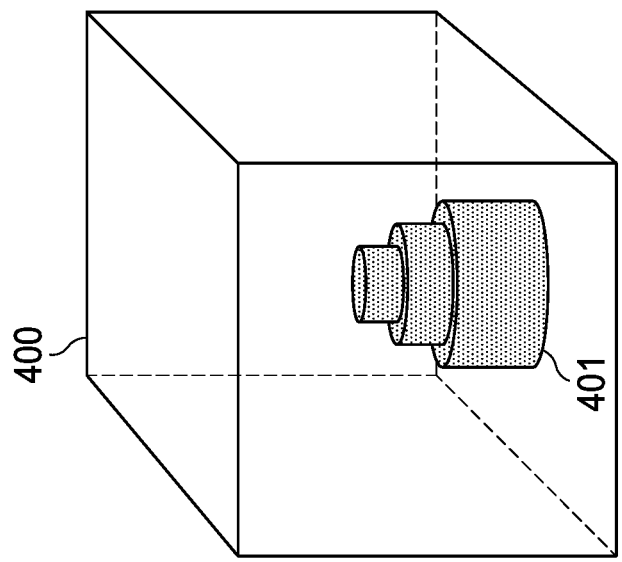
Figure 5:
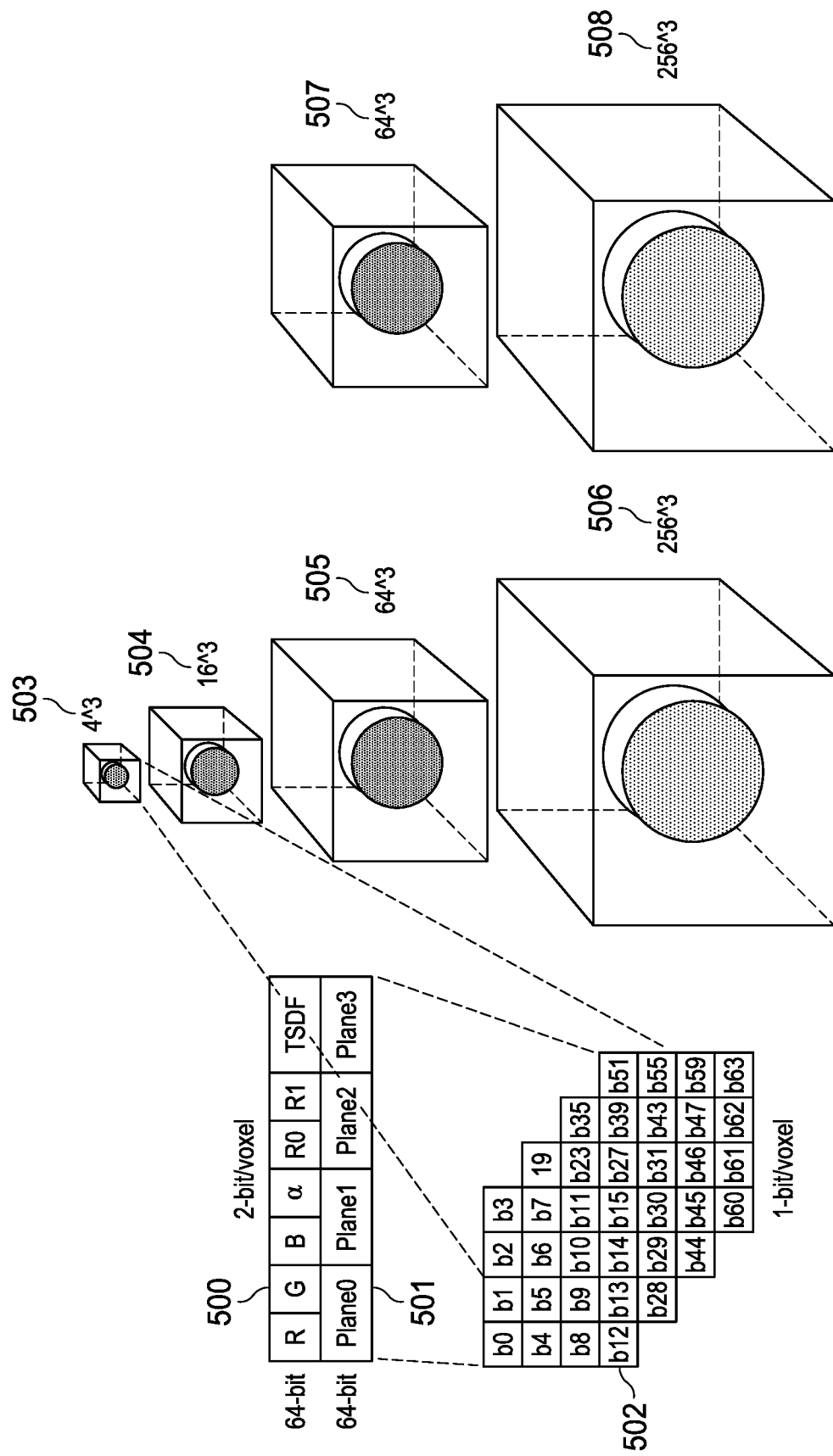
FIG. 5 illustrates the level of detail in an example element tree structure in accordance with some embodiments.

Turning to FIG. 4, a composite view of an example scene is illustrated in accordance with some embodiments. In particular, FIG. 4 shows how a composite view of a scene 404 can be maintained, displayed or subject to further processing using parallel data structures to represent synthetic voxels 401 and real world measured voxels 403 within equivalent bounding boxes 400 and 402 respectively for the synthetic and real-world voxel data. FIG. 5 illustrates the level of detail in a uniform $4^3$ element tree structure (or volumetric data structure) in accordance with some embodiments. In some implementations, as little as 1 bit may be utilized to describe each voxel in the volume using an octree representation, such as represented in the example of FIG. 5. However, a disadvantage of octree based techniques may be the number of indirect memory accesses utilized to access a particular voxel in the octree. In the case of a sparse voxel octree, the same geometry may be implicitly represented at multiple levels of detail advantageously allowing operations such as ray-casting, game-physics, CNNs, and other techniques to allow empty parts of a scene to be culled from further calculations leading to an overall reduction in not only storage required, but also in terms of power dissipation and computational load, among other example advantages.

In one implementation, an improved voxel descriptor (also referred to herein as "volumetric data structure") may be provided to organize volumetric information as a $4^3$ (or 64-bit) unsigned integer, such as shown in 501 with a memory requirement of 1 bit per voxel. In this example, 1-bit per voxel is insufficient to store a truncated signed distance function value (compared with TSDFs in SLAMbench/KFusion which utilize 64-bits). In the present example, an additional (e.g., 64-bit) field 500 may be included in the voxel descriptor. This example may be further enhanced such that while the TSDF in 64-bit field 500 is 16-bits, an additional 2-bits of fractional resolution in x, y and z may be provided implicitly in the voxel descriptor 501 to make the combination of the voxel TSDF in 64-bit field 500 and voxel location 501 equivalent to a much higher resolution TSDF, such as used in SLAMbench/KFusion or other examples. For instance, the additional data in the 64-bit field 500 (voxel descriptor) may be used to store subsampled RGB color information (e.g., from the scene via passive RGB sensors) with one byte each, and an 8-bit transparency value alpha, as well as two 1-byte reserved fields R1 and R2 that may be application specific and can be used to store, for example, acoustic reflectivity for audio applications, rigidity for physics applications, object material type, among other examples.

As shown in FIG. 5, the voxel descriptor 501 can be logically grouped into four 2D planes, each of which contain 16 voxels 502. These 2D planes (or voxel planes) may describe each level of an octree style structure based on successive decompositions in ascending powers of 4, as represented in FIG. 5. In this example implementation, the 64-bit voxel descriptor is chosen because it is a good match for a 64-bit bus infrastructure used in a corresponding system implementation (although other voxel descriptor sizes and formats may be provided in other system implementations and sized according to the bus or other infrastructure of the system). In some implementations, a voxel descriptor may be sized to reduce the number of memory accesses used to obtain the voxel. For instance, a 64-bit voxel descriptor may be used to reduce the number of memory accesses necessary to access a voxel at an arbitrary level in the octree by a factor of 2 compared to a traditional octree which operates on $2^3$ elements, among other example considerations and implementations.

In one example, an octree can be described starting from a $4^3$ root volume 503, and each non-zero entry in which codes for the presence of geometry in the underlying layers 504, 505 and 506 are depicted in the example $256^3$ volume. In this particular example, four memory accesses may be used in order to access the lowest level in the octree. In cases where such overhead is too high, an alternate approach may be adopted to encode the highest level of the octree as a larger volume, such as $64^3$, as shown in 507. In this case, each non-zero entry in 507 may indicate the presence of an underlying $4^3$ octree in the underlying $256^3$ volume 508. The result of this alternate organization is that only two memory accesses are required to access any voxel in the $256^3$ volume 508 compared to the alternate formulation shown in 503, 504 and 505. This latter approach is advantageous in the case that the device hosting the octree structure has a larger amount of embedded memory, allowing only the lower and less frequently accessed parts of the voxel octree 508 in external memory. This approach may cost more in terms of storage, for instance, where the full, larger (e.g., $64^3$) volume is to be stored in on-chip memory, but the tradeoff may allow faster memory access (e.g., 2×) and much lower power dissipation, among other example advantages.

Figure 6:
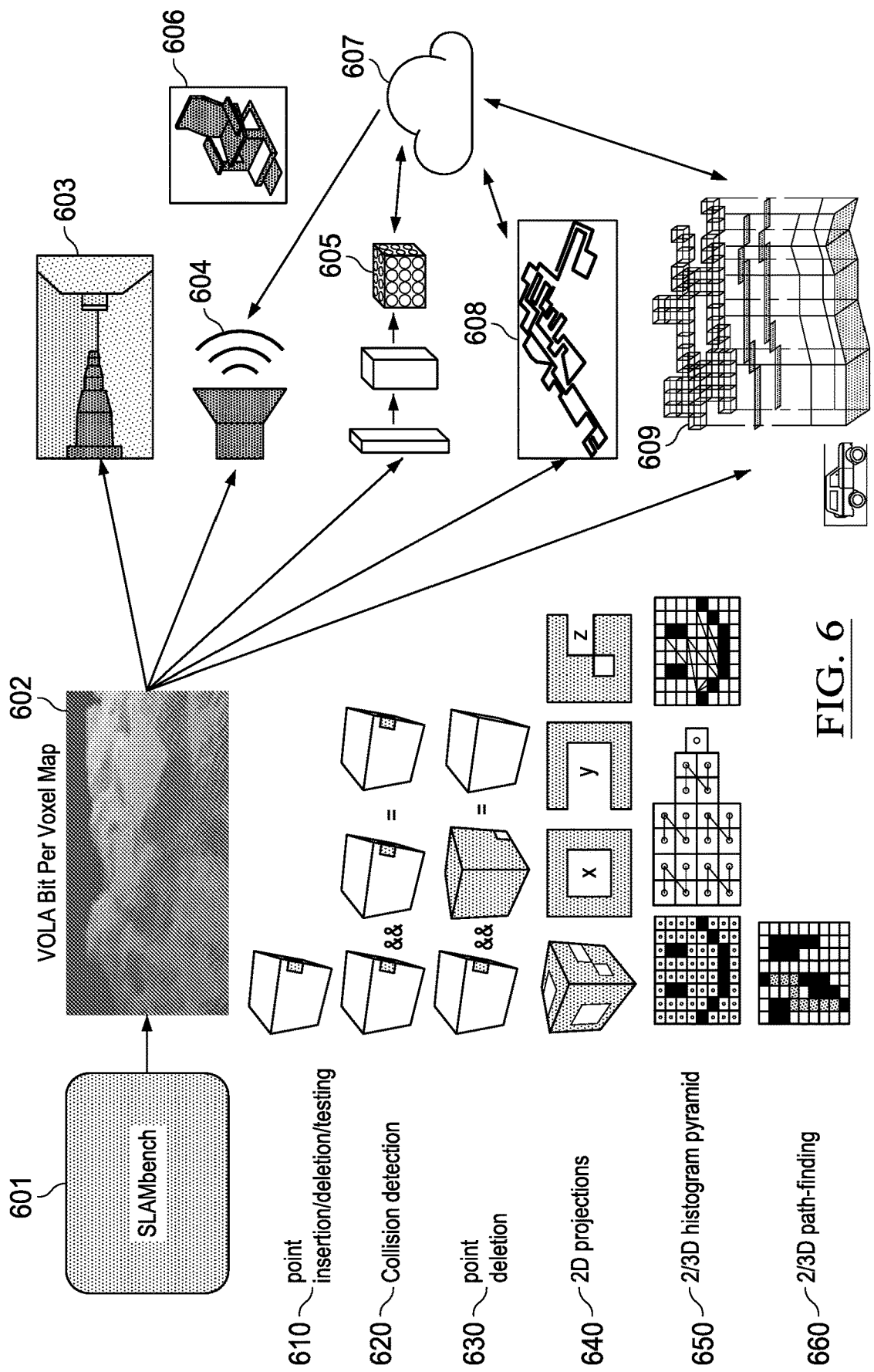
FIG. 6 illustrates applications which can utilize the data-structure and voxel data of the present application in accordance with some embodiments.

Turning to FIG. 6, a block diagram is shown illustrating example applications which may utilize the data-structure and voxel data of the present application in accordance with some embodiments. In one example, such as that shown in FIG. 5, additional information may be provided through an example voxel descriptor 500. While the voxel descriptor may increase the overall memory utilized to 2 bits per voxel, the voxel descriptor may enable a wide range of applications, which can make use of the voxel data, such as represented in FIG. 6. For instance, a shared volumetric representation 602, such as generated using a dense SLAM system 601 (e.g., SLAMbench), can be used in rendering the scene using graphic ray-casting or ray-tracing 603, used in audio ray-casting 604, among other implementations. In still other examples, the volumetric representation 602 can also be used in convolutional neural network (CNN) inference 605, and can be backed up by cloud infrastructure 607. In some instances, cloud infrastructure 607 can contain detailed volumetric descriptors of objects such as a tree, piece of furniture, or other object (e.g., 606) that can be accessed via inference. Based on inferring or otherwise identifying the object, corresponding detailed descriptors may be returned to the device, allowing voxels of volumetric representation 602 to be replaced by bounding box representations with pose information and descriptors containing the properties of the objects, among other example features.

In still other embodiments, the voxel models discussed above may be additionally or alternatively utilized in some systems to construct 2D maps of example environments 608 using 3D-to-2D projections from the volumetric representation 602. These 2D maps can again be shared via communicating machines via cloud infrastructure and/or other network-based resources 607 and aggregated (e.g., using the same cloud infrastructure) to build higher quality maps using crowd-sourcing techniques. These maps can be shared by the cloud infrastructure 607 to connected machines and devices. In still further examples, 2D maps may be refined for ultra-low bandwidth applications using projection followed by piecewise simplification 609 (e.g., assuming fixed width and height for a vehicle or robot). The simplified path may then only have a single X,Y coordinate pair per piecewise linear segment of the path, reducing the amount of bandwidth required to communicate the path of the vehicle 609 to cloud infrastructure 607 and aggregated in that same cloud infrastructure 607 to build higher quality maps using crowd-sourcing techniques. These maps can be shared by cloud infrastructure 607 to connected machines and devices.

In order to enable these different applications, in some implementations, common functionality may be provided, such as through a shared software library, which in some embodiments may be accelerated using hardware accelerators or processor instruction set architecture (ISA) extensions, among other examples. For instance, such functions may include the insertion of voxels into the descriptor, the deletion of voxels, or the lookup of voxels 610. In some implementations, a collision detection function 620 may also be supported, as well as point/voxel deletion from a volume 630, among other examples. As introduced above, a system may be provided with functionality to quickly generate 2D projections 640 in X-, Y- and Z-directions from a corresponding volumetric representation 602 (3D volume) (e.g., which may serve as the basis for a path or collision determination). In some cases, it can also be advantageous to be able to generate triangle lists from volumetric representation 602 using histogram pyramids 650. Further, a system may be provided with functionality for fast determination of free paths 660 in 2D and 3D representations of a volumetric space 602. Such functionality may be useful in a range of applications. Further functions may be provided, such as elaborating the number of voxels in a volume, determining the surface of an object using a population counter to count the number of 1 bits in the masked region of the volumetric representation 602, among other examples.

Figure 7:
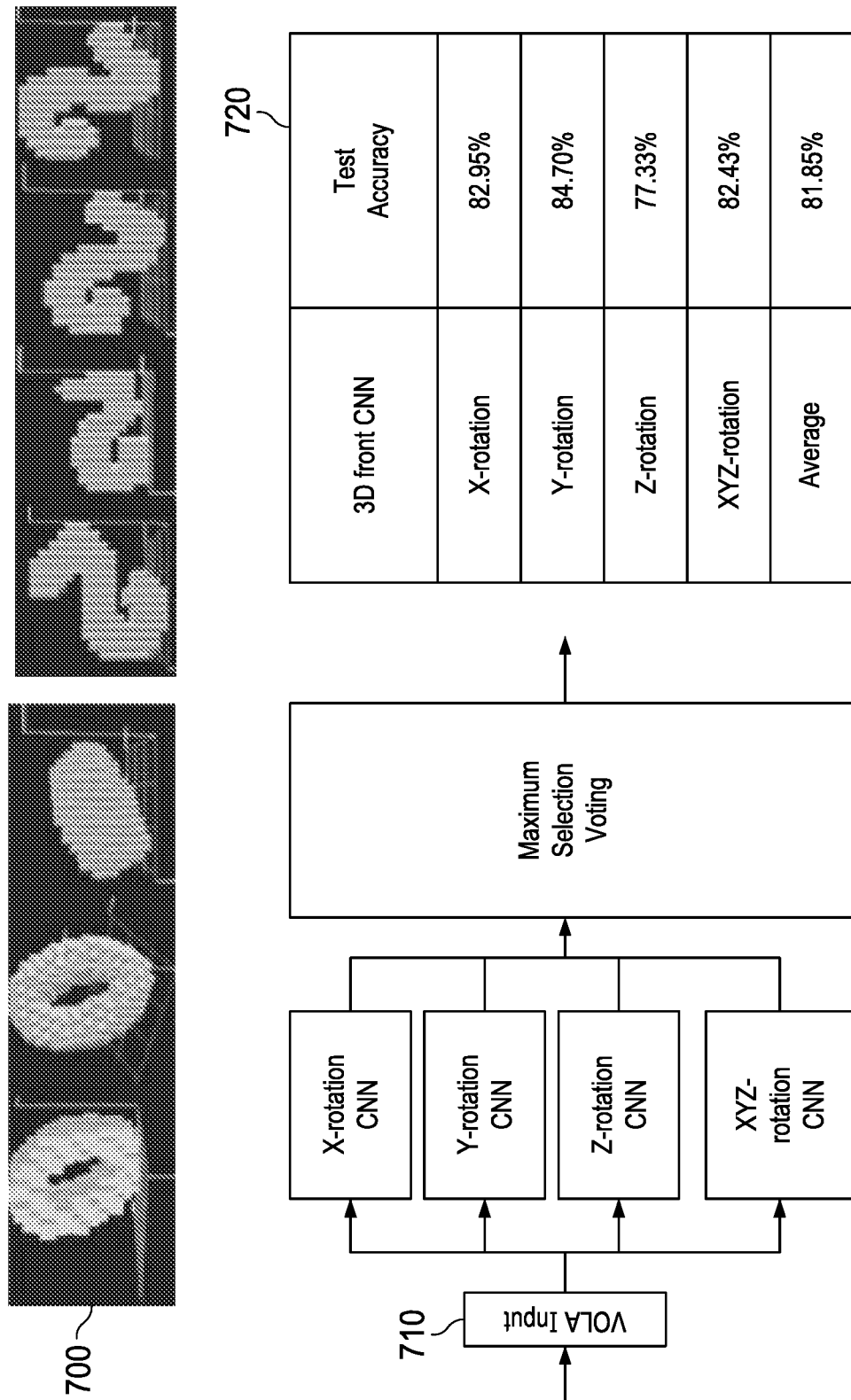
FIG. 7 illustrates an example network used to recognize 3D digits in accordance with some embodiments.

Turning to the simplified block diagram of FIG. 7, an example network is illustrated including systems equipped with functionality to recognize 3D digits in accordance with at least some embodiments. For instance, one of the applications shown in FIG. 6 is the volumetric CNN application 605, which is described in more detail in FIG. 7 where an example network is used to recognize 3D digits 700 generated from a data set, such as the Mixed National Institute of Standards and Technology (MNIST) dataset. Digits within such a data set may be used to train a CNN based convolutional network classifier 710 by applying appropriate rotations and translations in X, Y and Z to the digits before training. When used for inference in an embedded device, the trained network 710 can be used to classify 3D digits in the scene with high accuracy even where the digits are subject to rotations and translations in X, Y and Z 720, among other examples. In some implementations, the operation of the CNN classifier can be accelerated by the HW CNN accelerator 207 shown in FIG. 2. As the first layer of the neural network performs multiplications using the voxels in the volumetric representation 602, these arithmetic operations can be skipped as multiplication by zero is always zero and multiplication by a data value A by one (voxel) is equal to A.

Figure 8:
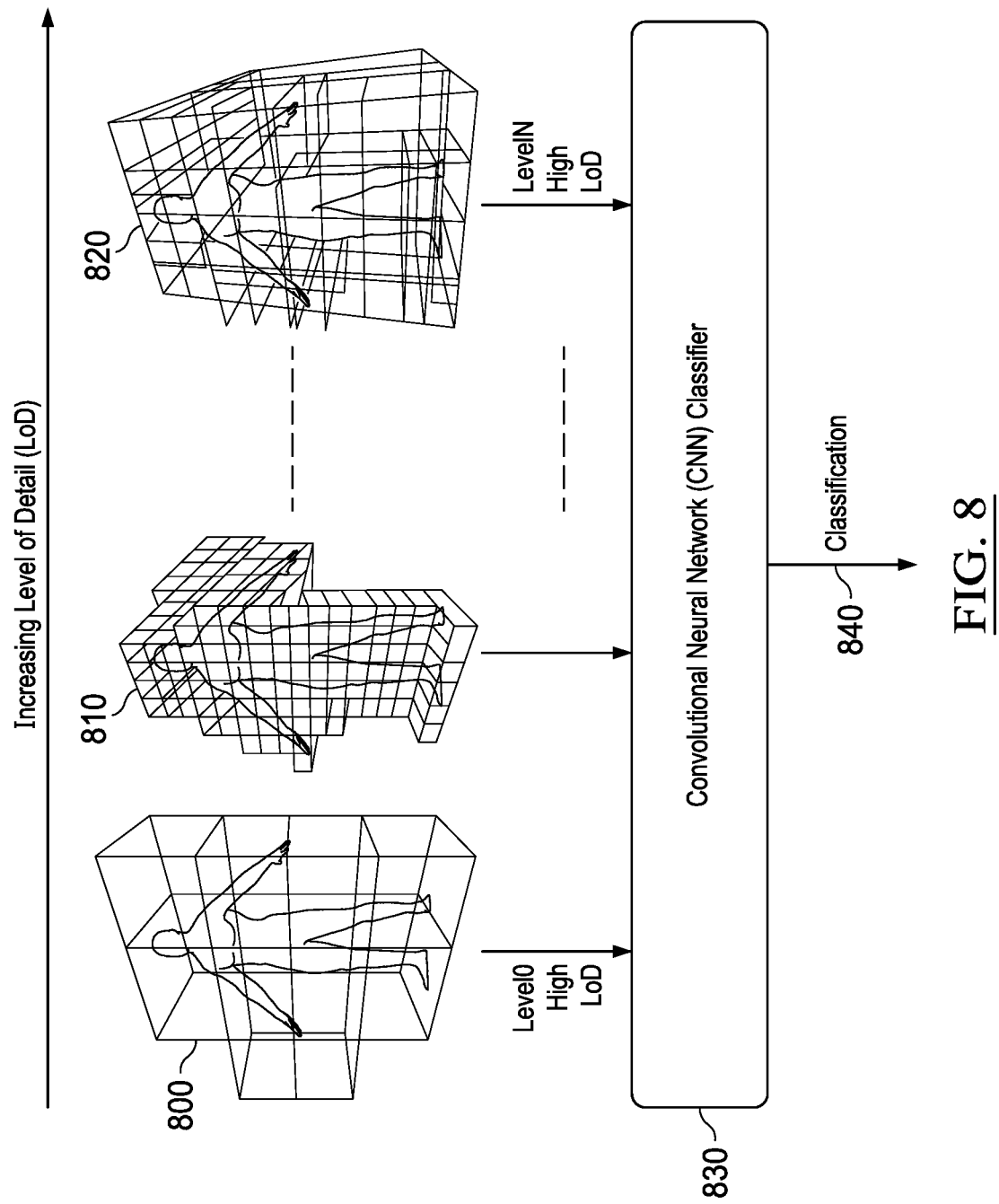
FIG. 8 illustrates multiple classifications performed on the same data structure using implicit levels of detail in accordance with some embodiments.

FIG. 8 illustrates multiple classifications performed on the same data structure using implicit levels of detail. A further refinement of the CNN classification using volumetric representation 602 may be that, as the octree representation contains multiple levels of detail implicitly in the octree structure as shown in FIG. 5, multiple classifications can be performed on the same data structure using the implicit levels of detail 800, 810 and 820 in parallel using a single classifier 830 or multiple classifiers in parallel, such as shown in FIG. 8. In traditional systems, comparable parallel classification may be slow due to the required image resizing between classification passes. Such resizing may be foregone in implementations applying the voxel structures discussed herein, as the same octree may contain the same information at multiple levels of detail. Indeed, a single training dataset based on volumetric models can cover all of the levels of detail rather than resized training datasets, such as would be required in conventional CNN networks.

Figure 9:
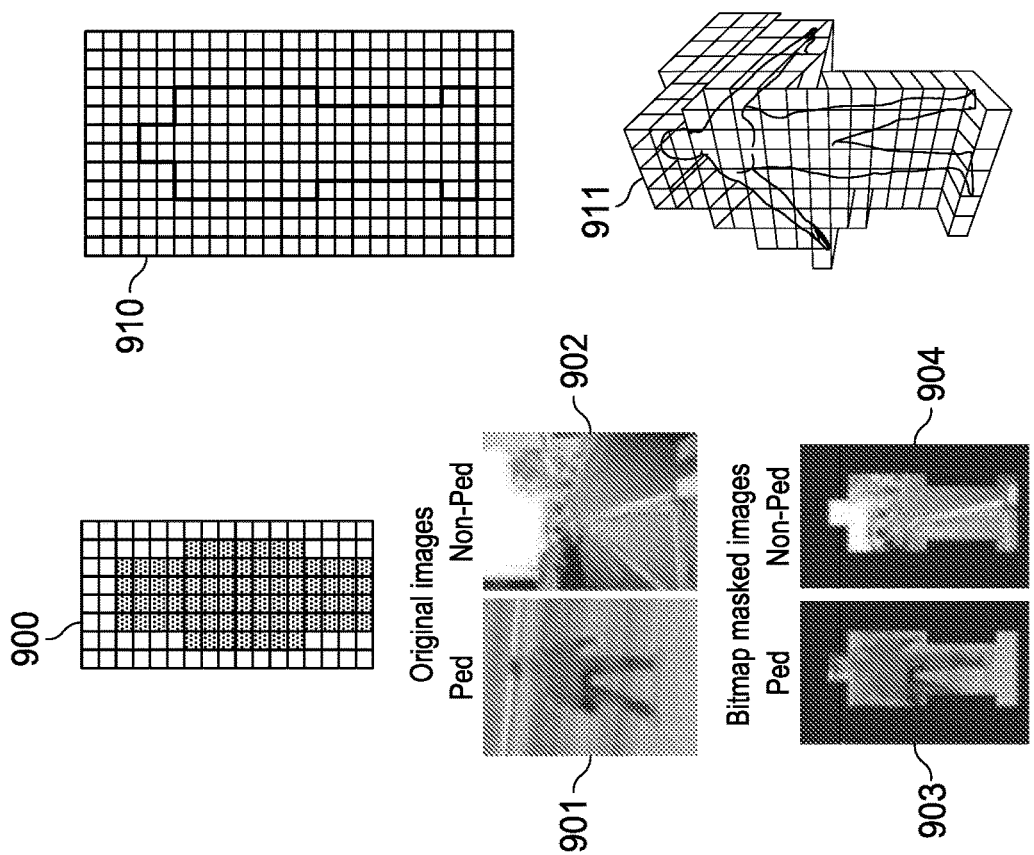
FIG. 9 illustrates operation elimination by 2D convolutional neural networks in accordance with some embodiments.
Figure 9:
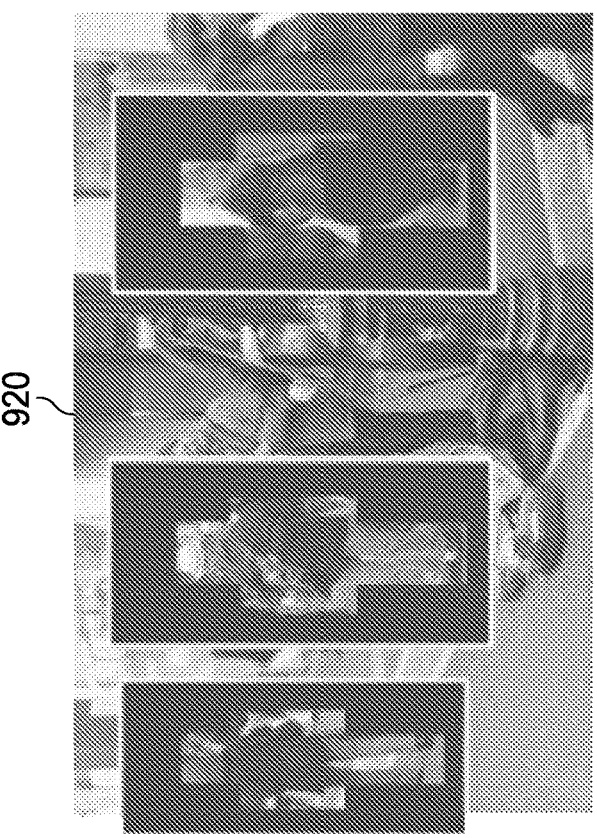

Turning to the example of FIG. 9, an example operation elimination is illustrated by 2D CNNs in accordance with some embodiments. Operation elimination can be used on 3D volumetric CNNs, as well as on 2D CNNs, such as shown in FIG. 9. For instance, in FIG. 9, in a first layer, a bitmap mask 900 can be used to describe the expected "shape" of the input 910 and may be applied to an incoming video stream 920. In one example, operation elimination can be used not only on 3D volumetric CNNs, but also on 2D volumetric CNNs. For instance, in a 2D CNN of the example of FIG. 9, a bitmap mask 900 may be applied to a first layer of the CNN to describe the expected "shape" of the input 910 and may be applied to input data of the CNN, such as an incoming video stream 820. As an example, the effect of applying bitmap masks to images of pedestrians for training or inference in CNN networks is shown in FIG. 9 where 901 represents an original image of a pedestrian 901, with 903 representing the corresponding version with bitmap mask applied. Similarly, an image containing no pedestrian is shown in 902 and the corresponding bitmap masked version in 904. The same method can be applied to any kind of 2D or 3D object in order to reduce the number of operations required for CNN training or inference through knowledge of the expected 2D or 3D geometry expected by the detector. An example of a 3D volumetric bitmap is shown in 911. The use of 2D bitmaps for inference in a real scene is shown in 920.

In the example implementation of FIG. 9, a conceptual bitmap is shown (at 900) while the real bitmap is generated by averaging a series of training images for a particular class of object 910. The example shown is two dimensional, however similar bitmap masks can also be generated for 3D objects in the proposed volumetric data format with one bit per voxel. Indeed the method could also potentially be extended to specify expected color range or other characteristics of the 2D or 3D object using additional bits per voxel/pixel, among other example implementations.

FIG. 10 is a table illustrating results of an example experiment involving the analysis of 10,000 CIFAR-10 test images in accordance with some embodiments. In some implementations, operation elimination can be used to eliminate intermediate calculations in 1D, 2D, and 3D CNNs due to Rectified Linear Unit (ReLU) operations which are frequent in CNN networks such as LeNet 1000, shown in FIG. 10. As shown in FIG. 10, in an experiment using 10,000 CIFAR-10 test images, the percentage of data-dependent zeroes generated by the ReLU units may reach up to 85%, meaning that in the case of zeroes, a system may be provided that recognizes the zeros and, in response, does not fetch corresponding data and perform corresponding multiplication operations. In this example, the 85% represents the percentage of ReLU dynamic zeros generated from the Modified National Institute of Standards and Technology database (MNIST) test dataset. The corresponding operation eliminations corresponding to these zero may serve to reduce power dissipation and memory bandwidth requirements, among other example benefits.

Trivial operations may be culled based on a bitmap. For instance, the use of such a bitmap may be according to the principles and embodiments discussed and illustrated in U.S. Pat. No. 8,713,080, titled "Circuit for compressing data and a processor employing the same," which is incorporated by reference herein in its entirety. Some implementations, may provide hardware capable of using such bitmaps, such as systems, circuitry, and other implementations discussed and illustrated in U.S. Pat. No. 9,104,633, titled "Hardware for performing arithmetic operations," which is also incorporated by reference herein in its entirety.

Figure 11:
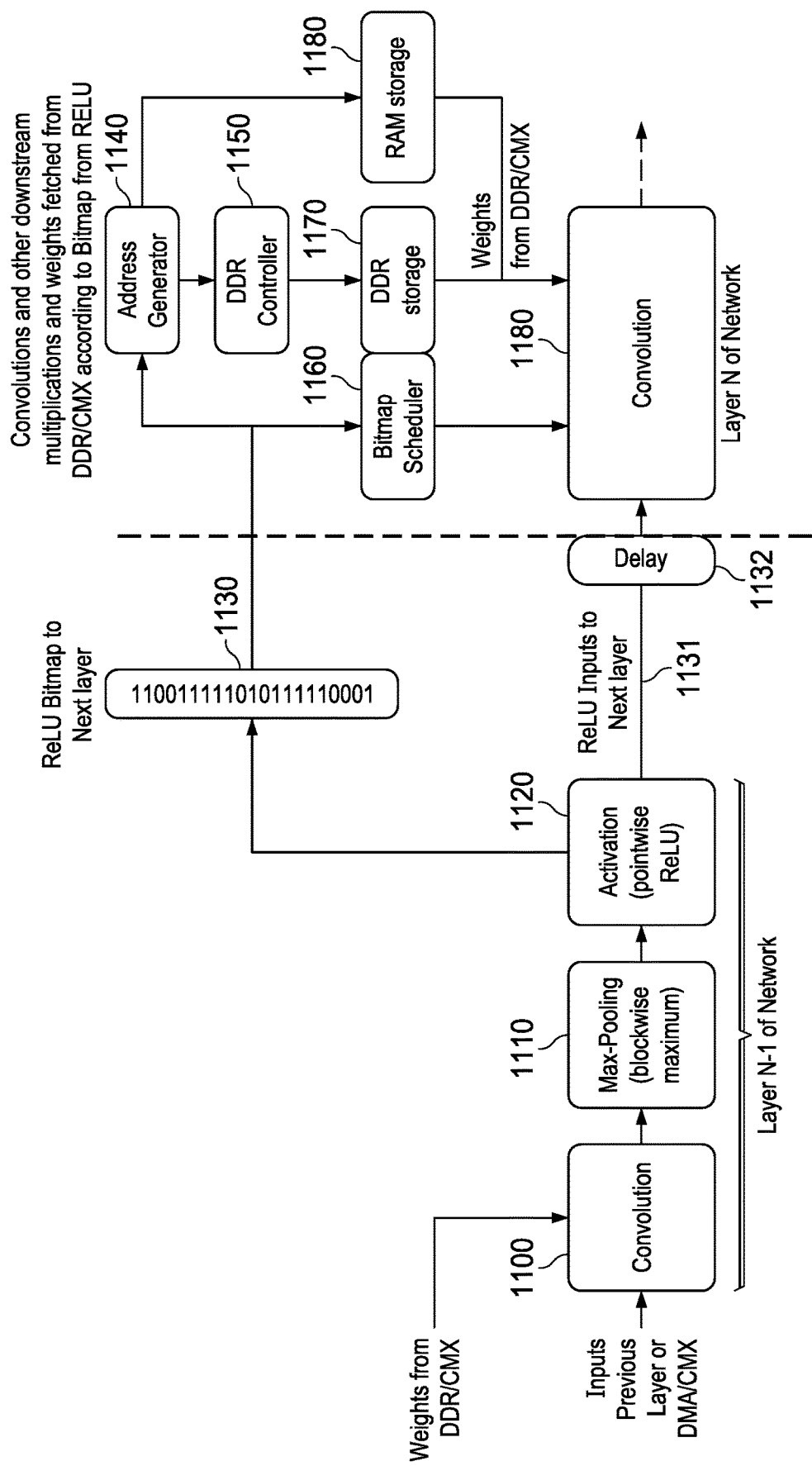
FIG. 11 illustrates hardware for culling operations in accordance with some embodiments.

FIG. 11 illustrates hardware that may be incorporated into a system to provide functionality for culling trivial operations based on a bitmap in accordance with some embodiments. In this example, a multi-layer neural network is provided, which includes repeated convolutional layers. The hardware may include one or more processors, one or more microprocessors, one or more circuits, one or more computers, and the like. In this particular example, a neural network includes an initial convolutional processing layer 1100, followed by pooling processing 1110, and finally an activation function processing, such as rectified linear unit (ReLU) function 1120. The output of the ReLU unit 1120, which provides ReLU output vector 1131, may be connected to a following convolutional processing layer 1180 (e.g., possibly via delay 1132), which receives ReLU output vector 1131. In one example implementation, a ReLU bitmap 1130 may also be generated in parallel with the connection of the ReLU unit 1120 to the following convolution unit 1180, the ReLU bitmap 1130 denoting which elements in the ReLU output vector 1131 are zeroes and which are non-zeroes.

In one implementation, a bitmap (e.g., 1130) may be generated or otherwise provided to inform enabled hardware of opportunities to eliminate operations involved in calculations of the neural network. For instance, the bits in the ReLU bitmap 1130 may be interpreted by a bitmap scheduler 1160, which instructs the multipliers in the following convolutional unit 1180 to skip zero entries of the ReLU output vector 1131 where there are corresponding binary zeroes in the ReLU bitmap 1130, given that multiplication by zero will always produce zero as an output. In parallel, memory fetches from the address generator 1140 for data/ weights corresponding to zeroes in the ReLU bitmap 1130 may also be skipped as there is little value in fetching weights that are going to be skipped by the following convolution unit 1180. If weights are to be fetched from an attached DDR DRAM storage device 1170 via a DDR controller 1150, the latency may be so high that it is only possible to save some on-chip bandwidth and related power dissipation. On the other hand, if weights are fetched from on-chip RAM 1180 storage, it may be possible to bypass/skip the entire weight fetch operation, particularly if a delay corresponding to the RAM/DDR fetch delay 1132 is added at the input to the following convolution unit 1180.

Figure 12:
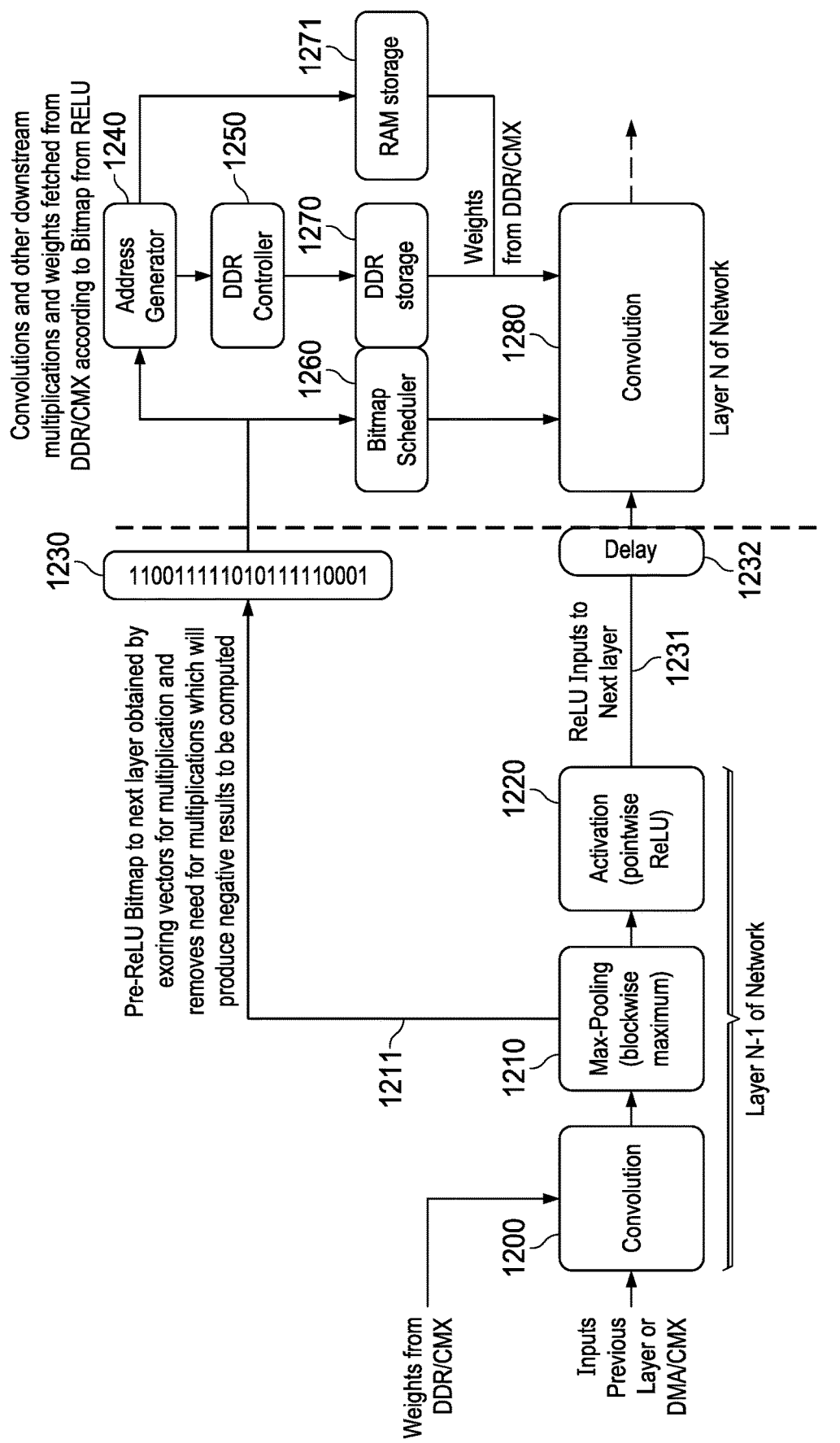
FIG. 12 illustrates a refinement to the hardware for culling operations in accordance with some embodiments.

Turning to FIG. 12, a simplified block diagram is presented to illustrate a refinement to example hardware equipped with circuitry and other logic for culling trivial operations (or performing operation elimination) in accordance with some embodiments. As shown in the example of FIG. 12, additional hardware logic may be provided to predict the sign of the ReLU unit 1220 input in advance from the preceding Max-Pooling unit 1210 or convolution unit 1200. Adding sign-prediction and ReLU bitmap generation to the Max-pooling unit 1210 may allow the ReLU bitmap information to be predicted earlier from a timing point of view to cover delays that may occur through the address generator 1240, through external DDR controller 1250 and DDR storage 1270 or internal RAM storage 1271. If the delay is sufficiently low, the ReLU bitmap can be interpreted in the address generator 1240 and memory fetches associated with ReLU bitmap zeroes can be skipped completely, because the results of the fetch from memory can be determined never to be used. This modification to the scheme of FIG. 11 can save additional power and may also allow the removal of the delay stage (e.g., 1132, 1232) at the input to the following convolution unit 1280 if the delays through the DDR access path (e.g., 1240 to 1250 to 1270) or RAM access path (e.g., 1240 to 1271) are sufficiently low so as not to warrant a delay stage 1232, among other example features and functionality.

Figure 13:
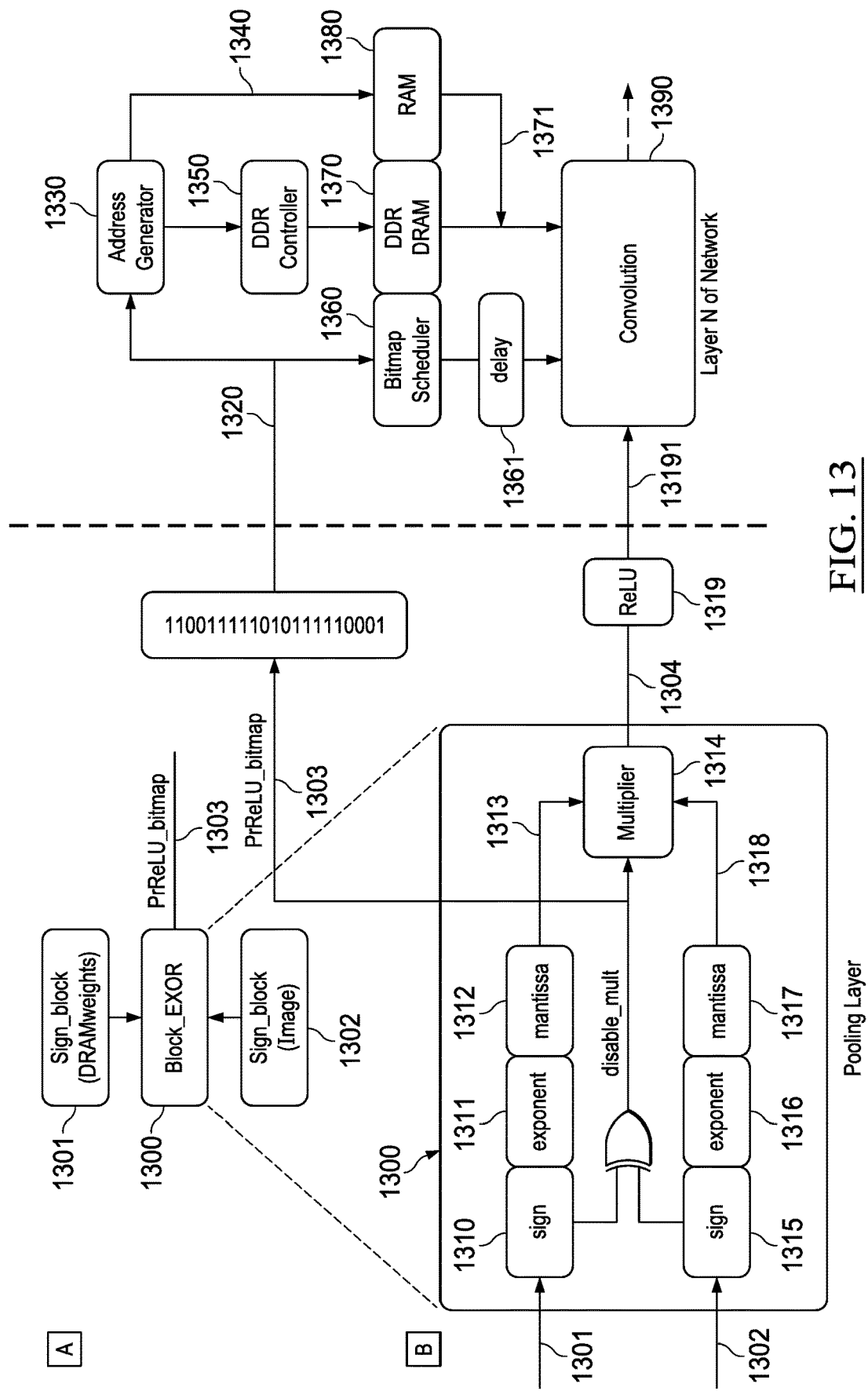
FIG. 13 illustrates hardware in accordance with some embodiments.

FIG. 13 is another simplified block diagram illustrating example hardware in accordance with some embodiments. For instance, CNN ReLU layers can produce high numbers of output zeroes corresponding to negative inputs. Indeed, negative ReLU inputs can be predictively determined by looking at the sign input(s) to the previous layers (e.g., the pooling layer in the example of FIG. 13). Floating-point and integer arithmetic can be explicitly signed in terms of the most significant bit (MSB) so a simple bit-wise exclusive OR (XOR) operation across vectors of inputs to be multiplied in a convolution layer can predict which multiplications will produce output zeroes, such as shown in FIG. 13. The resulting sign-predicted ReLU bitmap vector can be used as a basis for determining a subset of multiplications and associated coefficient reads from memory to eliminate, such as in the manner described in other examples above.

Providing for the generation of ReLU bitmaps back into the previous pooling or convolutional stages (i.e., stages before the corresponding ReLU stage) may result in additional power. For instance, sign-prediction logic may be provided to disable multipliers when they will produce a negative output that will be ultimately set to zero by the ReLU activation logic. For instance, this is shown where the two sign bits 1310 and 1315 of the multiplier 1314 inputs 1301 and 1302 are logically combined by an XOR gate to form a PreReLU bitmap bit 1303. This same signal can be used to disable the operation of the multiplier 1314, which would otherwise needlessly expend energy generating a negative output which would be set to zero by the ReLU logic before being input for multiplication in the next convolution stage 1390, among other examples.

Note that the representation of 1300, 1301, 1302, and 1303 (notation A) shows a higher level view of that shown in the representation donated B in FIG. 13. In this example, the input to block 1302 may include two floating-point operand. Input 1301 may include an explicit sign-bit 1310, a Mantissa 1311 including a plurality of bits, and an exponent again including a plurality of bits 1312. Similarly, input 1302 may likewise include a sign 1315, mantissa 1317, and exponent 1316. In some implementations, the mantissas, and exponents may have different precisions, as the sign of the result 1303 depends solely upon the signs of 1301 and 1302, or 1310 and 1315 respectively. In fact, neither 1301 nor 1302 need be floating point numbers, but can be in any integer or fixed point format as long as they are signed numbers and the most significant bit (MSB) is effectively the sign bit either explicitly or implicitly (e.g., if the numbers are one- or twos-complement, etc.).

Continuing with the example of FIG. 13, the two sign inputs 1310 and 1315 may be combined using an XOR (sometimes denoted alternatively herein as ExOR or EXOR) gate to generate a bitmap bit 1303, which may then be processed using hardware to identify down-stream multiplications that may be omitted in the next convolution block (e.g., 1390). The same XOR output 1303 can also be used to disable the multiplier 1314 in the event that the two input numbers 1313 (e.g., corresponding to 1301) and 1318 (e.g., corresponding to 1302) have opposite signs and will produce a negative output 1304 which would be set to zero by the ReLU block 1319 resulting in a zero value in the RELU output vector 13191 which is to be input to the following convolution stage 1390. Accordingly, in some implementations, the PreReLU bitmap 1320 may, in parallel, be transmitted to the bitmap scheduler 1360, which may schedules the multiplications to run (and/or omit) on the convolution unit 1390. For instance, for every zero in the bitmap 1320, a corresponding convolution operation may be skipped in the convolution unit 1390. In parallel, the bitmap 1320 may be consumed by an example address generator 1330, which controls the fetching of weights for use in the convolution unit 1390. A list of addresses corresponding to 1s in the bitmap 1320 may be compiled in the address generator 1330 and controls either the path to DDR storage 1370 via the DDR controller 1350, or else controls the path to on chip RAM 1380. In either case, the weights corresponding to ones in the PreReLU bitmap 1320 may be fetched and presented (e.g., after some latency in terms of clock cycles to the weight input 1371) to the convolution block 1390, while fetches of weights corresponding to zeros may be omitted, among other examples.

As noted above, in some implementations, a delay (e.g., 1361) may be interposed between the bitmap scheduler 1360 and the convolution unit 1390 to balance the delay through the address generator 1330, DDR controller 1350, and DDR 1350, or the path through address generator 1330 and internal RAM 1380. The delay may enable convolutions driven by the bitmap scheduler to line up correctly in time with the corresponding weights for the convolution calculations in the convolution unit 1390. Indeed, from a timing point of view, generating a ReLU bitmap earlier than at the output of the ReLU block 1319 can allow additional time to be gained, which may be used to intercept reads to memory (e.g., RAM 1380 or DDR 1370) before they are generated by the address generator 1330, such that some of the reads (e.g., corresponding to zeros) may be foregone. As memory reads may be much higher than logical operations on chip, excluding such memory fetches may result in very significant energy savings, among other example advantages.

In some implementations, if there is still insufficient saving in terms of clock cycles to cover the DRAM access times, a block oriented technique may be used to read groups of sign-bits (e.g., 1301) from DDR ahead of time. These groups of sign bits may be used along with blocks of signs from the input images or intermediate convolutional layers 1302 in order to generate blocks of PreReLU bitmaps using a set of (multiple) XOR gates 1300 (e.g., to calculate the differences between sign bits in a 2D or 3D convolution between 2D or 3D arrays/matrices, among other examples). In such an implementation, an additional 1-bit of storage in DDR or on-chip RAM may be provided to store the signs of each weight, but this may allow many cycles of latency to be covered in such a way as to avoid ever reading weights from DDR or RAM that are going to be multiplied by zero from a ReLU stage. In some implementations, the additional 1-bit of storage per weight in DDR or on-chip RAM can be avoided as signs are stored in such a way that they are independently addressable from exponents and mantissas, among other example considerations and implementations.

In one example, a system may be further enhanced to utilize DDR accesses, which may have a natural burst access for maximal data-transfer rate. Saving energy by skipping individual DDR weight accesses may not be feasible in this content as they may be shorter than a burst. Accordingly, in some instances, bursts may be skipped in cases where all bitmap bits corresponding to a particular burst transaction are zero. However, this may not occur frequently and hence, the resulting power and bandwidth savings may be limited. In still other implementations, a register programmable threshold may be set for the number of bitmap bits in a burst so that the burst will be skipped completely if more than N bits in the bitmap burst are zero. This may have the effect of slightly degrading overall CNN classification accuracy, but may be acceptable in the interests of saving energy.

Figure 14:
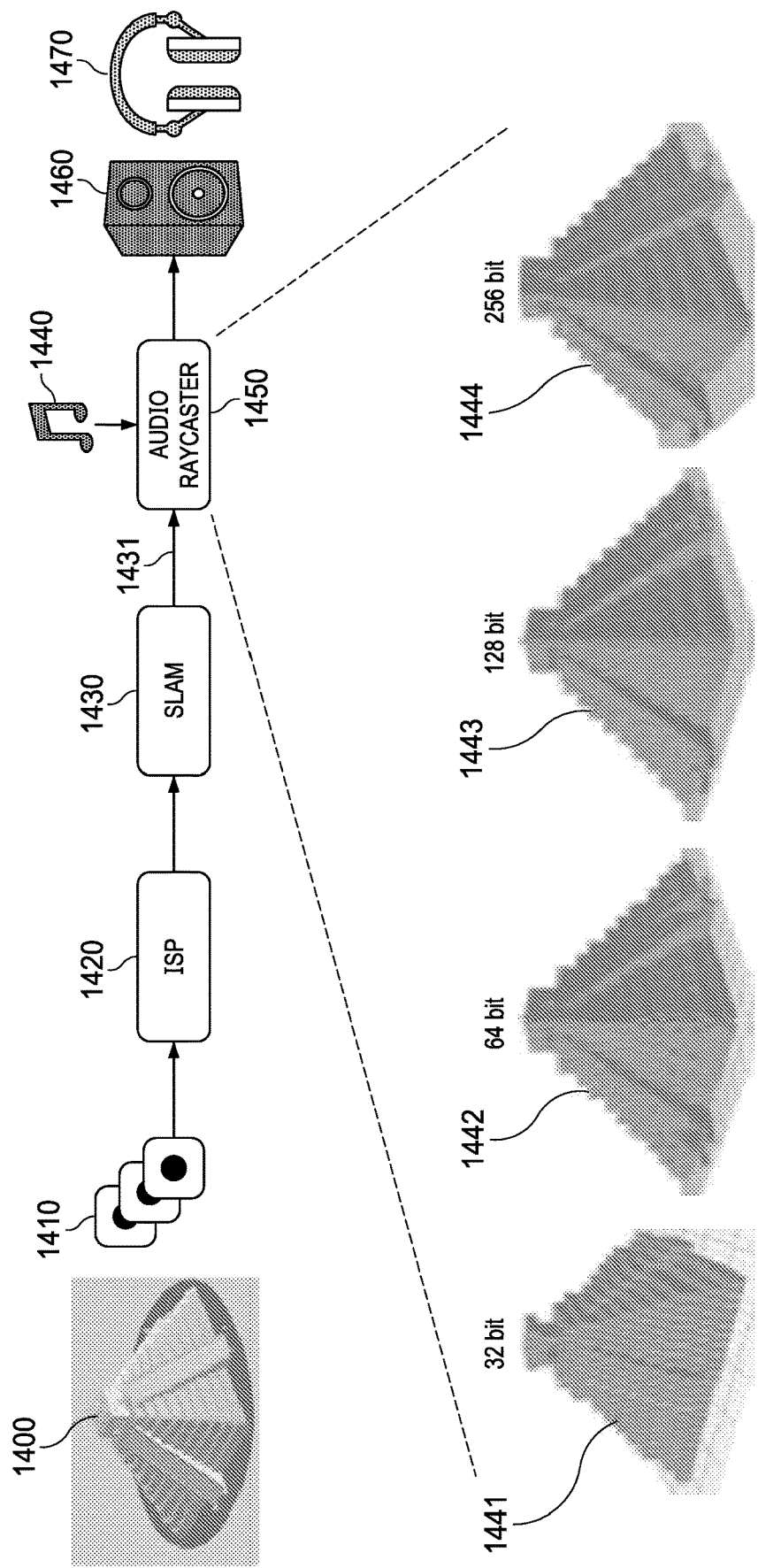
FIG. 14 illustrates use of example volumetric data to synthesize an audio stream in accordance with some embodiments.

FIG. 14 illustrates how volumetric data (e.g., according to a format, such as described above) may be used to synthesize an audio stream in accordance with some embodiments. A challenge present in some augmented reality (AR) and mixed reality (MR) systems is addressing inconsistencies in the AR/MR presentation in order to make the experience more realistic and immersive. This may include combining imagery (e.g., virtual with virtual, virtual with real, etc.), such as described above. Volumetric data may also be used to enhance audio presentations within AR and MR applications. For instance, the diagram shown in FIG. 14 illustrates the example use of volumetric data (e.g., formatted such as discussed above) to synthesize an audio stream for loudspeakers 1460, headphones 1470, or other speakers by creating a reverberation model from the volumetric model using an audio ray-caster 1450 and passing live or prerecorded audio 1440 through the audio ray-caster generated model to generate output waveforms corresponding to the volumetric model. In the particular example of FIG. 14, a plurality of image sensors 1410 may be provided, which are connected to an ISP pipeline 1420 (such as previously described), the outputs of which are fed into a SLAM pipeline 1430 (such as previously described). The image sensors 1410 can include passive stereo pairs, structured light or time-of-flight active IR cameras, among other examples.

A plurality of audio models can be generated from an octree-based volumetric model 1431 at differing levels of detail (for speed of rendering) as shown in 1441, 1442, 1443 and 1444 in ascending level of detail and bits. Indeed, the same volumetric model can be used to generate models for different loudspeaker positions so multiple loudspeakers including stereo and surround-sound can be supported, including stereo pairs and headphones. The models can be generated on the fly as complete models, or indeed can be built using reusable slides of geometry that can be combined opportunely and dynamically using a final summation-stage that takes into account the rays which can contribute to the sound field based on the listener's current position in the scene modeled by the volumetric model.

Figure 15:
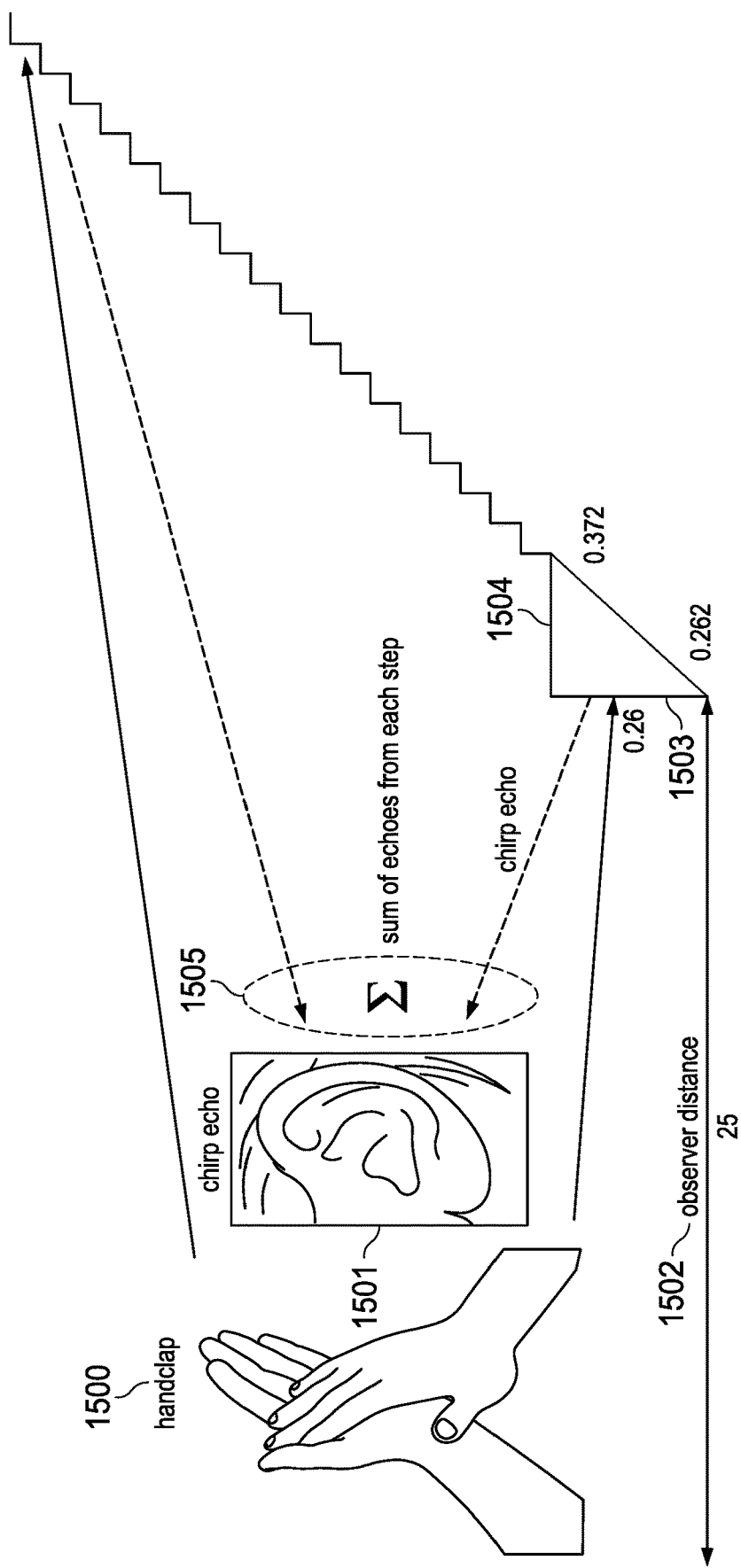
FIG. 15 illustrates an example of a reusable reverberation filter element in accordance with some embodiments.

FIG. 15 shows an example of such a reusable reverberation filter element based on geometry according to some embodiments. In the particular example of FIG. 15, a cross-sectional view of the example pyramid structure 1400 of FIG. 14 is considered. The pyramid may be modeled by an octree-based volumetric data structure, and the volumetric data structure may be utilized to generate an audio reverberation model consistent with the dimensions and characteristics of the pyramid structure 1400. In this example, generation of the audio reverberation model may be primarily based on the height 1503 and depth of the steps 1504, as well as the observer distance and orientation relative to the first step 1502 of the pyramid. A reverberation may be modeled for this first step as well as all of the other steps in the pyramid. These modeled reverberations may be summed back at a listener's ear (e.g., via speakers 1505 connected to the reverberation modeling circuitry or other logic). The input to the reverberation model may be a particular noise (e.g., a handclap, voice, or other audio), including an audio stream from a live environment captured via a microphone, a pre-recorded audio stream, or other sound 1500. While this example illustrates the modeling of a pyramid geometry, potentially any 3D geometry may be modeled by a corresponding volumetric data structure, according to the principles discussed herein. Accordingly, various VR, AR, and MR environments may be developed and enhanced using such volumetric data structures, and corresponding reverberation models may be developed that are consistent with the reverberation and audio characteristics of such environments, among other examples.

Figure 16:
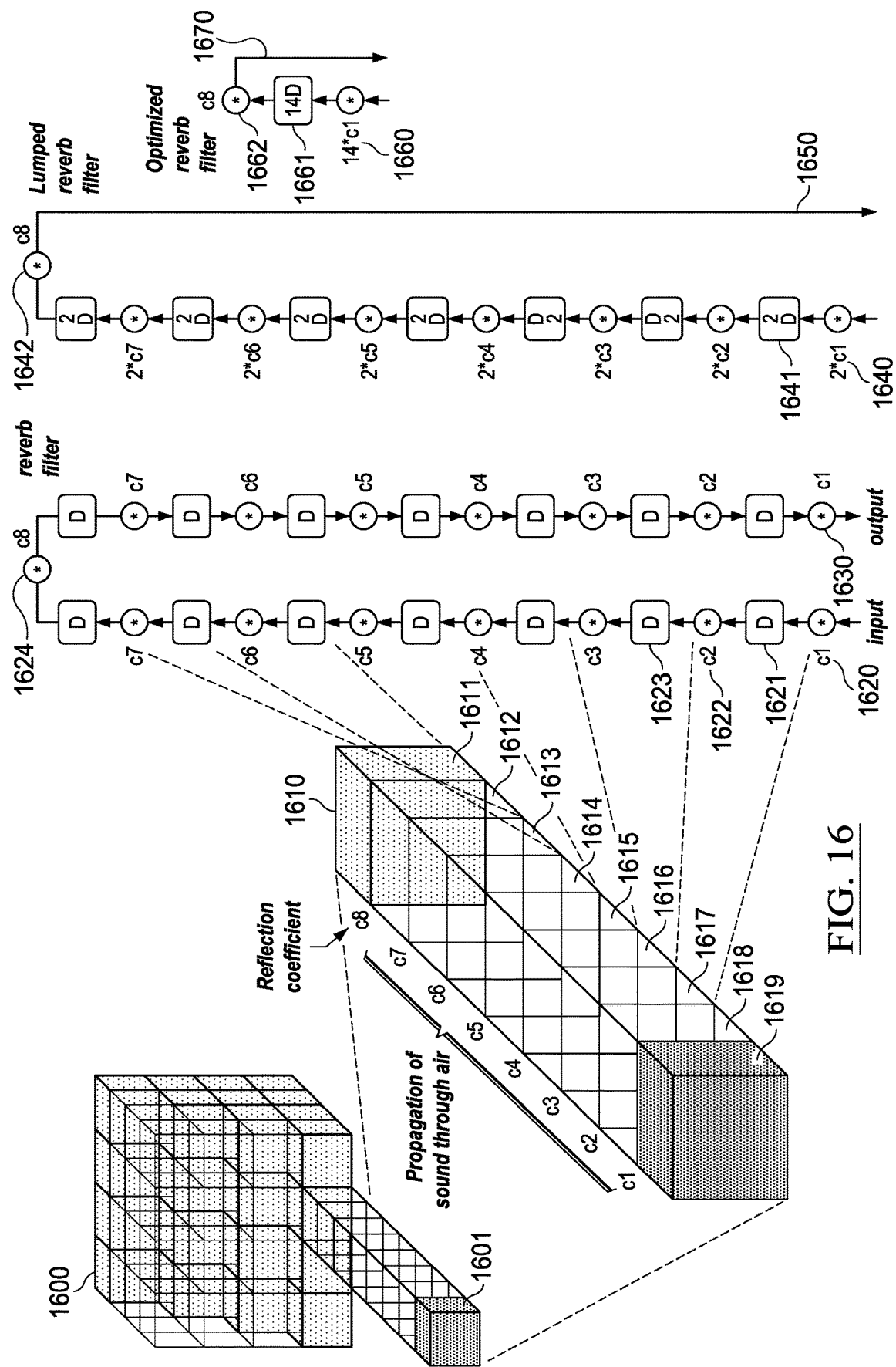
FIG. 16 illustrates the construction of the FIR reverberation filter in accordance with some embodiments.

FIG. 16 illustrates the example generation of a finite impulse response (FIR) reverberation filter from an example volumetric model according to some embodiments based on a 4×4 volumetric cube 1600 and a determined observer position 1601. From the point of view of one of the rays, the propagation of the sound wave may be modeled by considering its propagation through each voxel volume 1619 to 1612, with a system modeling attenuation of the sound wave by a propagation coefficient corresponding to the passage of sound through air. Continuing with this example, the modeled sound may be modeled as reflecting off a first portion 1610 of a volumetric model (e.g., the first step 1611 of the pyramid model in the example of FIGS. 14-15) with the reflection coefficient corresponding to the material of the object modeled by the voxel 1610. For instance, in the previous example, voxel 1610 may represent the surface of a limestone pyramid (or other structure with other geometry), with the volumetric model or associated data specifying that a reflection coefficient for limestone (e.g., the material of the pyramid surface) be used to determine how the sound would reflect off of the pyramid. Continuing with this example, propagation of the modeled and attenuated, reflected wave may be further modeled to re-traverse the voxels (e.g., 1612-1618) back to the observer position 1619, where the signal may be further modeled based on the reflection and the attenuation of the media (e.g., air, wall, water, glass, etc.) modeled by the voxels (e.g., 1612-1618) to create virtual delay and reverberation characteristics consistent with what would be expected in the actual presence of the modeled geometry, among other examples.

Figure 17:
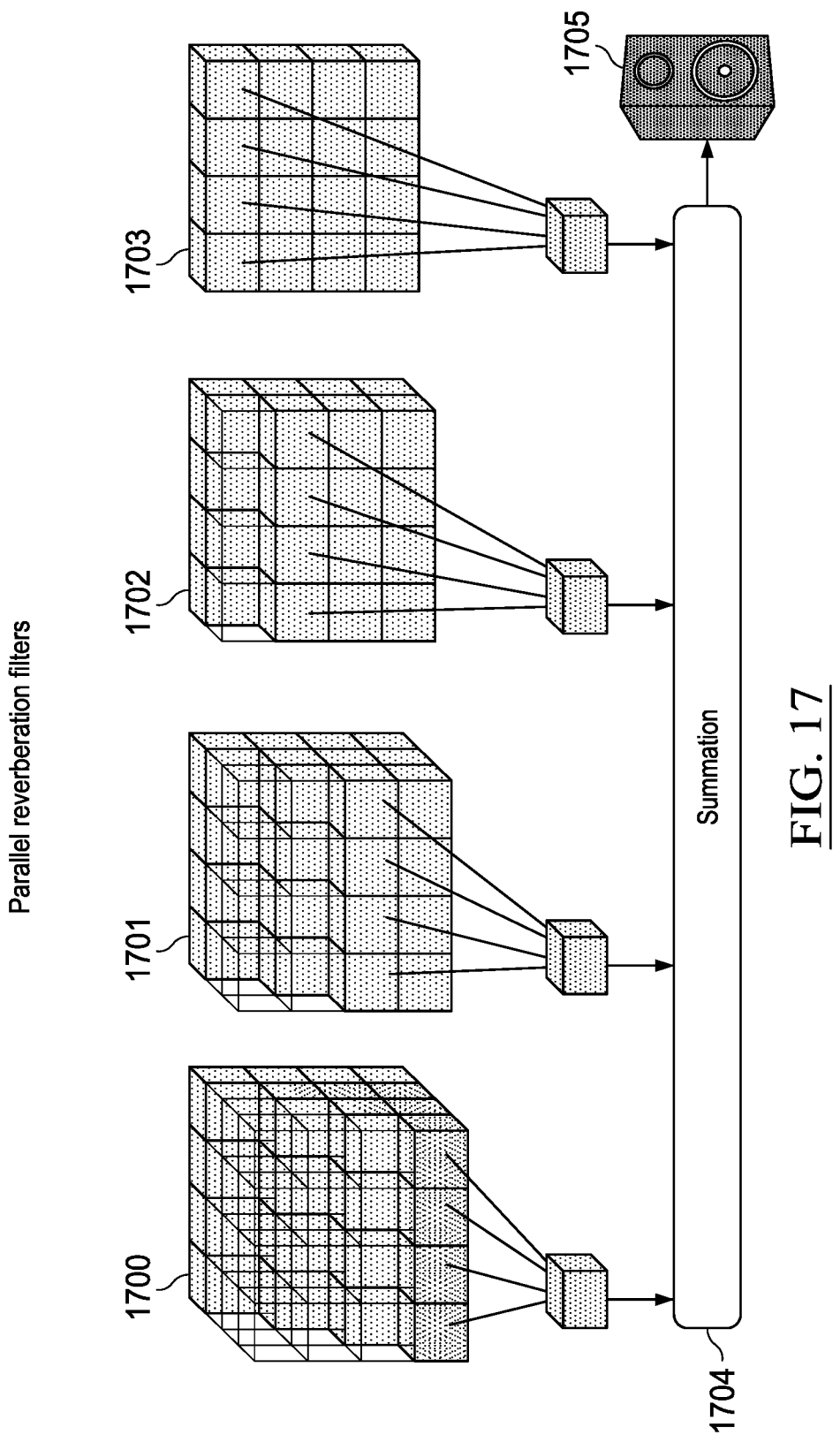
FIG. 17 shows a vectorized implementation of the FIR reverberation filter in accordance with some embodiments.

In one embodiment, the structure illustrated in FIG. 16 may be directly transcribed as an FIR filter where the input audio samples enter 1620, are multiplied by the propagation through the first voxel c1 (1620), and pass through a delay stage (1 voxel) 1621 before being attenuated by the propagation coefficient for one voxel 1622, and so on until the final output sample exits the FIR filter at 1630. That all voxel coefficients are equal allows a lumped version of the FIR filter to be built where half the number of delays and multipliers are used with each delay element 1641 twice as long and each multiplier coefficient 1640 twice as large with the exception of the reflection coefficient from the stone pyramid which is unchanged 1642. In other words, in such instances, N reflection coefficients could be summed and a lumped multiplication performed rather than performing each multiplication separately. Such summation can be done statically for each reflection (e.g., determined through ray casting against a geometry modeled by a volumetric data structure). For instance, all of the delays 1661 and all propagation coefficients 1660 may be lumped into a fully optimized FIR filter with a 14D delay element and 14×C1 propagation coefficient, however, this approach may not be vectorizable, which could present inefficiencies on a vector processor or vectorized hardware. For a vectorized implementation of the FIR reverberation filter the same 4×4 volume can be ray-traced in horizontal strips each four elements wide in four vector operations 1700-1703 before summing the four vectorized outputs in 1704 and outputting the output samples to a loudspeaker or headphones 1705, such as shown in the example diagram of FIG. 17. Accordingly, FIG. 17 shows a vectorized implementation of the FIR reverberation filter according to some embodiments.

Figure 18:
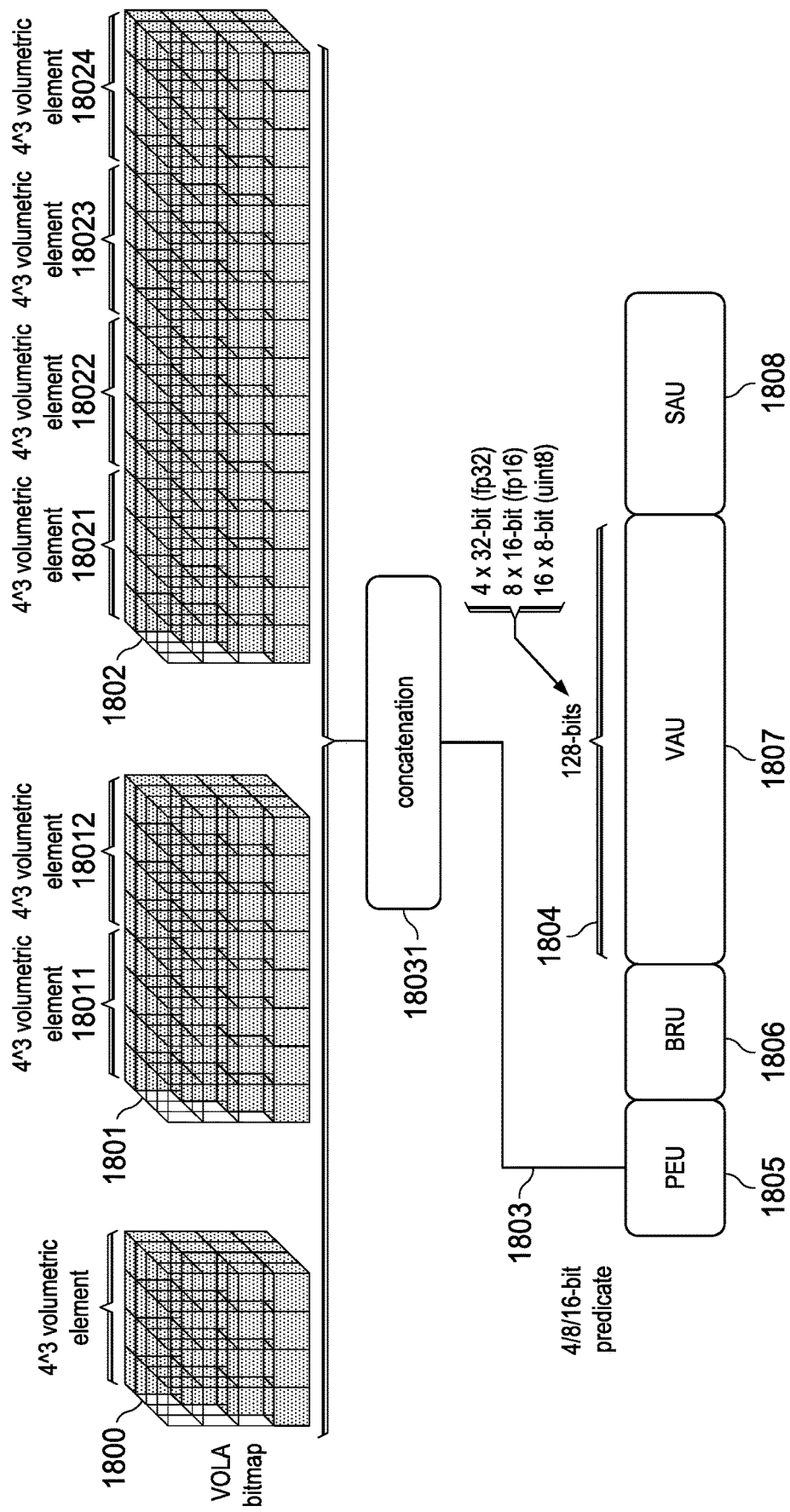
FIG. 18 shows ray-casting using vectorized processing in accordance with some embodiments.

Turning to FIG. 18, a diagram is shown illustrating ray-casting using vectorized processing according to some embodiments with predicated execution where the processor has at least four functional units; a predicated execution (PEU) 1805, which can perform per-lane predicated operations on a vector arithmetic unit (VAU) 1807 at one of three possible arithmetic precisions (fp32, fp16 or uint8) and a scalar arithmetic unit (SAU) 1808, all of which are under the control of a branch and repeat unit (BRU) which steps through the number of voxels (depth) in the volume, one vector at a time. In some implementations, in terms of vector arithmetic, 16-bit floating-point operands may be sufficient for MP3 audio (with 32-bit floating point (fp32) being optional), thereby allowing the throughput to be doubled through the VAU 1807. In fact in principle a fractional representation with unsigned integer (e.g., u8) multiplication by reciprocal of dividend can also be utilized in many cases, allowing the VAU throughput to be almost quadrupled with respect to an fp32 mode, among other possible example implementations.

The input to the predication unit 1803 may be constructed by selecting a bit-vector from the volumetric data-structure read from memory, which, as previously described, may be constructed from 4^3 voxel sub-volumes each represented by 64-bit integers. In the case of fp32 arithmetic, 4-bit wide vectors may be selected row by row from the 4^3 volumetric information in 1800. In the case of 16-bit arithmetic two 4-bit vectors from two sub-volumes of 1801, namely 18011 and 18012, may be concatenated by a concatenation unit 18031 to make an 8-bit predication vector 1803. Finally, in the case of 8-bit arithmetic, a 16-bit predication vector 1802 may be constructed by the concatenation unit 18031 by concatenating four 4-bit vectors from sub-volumes of 1802, namely 18021, 18022, 18023 and 18024, and so on. Irrespective of the arithmetic representation, per-lane predication allows vectorization to be used across the voxel geometry with 4, 8 or 16 voxels to be evaluated in parallel across the vector in a single cycle.

In one example implementation, the predication of the VAU 1807 by the PEU 1805 operates on the volumetric data in 4, 8 or 16 voxels wide chunks on 1803 as follows:

Bitmap 0—FIR reverberation summed along ray for propagation of audio signal through air;

Bitmap 1—Stopping criterion and reflection coefficient multiplication;

Exit—loop & stop propagating when all ones encountered across vector maintained by ORing each of the bitmap 1 bits with the previous contents of a register and stopping the loop when the register contains all ones.

A further optimization in the ray-casting process may be implemented by decomposing the 2D interpolation required for ray-tracing at an angle across voxels from the point of origin. The 2D interpolation in X and Y dimensions across the voxel volume can be decomposed into separate common y-component common across a vector with a second x-component which depends on distance from center of voxel.

Voxel representations, such as discussed herein, may be utilized to enhance ray-casting operations, not just for audio, but for other applications as well. In some instances, ray-casting used in physics or light propagation may differs from ray-casting for audio in that there may be no attenuation of the signal through the medium of air, although for fluids the same ray-casting mechanism can be used for physics or light propagation as was previously outlined for air. Accordingly, the predication mechanism for light/physics ray-casting with air as a medium may be implemented, for instance, as follows:

Bitmap 0—do nothing as negligible attenuation through medium (in audio case FIR outputs updated);

Bitmap 1—multiply by light reflectivity (object rigidity) coefficient and copy color (force) to output buffer;

Exit—loop & stop propagating when all ones encountered across a vector maintained by ORing each of the bitmap 1 bits with the previous contents of a register and stopping the loop when the register contains all ones.

Figure 19:
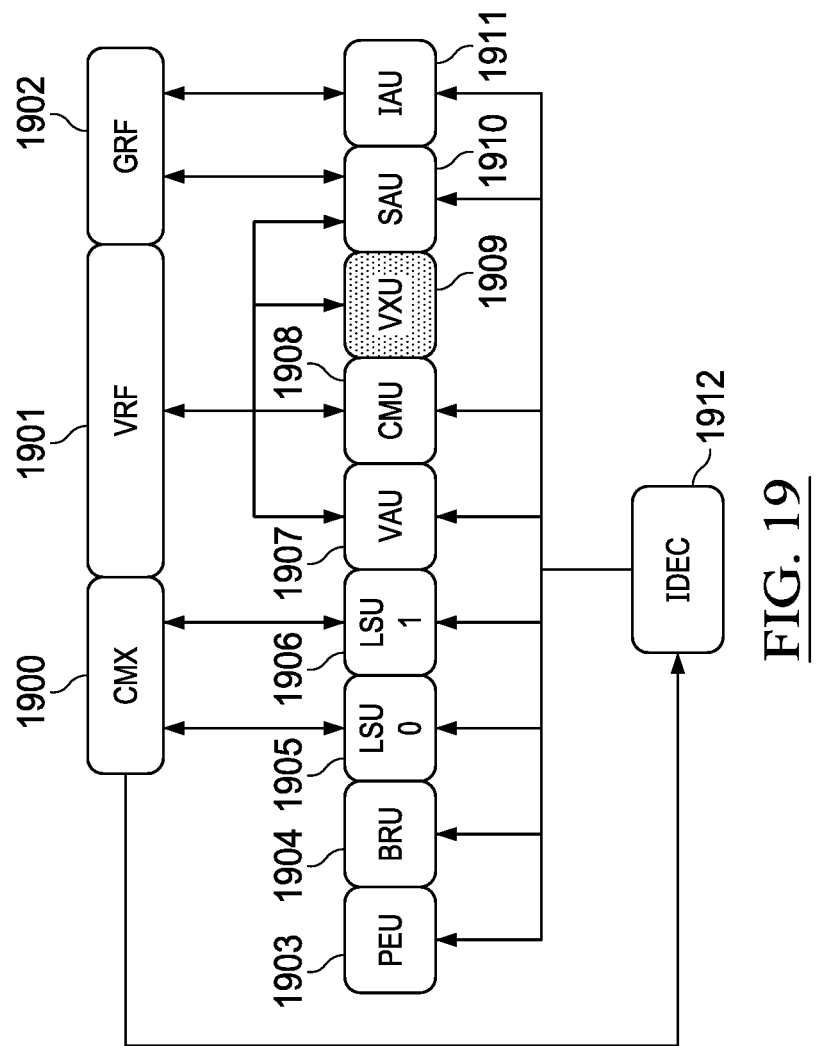
FIG. 19 depicts an example multi-slot vector processor in accordance with some embodiments.

FIG. 19 is a simplified block diagram representing an example multislot vector processor (e.g., a very long instruction word (VLIW) vector processor) in accordance with some embodiments. In this example the vector processor may include multiple (e.g., 9) functional units (e.g., 1903-1911), which may be fed by a multi-ported memory system 1900, backed up by a vector register file (VRF) 1901 and general register file (GRF) 1902. The processor contains an instruction decoder (IDEC) 1912, which decodes instructions and generates control signals which control the functional units 1903-1911. The functional units 1903-1911 are the predicated execution unit (PEU) 1903, branch and repeat unit (BRU) 1904, load store port units (e.g., LSU0 1905 and LSU1 1906), a vector arithmetic unit (VAU) 1907, scalar arithmetic unit (SAU) 1910, compare and move unit (CMU) 1908, integer arithmetic unit (IAU) 1911, and a volumetric acceleration unit (VXU) 1909. In this particular implementation, the VXU 1909 may accelerate operations on volumetric data, including both storage/retrieval operations, logical operations, and arithmetic operations. While the VXU circuitry 1909 is shown in the example of FIG. 19 as a unitary component, it should be appreciated that the functionality of the VXU (as well as any of the other functional units 1903-1911) may be distributed among multiple circuitry. Further, in some implementations, the functionality of the VXU 1909 may be distributed, in some implementations, within one or more of the other functional units (e.g., 1903-1908, 1910, 1911) of the processor, among other example implementations.

Figure 20:
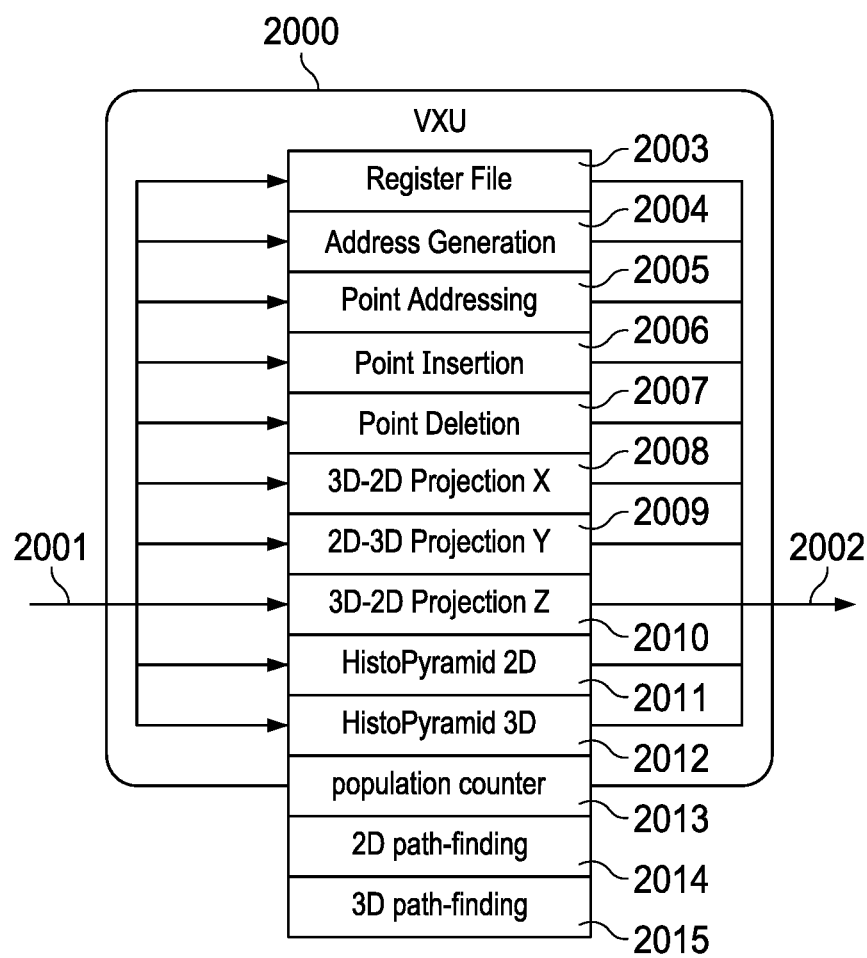
FIG. 20 illustrates an example volumetric acceleration hardware in accordance with some embodiments.

FIG. 20 is a simplified block diagram illustrating an example implementation of a VXU 2000 in accordance with some embodiments. For instance, VXU 2000 may provide at least one 64-bit input port 2001 to accept inputs from either the vector register file 1901 or general register file 1902. This input may be connected to a plurality of functional units including a register file 2003, address generator 2004, point addressing logic 2005, point insertion logic 2006, point deletion logic 2007, 3D to 2D projection logic in X dimension 2008, 3D to 2D projection logic in Y dimension 2009, 3D to 2D projection logic in X dimension 2010, 2D histogram pyramid generator 2011, 3D histopyramid generator 2012, population counter 2013, 2D path-finding logic 2014, 3D path-finding logic 2015 and possibly additional functional units to operate on 64-bit unsigned integer volumetric bitmaps. The output from the block 2002 can be written back to either the vector register file VRF 1901 or general register file GRF 1902 register files.

Figure 21:
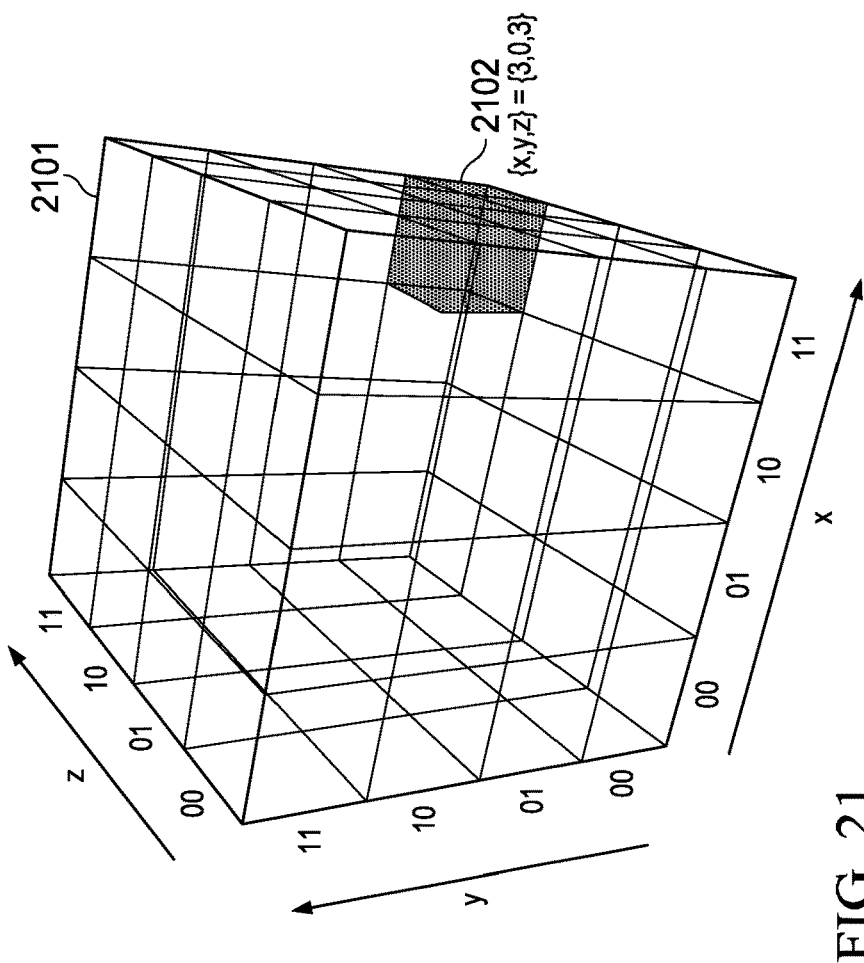
FIG. 21 illustrates the organization of a voxel cube in accordance with some embodiments.
Figure 21:
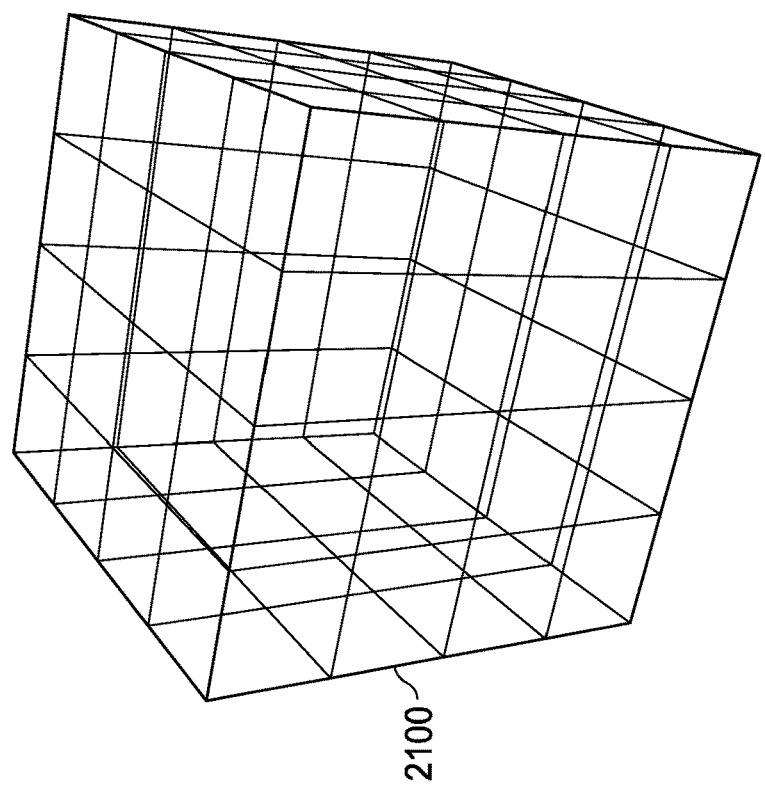
Figure 22:
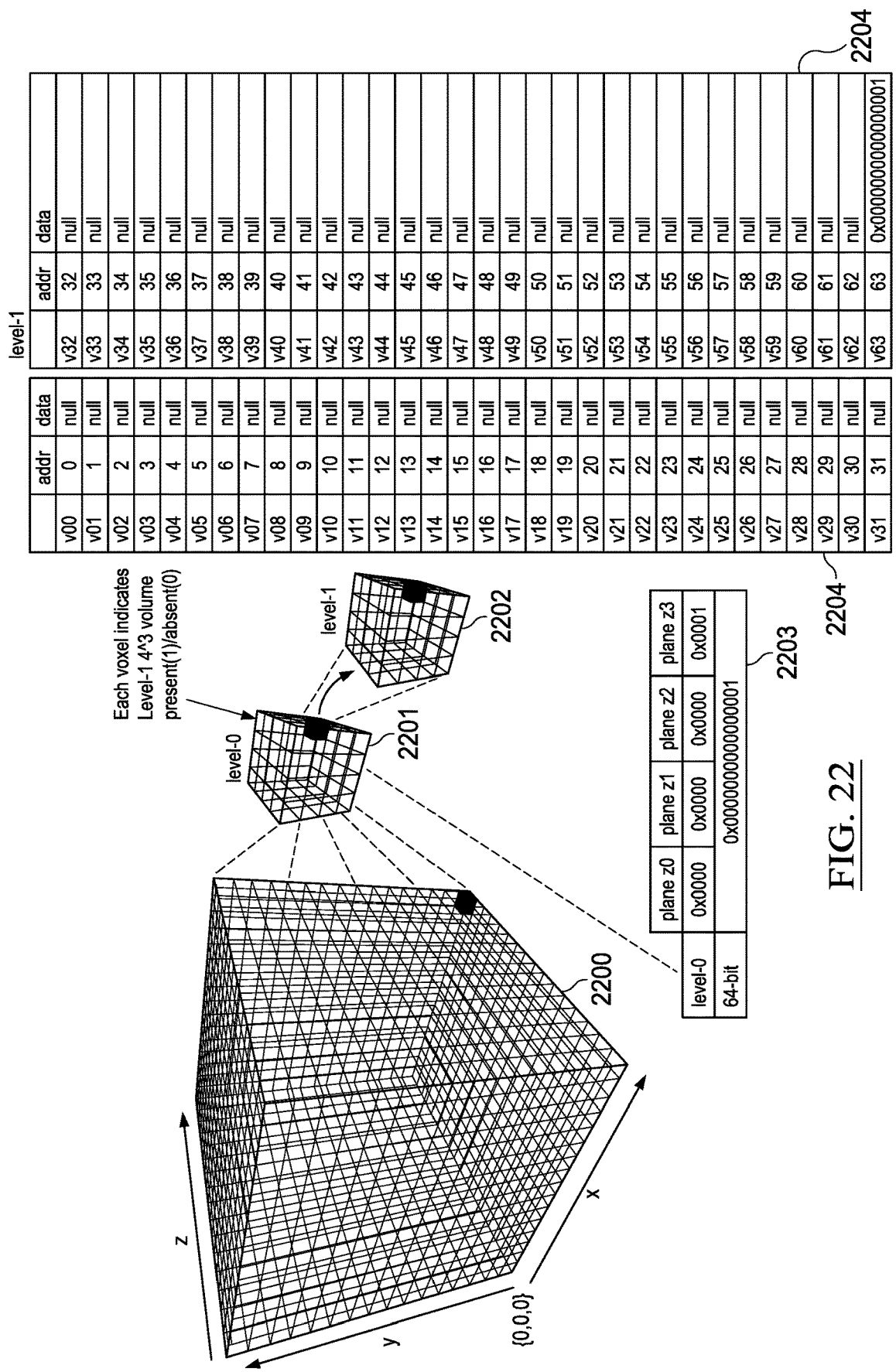
FIG. 22 illustrates a two-level sparse voxel tree in accordance with some embodiments.

Turning to the example of FIG. 21, a representation of the organization of a 4^3 voxel cube 2100 is represented. A second voxel cube 2101 is also represented. In this example, a voxel cube may be defined in data as a 64-bit integer 2102, in which each single voxel within the cube is represented by a single corresponding bit in the 64-bit integer. For instance, the voxel 2012 at address {x,y,z}={3,0,3} may be set to "1" to indicate the presence of geometry at that coordinate within the volumetric space represented by the voxel cube 2101. Further, in this example, all other voxels (beside voxel 2102) may corresponding to "empty" space, and may be set to "0" to indicate the absence of physical geometry at those coordinates, among other examples. Turning to FIG. 22, an example two-level sparse voxel tree 2200 is illustrated in accordance with some embodiments. In this example, only a single "occupied" voxel is included within a volume (e.g., in location {15,0,15}). The upper level-0 of the tree 2201 in this case contains a single voxel entry {3,0,3}. That voxel in turn points to the next level of the tree 2202 which contains a single voxel in element {3,0,3}. The entry in the data-structure corresponding to level 0 of the sparse voxel tree is a 64-bit integer 2203 with one voxel set as occupied. The set voxel means that an array of 64-bit integers is then allocated in level 1 of the tree corresponding to the voxel volume set in 2203. In the level 1 sub-array 2204 only one of the voxels is set as occupied with all other voxels set as unoccupied. As the tree, in this example, is a two level tree, level 1 represents the bottom of the tree, such that the hierarchy terminates here.

Figure 23:
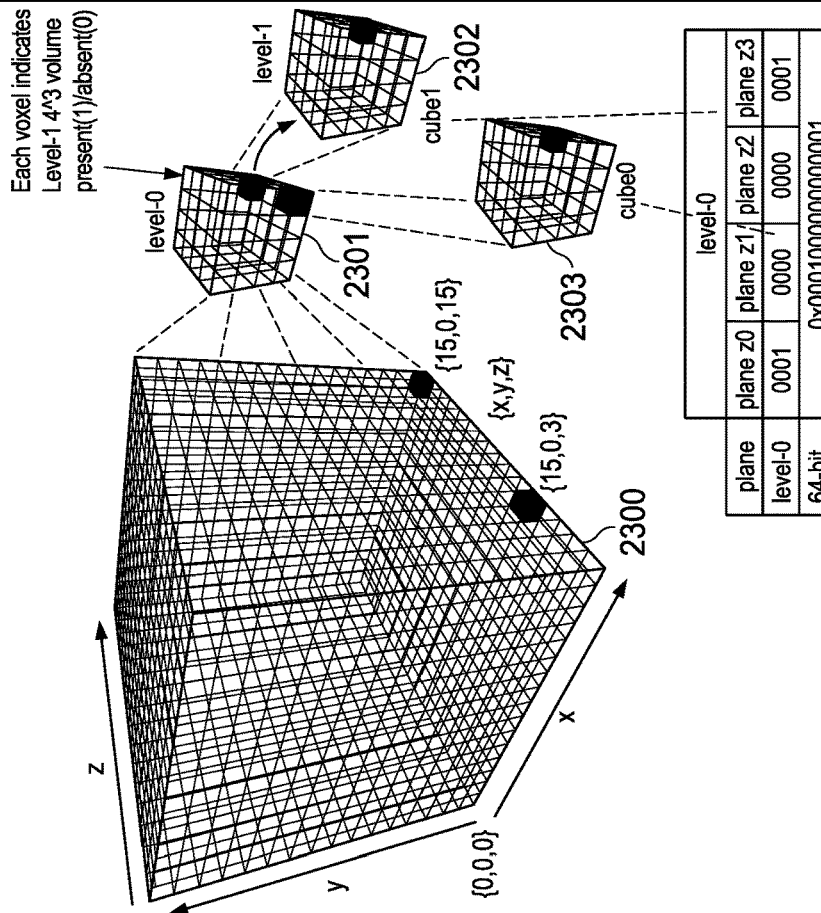
FIG. 23 illustrates a two-level sparse voxel tree in accordance with some embodiments.

FIG. 23 illustrates a two-level sparse voxel tree 2300 in accordance with some embodiments which contains occupied voxels in locations {15,0,3} and {15,0,15} of a particular volume. The upper level-0 of the tree 2301 in this case (which subdivides the particular volume into 64 upper level-0 voxels) contains two voxel entries {3,0,0} and {3,0,3} with corresponding data 2304 that shows two voxels are set (or occupied). The next level of the sparse voxel tree (SVT) is provided as an array of 64-bit integers that contains two sub-cubes 2302 and 2303, one for each voxel set in level 0. In the level 1 sub-array 2305, two voxels are set as occupied, v15 and v63, and all other voxels set as unoccupied and the tree. This format is flexible as 64-entries in the next level of the tree are always allocated in correspondence to each set voxel in the upper layer of the tree. This flexibility can allow dynamically changing scene geometry to be inserted into an existing volumetric data structure in a flexible manner (i.e., rather than in a fixed order, such as randomly), as long as the corresponding voxel in the upper layers have been set. If not, either a table of pointers would be maintained, leading to higher memory requirements, or else the tree would be required to be at least partially rebuilt in order to insert unforeseen geometry.

Figure 24:
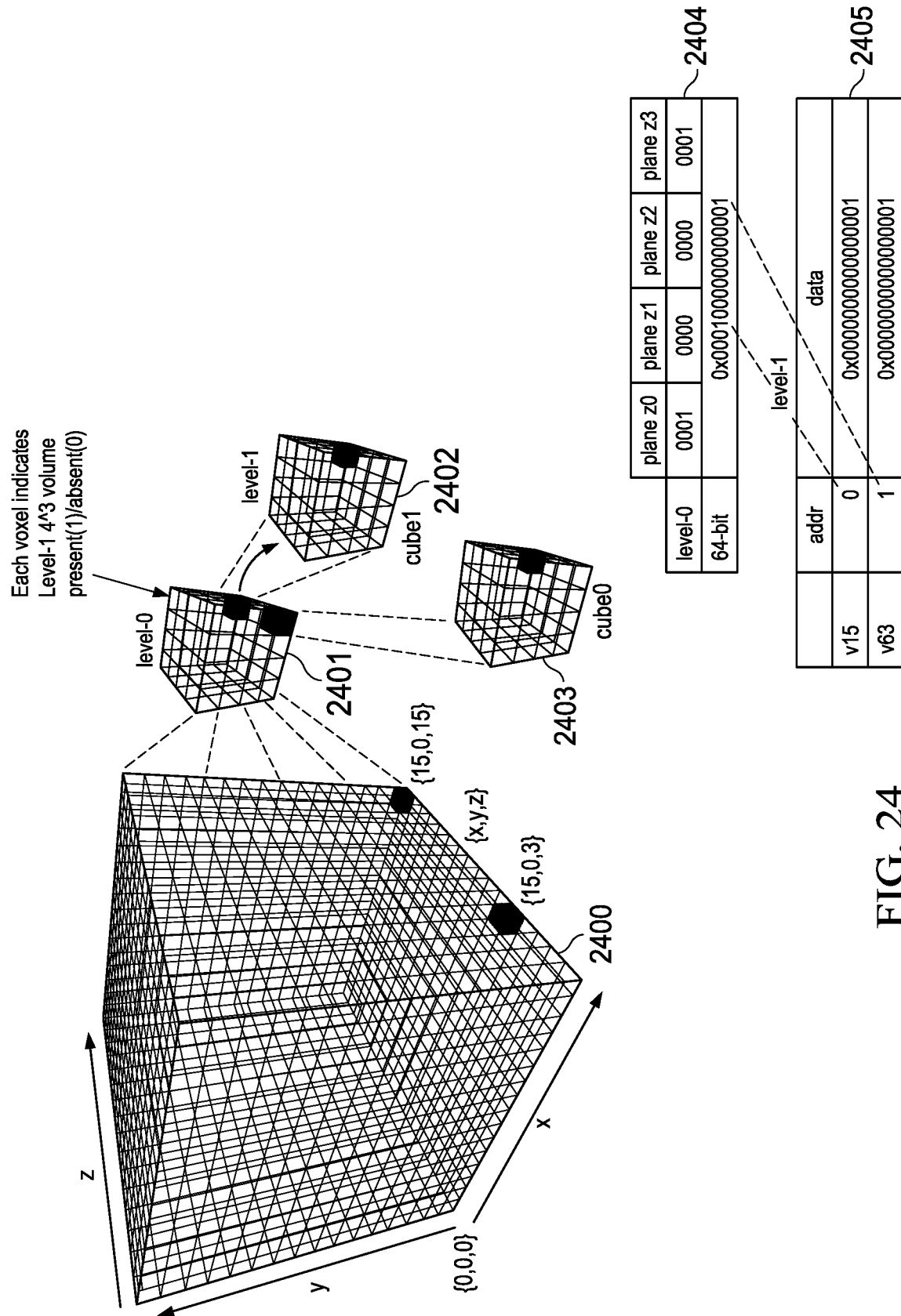
FIG. 24 illustrates storage of example voxel data in accordance with some embodiments.

FIG. 24 illustrates an alternate technique for storing the voxels from FIG. 23 in accordance with some embodiments. In this example, the overall volume 2400 contains two voxels stored at global coordinates {15,0,3} and {15,0,15} as in FIG. 23. In this approach, rather than allocating a 64-entry array to represent all of the sub-cubes in level 1 below level 0, only those elements in level 1, which actually contain geometry (e.g., as indicated by whether or not the corresponding level 0 voxels are occupier or not) are allocated as corresponding 64-bit level 1 records, such that the level 1, in this example, has only two 64-bit entries rather than sixty-four (i.e., for each of the 64 level-1 voxels, whether occupied or empty). Accordingly, in this example, the first level 0 2404 is equivalent to 2304 in FIG. 23 while the next level 2405 is 62 times smaller in terms of memory requirement than the corresponding 2305 in FIG. 23. In some implementations, if new geometry is to be inserted into level 0 for which space has not been allocated in level 1, the tree has to be copied and rearranged.

In the example of FIG. 24, the sub-volumes can be derived by counting the occupied voxels in the layer above the current layer. In this way, the system may determine where, in the voxel data, one higher layer ends and the next lower layer begins. For instance, if three layer-0 voxels are occupied, the system may expect that three corresponding layer-1 entries will following in the voxel data, and that the next entry (after these three) corresponds to the first entry in layer-2, and so on. Such optimal compaction can be very useful where certain parts of the scene do not vary over time or where remote transmission of volumetric data is required in the application, say from a space probe scanning the surface of Pluto where every bit is costly and time-consuming to transmit.

Figure 25:
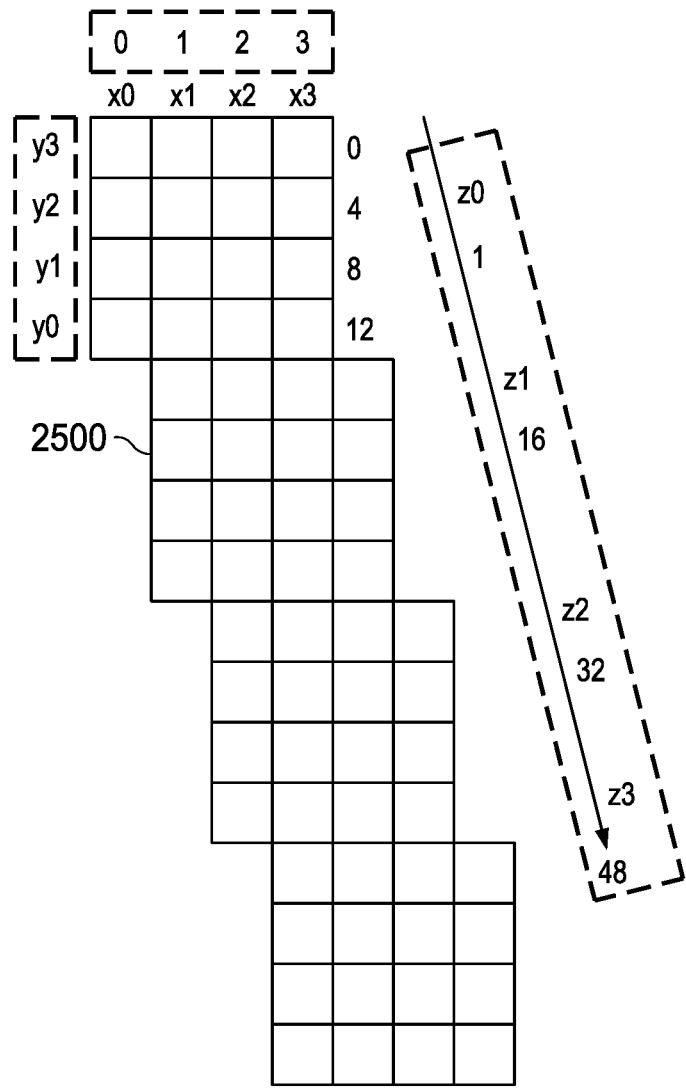
FIG. 25 illustrates insertion of a voxel into an example volumetric data structure in accordance with some embodiments.

FIG. 25 illustrates the manner in which a voxel may be inserted into a 4^3 cube represented as a 64 bit integer volumetric data structure entry, to reflect a change to geometry within the corresponding volume, in accordance with some embodiments. In one example, each voxel cube may be organized as four logical 16-bit planes within a 64-bit integer as shown in 2500. Each of the planes corresponds to Z values 0 through to 3, and within each plane each y-value codes for 4 logical 4-bit displacements 0 through 3, and finally within each 4-bit y-plane each bit codes for 4 possible values of x, 0 through 3, among other example organizations. Thus, in this example, to insert a voxel into a 4^3 volume, first a 1-bit may be shifted by the x-value 0 to 3, then that value may be shifted by 0/4/8/12 bits to encode the y-value, and finally the z-value may be represented by a shift of 0/16/32/48-bits as shown in the C-code expression in 2501. Finally, as each 64-bit integer may be a combination of up to 64 voxels, each of which is written separately, the new bitmap must be logically combined with the old 64-bit value read from the sparse voxel tree by ORing the old and new bitmap values as shown in 2502.

Figure 26:
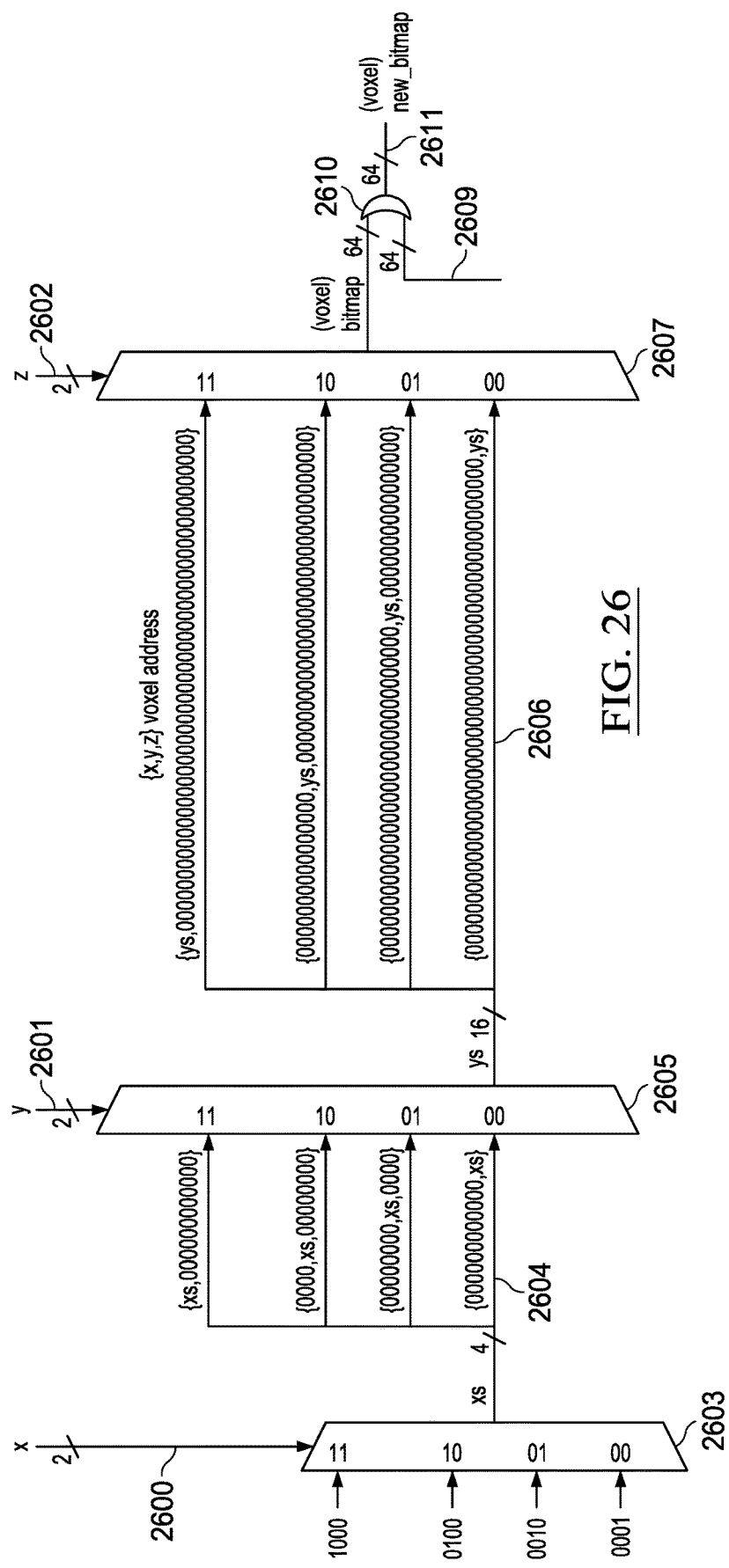
FIG. 26 illustrates logic to insert a voxel into an example volumetric data structure in accordance with some embodiments.

FIG. 26 illustrates logic to insert a voxel into a 4^3 cube represented by a 64-bit integer in accordance with some embodiments. The logic consists of 3 layers of multiplexers. The first multiplexer 2603 may encode the position of the voxel in x according to the 2-bit x input 2600 resulting in an effective shift in x by 0, 1, 2 or 3-bits onto the 4-bit output of the first mux 2604. The second mux 2605 shifts the 4-bit output of the first mux 2604 according to the y-input 2601 by 0, 4, 8 or 12 bits according to the y-input resulting in the 16-bit multiplexer output value 2606. The final multiplexer 2607 shifts the output of the second multiplexer 2606 by 0, 16, 32 or 48-bits according to the z-input 2602 thus encoding the position of the voxel in x, y and z on the 64-bit output of the third multiplexer 2608. The output of the third mux 2608 can be logically ORed by 2610 with the previous value of the bitmap for the 4^3 volume represented by a 64-bit integer 2609 and the 1-bit update to the voxel bitmap 2608 will thus appear at the correct position in the updated 64-bit bitmap for the volume 2611 ready to be written back to the register file, among other example implementations.

Figure 27:
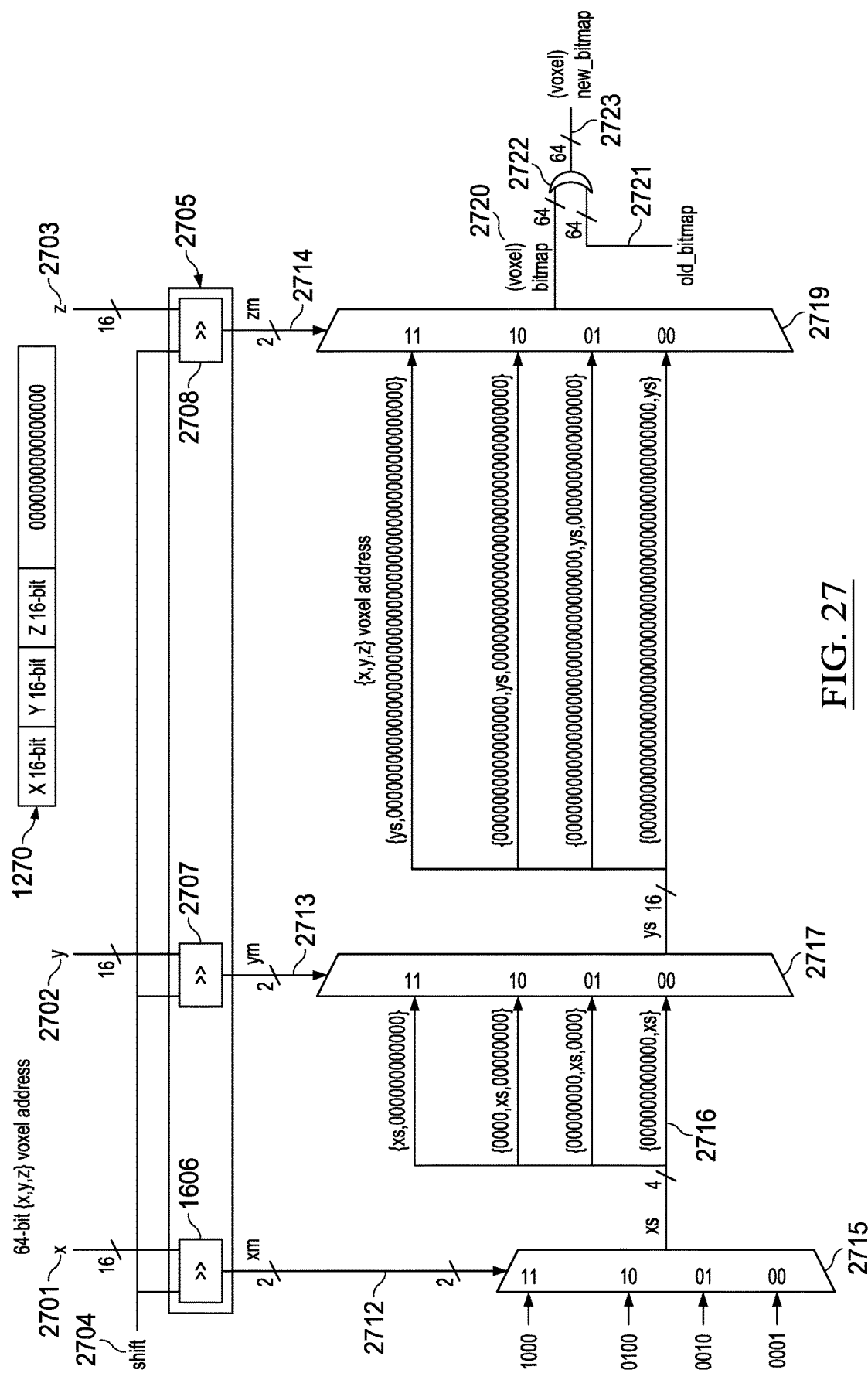
FIG. 27 illustrates logic to generate an address triplet to control the multiplexers in accordance with some embodiments.

FIG. 27 illustrates logic to generate a 6-bit address triplet to control the multiplexers in accordance with some embodiments, which perform voxel insertion, deletion and retrieval (presence detection). In this example the 16-bit x, y and z addresses of the voxel to be inserted, retrieved, tested for, etc. in a sparse voxel tree are presented to the address formatting logic 2705 as a packed 64-bit input value 2700 which consists of three 16-bit addresses for each of x, y and z followed by an unused field of 16 zeroes to pad out to 64-bits. The address formatting logic 1605 consists of 3 identical selection blocks 2706, 2707 and 2708 which select 2-bits from the 16-bit X, Y and Z addresses according to the shift input 2704. The three two-bit addresses xm (2712), ym (2713) and zm (2714) addresses are then applied to the x y and z multiplexer levels 2715, 2717 and 2719 as described in FIG. 27 and the accompanying description in the previous paragraph.

Figure 28:
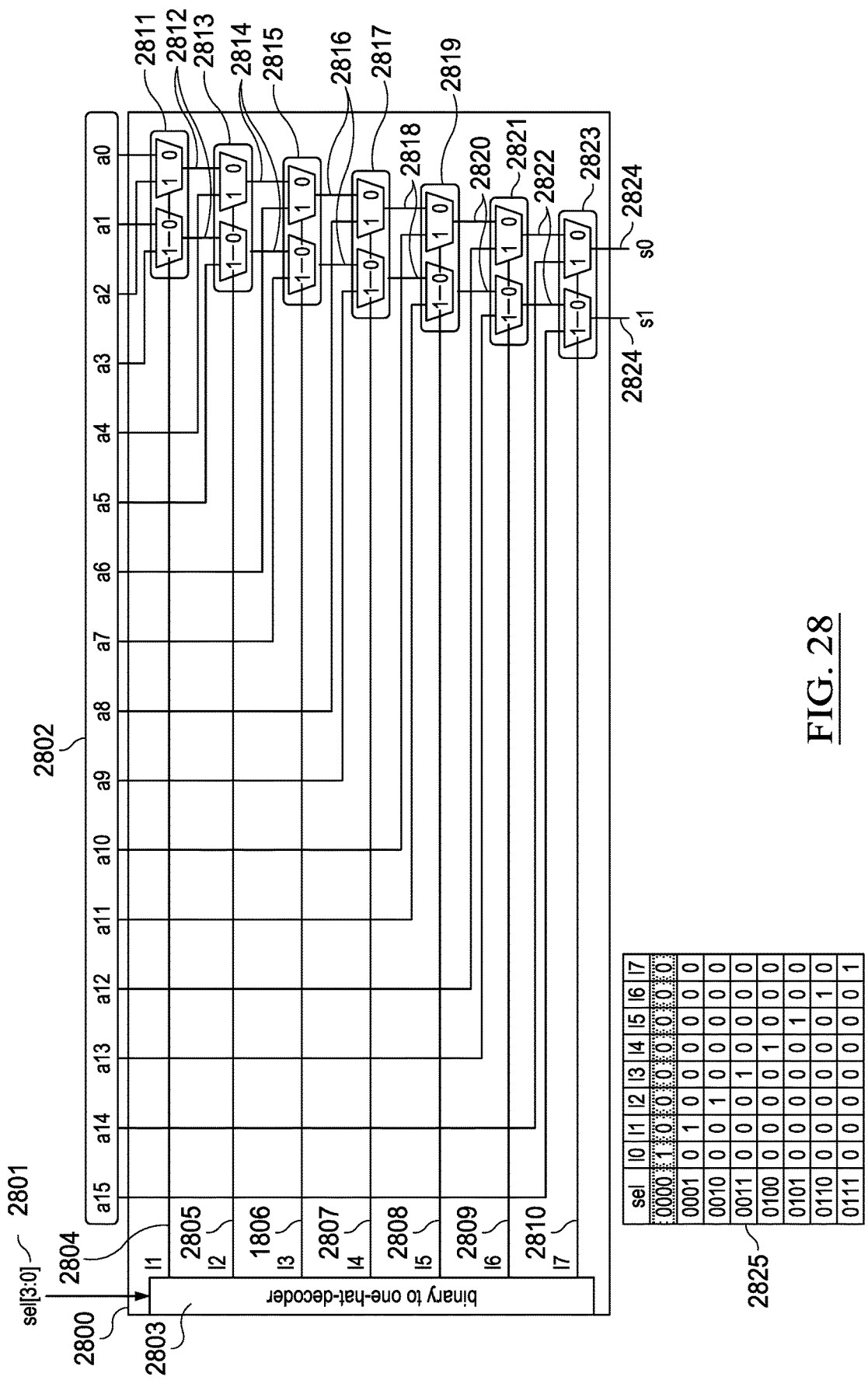
FIG. 28 illustrates address selection logic in accordance with some embodiments.

FIG. 28 illustrates address selection logic in accordance with some embodiments to generate a 2-bit address output address 2824 for the SVT level specified by the sel[3:0] input 2801 from a 16-bit input address 2802. The decoding of the 4-bit sel[3:0] input 2801 may be performed in a binary-to-one-hot-decoder 2803 according to a truth table 2825. In a one hot decoder only one of the output lines 10-16 (2804-2810) can be high at any one time and all other outputs are zero. If the level from the one-hot-decoder 2803 is high the input address pair to the current multiplexer level is selected, otherwise the output from the previous multiplexer level is selected. In the multiplexer tree the first level is controlled by decoder output 16 2806 which if high controls the multiplexer pair 2811 to select address bit pair a1:a0 if high and a3:a2 if low, with the selected pair of multiplexer inputs appearing on the output pair 2812 which is connected in turn to the 15 mux pair 2813. The second level of multiplexers 2813 is controlled by select line 15 (2805) which selects the output of the previous mux pair 2812 if high, or else if 2805 is low the a5:a4 address pair is selected. The decoding continues in a similar manner until the final multiplexer stage 2823 which produces the 2-bit output address pairs [1:0] 2824.

Figure 29:
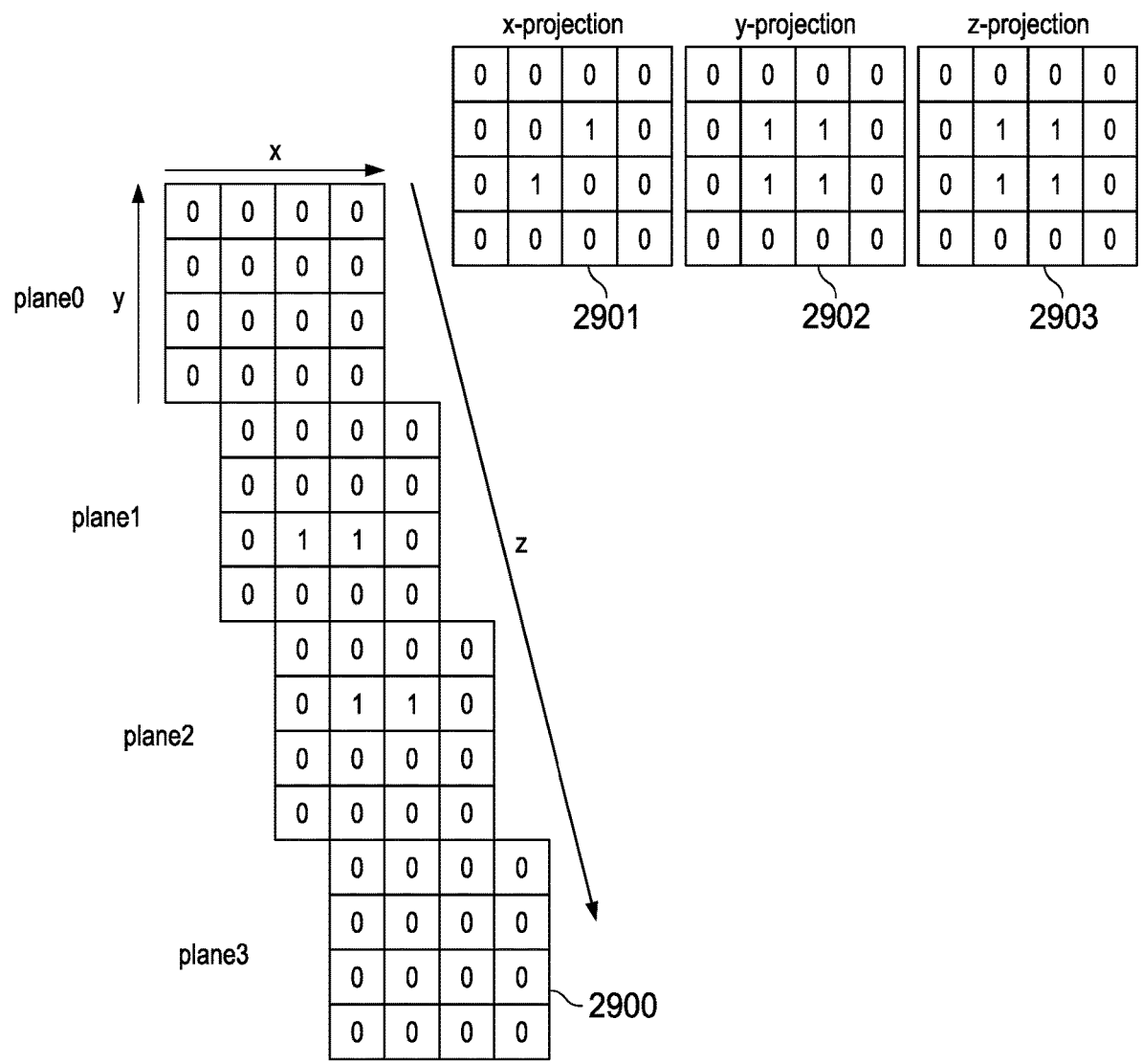
FIG. 29 illustrates projection of an example 3D volumetric object, in accordance with some embodiments.

Turning to FIG. 29, a representation is shown to illustrate, in accordance with some embodiments, how a 3D volumetric object stored in a 64-bit integer 2900 can be projected by logical ORing in the X direction to produce the 2D pattern 2901, in the Y-direction to produce the 2D output 2902 and finally in the Z-direction to produce the pattern shown in 2903. FIG. 30 illustrates, in accordance with some embodiments, how bits from the input 64-bit integer are logically ORed to produce the output projections in X, Y and Z. In this example, table 3001 shows column-wise which element indices from the input vector 3000 are ORed to produce the x-projection output vector 3002. Table 3003 shows column-wise which element indices from the input vector 3000 are ORed to produce the y-projection output vector 3004. Finally 3005 shows column-wise which element indices from the input vector 3000 are ORed to produce the z-projection output vector 3006.

The X-projection logically ORs bits 0,1,2,3 from the input data 3000 to produce bit 0 of the X-projection 3001. For instance, bit 1 in 3001 may be produced by ORing bits 4, 5, 6, and 7 from 3000, and so on. Similarly, bit 0 in the Y-projection 3004 may be produced by ORing together bits 0, 4, 8, and 12 of 3000. And bit 1 of 3004 is produced by ORing together bits 1, 5, 9, and 13 of 3000 etc. Finally bit 0 in the Z-projection 3006 is produced by ORing together bits 0, 16, 32, and 48 of 3000. And bit 1 of 3006 may be produced by ORing together bits 1, 17, 33, and 49 of 3000, and so on.

FIG. 31 shows the hardware organization of a 3D to 2D projection in the Z direction in accordance with some embodiments. In this particular example, the hardware may include an input 64-bit register 3100 whose outputs are connected to an array of sixteen 4-input OR gates 3101, 3102 etc., with the output of 3101 connecting to bit 0 in the output Z-projection 3104, the output of 3102 connecting to bit 1 in 3104, and so on. By combining projections across multiple voxel-cubes in X, Y or Z using the projection hardware projections in X, Y or Z, can be generated for complete volumes. Additionally it would be simple to add masking logic to allow 1-4 levels from a 4^3 cube to be masked out from the logical OR if so desired so there is a single voxel granularity in X/Y/Z projections, among other examples.

Figure 32:
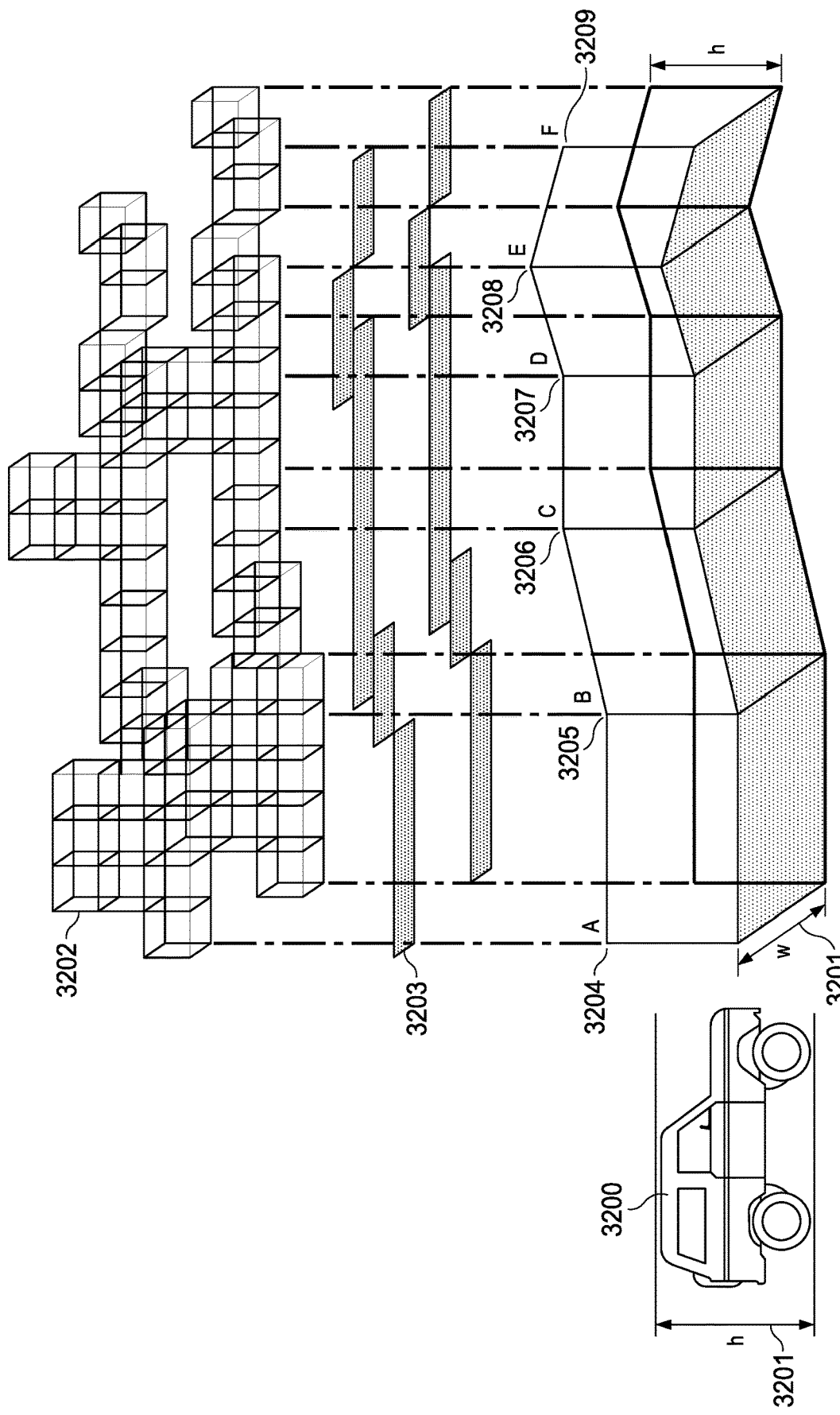
FIG. 32 shows using projections to generate simplified maps in accordance with some embodiments.

FIG. 32 shows an example of how projections can be used to generate simplified maps in accordance with some embodiments. In this scenario, the goal may be to produce a compact 2D map of paths down which a vehicle 3200 of height h 3201 and width w 3201 from a voxel volume 3202. Here the Y-projection logic can be used to generate an initial crude 2D map 3203 from the voxel volume 3202. In some implementations the map may be processed to check whether a particular vehicle (e.g., a car (or autonomous car), drone, etc.) of particular dimensions can pass through the width 3201 and height constraints 3201 of the path. This may be performed in order to ensure the paths are passable by performing projections in Z to check the width constraint 3201 and the projections in Y can be masked to limit calculations to the height of the vehicle 3201. With additional post processing (e.g., in software) it can be seen that for paths which are passable and satisfy the width and height constraints only the X and Z, coordinates of the points A 3204, B 3205, C 3206, D 3207, E 3208 and F 3209 along the path may only be stored or transmitted over a network in order to fully reconstruct the legal paths along which the vehicle can travel. Given that the path can be resolved into such piecewise segments it's possible to fully describe the path with only a byte or two per piecewise linear section of the path. This may assist in the fast transmission and processing of such path data (e.g., by an autonomous vehicle), among other examples.

Figures 33, 34:
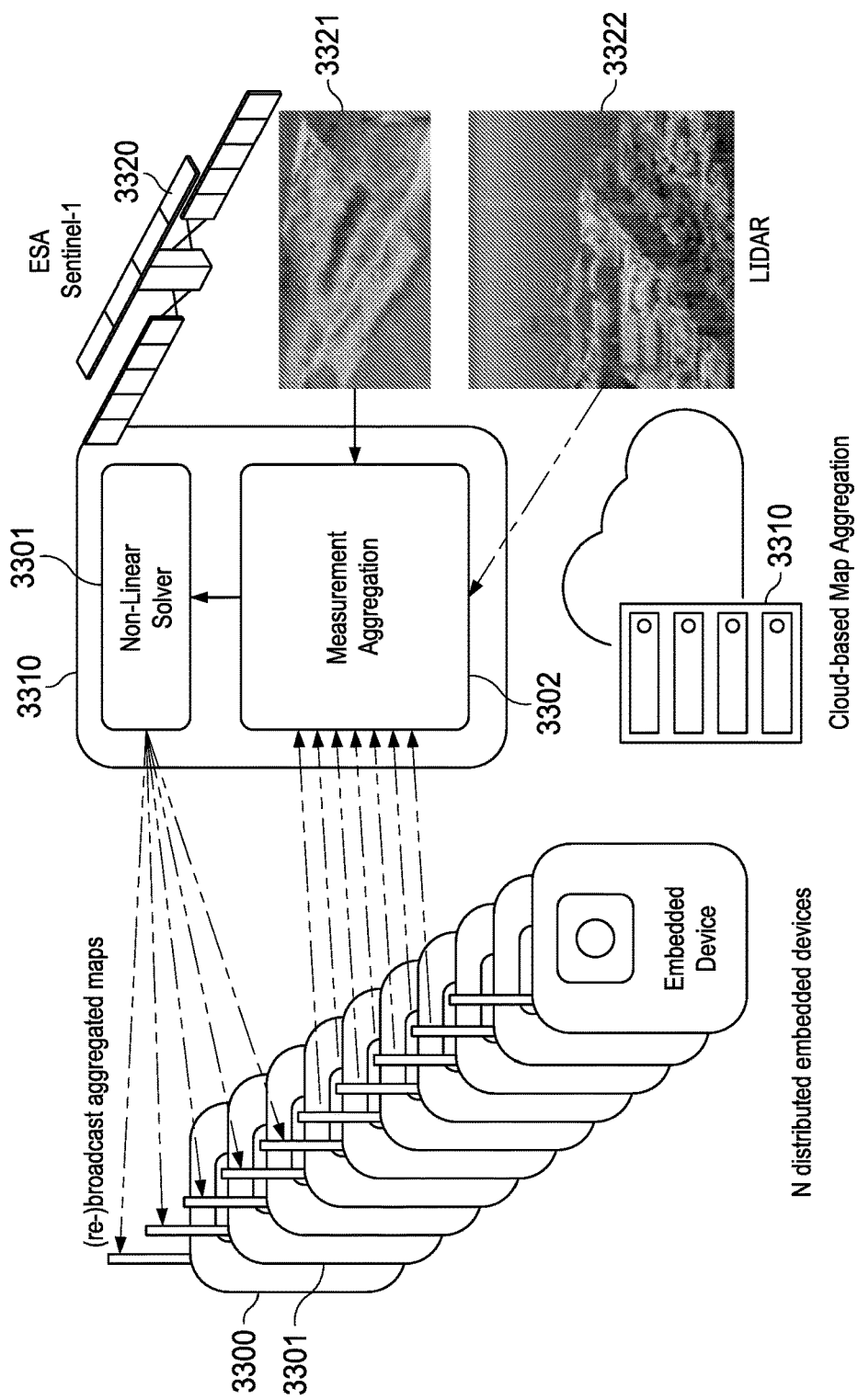
FIG. 33 illustrates example aggregation of example volumetric 3D and/or simple 2D measurements from embedded devices in accordance with some embodiments.
FIG. 34 illustrates example projections in X, Y or Z in some embodiments.

FIG. 33 illustrates how either volumetric 3D or simple 2D measurements from embedded devices can be aggregated in accordance with some embodiments by mathematical means in order to generate high-quality crowd-sourced maps as an alternative to using LIDAR or other expensive means to make precision measurements. In the proposed system a plurality of embedded devices 3300, 3301, etc. may be equipped with various sensors capable of taking measurements, which may be transmitted to a central server 3310. Software running on the server performs aggregation of all of the measurements 3302 and performs a numerical solve by non-linear solver 3303 of the resulting matrix to produce a highly accurate map, which can then be redistributed back to the embedded devices. Indeed the data aggregation can also include high accuracy survey data from satellites 3320, aerial LIDAR surveys 3321 and terrestrial LIDAR measurements 3322 to increase the accuracy of the resulting maps where these high fidelity datasets are available. In some implementations, the map and/or the recorded measurements may be generated in, converted to, or otherwise expressed using sparse voxel data structures with formats such as described herein, among other example implementations.

The projection logic in FIG. 31 can be duplicated to produce simultaneous projections in X, Y and Z or alternately when simultaneous projections are not required the diagram in FIG. 34 shows how the logic in FIG. 31 can be extended to produce projections in X, Y or Z in some embodiments under the control of an input multiplexer stage to select the appropriate quads of 4 input bits to route to each of the 16 OR gates in FIG. 31. Additionally a bank of 64 AND gates can be used to mask out bit planes in the event the application requires voxel-level accuracy for X, Y and Z projections. This masking logic can be duplicated in the logic of FIG. 31 for the same fidelity reasons. 3401 is mask, such as mask 0, 1, 2, or 3, and 3400 is an AND gate.

Figure 35:
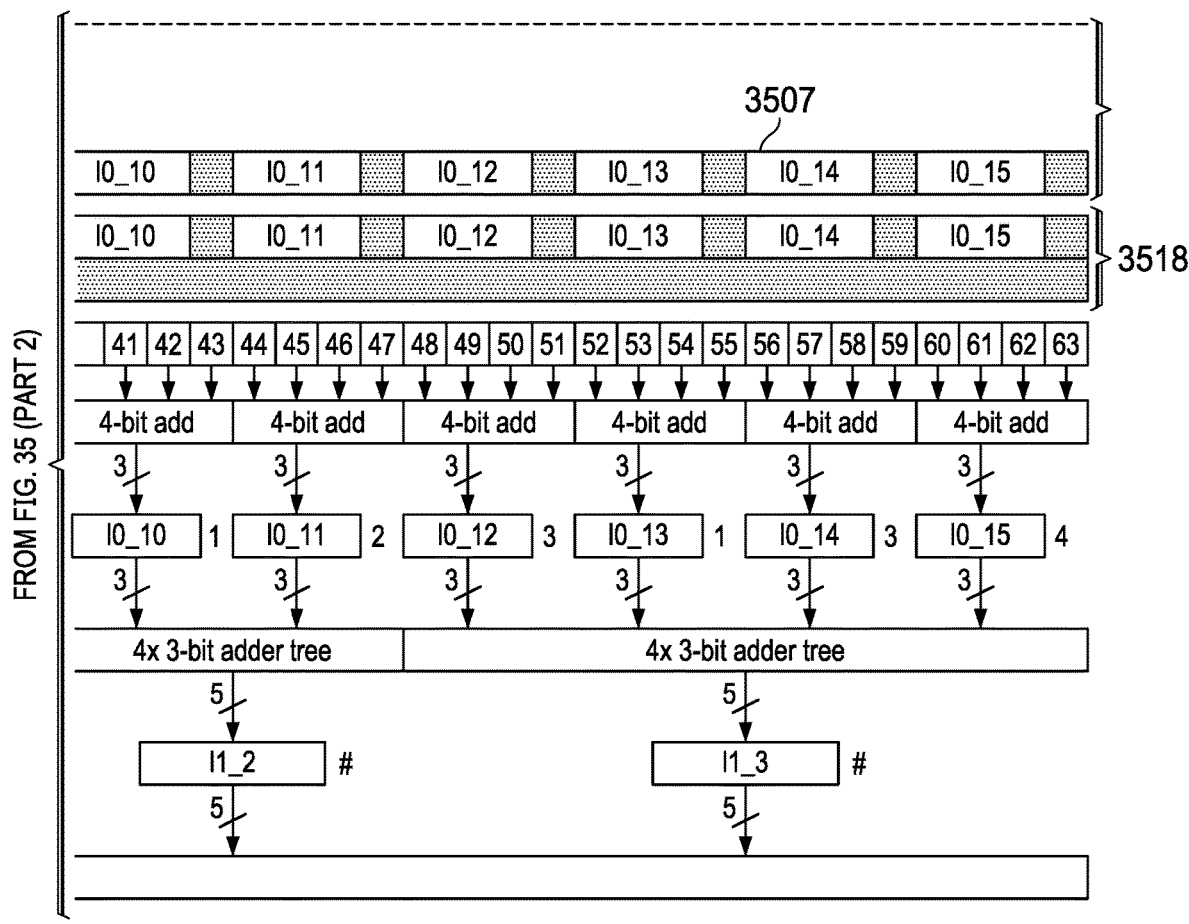
FIG. 35 shows the example acceleration of the generation of histogram pyramids from 2D bitmaps in accordance with some embodiments.

FIG. 35 is a diagram showing how the generation of histogram pyramids from 2D bitmaps can be accelerated in accordance with some embodiments. A histogram pyramid may be computed by successively summing the number of ones in an input 8×8 bit representation of a 2D binary array represented as a 64-bit integer 3500 entry of an example volumetric data structure. The first level of the histogram pyramid is derived by summing the number of ones in each of the 2×2 bit groupings in 3500 to yield the sixteen 3-bit numbers {0,1,2,3,4} shown in 3501. For instance, bits 0, 1, 2 and 3 of the 64-bit value 3504 (corresponds to 350) may be summed by a 4×3-bit adder 3505, to produce a partial sum in the I0_x register 3506. The next 4×3-bit adder computes the sum of bits 4, 5, 6 and 7 etc. The output of the first layer of sixteen 4×3-bit adders is packed into a 48-bit register I0_x also denoted as 3507. The next level of the histogram pyramid is computed by summing the partial products in register I0_x (3505) using an 8-bit adder to 3508 to sum the four 3-bit partial sums I0_0, I0_1, I0_2 and I0_3 to compute level 1 values I1_x (e.g., 3509) the elements of I1_x are concatenated into 3517× which also corresponds to 3507. The final stage sums I1_x elements (e.g., 3509) into a 7-bit result via a 4×5-bit adder tree 3510. The output of 3510 is then stored in a register 3512 as I2_0 which corresponds to 3503 and 3507. From the point of view of ease of use from a memory map perspective, the three elements 3514, 3516 and 3507 can be packed into a 128-bit format shown in 3518, among other example features and implementations.

Figure 36:
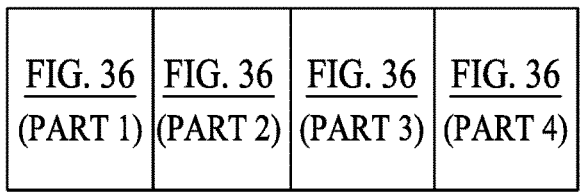
FIG. 36 shows the example acceleration of the generation of histogram pyramids from 3D bitmaps in accordance with some embodiments.
Figure 36:
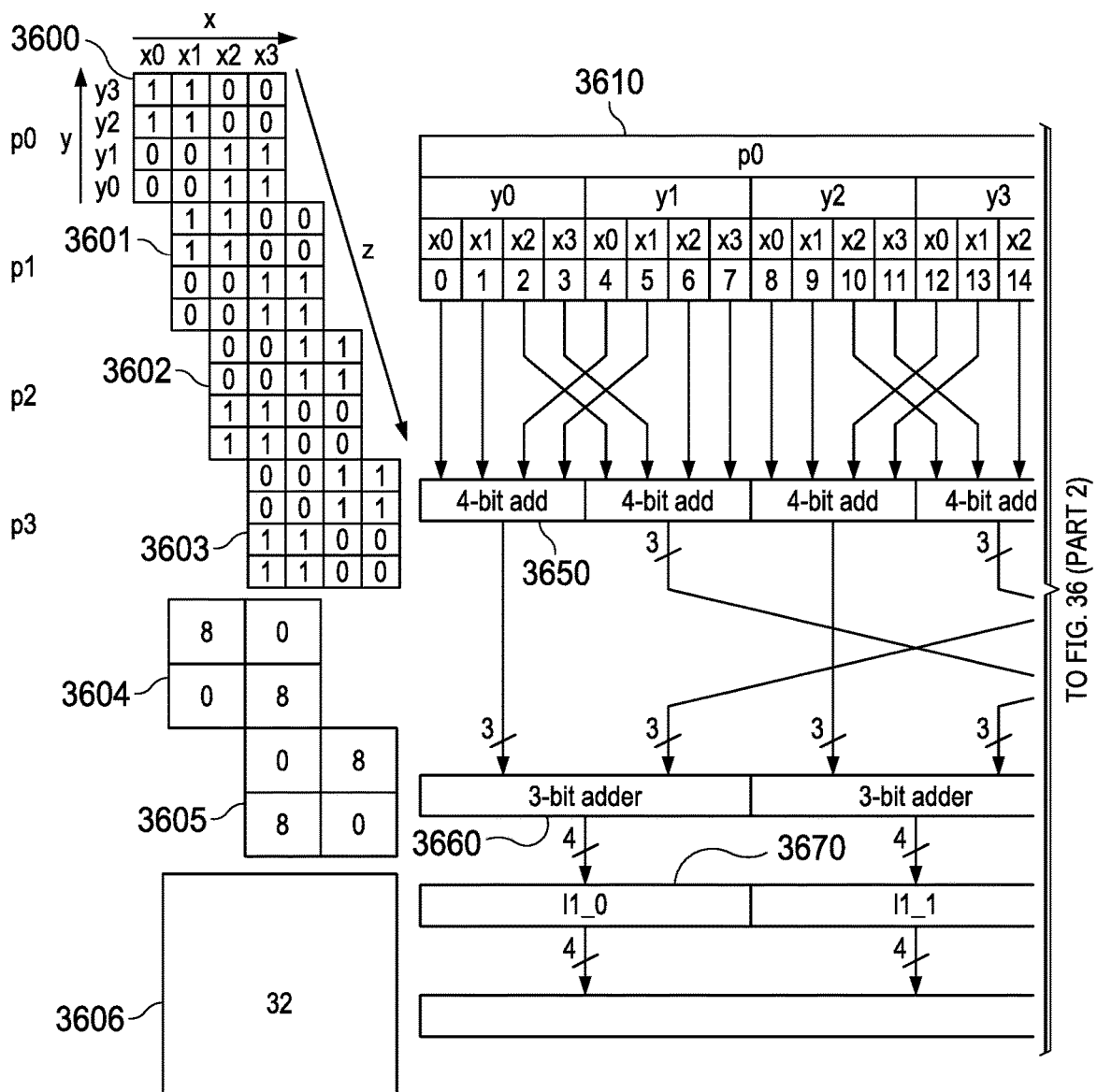
Figure 36:
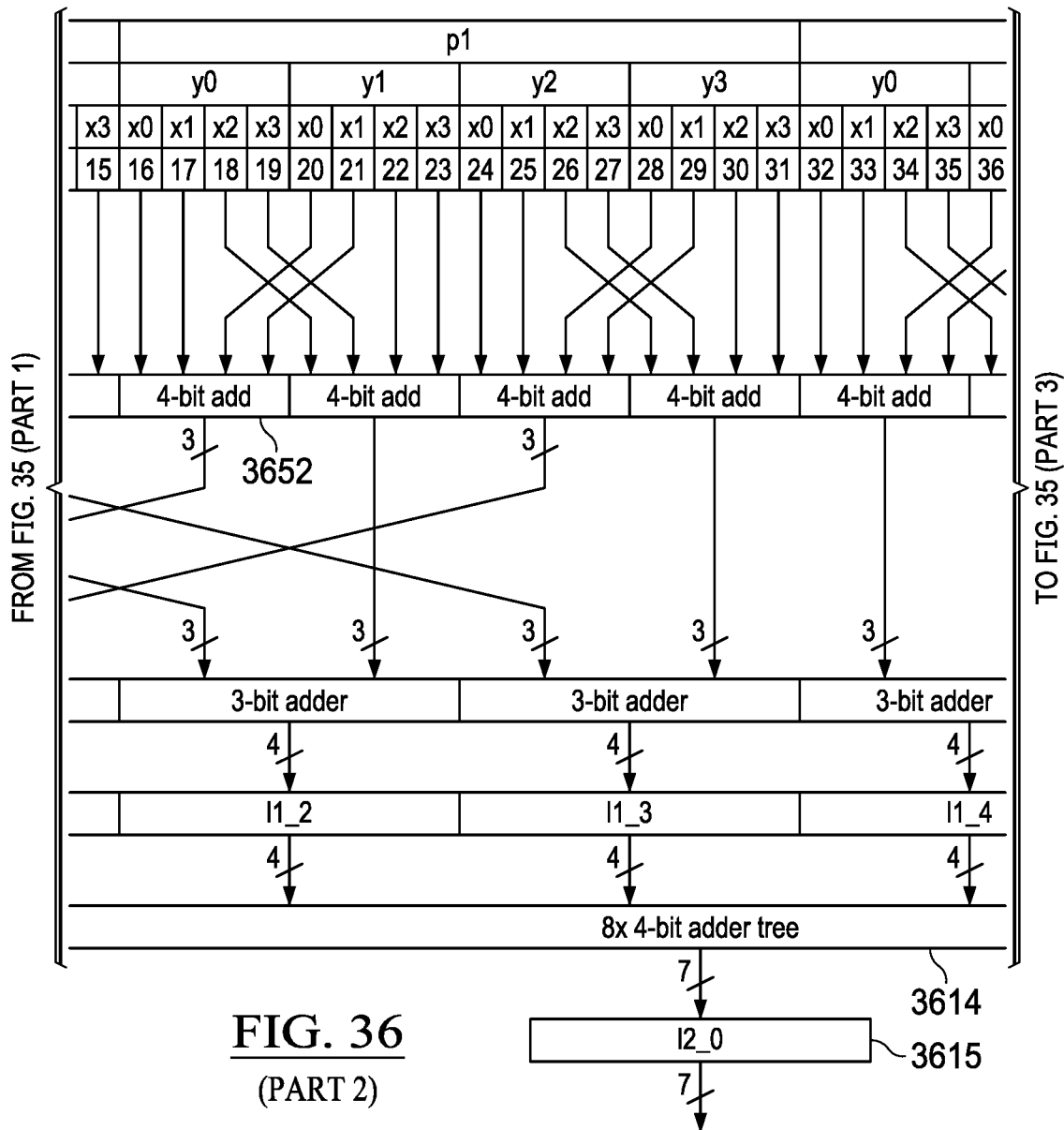
Figure 36:
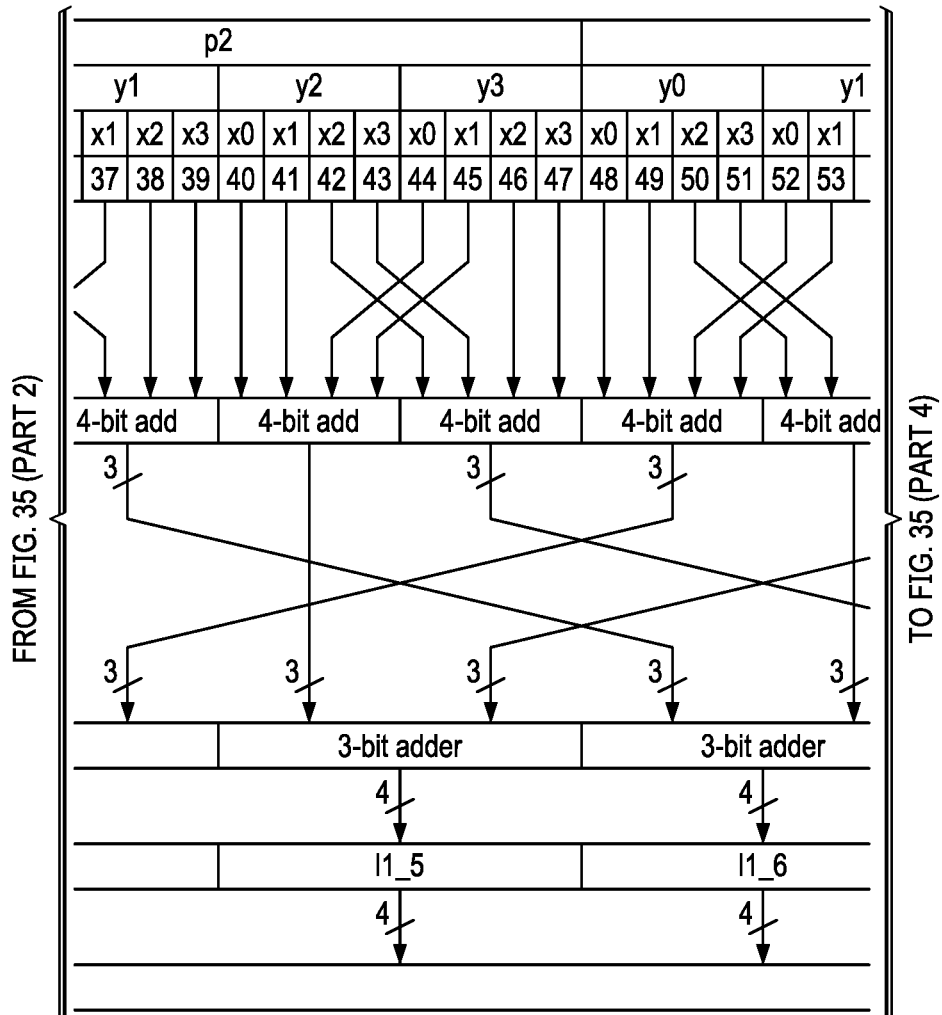

FIG. 36 shows how the generation of histogram pyramids from 3D bitmaps can be accelerated in accordance with some embodiments. Similar to the example of FIG. 35, a 64-bit integer entry of an example volumetric data structure (e.g., 3600, 3601, 3602, 3603) codes this time for a 4^3 3D volume rather than an 8×8 2D volume. The 3D volume may be reduced to a histogram pyramid consisting of 2 levels 3604 and 3605 followed by 3606. In the case of FIG. 36, the volume is reduced by a factor of 2 in 3 dimensions, rather than only 2 dimensions as in the case of FIG. 35. The bits in the 64-bit integer entry may be laid out as shown in 3610 and are summed by a row of 16 four bit adders 3650 to 3655. The first 4-bit adder 3650 sums bits 0, 1, 4 and 5 through to the sixteenth adder 3655, which sums bits 58, 59, 62 and 63 of 3610. A second row of eight 2×3-bit adders 3660 to 3665 then sums the output of the 4-bit adders 3650 to 3655. For instance, adder 3660 sums the outputs of 3650 and 3652 and the result is stored in I1_0 (3670) etc. Finally an 8×4-bit adder tree 3614 sums the I1_x elements 3670 to 3675 and the result is stored in I2_0 (3615).

Figures 36, 37:
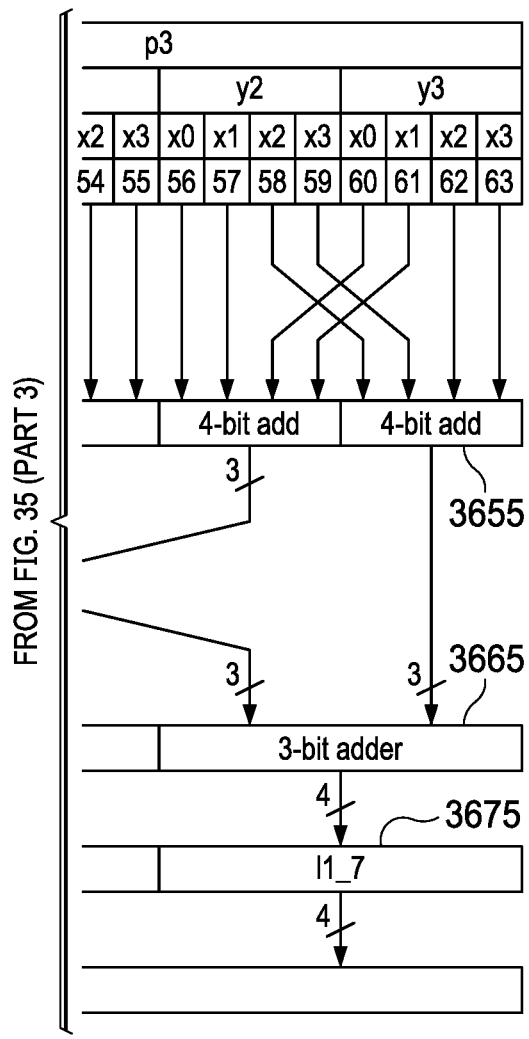
FIG. 37 shows the example acceleration of 2D Path-Finding on a 2D 2×2 bitmap in accordance with some embodiments.

FIG. 37 is a diagram showing how 2D Path-Finding on a 2D 2×2 bitmap can be accelerated in accordance with some embodiments. The principal of operation is that for connectivity to exist between points on a map of identical grid cells the values of a contiguous run of cells in x or y or x and y must all be set to one. So a logical AND of bits drawn from those cells can be instantiated to test the bitmap in the grid for the existence of a valid path, and a different AND gate can be instantiated for each valid path through the N×N grid. In some instances, this approach may introduce combinatorial complexity in that even an 8×8 2D grid could contain $2^{64}$-1 valid paths. Accordingly, in some improved implementations, the grid may be reduced to 2×2 or 4×4 tiles which can be hierarchically tested for connectivity. A 2×2 bitmap 3700, contains 4 bits labeled b0, b1, b2 and b3. The 4 bits can take on the values 0000 through to 1111 with corresponding labels 3701 through to 3717. Each of these bit patterns expresses varying levels of connectivity between faces of the 2×2 grid labelled 3721 through to 3730. For instance 3721 or v0 denoting vertical connectivity between x0 and y0 in 3700 exists when the 2×2 grid 3700 contains bitmaps 1010 (3712), 1011 (3713), 1110 (3716) or 1111 (3717). A 2-input logical AND or b0 and b3 in 3700 as shown in row 1 of table 3718 generates v0 in the connectivity map that can be used in higher level hardware or software to decide on global connectivity through a global grid that has been subdivided into 2×2 sub grids. If the global map contains an odd number of grid points on either x or y axis the top level grid will require padding out to the next highest even number of grid points (e.g., such that 1 extra row of zeroes will need is added to the x- and/or y-axes on the global grid). FIG. 37 further shows an exemplary 7×7 grid 3750 showing how it is padded out to 8×8 by adding an additional row 3732 and column 3734 filled with zeroes. In order to speed up path-finding compared to other techniques (e.g., depth-first search, breadth-first search or Dijkstra's algorithm, or other graph-based approaches), the present example may sub-sample the N×N map 3750 progressively town to a 2×2 map. For instance in this example cell W in 3740 is populated by ORing the contents of cells A, B, C and D in 3750, and so on. In turn the bits in 2×2 cells in 3740 are ORed to populate the cells in 3742. In terms of path-finding the algorithm starts from the smallest 2×2 representation of the grid 3742 and tests each of the bits. Only the parts of the 4×4 grid in 3740 (composed of four 2×2 grids) corresponding to one bits in the 2×2 grid 3742 need be tested for connectivity as we know that a zero bit means that there is no corresponding 2×2 grid cell in 3740. This approach can also be used in searching the 8×8 grid in 3720, for example if cell W in 3740 contains a zero then we know that there is no path in ABCD in 3720 etc. This approach prunes branches from the graph search algorithm used whether it be A*, Dijkstra, DFS, BFS or variants thereof. In addition to this, the use of a hardware basic path-finder with 2×2 organization 3718 may further limit the associated computations. Indeed, a 4×4 basic hardware element can be composed using a five 2×2 hardware blocks with the same arrangement as 3740 and 3742 further constraining the amount of graph searching that needs to be performed. Furthermore an 8×8 hardware-based search engine can be constructed with twenty one 2×2 HW blocks (3718) with the same arrangement as 3742, 3740, 3700, and so on for potentially any N×N topology.

Figure 38:
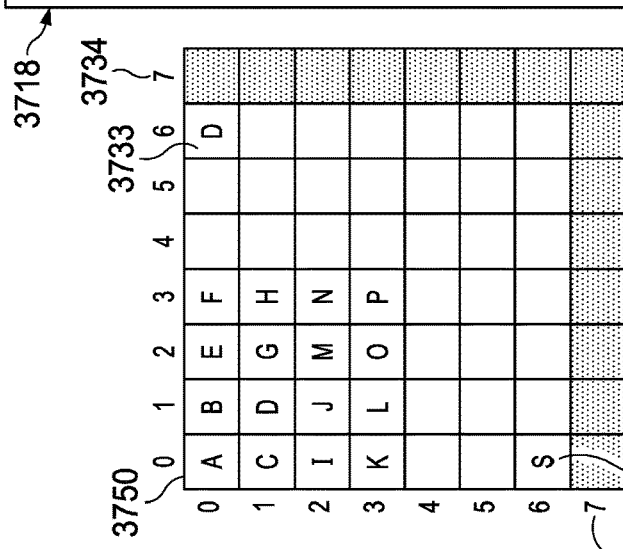
FIG. 38 shows the example acceleration of 2D Path-Finding on a 2D 2×2 bitmap in accordance with some embodiments.

FIG. 38 shows how 3D Path-Finding on a 3D 2×2×2 bitmap can be accelerated in accordance with some embodiments. Similar to the example of FIG. 37, an N×N×N grid can be padded to a multiple of 2 (N must be even) as shown in 3800. This grid can be progressively subsampled to a 4×4×4 grid as shown in 3801 and finally to a 2×2×2 grid in 3802. Similarly to FIG. 37 the presence or absence of ones in the cells in each 2×2×2 grid cell (3802) can be used to determine whether any region of the 4×4×4 grid should be searched, cells in the 4×4×4 grid can be used to prune calculations in the 8×8 grid and so on up to the full N×N grid independently of the graph algorithm used to search the overall N×N×N grid. At the 2×2×2 grid level the 8 bits in the 2×2×2 bitmap are labeled v0-v7 as shown in 3803. The connectivity to the faces of the cube are shown in 3804 using the same color coding. As shown in the connectivity matrix for the path-finder through the 2×2×2 volume shown in 3805 the connectivity is symmetric so only the lower triangle need be represented as connectivity from A to B is the same as from B to A. Furthermore the elements along the diagonal need not necessarily be considered as they are implicit. The equations for the connectivity in 3 dimensions is shown in 3806 to 3813 with the various sections showing the equations for the bits required to be all ones in order for connectivity to exist between voxels in the 2×2×2 volume 3803. For instance for connectivity to exist between v0 and v1 to exist bits v0 AND v1 must both be "1", for connectivity to exist between v0 and v2 to exist both v0 and v2 must both be "1", and for connectivity to exist between v0 and v3 then v0, v1 or v2 AND v3 must all be "1"'s, and so on, as shown in section 3086 of the truth-table. From this organization, the equations shown may be implemented in AND-OR logic circuitry to implement the 2×2×2 path-finding on an 8-bit bitmap 3803 and output the paths between the voxels v0-v7 in a single parallel step. Further, in a manner similar to that shown in FIG. 37, a 4×4×4 primitive HW path-finder can be constructed using five 2×2×2 HW path-finders as per 3805 interconnected in the manner shown between 3802 and 3801. Indeed, an 8×8×8 HW path-finder can be implemented connecting one hundred and 37 2×2×2 HW path-finders as per the connectivity of 3802, 3801 and 3800, among other examples.

Figure 39:
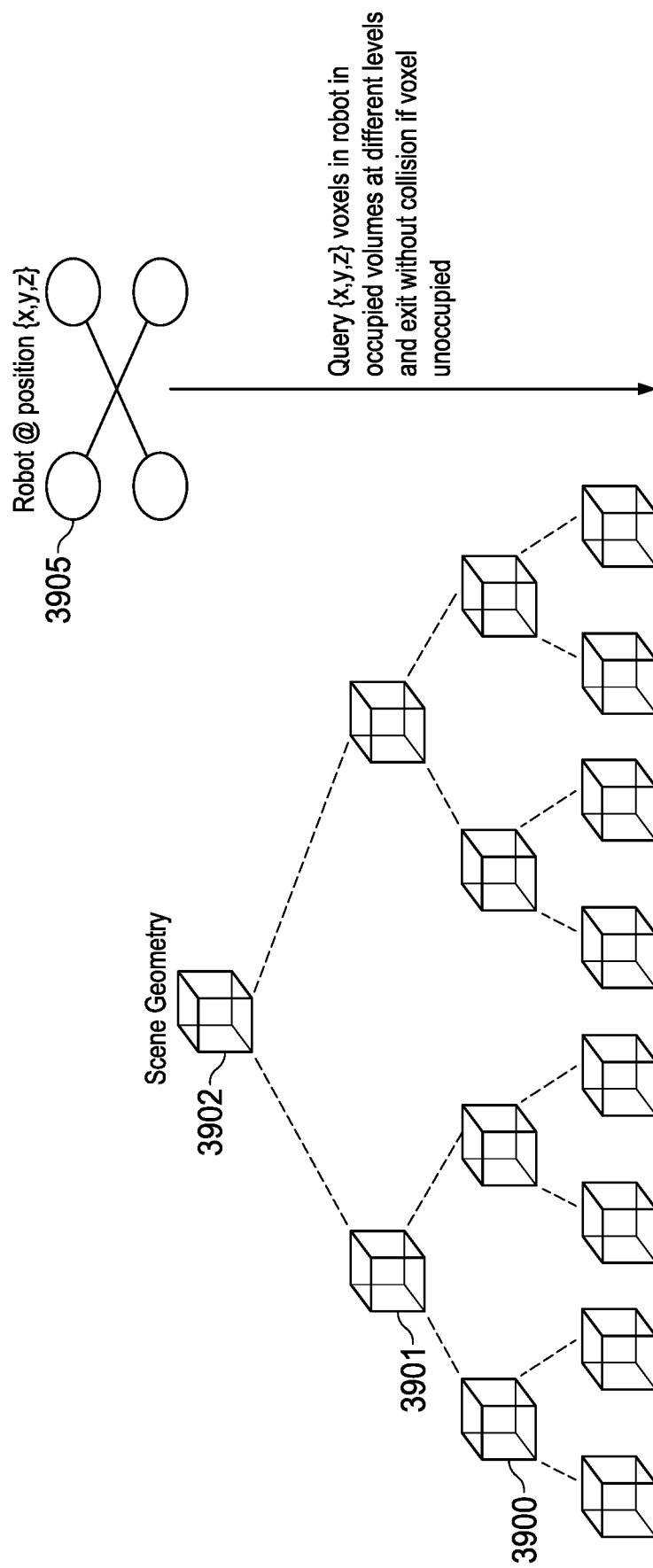
FIG. 39 shows the example acceleration of collision detection using an example volumetric data structure in accordance with some embodiments.

FIG. 39 is a simplified block diagram showing how collision detection can be accelerated using the proposed volumetric data structure in accordance with some embodiments. The 3D N×N×N map of the geometry can be sub-sampled into a pyramid as previously shown in FIG. 38 consisting of a lowest Level of Detail (LoD) 2×2×2 volume 3802 (3902), a next highest 4×4×4 volume 3801 (3901), an 8×8×8 volume 3800 (3900), and so on all the way up to N×N×N. If the position of the drone, vehicle, or robot 3905 is known in 3D space via either a location means such as GPS, or via relocalization from a 3D map, then it can rapidly be used to test for the presence or absence of geometry in a quadrant of the relevant 2×2×2 sub-volume by scaling the x, y and z positions of the drone/robot appropriately (dividing them by 2 the relevant number of times) and querying 3902 for the presence of geometry (e.g., checking if the corresponding bitmap bit is one indicating a possible collision). If a possible collision exists (e.g., a "1" is found) then further checks in volumes 3901, 3900, etc. may be performed to establish if the drone/robot can move or not. However, if a voxel in 3902 is free (e.g., "0"), then the robot/drone can interpret the same as free space and manipulate directional control to move freely through a large part of the map.

As discussed above, a volumetric data structure may be utilized to enhance the performance of ray casting within a volume including various geometry. While the concept of audio ray casting was introduced above (e.g., in connection with FIGS. 14-19), it should be appreciated that similar principles may be utilized to perform ray casting in connection with graphics rendering, path planning, collision avoidance, and other ray casting applications involving a 3D geometry. For instance, as shown in the simplified block diagram 4000 of FIG. 40, a system is shown to illustrate how a volumetric data structure may be used in connection with an example path finding application. As an example, a drone 4002 (or another device, such as a robot, remote controlled vehicle, etc.) may be tasked with navigating a 3D volume 4004. The drone 4002 (or an associated controller device (e.g., 4006)) may be configured with hardware- and/or software-based logic to acquire a volumetric data structure 4008 that describes the volume, which the device(s) (e.g., 4002, 4006) may use to identify geometry within the volume 4004 to influence or direct the travel pattern of the drone 4002 (e.g., obstacles to avoid, objects with which the drone is to target (e.g., a package to pick up and transport), areas representing potential landing and parking pads, etc.). In some instances, the volumetric data structure 4008 may be pre-loaded onto the local memory of the drone 4002 in preparation for the drone's use within an environment corresponding to the modeled volume 4004. In other examples, the drone 4002 may acquire at least a portion of the volumetric data structure 4008 from resources in a network 4010 (e.g., a repository 4012 of volumetric data structures corresponding to a universe of different volumes and environments). For instance, the drone 4002 (or a controller system 4006) may transmit a wireless communication to the network 4010 to indicate a request for a volumetric model for a particular environment. In one example, the request may include global positioning data or other location information, which the repository system 4012 may utilize to identify a corresponding volumetric data structure. Accordingly, a corresponding volumetric data structure (e.g., 4008) may be returned (over a network) in response for use by the drone 4002 (or its controller 4006). As an example, the direction of travel (e.g., 4014) of the drone 4002 may be measured at the drone (or by its controller), and a path of voxels (e.g., 4016, 4018, etc.) in volume 4004 may be identified from the volumetric data structure that the drone will enter if the drone continues along its present course. Similarly, the path of travel (e.g., 4014) may identify that the boundary of a one volume (represented by a first volumetric data structure) is approaching and that a second volumetric data structure corresponding to the adjacent volume should be accessed and used, among other examples.

In some cases, volumetric data structures may be selected in connection with the travel of a particular device prior to the beginning of travel (e.g., based on a start location of the device). In other cases, the volumetric data structures may be selected and provided as the device travels through a volume (e.g., with new or additional volumetric data structures being loaded onto the device or its controller as it is detected to be approaching a corresponding point in space). In some instances, updates to volumetric data structures may also be provided, for instance, to reflect temporary or new changes to geometry, which may not be reflected in the volumetric data structure(s) associated with a particular space (e.g., to show the presence of a newly erected crane, barrier, ditch, etc., or even the removal of previously present geometry, etc.). Such volumetric information may be pushed or broadcast, in some instances, to the traveling device as it is detected to approach a corresponding area, which may cause the device to replace or update the volumetric data structure it is using (e.g., by inserting or removing bits from corresponding entries) with the new information, among other examples.

As a device progresses through an environment, the device's logic may be utilized to identify upcoming geometry as identified within one or more voxels (e.g., 4018) described in a volumetric data structure. The presence of the geometry may be processed by the drone system to change or finetune its navigation within the volume. For instance, the volumetric data structure may define the geometry at multiple levels of detail and identifying geometry in a low level of detail voxel may cause the drone system to progressively process the volumetric data structure to identify corresponding higher level of detail voxels. In some implementations, this may involve the drone requesting remaining portions of the volumetric data structure (from a cloud-based repository (e.g., 4012) that include representations of higher level of detail voxels. In other cases, the compact nature of a volumetric data structure may allow all levels of detail to be represented and conveniently stored and processed by the drone system 4002 (which itself may be have constrained memory and processing resources). In some cases, inference may be performed (e.g., using a CNN, such as described herein) on identified geometry to determine the identity or characteristics of the approaching geometry, and the device's response to the geometry may be based on these characteristics (e.g., to either ignore or avoid the geometry during travel), among other example implementations.

Figure 40:
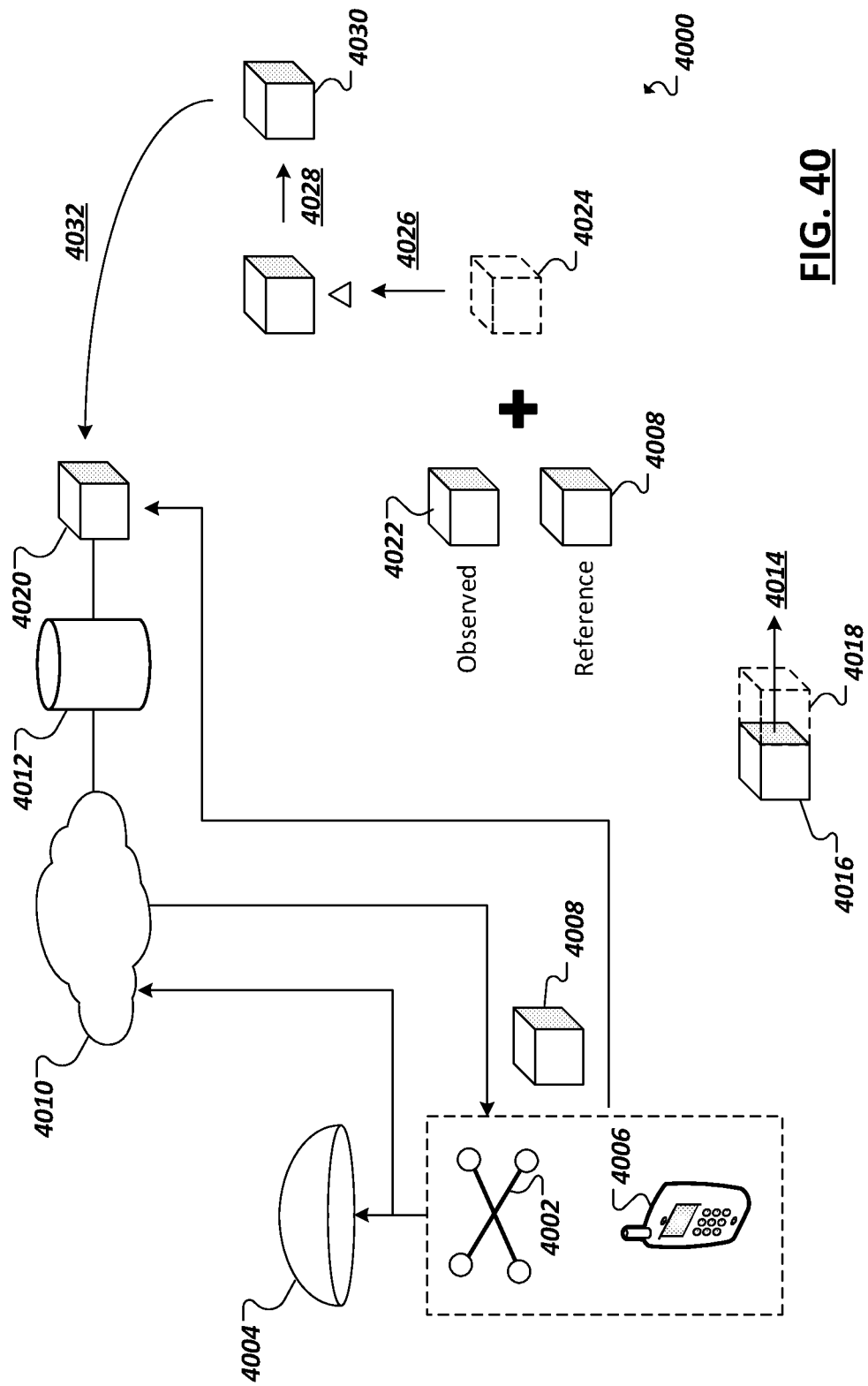
FIG. 40 is a block diagram of an example system including a vehicle using an example volumetric data structure for path guidance.

In still other examples, such as shown in FIG. 40, a drone, robot, or other device (e.g., 4002), which uses a volumetric data structure to navigate a volume (e.g., 4004), may itself possess sensors (e.g., stereographic cameras, depth scanners, light detection and ranging (LIDAR) scanners, or other image sensors), which may allow the device to provide feedback to a repository system (e.g., 4012) to update a master volumetric data structure (e.g., 4020) for the environment 4004. Indeed, in some implementations, a system (e.g., 4002 and/or 4006) may possess functionality to process image data collected by image sensors to generate a volumetric data structure according to a defined structure. For instance, when navigating a volume (e.g., using a volumetric data structure provided by cloud repository 4012), the device (e.g., 4002) may generate observed image data 4022 (e.g., an observed volumetric data structure updated to reflect differences observed by the drone 4002), which may be compared with the retrieved volumetric data structure 4008 (which may serve as the expected reference description of the volume 4004) to generate a delta representation 4024 of the volumetric data structure (e.g., by XORing the observed data structure 4022 with the reference data structure 4008), among other example implementations. The device (e.g., 4002) may communicate 4026 the differences observed in the volume 4004 to the repository system 4012. The repository system 4012 (or another system, such as the drone system 4002) may process this feedback to derive 4028 an updated version of the volumetric data structure 4030, which may replace 4032 the master version of the volumetric data structure, in some implementations. In this manner, voxels may be inserted or deleted (e.g., using mechanisms disclosed herein) using feedback from potentially multiple different sensors and system to continually refine and update volumetric data structures maintained to describe potentially changing geometries in various environments (e.g., 4004) modeled by the volumetric data structures.

Figure 41:
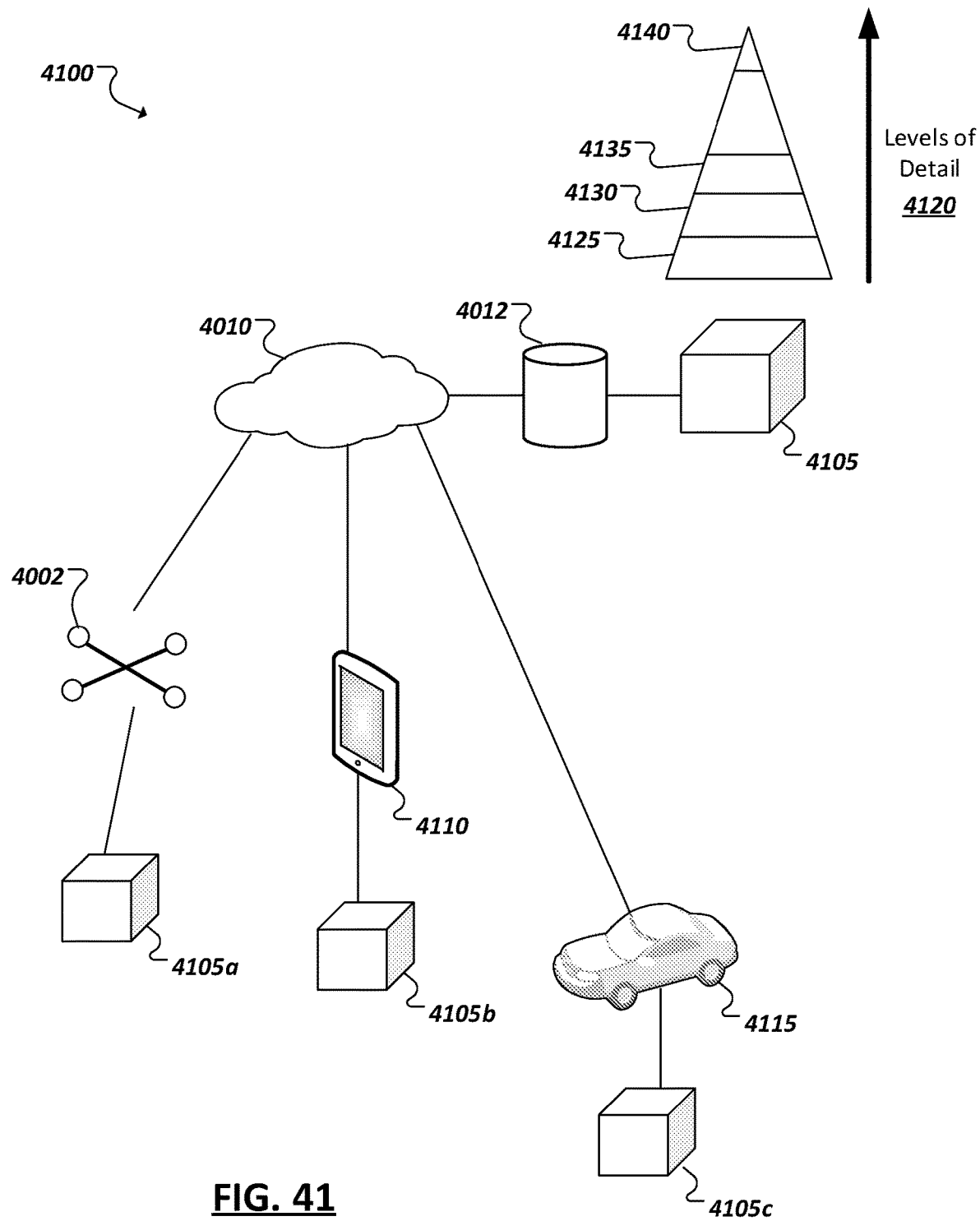
FIG. 41 is a block diagram of an example system including a repository system maintaining example volumetric data structures.

Turning to the example of FIG. 41, a simplified block diagram 4100 is shown of an example system which develops and maintains volumetric data structures 4205 for use in a variety of applications. For instance, a repository system 4012 may be provided, which may connect through one or more data networks 4010 (e.g., using Wi-Fi, Bluetooth, Ethernet, and other wireless and/or wired communications technologies) to a variety of client systems (e.g., 4002, 4110, 4115, etc.) equipped with hardware and/or software for using the volumetric data structures (e.g., 4105). For instance, an aerial drone 4002 may obtain, locally store, and utilize a particular volumetric data structure 4105a to assist in collision detection and navigation within a corresponding 3D environment. In another example, volumetric data 4105b may be served to a user computing device, such as a smartphone, AR/MR/VR system, gaming console, etc. (e.g., 4010) for use in rendering graphics on a display of the device 4110 corresponding to a 3D environment modeled by the volumetric data structure 4105b. In another example, a vehicle such as an automobile 4015 equipped with an onboard computer may obtain and use a volumetric data structure 4105c to assist in autonomous driving applications, presentation of graphical global positioning guidance (on a dashboard or heads-up display), among other example use cases.

Volumetric data structures (e.g., 4105a-c) used across potentially multiple different systems and applications may be defined according to a particular volumetric data structure format (such as discussed in some of the previous examples) to compactly represent each of multiple levels of detail 4120 of a corresponding volume. For instance, the volumetric data structure may include integer entries (e.g., 64-bit integer entries) whose individual binary values indicate whether geometry is present in a corresponding voxel representing a subvolume of the overall volume described by the volumetric data structure. The entries in the volumetric data structure may be according to any one of the multiple levels of detail 4120 defined using the volumetric data structure. In one example, the lowest level of detail voxels (e.g., represented by 4125) may provide the lowest granularity information, with each of these voxels representing a subvolume of the overall volume represented by the volumetric data structure. The voxels at this first (L0) and lowest level of detail are the largest defined subvolumes. The voxels at the next level of detail 4130 (L1) may represent respective subvolumes of each of the subvolumes represented by the L0 voxels. In one example, a single L0 entry may be provided in the volumetric data structure to describe each of the L0 voxels. Each L1 entry in the volumetric data structure may likewise describe the respective L1 voxels subdividing a corresponding one of the L0 voxels. As discussed above, to provide a sparse data representation of the volume, L1 entries may only be provided for those L0 voxels which are indicated (e.g., by a binary "1") to include geometry, as an empty L0 voxel (e.g., indicated by a binary "0" in a corresponding bit of the L0 entry) signifies that that the voxel (and all subvolumes of this voxel) are empty. Accordingly, rather than providing L1 entries of all zeroes, these entries may simply be omitted, with the one's in the immediately lower level entry (e.g., L0) indicating which (and how many) entries in the next higher level (e.g., L1) are provided for in the volumetric data structure. Likewise, the next level of detail 4135 (L2) may represent subdivisions of the L1 voxels and so on, until the highest level of detail 4140 (Ln) defined in the volume is reached, with Ln voxels representing the geographically smallest and highest grained representations of the volume and geometry within the volume.

Figure 42:
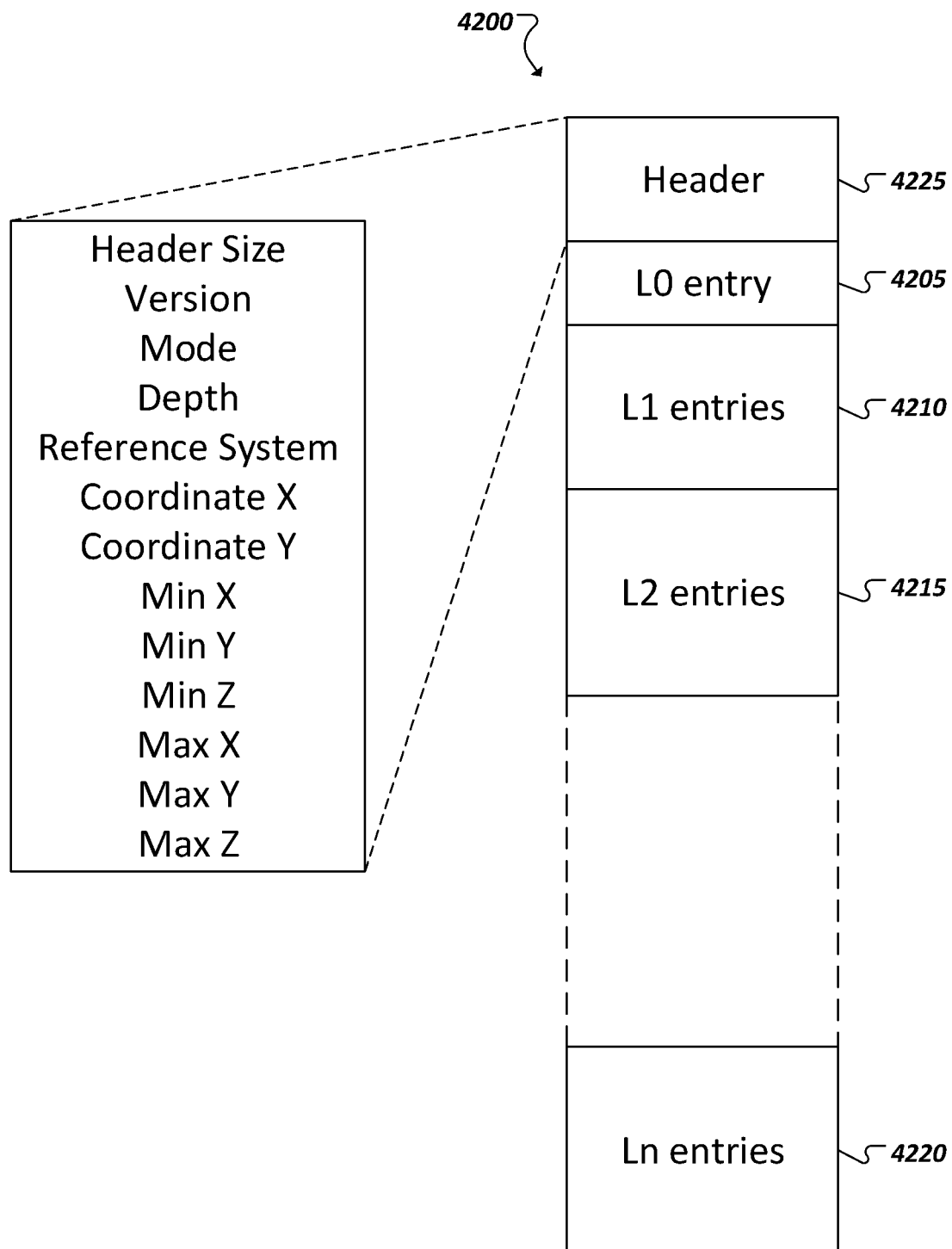
FIG. 42 is a representation of an example volumetric data structure.

Turning to the example of FIG. 42, an example representation of a volumetric data structure 4200 is shown. In this example, entries (e.g., 4205, 4210, 4215, 4220) may be provided for each of multiple levels of detail defined for a corresponding volume. As some volumes may be defined at higher and more numerous levels of details than others, some volumetric data structures may have more or less levels of detail (and corresponding entries). As in one or more of the preceding examples, the volumetric data structure 4200 in this example may include a single L0 entry 4205 corresponding to voxels at the lowest level of detail. The entry may include a binary value corresponding to each of the L0 voxels. Immediately contiguous to the L0 entry 4205 may be one or more entries for the next (higher) level of detail voxels (L1) representing subvolumes of each of the respective L0 voxels. No L1 entry is to be provided for any L0 entry identified as empty in the L0 entry 4205). Further, as introduced above, for each L0 voxel identified (e.g., by a "1") as at least partially including geometry, a corresponding L1 entry 4210 may be provided. Accordingly, each L1 entry may likewise include binary values representing each L1 voxel within a corresponding L0 voxel. As in the L0 entry, L1 voxels may be identified as being either completely empty (e.g., by a "0") or at least partially occupied by geometry (e.g., by a "1"). Further, for each L1 voxel identified as being occupied, a corresponding L2 entry may be provided in the volumetric data structure 4200 to identify whether the corresponding L2 voxels (representing subvolumes of a respective one of the L1 voxels) is occupied with any geometry or not, and so on until the volume is subdivided to highest-grained voxels measured for the volume and geometry (as defined in one or more Ln entries 4220).

In some implementations, a header 4225 may additionally be provided with the volumetric data structure 4200 to indicate various potentially variable characteristics of a particular volumetric data structure 4200. As an example, a header 4225 may include a header size field to identify when the header 4225 ends and the L0 entry 4205 begins (as the L0 entry may be contiguous with the header bits 4225). A header 4225 may include version and mode fields, which may identify to the consuming logic, what format is adopted in the volumetric data structure (e.g., to support enhancements and evolution of the volumetric data structure format). A depth field may indicate the number of levels of detail defined within the volume modeled by the volumetric data structure, with some volumes measured are more and higher-grained levels of detail than others (e.g., based on the precision of the technology used to measure the volume, the size of the volume measured, the scale of the voxels, etc.). A coordinate reference system (CRS) field may be provided in some implementations of a volumetric data structure header 4225, for instance, to identify how to map the volume represented in the volumetric data structure to a larger volume (e.g., a virtual volume defined within a video game or virtual world, a map of the world, country, solar system, etc.). As the volume described by a volumetric data structure may be real or virtual and located in potentially any larger geography, a variety of different coordinate reference systems may be defined and used to identify, with varying precision, where a volume fits within a larger geography. Further, coordinate fields (e.g., Coordinate X and Coordinate Y) may be provided to indicate coordinate values corresponding to the location of the volume modeled by the volumetric data structures (according to the CRS identified in the CRS field). For instance, latitude and longitude or other coordinate values may be provided. These values may be used to identify that the volumetric data structure should be served to a consuming device in response to identifying that the device is within or entering an environment corresponding to these coordinates. Further, the number and type of coordinate fields may be dependent on the particular CRS identified in the CRS field. Additional fields (e.g., Min X, Min Y, Min Z, Max X, Max Y, Max Z) may be provided to define a bounding box of the volumetric data structure (e.g., as measured from the CRS coordinates provided in the Coordinate X and Coordinate Y fields, etc.) and more acutely identify the volume modeled by the volumetric data structure.

A header may include additional information beyond that explicitly illustrated in the shown in the example of FIG. 42. For instance, based on the value of the Mode field (and/or the Version field) additional (even custom) fields may be defined. The Mode field may also identify whether a 1-bit per voxel representation is adopted in the entries of the volumetric data structure, or a 2+ bit per voxel representation is adopted. In the case of a multiple bit per voxel representation, the Mode value may also identify what type(s) of additional information is/are provided for each voxel (e.g., in the color of the voxel, material of geometry within the voxel, reflection coefficient of the geometry within the voxel, a category or identification of the geometry, and so on), among other examples. In some instances, information included in the header 4225 of a volumetric data structure may be determined to be superfluous to the application in which the volumetric data structure 4200 is to be used, such that the header may be discarded by the consuming system. For instance, in an application constrained to a particular volume, information defining where the particular volume fits within a greater real or virtual may be irrelevant, and the header (or these fields) may be stripped from the volumetric data structure prior to be stored in local memory or processed using the consuming system, among other example implementations.

Figure 43:
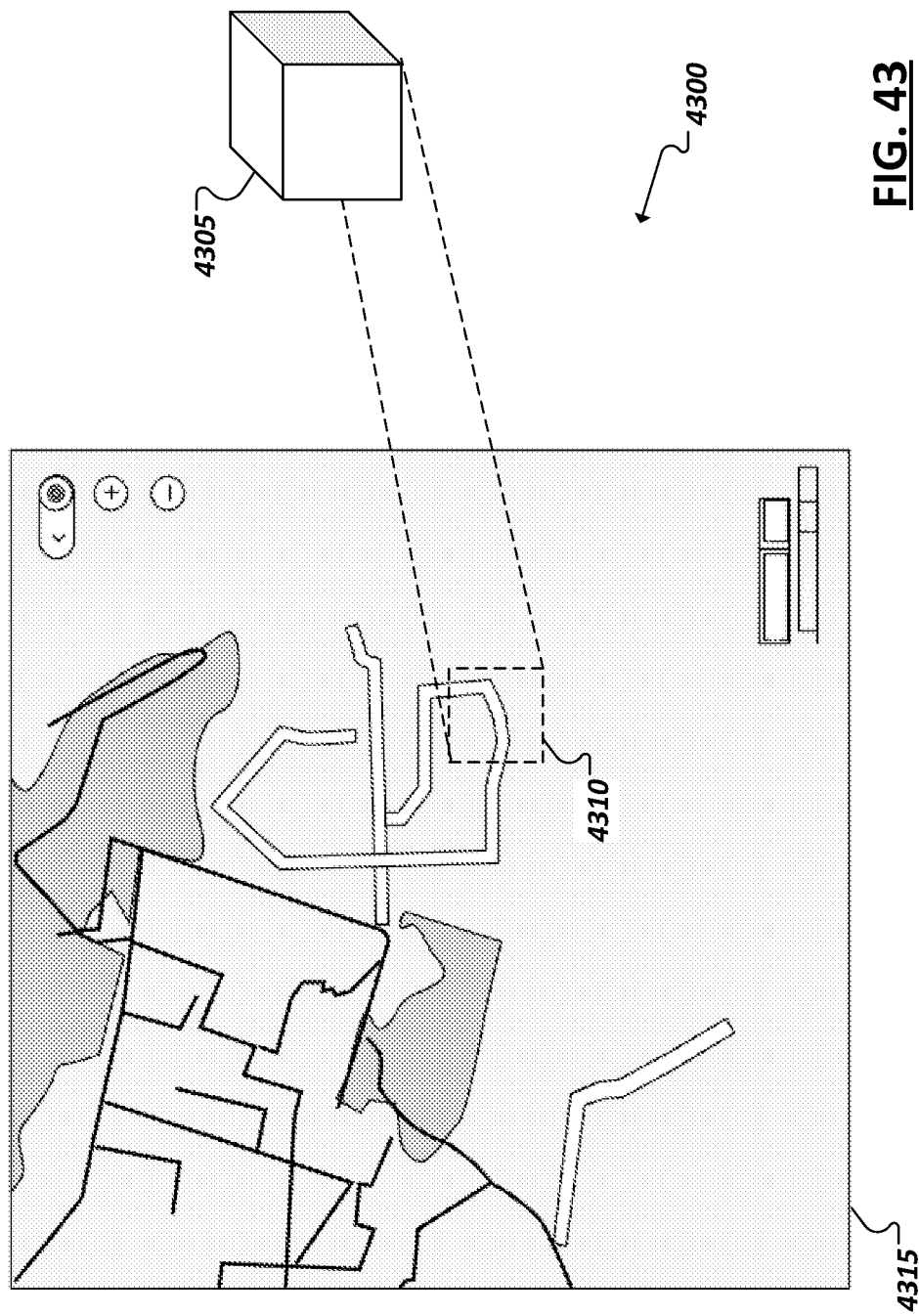
FIG. 43 is a simplified block diagram illustrating the projection and association of a volume on a map.

Turning to the example of FIG. 43, a representation 4300 is shown illustrating the mapping of a particular volume 4305 (e.g., a cubic or rectangular prismatic volume) to a space 4310 corresponding to a larger environment (e.g., represented by a digital map 4315). In some implementations, information mapping a volumetric data structure 4305 to a map 4315 may be developed in connection with the generation of the volumetric data structure itself. For instance, an area may be scanned to generate a depth map, stereo image data, or other information, from which the volumetric data structure may be generated (e.g., using a SLAM pipeline). During the scanning, corresponding location information be generated and associated with the image data and resulting volumetric data structure. In one example, a LIDAR scan may be performed on a section of geography (e.g., a portion of a city) and a volumetric data structure may be generated from the resulting LIDAR data, among other example implementations. Mapping the geometric descriptions in a volumetric data structure to physical environments, may enable a number of location-specific applications. For instance, mixed and augmented reality application may involve the occlusion of virtual geometry on top of or in place of physical geometry, which may enabled or enhanced using a volumetric data structure representing the virtual geometry as mapped to the physical geometry (which may be represented by a separate volumetric data structure). Global position, collision avoidance, and path finding applications may also make use of mappings of volumetric data structures (or even individual voxels within the volume represented by a volumetric data structure) to location information, such as shown in the example of FIG. 43.

In one example, geographic location information may be mapped to or associated with volumetric data structure information by mapping coordinates of a geographic information system (GIS) representation to coordinates of the volume represented by the volumetric data structure (e.g., as specified in a header of the volumetric data structure). In some cases, either or both GIS representation or volumetric data structure representations may be scaled to "fit" the volume to the (potentially 2D) GIS representation. When the GIS information and volume are aligned, the corresponding volumetric data structure may be enhanced with metadata corresponding to the information included in the GIS representation. This can be done by doing a projection along the y axis to produce a 2D floorplan map for the 3D VOLA volume, which can be aligned with a similar 2D GIS map. Producing the 2D VOLA projection may involve determining where ground-level is in the 3D map and then slicing the 3D volume appropriately so the outlines of the buildings etc. are clearly visible. Once the VOLA and GIS 2D maps have been aligned (e.g., through registration) the GIS data can be propagated to the overlying voxels in the 3D VOLA volume to label them. For instance, a GIS representation may identify streets, building, trees, parks, bodies of water, sidewalks, mountains, and other features, which are not identified in the volumetric data structure. Indeed, in some implementations, the volumetric data structure may represent geometry within an environment in a purely binary way—it's either there, or it isn't. By mapping the volume to more robust, corresponding geographic information, voxels described in the volumetric data structure may be associated with corresponding geographic information, such that a voxel representing a particular geometry may be defined according to the geographic information. For instance, a voxel aligned with a portion of the GIS representation identifying a street may be determined by a system to be street geometry, likewise voxels aligned with GIS representations of buildings, trees, water, etc. may likewise be associated with these features. By joining or supplementing a volumetric data structure with such GIS information (or other information), meta characteristics may be defined for individual voxels, such as colors associated with a specific material or object represented by the voxel (e.g., blue for voxels aligned with water, green for voxels aligned with trees, etc.), reflection coefficients associated with the material (e.g., voxels aligned with a building may be automatically assigned a reflection coefficient associated with concrete, glass, metal, and/or other materials used in the construction of a building), and so on. In this manner, information from other sources (e.g., GIS information) may be quickly associated with the geometries described in a volumetric data structure to enrich the information provided by the volumetric data structure (and negate a need to manually define characteristics of individual voxel geometry to build richer representations of 3D environments).

Figure 44:
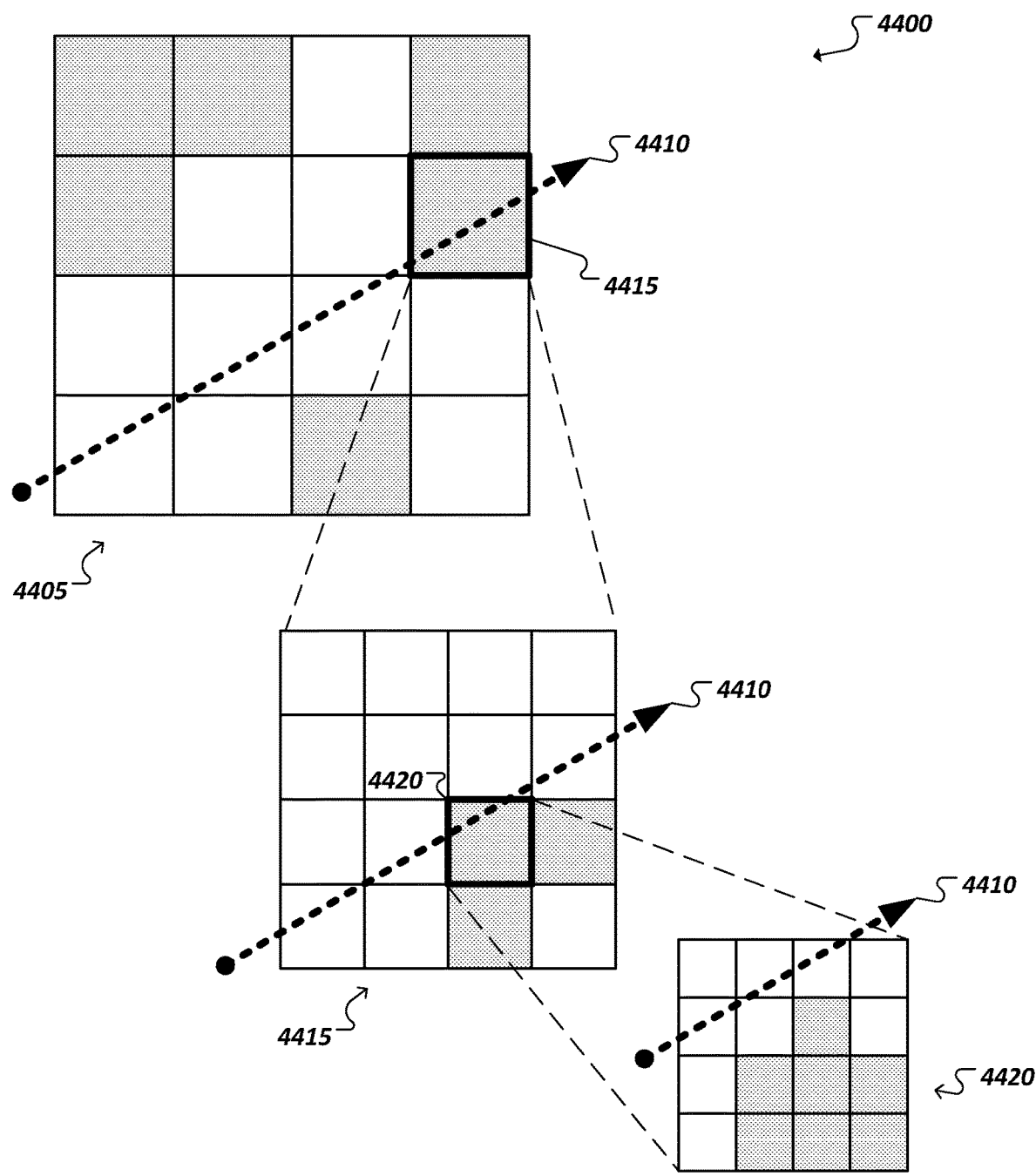
FIG. 44 is a simplified representation of ray casting using an example volumetric data structure.

As introduced above, a volumetric data structure, which defines voxels at multiple ascending levels of detail may be used to assist in more efficient processing of the volumetric information to appropriately render or otherwise use the volume described in the volumetric data structure. For instance, ray casting within the volume to identify geometry and points of reflection, potential collisions, etc. may effectively make use of an example volumetric data structure to more efficiently perform ray casting at any one of the desired levels of detail. FIG. 44 includes a representation 4400 of a view of a 3D space in two dimensions (e.g., a top or side view of a 3D space). The volume 4405, in this example, is subdivided into a 4×4×4 matrix of 64 individual voxels (e.g., 4415) at a first, lowest level of detail. A corresponding volumetric data structure may be provided to describe the volume, as subdivided into voxels of multiple levels of detail. In the representations (e.g., 4405, 4415, 4420) shown in FIG. 44, a shaded box (e.g., 4415) indicates that a corresponding voxel is at least partially occupied with geometry, while a blank box indicates that the corresponding voxel is completely empty of geometry.

The casting of a ray 4410 through a volume represented by a volumetric data structure is illustrated in the example of FIG. 44. In this example, the ray casting may be first processed at the lowest level of detail. A subset of the voxels at the first level of detail may be identified through which the ray 4410 passes. By identifying this subset of voxels, all other voxels may be ignored. The set of voxels traversed by the ray 4410 may then be assessed (e.g., by identifying corresponding binary values within the L0 entry of the volumetric data structure) to identify whether any of these lower level voxels is at least partially occupied with geometry. If all of the subset of voxels are empty (e.g., as denoted by corresponding zeroes in the volumetric data structure), then it can be concluded immediately, without any further processing, that the ray 4410 does not meet any geometry within the volume 4405. In this example, however, at least one of the subset of voxels 4415 is identified as possessing geometry (at some level of detail). To determine whether the ray 4410 collides or intersects this geometry, a system may further process the volumetric data structure to ascend the levels of detail defined in this tree-based data structure.

For instance, as further illustrated in FIG. 44, by identifying that L0 voxel 4415 is both intersected by the ray 4410 and contains some geometry, a system may identify an L1 entry within the volumetric data structure representing the 64 ($4^3$) subvolumes of voxel 4415. The L1 entry may indicate for each L1 voxel (e.g., 4420), whether the L1 voxel includes geometry or not. Accordingly, the system may determine what subset of the L1 voxels (subdividing L0 voxel 4415) are intersected by the ray 4415 and further determine whether any one of the L1 voxels in this subset is occupied with some geometry. In this example, only L1 voxel 4420 is identified as having some geometry and being intersected by the ray 4410. Accordingly, the system may identify an L2 entry corresponding to the subdivision of L1 voxel 4420 and again determine a subset of the L2 voxels intersected by the ray 4410. In this example, none of the L2 voxels intersected by the ray 4410 are identified as occupied with geometry. Accordingly, for the intersection of voxel 4415, it can be concluded that the ray 4410 does not actually intersect geometry, and the system may omit the analysis of any higher levels of detail of voxel 4415. For any other voxels intersected by the ray 4410, the system may likewise ascend the levels of detail defined in the entries of the volumetric data structure in a stepwise manner to determine whether the ray intersects geometry at a particular (high) level of detail, while omitting the analysis of any higher level of voxels that are either not intersected by the ray, or which do not include geometry. In this manner, the tree-based representation of a volume embodied in an example volumetric data structure may be efficiently assessed to determine whether a ray meets/intersects geometry at a desired level of detail (e.g., as specified by a depth level for the operation) or not, greatly reducing the processing resources, time, context switching, and power utilized to make such a determination.

Figure 45:
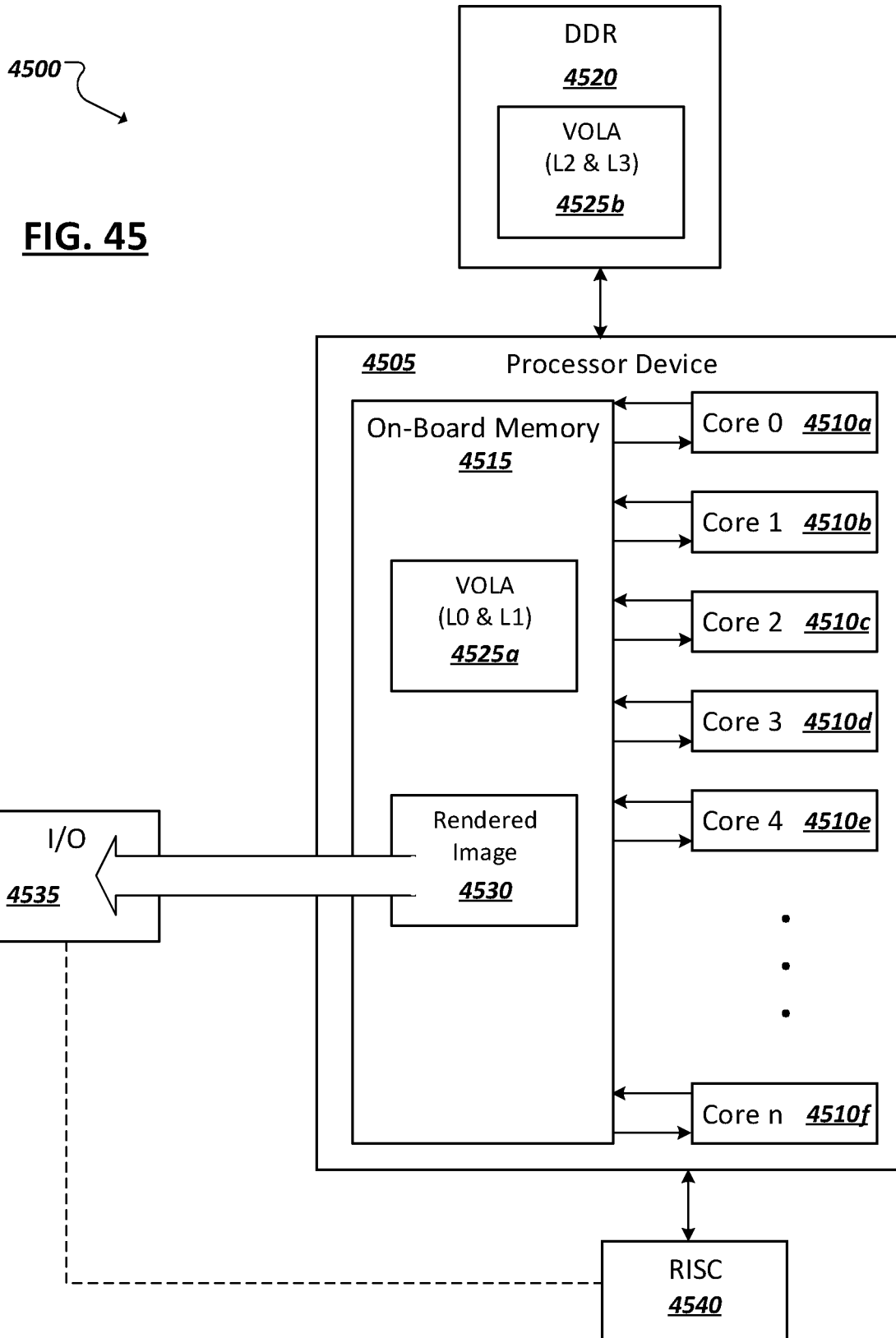
FIG. 45 is a simplified block diagram of an example processor device.

FIG. 45 is a simplified block diagram 4500 illustrating an example computing system to consume a volumetric data structure and perform ray casting analyses and other processes in accordance with at least some of the implementations discussed herein. In this example, a processor device 4505 may be provided with a number n of processor cores (e.g., 4506-4511) capable of performing parallel processing of operations utilizing a volumetric data structure in various applications. The cores 4510a-f may interface with and share an onboard multi-ported shared memory 4515. For instance, each core 4510a-f may have a respective read and write port to onboard memory 4515. Additionally, a read access memory (e.g., DDR memory 4520) may additionally be provided to store data for access and processing by any one of the cores 4510a-f.

In some implementations, work relating to rendering, ray casting, collision avoidance, path finding, or other applications involving a volume modeled by a corresponding volumetric data structure may be divided among the respective cores 4510a-f to facilitate parallel computing efficiencies. For instance, for multiple rays to be cast from a particular point into a particular volume, each ray casting operation may be handled by a respective core 4510a-f using the volumetric data structure for the corresponding volume. Further, as shown in this example, as lower level volumetric data structure entries are to be used most frequently (e.g., because the lower levels of the tree are to be traversed before reaching the higher levels, and some application may not require the higher level of detail analysis, etc.), it may be advantageous to provide for a portion of a volumetric data structure (or VOLA) 4525a to be loaded into the shared onboard memory 4505 for quick access by the cores 4510a-f, and store entries of the volumetric data structure (e.g., 4525b) corresponding to higher levels of detail in DDR 4520, among other example implementations. In this example, an image (e.g., 4530) is to be rendered (e.g., using ray casting) by the processor device 4505 from a particular volumetric data structure. As portions or tiles of the image are derived by the parallel cores 4510a-f, the rendered image 4530 may be assembled (e.g., in on-board memory 4515) and loaded into a buffer for delivery to an input/output interface 4535 (employing potentially any one of a variety of different technologies (e.g., Lighting, High Definition Multimedia Interface (HDMI), Universal Serial Bus (USB), etc.)) for presentation on one or more display devices, among other example outputs and implementations.

Figure 46:
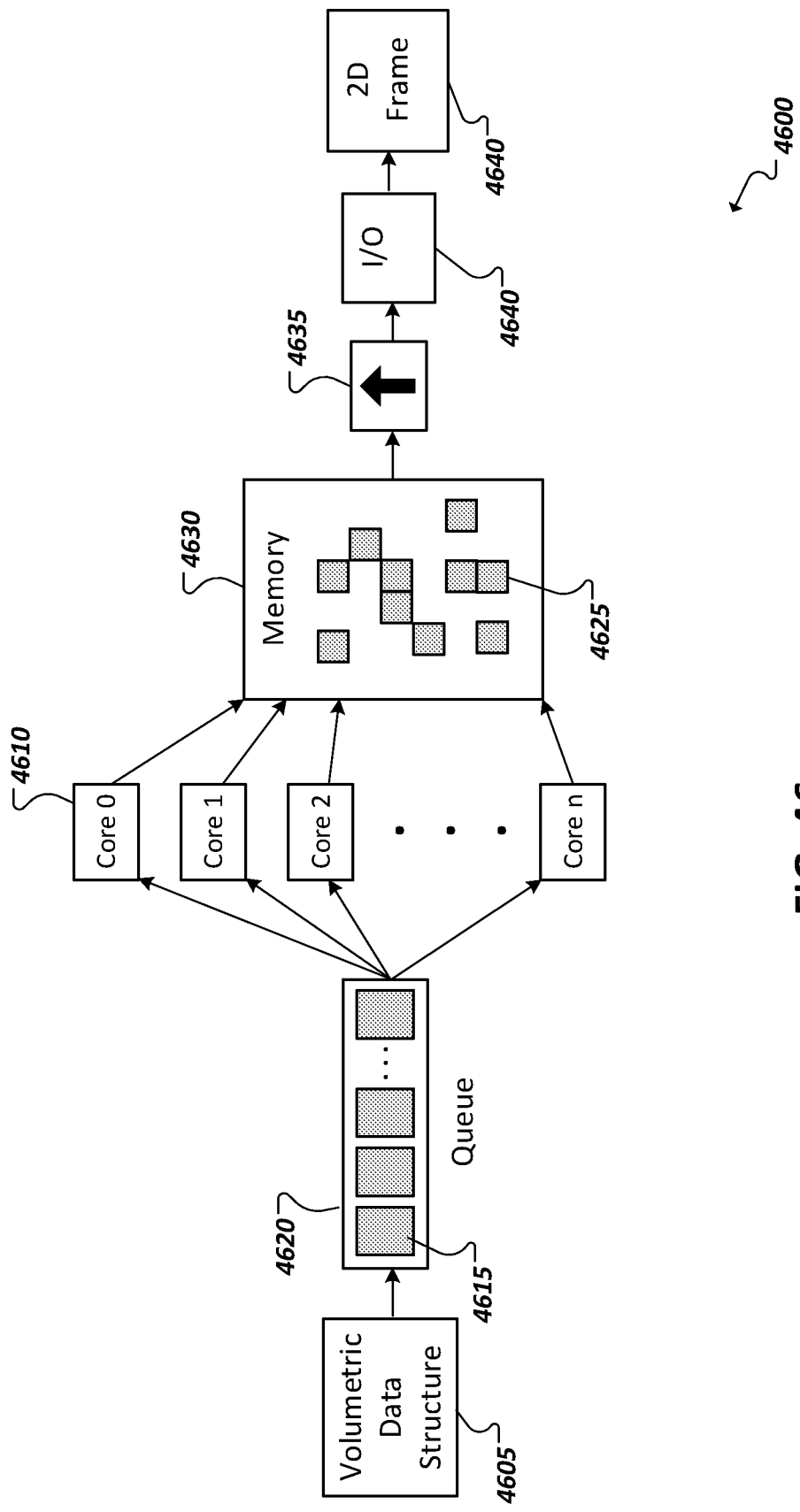
FIG. 46 is a simplified block diagram illustrating parallel processing in connection with the rendering of a frame.

Turning to FIG. 46, a simplified block diagram 4600 is shown illustrating the example rendering of a view of geometry described in an example (e.g., SST-based) volumetric data structure 4605 into a 2D frame 4640 using a processor device (such as shown and discussed in the example of FIG. 45) utilizing multiple vector processing cores 4610. For example, a stream of frames (e.g., 4640) may be generated from one or more volumetric data structures by rendering the frames based on a point of reference (which way move, turn, or otherwise change as a scene progresses) positioned relative to the geometry represented within the volume(s) represented in the one or more volumetric data structures. In some implementations, the rendering of a volumetric data structure 4605 (e.g., through ray casting within the volume described by the volumetric data structure 4605) may be divided into chucks of work, or tiles (e.g., 4615), which may be defined and placed in a queue 4620 for assignment to or pulling by the various processing cores (e.g., 4610) provided in the device. For instance, the resulting frame (e.g., 4640) may be rendered row by row, with the rendering of individual rows, or portions of the rows, handled by respective cores. As another example, casting of individual rays in the set of rays to be cast into the described volume may corresponding to defined jobs (e.g., 4615) in the queue 4620 to be handled in parallel by the multiple parallel processing cores 4610, among other example implementations.

In some implementations, the tiles 4615 may be assigned to the cores in an ordered manner. In other cases, the cores may simply pull the next tile in the queue as soon as they finish a previous job (e.g., rendering in connection with a previous tile). In this manner, bottlenecks can be avoided where one or more cores are assigned tiles with heavier processing requirements than others handled by other cores, among other example advantages. Additional optimizations may also be implemented in the processing hardware to leverage the compressed, multi-level format of an example volumetric data structure. For instance, one or more of the cores may be utilized to cull operations based on information in the volumetric data structure. For instance, in a ray casting application, a subset of volumetric data structures or entries within these structures may be identified as being intersected by one or more rays, allowing operations relating to remaining volumes and levels of details from the work to be assigned to the cores (e.g., 4610). For instance, an L0 entry of a volumetric data structure 4605 may be read to identify operations which may be skipped or fast-tracked based on the absence of geometry within L0 voxels corresponding to a given frame. Alternatively, the presence of geometry in a voxel may also allow jobs to be culled, based on identifying (e.g., in a rendering application) that geometry of voxels representing a foreground of a frame block other geometry behind this geometry, among other operations, which may be performed to prepare an optimized set of jobs or tiles (e.g., 4615) to be provided in a queue 4620 for operations performed by the processing cores.

Continuing with the example of FIG. 46, as jobs are completed in the rendering of the frame 4640, these segments (e.g., 4625) may be written to memory 4630 to assemble the rendered frame. In some implementations, upon processing the frame, additional processing may be performed, such as upscaling (e.g., 4635), prior to delivering the rendered frame 4640 to an I/O port for display on a device, among other example features, steps, and implementations.

Figure 47:
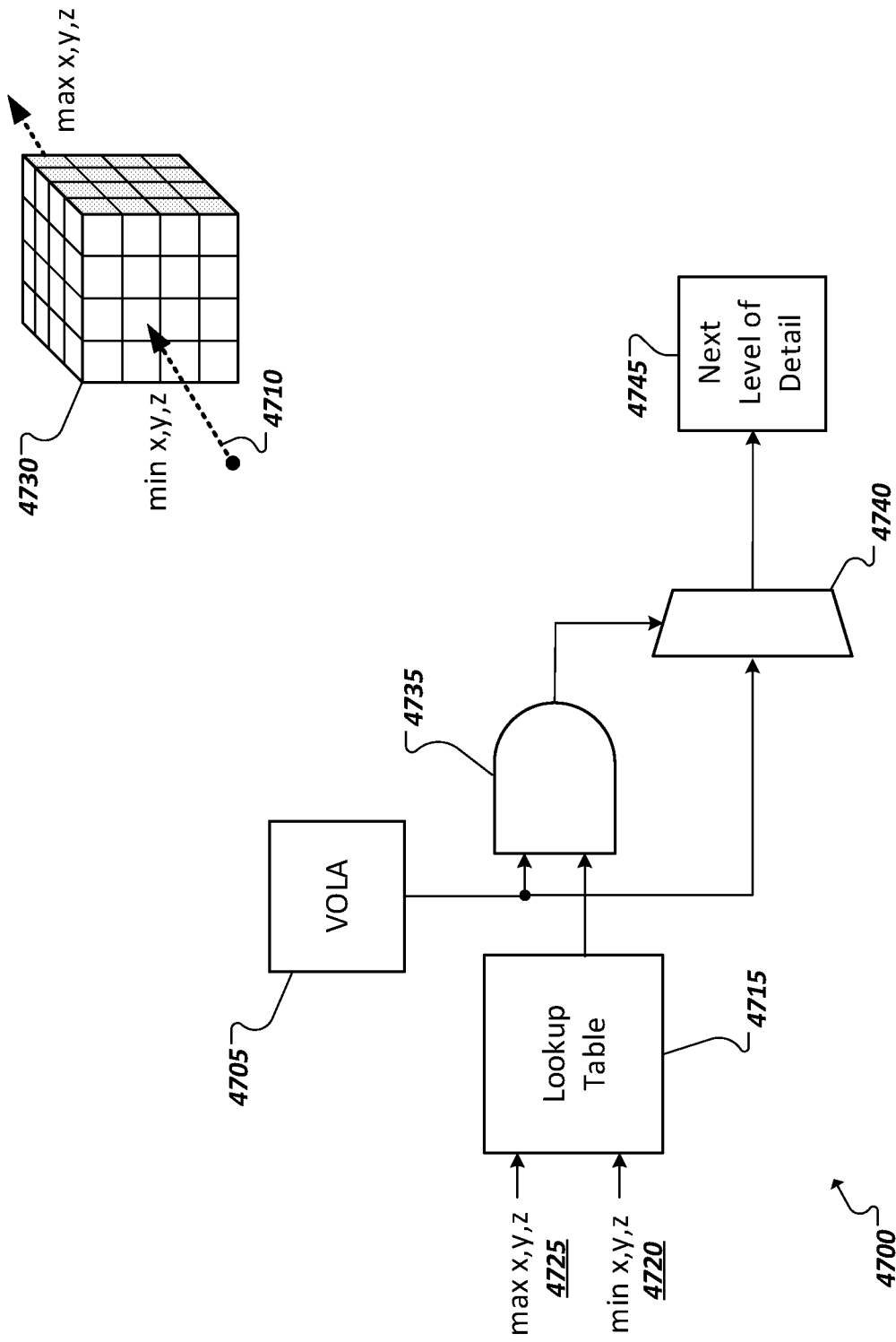
FIG. 47 is a simplified block diagram of example logic to be used to perform ray casting.

As introduced above, hardware and/or software logic may be provided to leverage the structure of volumetric data to quickly narrow the scope of an operation, such as ray casting in a volume represented by an example volumetric data structure. For instance, turning to the example of FIG. 47, a simplified block diagram 4700 is shown illustrating the example implementation of hardware logic to identify an intersection of a ray 4710 with geometry described in an example volumetric data structure 4705. For instance, in the example of a volumetric data structure (or VOLA) 4705 implemented as a set of 64-bit integers including binary values to identify whether or not geometry is present within a corresponding voxel, a corresponding set of 64-bit integer entries may be developed to identify the voxels through which a ray 4710 when cast into the volume represented by the VOLA 4705. In the example of FIG. 47, a look-up table 4715 is provided from which a volumetric data structure may be identified, which describes the ray, as cast within the volume, as geometry occupying a set of voxels along the trajectory of the ray. For instance, given the coordinates of the ray's entry into a volume (specified by min x, y, z, coordinates 4720) and coordinates of the ray's exit from the volume (specified by max x, y, z, coordinates 4725), a corresponding volumetric data structure may be identified from the look-up table 4715. Accordingly, a 64-bit integer representing the geometric placement of the ray 4710 at the lowest level of detail within the volume 4730 may be generated as an output from the look-up table 4715 and provided as an input to AND logic 4735. The corresponding 64-bit integer entry from the volumetric data structure 4705 (describing the geometry within volume 4730 at the lowest level of detail) may also be provided at the AND logic 4735 to determine which lowest level of detail (L0) voxels within the volume 4730 are occupied by both the ray 4710 and geometry of the volume 4715. In L0 voxels for which the value returned by the AND gate 4735 is "1", the L0 voxel may be identified as one in which the ray is determined to "hit" or intersect geometry within the volume. A bitmap may be generated by the AND gate 4735 to be fed as a selector value to multiplexer circuitry 4740 to select the L1 entries from the volumetric data structure 4750 that correspond to subvolumes of the L0 voxels indicated to be "hits". The analysis then repeats for this next level of detail (4745), but limited only to these L1 voxels (representing the L0 subvolumes where hits were identified (at 4735)). For instance, the next level of detail may involve determining the coordinates of the ray's intersection with a corresponding one of these select L0 voxels to determine a subset of the underlying L1 voxels (using the same or another lookup table 4715) through which the ray intersects. This subset of voxels may be compared with corresponding L1 entries selected from the volumetric data structure 4705 (using the same or parallel AND logic (e.g., 4735)) to determine whether the ray intersects any L1 geometry specified for this subset of L1 voxels in the volumetric data structure 4705. This process may repeat until the highest (or target) level of detail is reached and any "hits" between the ray 4710 and voxel geometry are identified. Hits (or "1"'s) identified for a target or highest level of detail comparison may be interpreted as identification of the coordinates of intersections or collisions of the ray 4710 with geometry of the volume 4730. Through this hierarchical early termination of assessing voxels (e.g., at higher levels of detail) that either do not include the ray or the geometry, such as discussed in this example, ray casting using a volumetric data structure may be completed substantially quicker than using traditional ray casting processes.

Figure 48:
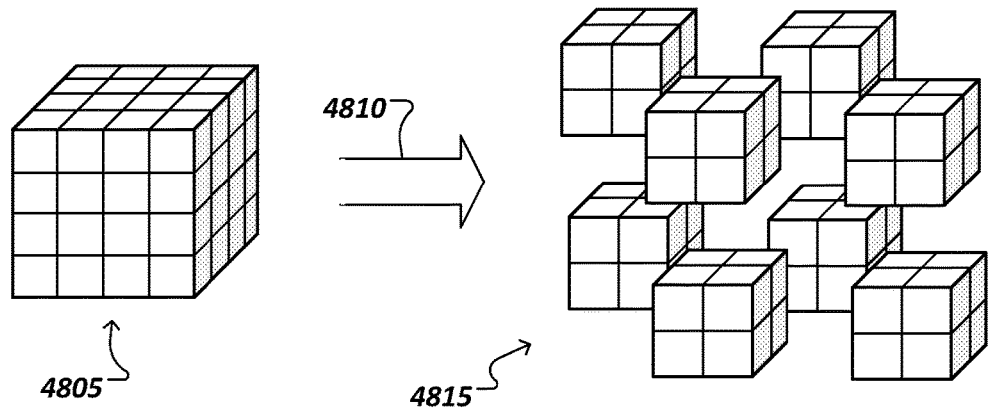
FIG. 48 is a simplified block diagram of example logic to be used to perform ray casting.
Figure 48:
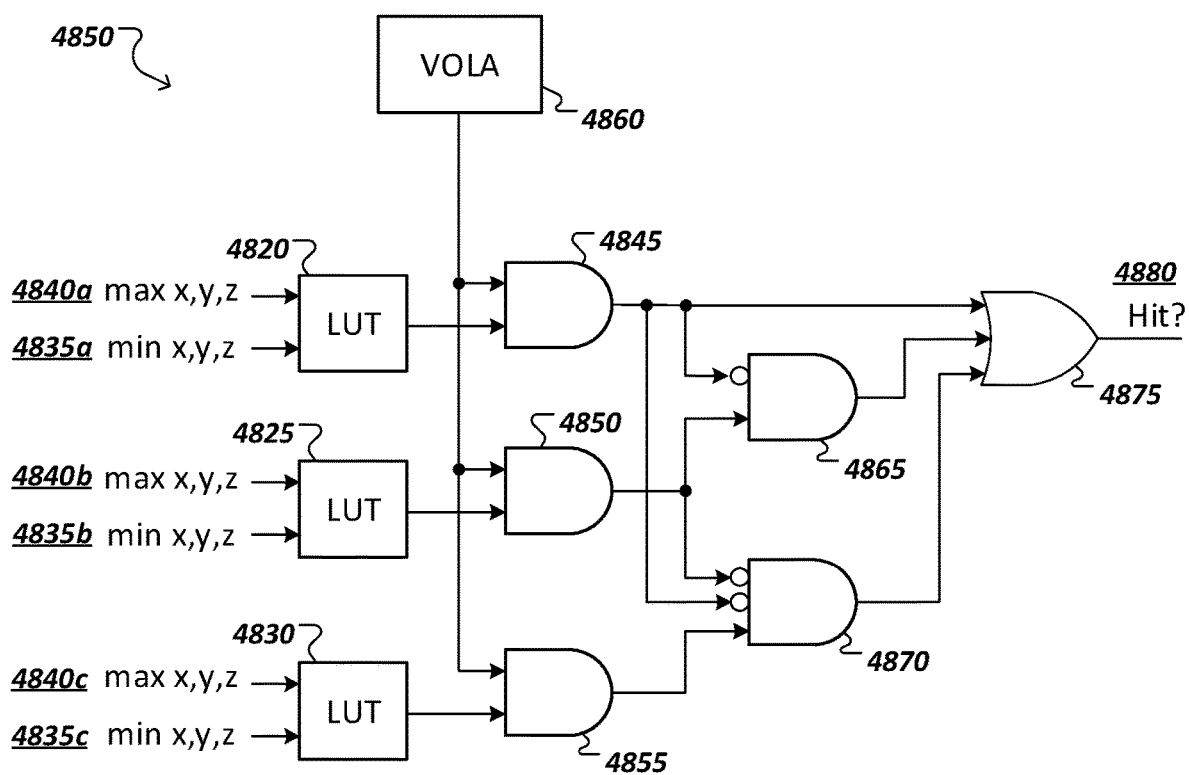

Turning to FIG. 48, a simplified block diagram 4800 is shown illustrating a portion of another implementation of hardware logic to be used to detect intersections of rays with geometry in ray casting applications. In the example of FIG. 47, a look-up table was provided to produce multiple levels of detail of volumetric data entries to correspond to any one of the possible rays that might intersect a volume (e.g., based on the respective entry and exit points of the ray into and out of the volume). One disadvantage of this approach is the size of the look-up table, which can constrain processing speed. Accordingly, in an alternate implementation, rather than providing a single lookup table for all voxels in a volume, the overall volume 4805 may be logically subdivided (e.g., 4810) into smaller subvolumes (e.g., 4815) and separate, corresponding, smaller lookup tables (e.g., 4820, 4825, 4830) may be defined for each subvolume to speed-up the related look-up and computation of ray casting hits within the overall volume 4805. For instance, a volume 4805 may divided as an octree into eight subvolumes 4815. As a ray may traverse at most three of these octree subvolumes, these octree subvolumes may first be identified and the respective entry (e.g., 4835*a-c*) and exit (e.g., 4840*a-c*) points of the ray into these subvolumes may be identified and provided as inputs to the respective lookup tables (e.g., 4820, 4825, 4830) of these subvolumes. 64-bit integers may be generated by each of the lookup tables (e.g., 4820, 4825, 4830) to be provided as inputs to AND gates 4845, 4850, 4855 in the example circuit 4850, to determine whether respective segments of the ray passing through these subvolumes intersect with geometry identified in L0 voxels described in volumetric data structure 4860. A network of logic gates (e.g., 4865, 4870, 4875) to derive results 4880 indicating which L0 voxels have potential geometry-ray intersections. Based on these results, as in the example of FIG. 47, similar assessments may be made for progressively higher levels of detail until a target level of detail is reached to identify intersections, or "hits", of the ray contacting and projecting through geography represented in the volumetric data structure 4860.

Figure 49:
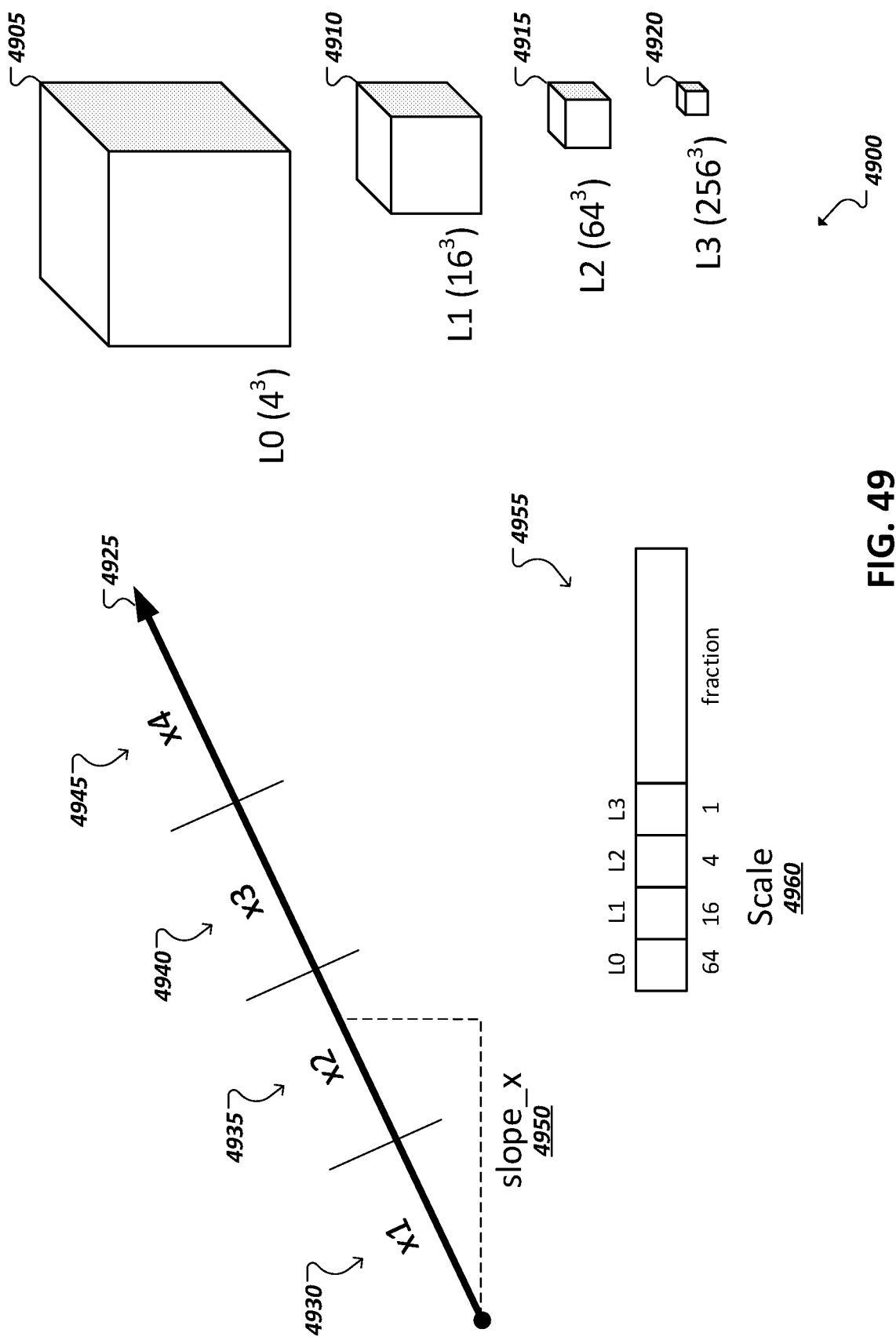
FIG. 49 is a simplified block diagram illustrating aspect of example ray casting.

FIG. 49 is a simplified block diagrams 4900 illustrating principles of rays cast through volumes subdivided into voxels, such as described using volumetric data structures defined according to principles described in some of the examples above. These principles may be leveraged to provide alternative hardware implementations configured to detect, from a volumetric data structure, whether and where any given ray case into a volume intersects or collides with geometry within the volume 4905. For instance, circuitry may be provided to compute, which voxels, at each level of detail, are intersected by a particular ray. For instance, from the coordinates of the ray's entry and exit in {x,y,z} from the volume (e.g., determined using AABB ray-box intersection), the slope of the ray can be determined in its respective x-, y-, and z-components. Using the slope, and knowing the scale applied within the volume at each level of detail, each of the intersected voxels may be identified (e.g., by their respective coordinates within the volume). Each of these voxels may then be tested to see if corresponding voxel geometry is present, representing an intersection of the ray with the geometry (e.g., using a logical AND against bits found in unsigned integer bits of entries in an example volumetric data structure, such as discussed herein).

For instance, as illustrated in FIG. 49, an implementation may subdivide a volume into 4×4×4 L0 voxels, with each ascending level of detail (e.g., 4910, 4915, 4920) subdividing voxels of the next lower level into 4×4×4 subvolumes. These subvolumes may be represented in single 64-bit integer entry, where the ones in the (e.g., L0) entry denote where geometry (encoded as 64-bit unsigned integers) is present in the next level of detail (e.g., L1) level of hierarchy 4910. Further, "1" bits in any of the 64-bit integers in L1 4910 may indicate the presence of geometry at the next level of details (L2) 4915, and so on such that the result is an entire traceable volume describing only those voxel element cubes which contain surface geometry. The resulting volumetric map implemented using the volumetric data structure is therefore highly sparse and hierarchal allowing it to be rapidly ray-traced for only those subvolumes that might produce an interaction (e.g., where no empty space is ray-traced). While this manner of subdivision is provided in this and in other examples discussed in the disclosure, it should be appreciated that potentially any other subvolume divisions (e.g., 2×2×2, 16×16×16, 4×4×8, 4×5×2, etc.) may be permissible and non-cubic voxels may be adopted without departing from the principles disclosed herein.

In implementations employing a 4×4×4 division, such as illustrated in the example of FIG. 49, a ray 4925, projected into a volume (e.g., 4905) may be interpolated across all four voxels in each of the x, y and z directions by accumulating the scaled slopes (e.g., 4930, 4935, 4940, 4945) in x, y and z. Determining whether the ray intersect geometry within the volume may begin by first assessing the lowest level of detail and successively "zooming in" on those voxels where geometry is identified. This may allow the tracing of at least some rays to be terminated at lower levels of detail (i.e., than the target level of detail) in cases where there is not interaction (or intersection, or hit) with geometry in the volume, thereby saving time, power, and memory bandwidth. likewise considered as broken into as many as four ray segments, each segment corresponding to a voxel through which the ray passes in the volume.

Using the slope (e.g., 4950) of the ray, calculated in each of the volume's three dimensions (i.e., x-, y-, and z-slopes), interpolations may be performed to determine intersections of the ray down to a target depth, or level of detail. The depth may be the highest level of detail defined for the volume (e.g., in the corresponding volumetric data structure), or may simply be a specified one of the levels of detail that is determined sufficient for a given application. In the particular example of FIG. 49, a depth of four is defined, meaning that four levels of detail (e.g., L0-L3 (4905, 4910, 4915, 4920)) are defined and that the ray trace should conclude at the fourth level of detail L3 4920. At L3, in this example, the overall volume is subdivided into $256^3$ total subvolumes. These L3 subvolumes may represent the base unit of volumetric geometry within the volume. Accordingly, as shown at 4955, the voxels (and slopes defined according to these voxels) at each level of detail other than L3 may be adjusted according to a scale 4960.

In one example, the slope of a given ray (e.g., 4925) may be computed according to:

$$slope=(\max(x,y,z)-\min(x,y,z))/DIM$$

where max(x,y,z) is the exit point of the ray, min(x,y,z) in the entry point of the ray, and DIM are the 3D dimensions of the volume (e.g., 256 in the case of a depth of L3). The slope can be alternatively expressed in componentized form as:

$$slope\_x=((\max\_x-\min\_x)/4)*scale;$$

$$slope\_y=((\max\_y-\min\_y)/4)*scale;$$

$$slope\_z=((\max\_z-\min\_z)/4)*scale;$$

where scale is a factor corresponding to the level of detail at which the ray intersections are to be assessed (with scale decreasing exponentially at each successively higher level of detail (as illustrated at 4955). As the slope is determined in this example by dividing by the number of voxels in each direction (e.g., 4 voxels in each of the x-, y-, and z-directions), it should be appreciated that other implementations employing different voxel subdivisions (e.g., 2×2×2 or 16×16×16, etc.) will be calculated accordingly (e.g., by dividing by 2 or 16 instead of 4). From the computed slope, the following logic may be utilized to determine the x, y, z coordinates (in terms of voxels measured from a reference corner of the volume) of each voxel through which the ray passes, such as illustrated in the pseudocode below:

```
for (i = 0; i < 4; i++)    {
    acc.x = min__x + slope__x * i;
    acc.y = min__y + slope__y * i;
    acc.x = min__z + slope__z * i;
    x = ((int) acc.x) >> scale;
```

-continued

```
        y = ((int) acc.y) >> scale;
        z = ((int) acc.z) >> scale;
        vola_comp = lookup(x, y, z);
}
``` where "acc." is an accumulation function, "int" is an integer rounding function, "vola_lookup" is the (e.g., 64-bit INT) output of the lookup table that is to compared to an entry (e.g., 64-bit) of the volumetric data structure, and "i" is an increment variable corresponding to the potentially four segments of a ray at any level of detail, and "lookup" is a lookup function to return a bitmask mapping the voxel at (x, y, z) to a bit in a defined volumetric data structure format (as adopted in a volumetric data structure describing geometry within the particular volume).

Figure 50:
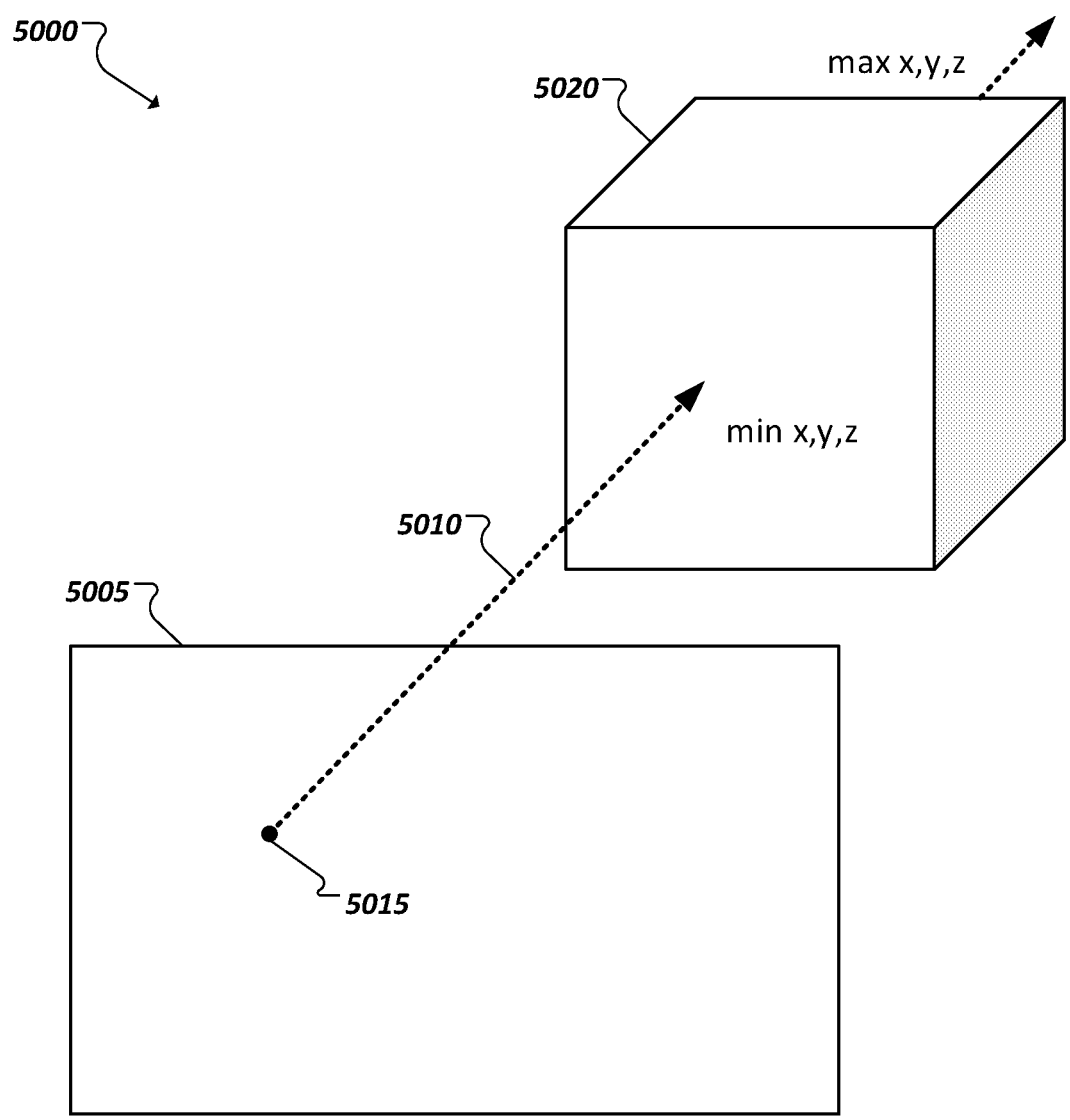
FIG. 50 is a simplified block diagram illustrating example ray casting

Turning to FIG. 50, a simplified block diagram 5000 is shown illustrating ray casting in association with the rendering of a graphical image from one or more volumetric data structures. For instance, the graphical image may be rendered for presentation on a particular display 5005, the display composed of an array of pixels. In one implementation, to render a 3D space represented by the one or more volumetric data structures, rays may be cast from each pixel on the display into the volume(s) of the 3D space to identify the various geometry that would be presented from the vantage point of the display screen 5005. For instance, multiple rays (e.g., 5010) may be cast from the various pixels (e.g., 5015) (or other subdivisions of the display screen's 5005 surface area) into the volume (e.g., 5020) containing the geometry. The volume 5020 may be described using a corresponding volumetric data structure, such as discussed above. The entry point and exit point of the ray 5010 into and out of the volume 5020 may be determined and from this information, the volumetric data structure may be processed to determine whether (and where) the ray 5010 intersects with geometry in the volume 5020. An intersection of the ray, in this context, may be used (together with the results from other rays cast from the pixel 5015 into the volume 5020) to determine what is displayed at the pixel in the screen. Similar ray casting operations may be performed for the entirety of the pixels in the display to determine the rendering of the image to be presented on the display 5005.

Figure 51A:
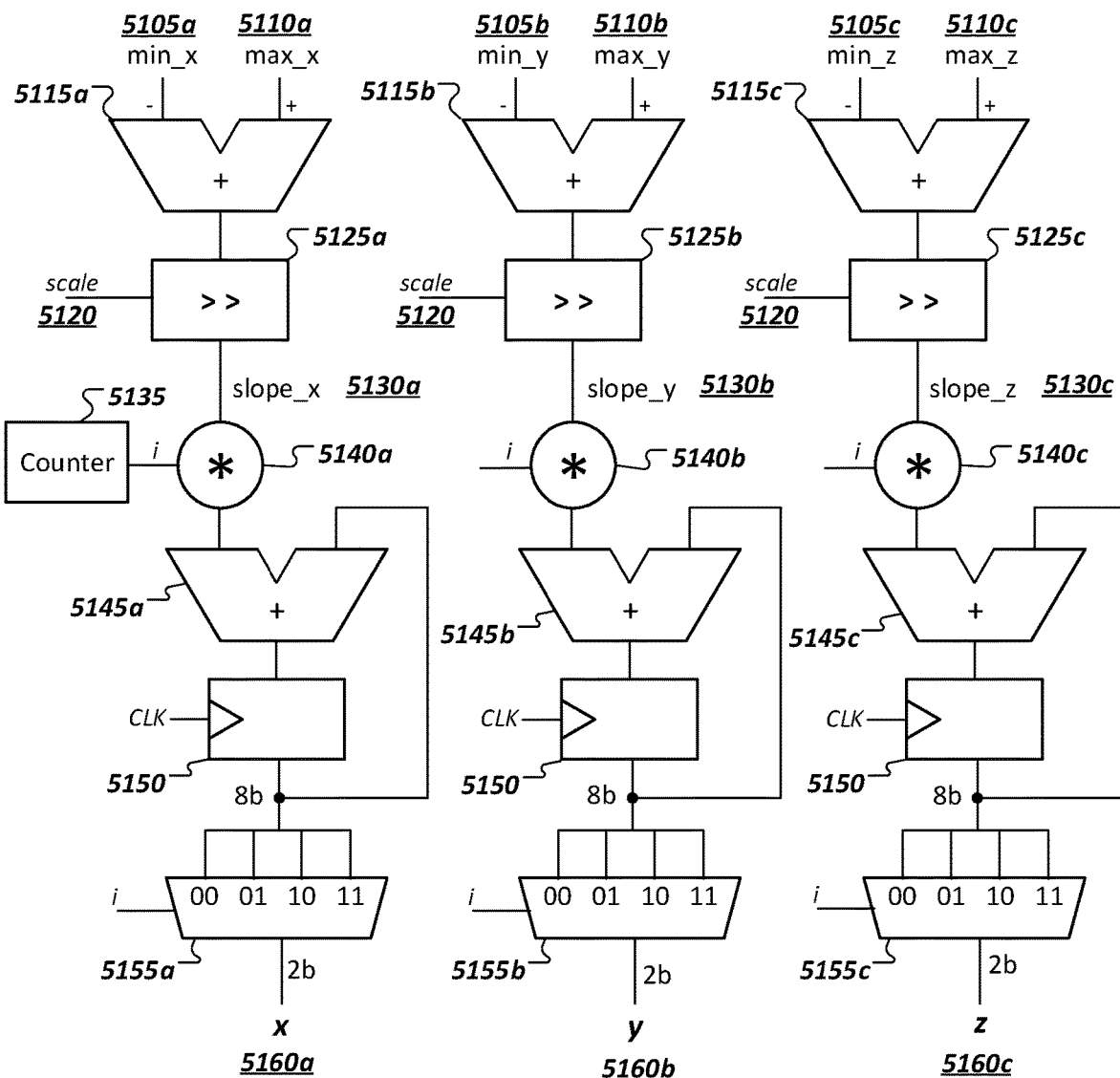
FIG. 51A is a simplified block diagram of example logic to be used to perform ray casting.

In some implementations, hardware interpolation logic for the ray slope in {x,y,z}, such as illustrated by the simplified block diagram 5100a in the example of FIG. 51A, may take as inputs the x-, y-, and z-entry (5105a-c) and exit (5110a-c) coordinates of a ray into a volume described by a particular volumetric data structure. The circuitry represented in FIG. 51A may implement, in hardware, the pseudocode discussed above in connection with the FIG. 49. For instance, the x-, y-, and z-slopes (e.g., 5130a-c) of the ray may be determined by determining the difference between the minimum and maximum x-, y-, and z-coordinates (e.g., using adders 5115a-c) and dividing the result by a scale value 5120 (e.g., using shifter circuits 5125a-c) corresponding to the current level of detail being assessed. Each segment of the ray (e.g., as divided by the boundaries of up to four voxels in the volume/subvolume) may then be assessed by applying and incrementing a counter value i using counter 5135, and multiplying the counter value i against each of the component slope values 5130a-c (e.g., using multiplier circuitry 5140a-c). These products may be provided to an accumulator circuit (e.g., 5145a-c) to move up the segment according to the slope (e.g., at each clock cycle (5150) and generate an 8-bit code to be provided to multiplexer circuits 5155a-c. Based on the respective code, the multiplexers 5155a-c may each generate a corresponding voxel address value 5160a-c based on the current iteration, i, in the loop (e.g., which causes 00→01→10→11 to be iterated sequentially).

Some system implementations may incorporate alternative circuitry and algorithms to perform ray casting against a volumetric data structure without departing from the principles of the current disclosure. For instance, while the example of FIG. 51A, shows the use of a counter (e.g., 5135) and loop to interpolate through the four segments of a ray as it passes through a volume or sub-volume, in other implementations, circuitry similar to that illustrated in the example of FIG. 51A may be reproduced (e.g., four times) to allow these looped interpolations to instead be carried out in parallel rather than sequentially (e.g., with each parallel circuit having respective multipliers (e.g., corresponding to multipliers 5140a-c) that multiply the x-, y-, z-slopes by either 0, 1, 2, or 3 (rather than relying on counter value i)). This may allow four parallel interpolations to be carried out in a single cycle (rather than four), with the respective outputs provided to lookup tables to identify potential hits (similar to the circuitry and example shown in FIG. 52). In such an implementation, interpolation may be carried out such as expressed in the following pseudocode:

```
// i=0, corresponding to a first of the four parallel circuitry blocks;
acc0.x = min_x; // + slope_x * 0;
acc0.y = min_y; // + slope_y * 0;
acc0.x = min_z; // + slope_z * 0;
x0 = ((int) acc0.x) >> scale;
y0 = ((int) acc0.y) >> scale;
z0 = ((int) acc0.z) >> scale;
vola_comp0 = lookup(x0, y0, z0);
// i=1, corresponding to a second of the four parallel circuitry blocks;
acc1.x = min_x + slope_x; // + slope_x * 1;
acc1.y = min_y + slope_y; // + slope_y * 1;
acc1.x = min_z + slope_z; // + slope_z * 1;
x1 = ((int) acc1.x) >> scale;
y1 = ((int) acc1.y) >> scale;
z1 = ((int) acc1.z) >> scale;
vola_comp1 = lookup(x1, y1, z1);
// i=2, corresponding to a third of the four parallel circuitry blocks;
acc2.x = min_x + slope_x * 2;
acc2.y = min_y + slope_y * 2;
acc2.x = min_z + slope_z * 2;
x2 = ((int) acc2.x) >> scale;
y2 = ((int) acc2.y) >> scale;
z2 = ((int) acc2.z) >> scale;
vola_comp2 = lookup(x2, y2, z2);
// i=3, corresponding to a fourth of the four parallel circuitry blocks;
acc3.x = min_x + slope_x * 3;
acc3.y = min_y + slope_y * 3;
acc3.x = min_z + slope_z * 3;
x3 = ((int) acc3.x) >> scale;
y3 = ((int) acc3.y) >> scale;
z3 = ((int) acc3.z) >> scale;
vola_comp3 = lookup(x3, y3, z3);
```

Figure 51B:
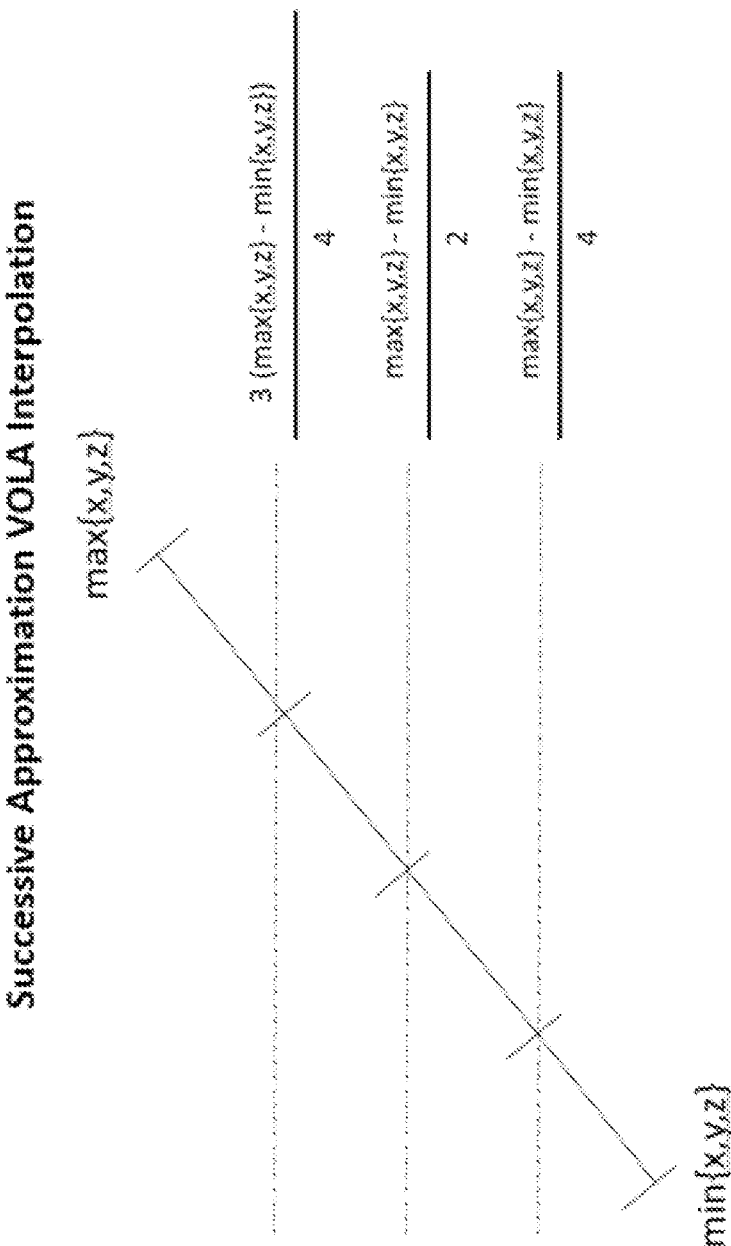
FIGS. 51B-51C illustrate an example ray casting technique.
Figure 51C:
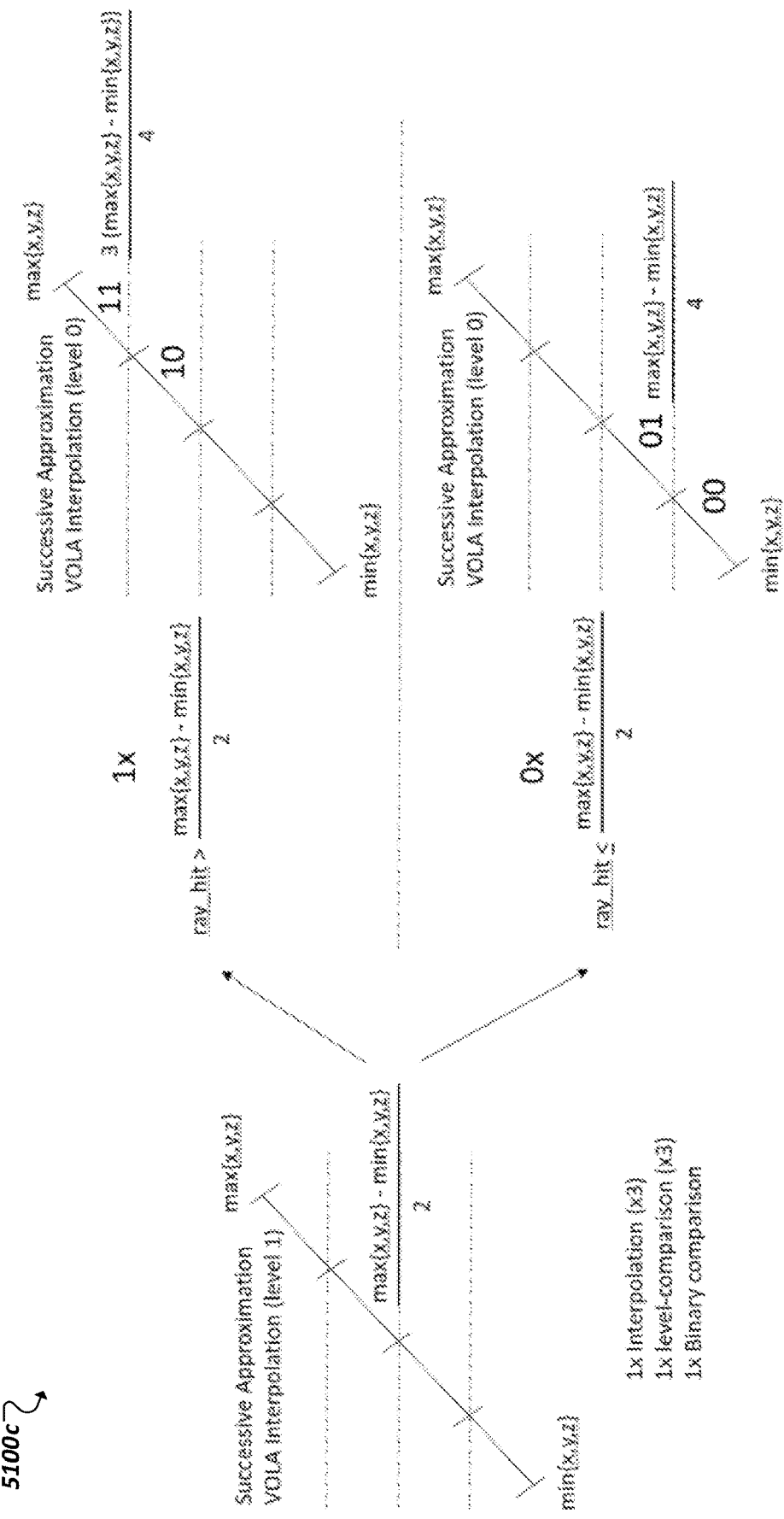

In another implementation, as illustrated in the block diagrams 5100b-c of FIGS. 51B-51C, circuitry similar to that illustrated in the example if FIG. 51A may be used to perform (and speed up) interpolations by applying successive approximation techniques. For instance, successive approximation may be performed to cut the cycles in half (e.g., as compared to the example of FIG. 51A). For instance, a first interpolation may be performed to the mid-point of the four-element volume to determine whether an intersection has occurred above or below that mid-point. Based on the result of this comparison, a second interpolation could be performed in the second cycle on the upper or lower line segment in order to determine the exact intersection point, resulting in a maximum of two cycles and two interpolations to be performed, and providing a potential early exit opportunity (e.g., in the case of no hits in the first cycle), resulting in additional efficiencies and gains in speed to complete a corresponding ray-casting process.

Figure 52:
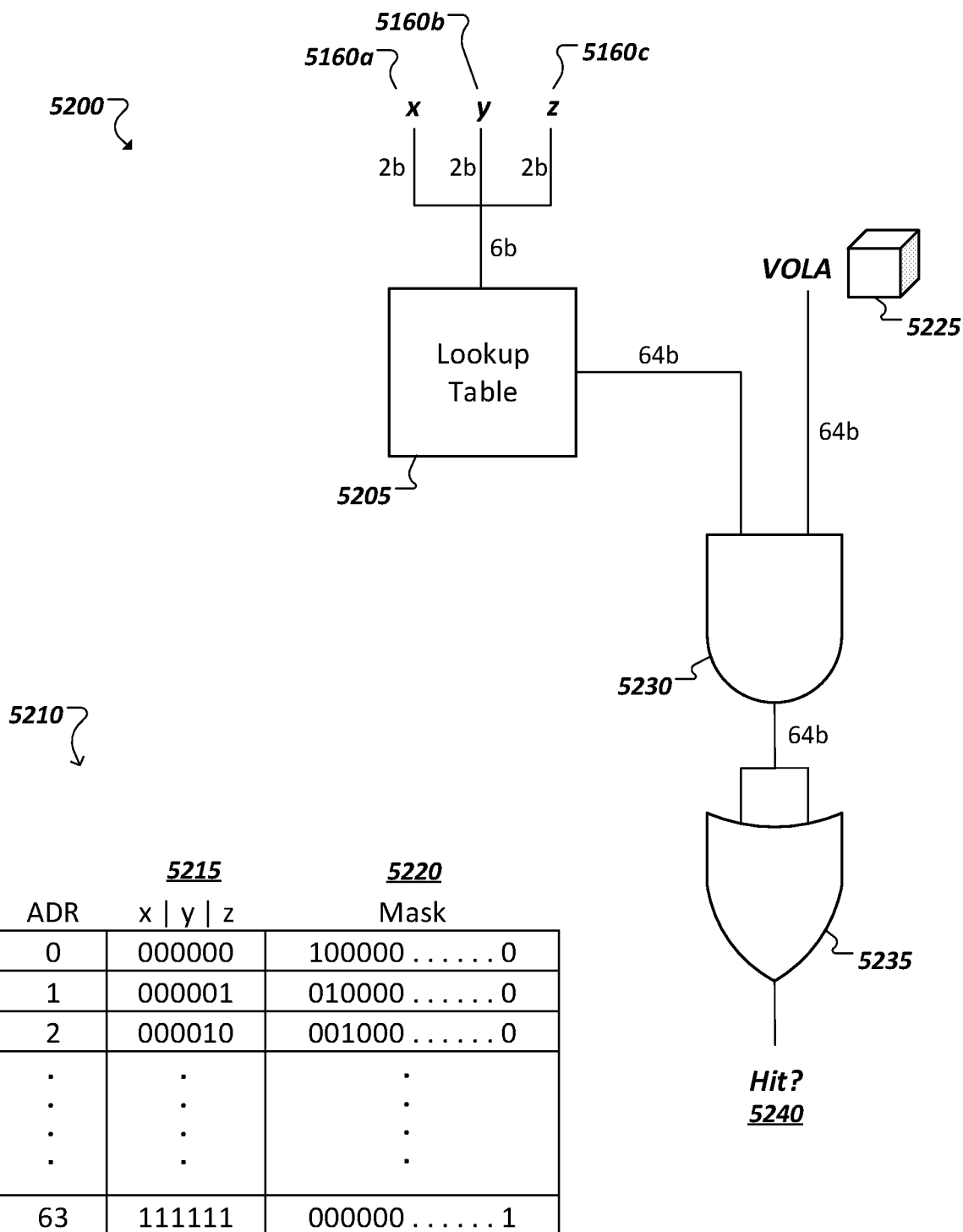
FIG. 52 is a simplified block diagram of example logic to be used to perform ray casting.

Turning to the simplified block diagram 5200 of FIG. 52, additional circuitry may be provided, which may accept the three outputs (e.g., 5160a-c) generated by the circuitry of the example of FIG. 51A corresponding to a particular ray. The values 5160a-b may be concatenated to form a 6-bit address 5215, which may be provided to a lookup table circuit 5205. As shown in table 5210, each of the possible 6-bit combinations (built from values 5160a-c) may correspond to one of 64 voxels (and corresponding entry bits) at a particular level of detail. This relatively small lookup table 5205 may be used to quickly return a 64-bit bitmask 5220 that corresponds with the voxel identified (e.g., using the example circuitry of FIG. 51) as being intersected by (or containing a segment of) the particular ray. The resulting bitmask may be provided to AND logic 5230 to be compared with an entry of the volumetric data structure 5225 describing the volume being intersected by the ray. If the result of AND gate 5230 is anything other than 64 zeroes, OR logic 5235 will generate a "1" (at 5240) to indicate that the voxel contains both geometry and the ray segment. Otherwise a "0" is returned to indicate a miss. In the case of a miss, all other operations for any remaining level of detail corresponding to the voxel may be dismissed. In this way, for every miss, the universe of voxels within the volume that are to be assessed may be quickly narrowed.

As in other examples discussed above, when utilizing the example circuitry shown in FIGS. 51A-52, an iterative process may be performed to assess voxels beginning at a lowest level of detail and progressing (when a hit is identified) up the tree to higher levels of detail until either a miss is found or a hit at the leaf node (i.e., a highest level of detail voxel) is established. For instance, in a first iteration of the circuit, the entry and exit coordinates may be the coordinates of the overall volume and the volumetric data structure entry (provided to AND gate 5230) may be the L0 entry of the volumetric data structure. As in other examples, in response to identifying that one or more of the L0 voxels contains both a ray segment and geometry, operation may loopback to assess L1 entry and exit coordinates, with a corresponding L1 entry of the volumetric data structure 5225 (representing the subvolumes of the L0 voxels where "hits" were found) being provided as the input to AND logic 5230 (e.g., in the same or another equivalent block of the circuitry (e.g., FIGS. 51A-52) used to assess the L0 voxels) and so on until the geometry is checked for intersections with the ray at the highest (or another target) level of detail. Such logic may be implemented a single time or in multiple blocks within a device. For instance, multiple parallel blocks (e.g., similar to the examples of FIGS. 51A-52) may be provided, for instance, to facilitate the parallel assessment of multiple different rays (e.g., in association with audio or video rendering associated with geometry described in the volumetric data structure (or multiple different volumetric data structures), among other examples.

As introduced above, ray casting, rendering, and other operations may be performed based on volumetric data structures describing an environment. These operations may also be utilized in applications involving the automation of path planning, navigation, collision detection and avoidance, and other features of autonomous or semi-autonomous vehicles. For instance, volumetric data structures and functionality such as discussed above may allow a drone or autonomous vehicle to navigate safely within an environment. For instance, the description of the volumetric data structure maybe provided to back-up or serve as ground-truth data for other systems controlling a vehicle's travel within an environment, such as a computer vision subsystem of the vehicle. For instance, the multiple levels of detail provided within the volumetric data structure may allow for fast object avoidance at progressively higher resolutions (e.g., leveraging the Sparse Sexaquaternary Tree (SST) format of an example volumetric data structure).

Figure 53:
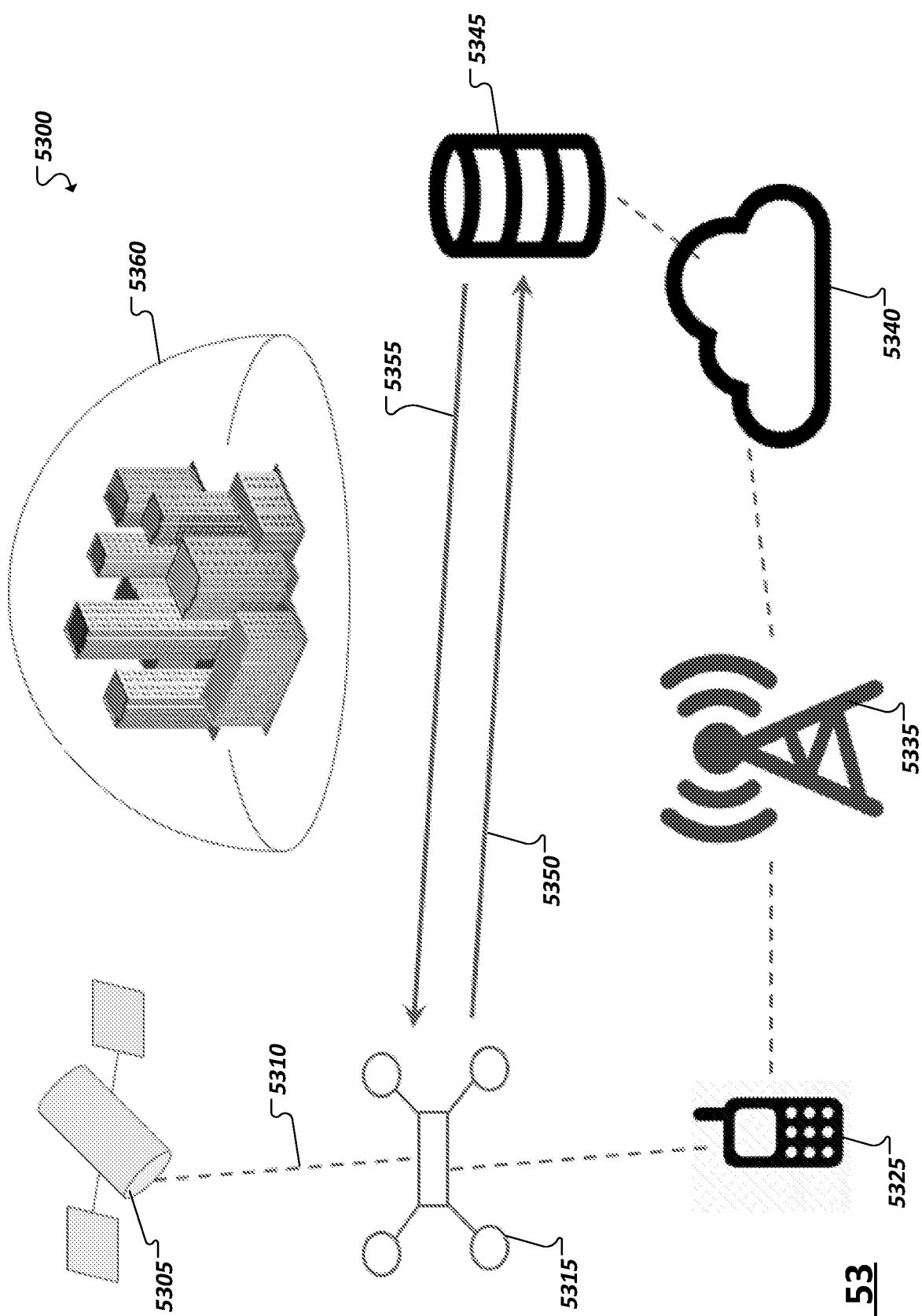
FIG. 53 is a block diagram of an example system including an autonomous vehicle.

Turning to the simplified block diagram 5300 of FIG. 53, as an example, a drone (e.g., 5315) when it takes off from a location can request an SST volumetric map (embodied as a one of a library of volumetric data structures) corresponding to the surrounding half hemisphere it can reach on the current battery change. The volume of the hemisphere (e.g., 5360) in which the drone is likely travel. For instance, a volume may be defined as $V=(2/3)\pi r^3$, where r is the range of the drone on the current battery charge or the range of a signal for use in communicating with the drone, among other examples. This volume V, upon identification, may be progressively subdivided into subvolumes of $4^3$ voxels starting from an initial 64-bit number describing the coarsest subdivision of the volume into 64 voxels ($4^3$) each represented by a single bit entry where "1" means the corresponding subvolume contains geometry at that {x,y,z} location and "0" means the volume contains no geometry at that location. Using progressively higher levels of geometry means that collision avoidance can be detected and obstacles avoided more quickly allowing the drone, vehicle, robot, robotic arm, or other movable device to move through the environment more quickly than might otherwise be possible.

Continuing with the discussion of FIG. 53, a drone 5315 (or other device) may request (at 5310) a volumetric data structure describing the geometry within a particular hemisphere of volume 5360 it can reach on a current battery charge, where the range (and the corresponding volume) are determined by the current drone battery charge, historical energy usage rates, device weight, payload weight, and other factors. In this example, the hemisphere of the requested volume 5360 may be centered on the GPS location of the drone at take-off which can be determined either using a GPS receiver onboard the drone, in an associated controller (e.g., an associated smartphone (e.g., 5325) controller) or via a data network 5335 (e.g., a cellular data network). In some implementations, all or a portion of the volumetric data structure may be stored onboard the drone 5315 or alternately requested via the network 5335 to access a repository of volumetric data structures stored in the cloud or other online systems 5340. For instance, a request 5350 containing the drone location at takeoff may be transmitted (e.g., directly by the drone 5315 or through an associated computer (e.g., 5325)) to a repository system 5345, which may determine or build a volumetric data structure corresponding to the parameters (e.g., GPS location, range, geometry, etc.) included in the request 5350. The repository system 5345 may then return 5355 the requested volumetric data structure using a similar network communications channel.

While some of the examples discussed herein have illustrated a volume as a cube or rectangular prism, as illustrated in the example of FIG. 53, the overall or base volume described by a volumetric data structure may potentially be any geometry (e.g., a hemisphere, cube, rectangular prism, etc.). Indeed, a volume represented by a volumetric data structure may be oblong and discontinuous in some instances. The volume may be determined to account for potential deviations in the course of travel, either due to rerouting, added routes, evasive maneuvers, environment forces, or other factors, which may add variance to the size and shape of the space (or potential travel range) in which a device may travel. Any such volume may then be subdivided into a number of voxels corresponding to a lowest level of detail within a sparse tree representation provided by the volumetric data structure. These lowest level voxels may then be mapped to individual bits included in an L0 entry of the volumetric data structure. In some cases, such as with an irregular-shaped volume described by the volumetric data structure, the volumetric data structure header or even a separate data structure may be utilized to chart the mapping of physical subvolumes at the first level of detail to bits in the L0 entry (e.g., 64-bit) integer identifying whether these various subvolumes are occupied or not. For instance, a volume in which travel is to occur may be determined to consider a generalized path between a start and end (goal) locations (e.g., with volumes diverging from this direct path considered less likely for travel), a preferred path, based on regulations and laws governing travel (e.g., corresponding to roadways and parking lots for automobiles, regulated airspace elevations for aerial drones, etc.), or other considerations. Such considerations may result in irregular volumes, which may nonetheless be described using a sparse-tree based volumetric data structure representation.

Figure 54A:
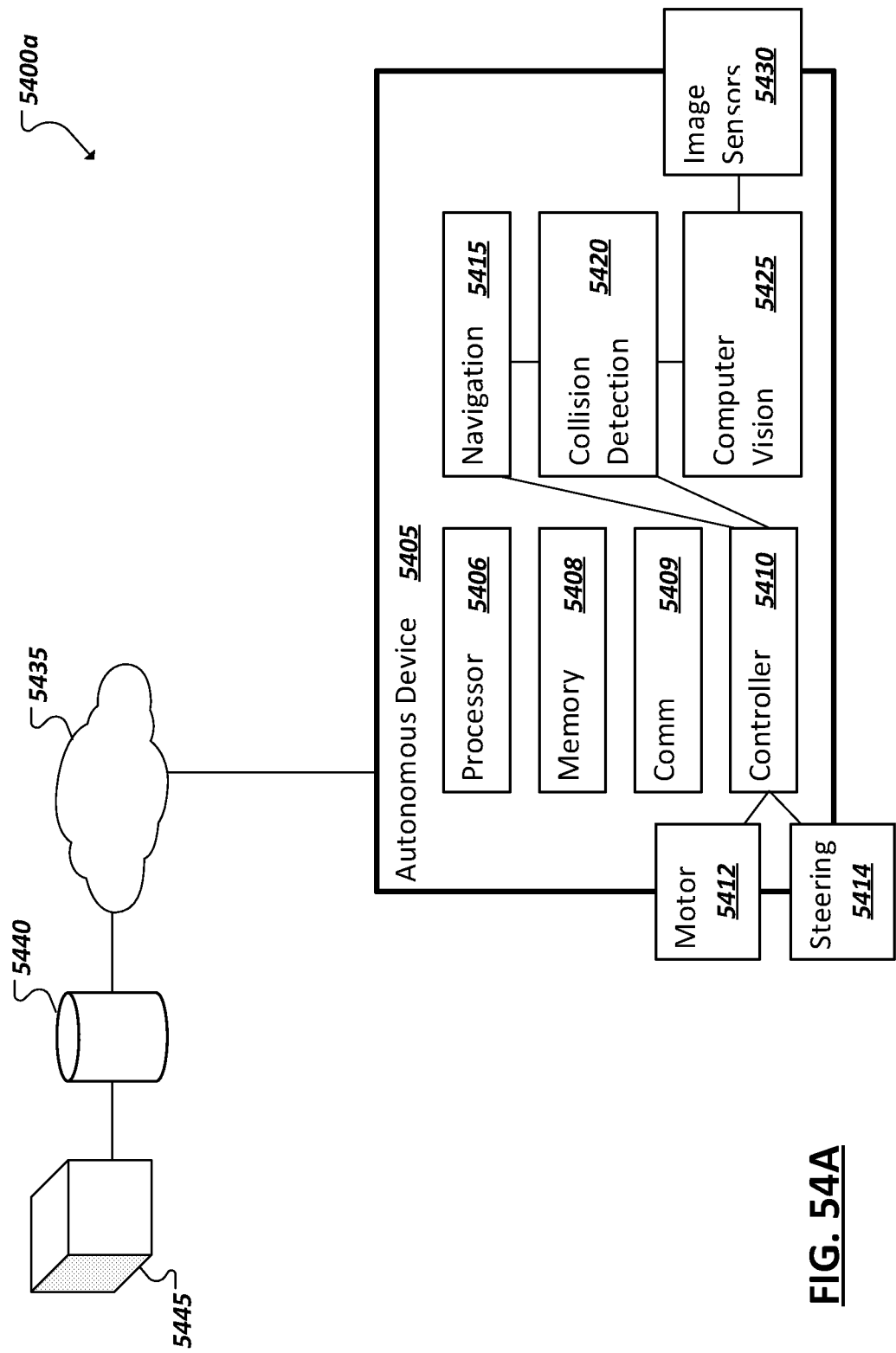
FIGS. 54A-54B are simplified block diagrams illustrating example implementations of autonomous vehicles.
Figure 54B:
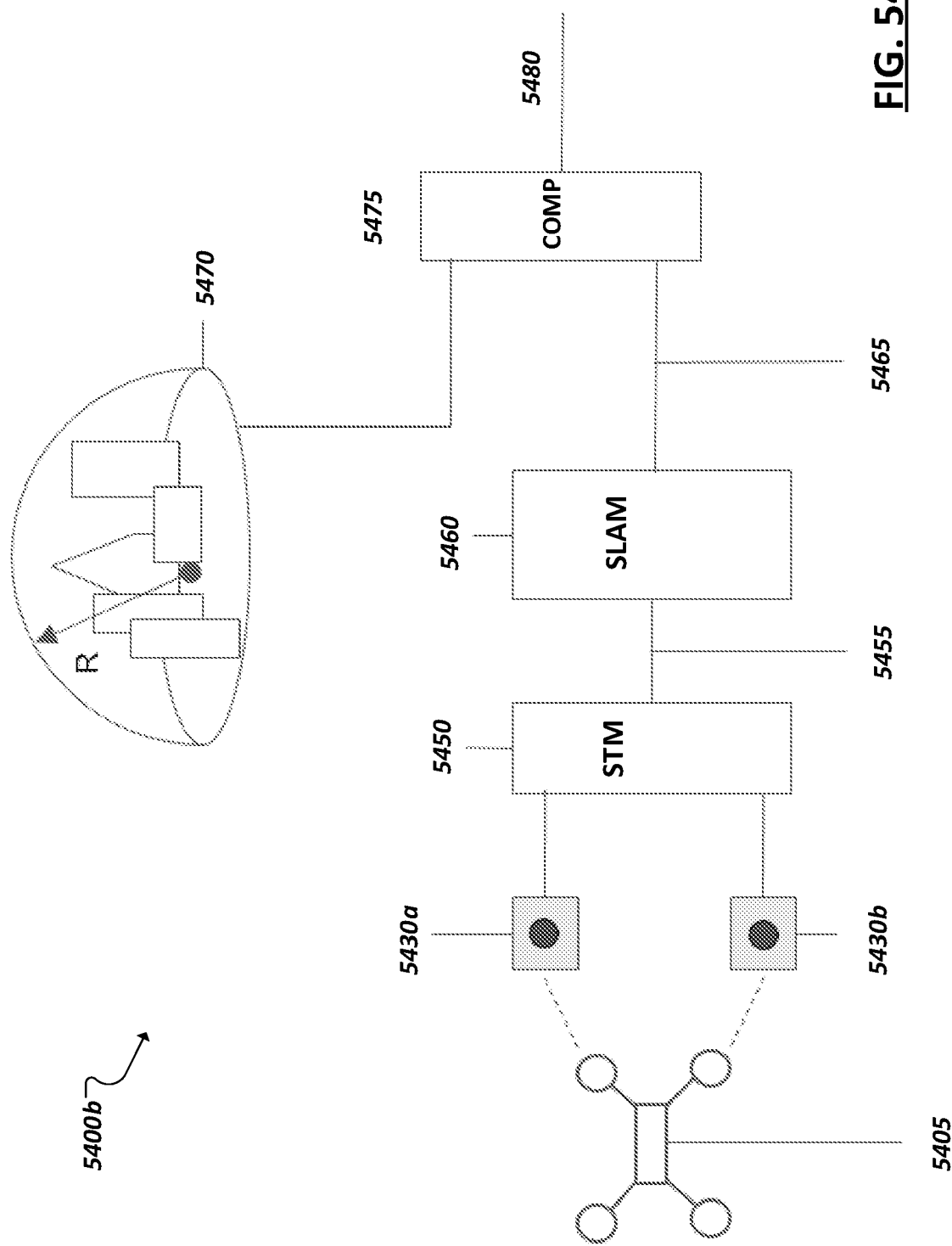

FIGS. 54A-54B are simplified block diagram 5400a-b illustrating example implementations and features of a device capable of moving autonomously within an environment. While the example of a drone (e.g., aerial, water, or land-based) is presented here, it should be understood that these same principles and similar functionality may be integrated in a device equipped with functionality to move or travel autonomously or semi-autonomously (e.g., semi-autonomous in the sense that movement may be controlled periodically or overridden by a human user). For instance, in the example of FIG. 54A, an autonomous device 5405 may be provided which includes one or more data processing devices (e.g., 5406) and computer-readable memory devices (e.g., 5408), which may store instructions and data to be processed using the processor 5406. A communication module 5409 may be provided to allow the autonomous device 5405 to communicate with external systems using one or more network technologies (e.g., Wi-Fi, cellular broadband, Bluetooth, etc.). For instance, the communication module 5409 may enable communication between the device 5405 and an external controller or other device supplementing the functionality of the device 5405. For instance, an external controller may include at least some of the logic illustrated in this example as included within the device 5405 itself.

In some cases, an external controller or system may provide a user interface to program or configure the automation and other parameters of the device 5405, among other example implementations. The communication module 5409 may additionally facilitate communication between the device 5405 and a repository system (e.g., 5440) accessible over one or more data networks 5435, such that volumetric data structures (e.g., 5445) may be accessed and used by the autonomous device 5405. As noted in the discussion of FIG. 53, in some cases, volumetric data structures 5445 may be additionally or alternatively accessed by a supporting controller system separate from the device 5405, and may even be used to serve selected portions or other data generated from a volumetric data structure to the device 5405, among other examples.

An example autonomous device 5405 may additionally include a controller 5410 to provide signals and/or instructions to the hydraulics, jets, engines, motors, or other driving mechanisms (e.g., 5412) provided to drive movement of the device, as well as steering mechanisms (e.g., 5414) used to control the directionality of the movement of the device. The controller 5410 may interface with navigation or path planning/execution logic 5415 implemented in hardware and/or software to determine a dictate a path of movement the device 5405 is to execute using its driving and steering mechanisms 5412, 5414. Hardware and/or software-based collision detection logic 5420 may also be provided in some implementations, to detect (based on inputs from various sensors (e.g., image sensors 5430, proximity sensors, infrared, radio frequency, touch, or other sensors)) that a current course of movement specified by a path plan provided by navigation logic 5415 is likely to result in a collision with an external object (e.g., a person, vehicle, building, animal, smoke, cloud, etc.) to impact the travel of the device 5405 or the object in the path of the device 5405. For instance, a potential collision detected by the collision detection logic 5420 may cause a deviation or adjustment from the current path, with the collision detection logic 5420 providing signals or instructions to the navigation logic 5415 to cause the navigation logic to generate a modification to the path plan in response.

In some implementations, a device 5405 may include a computer vision 5425 or other subsystem for use in processing inputs by various sensors (e.g., image sensor 5430) to generate data useable by other subsystems of the device 5405. For instance, a computer vision subsystem 5425 may utilize image data (e.g., stereo image data) generated by the image sensor(s) 5430 to generate a 2D or 3D representation of a real-time view of the path and surrounding geometry for the device 5405. In some cases, the computer vision logic 5425 may detect the orientation (e.g., coordinates in space, the device's angle, pose, etc.) to generate a 2D projection of 3D space around the device and/or generate a 3D representation (e.g., according to the sparse-tree based volumetric data structure described herein) for use by the navigation (e.g., 5415) and/or collision detection logic 5420. For instance, volumetric data structures (e.g., 5445) obtained from a repository 5440 may be used as a ground truth to compare against 2D or 3D representations of the immediate geometry generated by the computer vision subsystem 5425 and determine (e.g., at the navigation system 5415) whether the device remains on course or whether an unexpected obstacle presents a potential collision (e.g., using collision detection logic 5420), among other example uses and functionality.

For instance, turning to FIG. 54B, an autonomous device 5405 is shown implemented as an aerial drone. The drone 5405 may include multiple cameras 5430a-b to serve as stereoscopic image sensors, such as a stereo pair with a baseline b, mounted on the drone and oriented in the current direction of travel. The baseline may represent the distance between the respective centers of the stereo camera pair 5430a-b. The output of the cameras 5430a-b may then be passed to a computer vision subsystem which include a stereo matching block 5450, which may be used to calculate pixel disparities between the two images and produces an output depth-map (at 5455). Further, a simultaneous localization and mapping (SLAM) block 5460 may be provided to integrate a succession of depth images 5455 generated by the stereo matching block 5450 using progressively captured images by cameras 5430a-b to build a volumetric map of the environment (at 5465). This volumetric map can either be converted to a SST volumetric data structure representation or may be natively used as a depth map. Comparator logic (e.g., 5475) may be utilized to compare the volumetric representation of the observed geometry (generated by the device's 5405 computer vision subsystem (e.g., including elements 5430a-b, 5450, 5460, etc.)) to a representation of the reference geometry (in volume 5470) described in a corresponding volumetric data structure. In some cases, this may involve conversion of the volumetric data structure (e.g., through rendering or other 2D-3D projection operations) to a depth map or 2D image generate by the computer vision system. In some cases, the comparison performed by the comparator logic 5475 may involve a voxel by voxel comparison to produce an output map of voxel correspondences (and non-correspondences) detected by the comparator 5475 (at 5480).

As an example, a reference volumetric map may be downloaded from a repository system or excised from a larger scale map stored on the drone, to serve as the ground-truth for the computer vision subsystem on the drone which produces an observed volumetric map 5465. This comparison of observed geometry to reference geometry (e.g., at the drone or a supporting computing system) allows the drone 5405 to quickly recognize deviations from the ground truth to either ignore the deviations (e.g., if the ground truth is to be trusted more than the on-the-fly results of the computer vision system) or modify a path plan to avoid new geometry identified in the observer geometry. In cases where the volumetric data structure's description of the reference geometry is to be trusted as the ultimate ground truth, the corresponding volumetric map may be relied upon to fly safely and autonomously in cases where the computer vision subsystem has a technical failure, error, or otherwise fails to produce a "correct" volumetric map, such as in the case of smoke, fog, snow, rain, birds, lightning, etc. interrupting the accurate generation of a volumetric map using imaging sensors 5430a-b, among other example uses and advantages.

Figure 55:
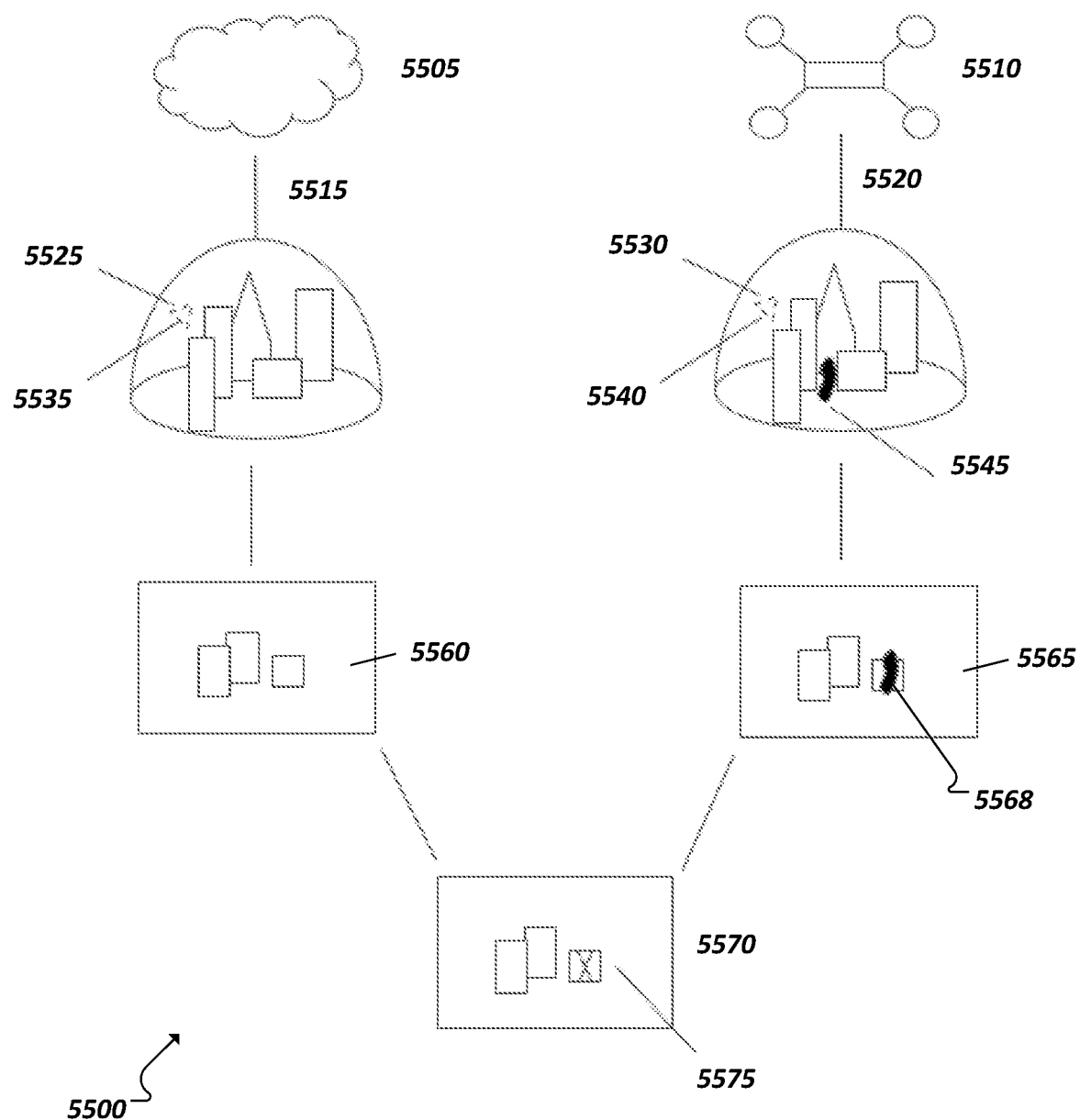
FIG. 55 is a simplified block diagram illustrating an example comparison of volumetric maps in accordance with some embodiments.

Turning to the example of FIG. 55, a simplified block diagram 5500 is shown illustrating the comparison of volumetric map representations using logic associated with a vision pipeline of an example autonomous device 5510. For instance, in the example of FIG. 55, the vision pipeline compares a volumetric representation of a scene 5525 obtained 5515 from memory, such as from cloud-based storage 5505, local onboard storage of the vehicle 5510, or another system in supporting operation of the vehicle 5510, among other examples. The vehicle 5510 may utilize functionality present on the vehicle 5510 to create (at 5520) its own volumetric representation 5530 of the scene, for instance, using an onboard computer vision subsystem, LIDAR, radar, ultrasound, or other techniques. Comparison logic may then be utilized to compare the representation 5530 developed by the vehicle's logic, with a reference representation 5525 (e.g., generated from a volumetric data structure) obtained from data storage. For instance, these two volumetric representations can be compared directly (e.g., on a voxel-by-voxel basis) where the vehicle logic generates a corresponding representation according to the volumetric data structure format.

Alternately, in some implementations, the reference volumetric data structure may be converted (e.g., through rendering operations (such as set forth herein)) into a 2D representation 5560 of the reference scene 5535 for comparison with a similar 2D representation 5565 generated for the perceived scene 5530 (by the vehicle logic). For instance, a 2D representation of the reference volumetric map can be reconstructed with knowledge of the location of the vehicle 5510 in the scene/volume at the time the observed volumetric map is generated, together with knowledge of the vehicle's pose (at the time the scene was observed). For instance, to accurately generate a 2D image from the volumetric data structure that is comparable to a 2D image generated by the vehicle's image sensors, an accurate projection of the volumetric data structure is to be performed to correctly represent the view generated by the image sensors (e.g., camera(s)). As an example, the camera pose may be identified and a 3D matrix multiplication performed to reconstruct what the 3D volumetric data structure description should look like as seen from the position and pose of the camera.

As an illustrative example, a particular portion (e.g., 5535, 5540) of the scene's geometry may be captured in the observed volumetric map 5530. This portion 5535, 5540 may be identified (e.g., from vehicle location and pose information (e.g., tagged in the observed volumetric data)) to drive the generation of a 2D projection or rendering of the reference volumetric map to reflect the same portion (and viewing angle) as observed by the vehicle's vision system. In such cases, both 2D representations 5560, 5565 of the reference 5525 and the perceived scene 5530 may be compared directly (e.g., pixel by pixel, using machine learning or heuristic analysis, or another technique) to identify and tag any non-corresponding geometries (e.g., 5575) in the compared scene 5570. As an example, if some unexpected imagery or geometry (e.g., 5545) appears in the perceived scene 309 (i.e., different from what is anticipated from the ground truth modeled by scene 5525), such as a cloud of smoke or an occluding object or bird, this will be detected and tagged (at 5575) in the scene 5570 as a non-correspondence. Alternatively, if the 2D image (e.g., 5560, 5565) is a depth map or a conventional input image from the computer vision pipeline of the vehicle 5510, this image can be compared against a reference image 5525 generated from the volumetric data structure and used to calculate disparities against the reference 2D image 5560 in the manner previously described. This latter technique may, in some cases, have the benefit of yielding lower latency and allow the vehicle 5510 to proceed at higher speed without colliding with anything in the scene, among other example features and advantages.

Figure 56:
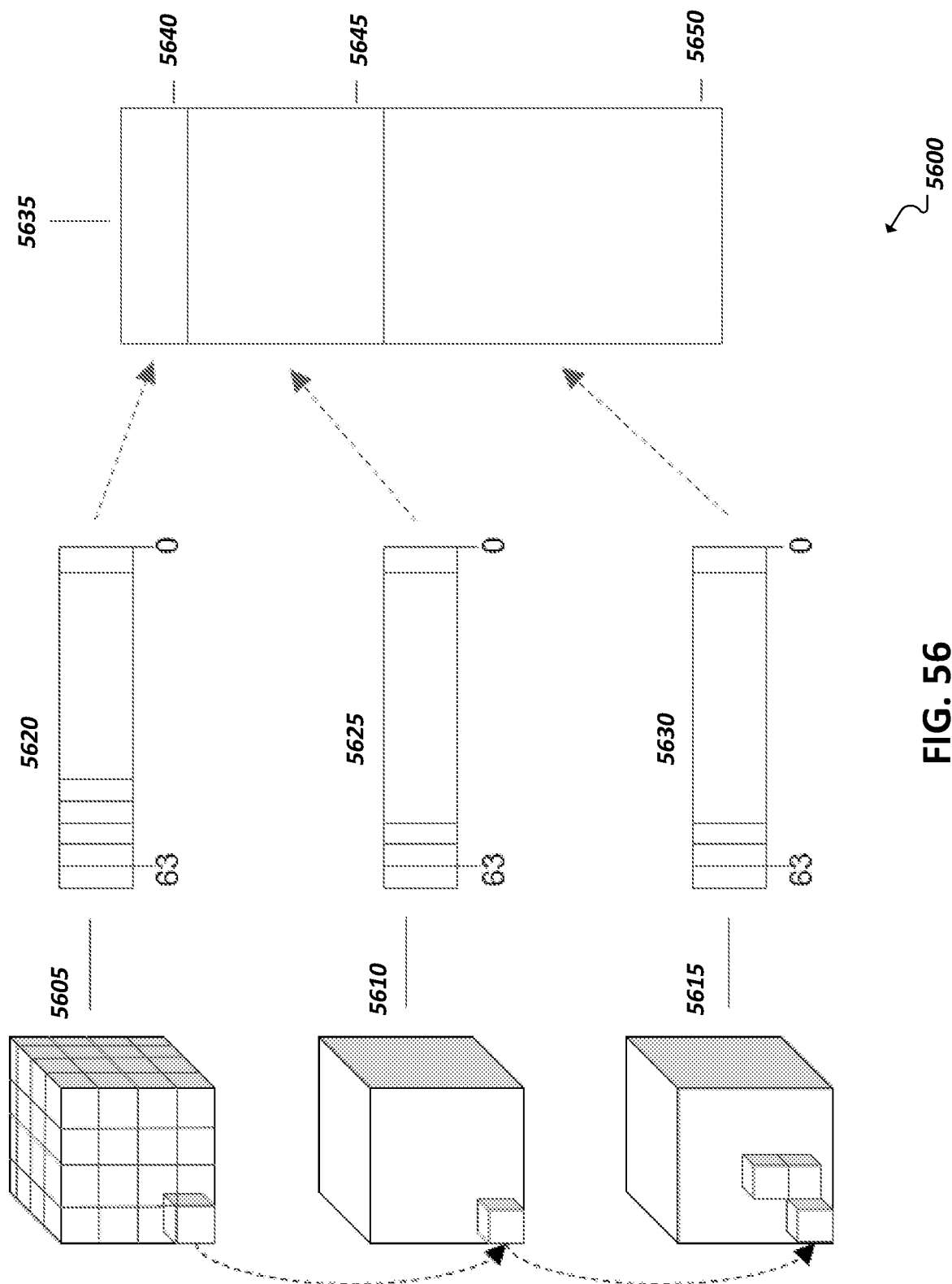
FIG. 56 is a simplified block diagram illustrating an example volumetric data structure.

Turning to FIG. 56, a simplified block diagram 5600 is shown illustrating a representation of an example SST volumetric data structure format. For instance, the block diagram 5600 illustrates how such a volumetric data structure may be organized in memory. As in other examples discussed herein, the volumetric data structure may be composed of entries, with each entry include a 64-bit basic integer to represent the elements, or voxels, subdividing a corresponding volume. For instance, a one bit per voxel representation may be provided to represent geometry within the volume (and voxel subvolumes), with a "1" inserted into a corresponding bit to indicate that there is geometry within the corresponding voxel. The volumetric data structure may be further organized to represent a volume at multiple levels of detail. For instance, a volume may be first subdivided into a collection of (e.g., 64) voxels (as shown at 5605) at a lowest level of resolution or detail (L0), with a corresponding entry 5620 providing 64-bits to indicate for each L0 voxel whether geometry is present or not. The L0 voxels may be subdivided into $4^3$ subvolumes to represent L1 voxels (E.g., 5610) at the next (higher) level of detail. One or more entries (e.g., 5625) may also be provided to indicate (with a corresponding "1" or "0") whether the L1 voxel is occupied with geometry or not. In some implementations, the volumetric data structure may sparsely represent the geometry, but omitting higher level (Ln) entries corresponding to subdivisions of a lower level (Ln−1) voxel indicated (in its corresponding entry) to be empty. Accordingly, for a next level of detail, L1 voxels (e.g., 5610), for which there is geometry present, may be subdivided into voxel subvolumes of the next level of detail (e.g., as illustrated at 5615), with corresponding entries 5630, until a maximum or target level of detail (or resolution) is reached within the tree-based volumetric data structure.

In some implementations, the entire tree-based volumetric model may be stored contiguously in memory as a single data-structure 5635, with subsections 5640, 5645, 5650, etc. populated with volumetric data structure entries at each of the supported levels of detail (e.g., corresponding 5605, 5610, 5615, etc.). In other implementations, it may be suitable to store one or more of the different volumetric sections (e.g., 5640, 5645, 5650) of the volumetric data structure separately rather than as a single contiguous data structure in memory. For instance, the base addresses of 5640, 5645, 5650 may be configured to allow non-contiguous storage, which may be advantageous in some instances. For example, in memory constrained systems with little onboard memory, entries (e.g., 5640, 5645) describing the lowest resolution views of a scene may be stored in onboard memory (e.g., in a processor or system on chip (SoC) of the vehicle), while higher resolution entries (e.g., 5650) (which may be more seldom used and accessed (e.g., for fine grained navigation in certain segments of a path (e.g., during landing of a drone or navigating between tight spaces along the path)) may be stored off-chip in DRAM, among other examples. Such implementations may advantageously keep the most frequently used portion of a volumetric data structure (e.g., lower resolution descriptions) on-chip so that they can be cached for fast access and hence fast collision detection, obviating the accesses to off-chip memory, except in sporadic path segment where very high level of resolution is useful (e.g., to navigate a very cluttered scene), among other examples.

Figure 57:
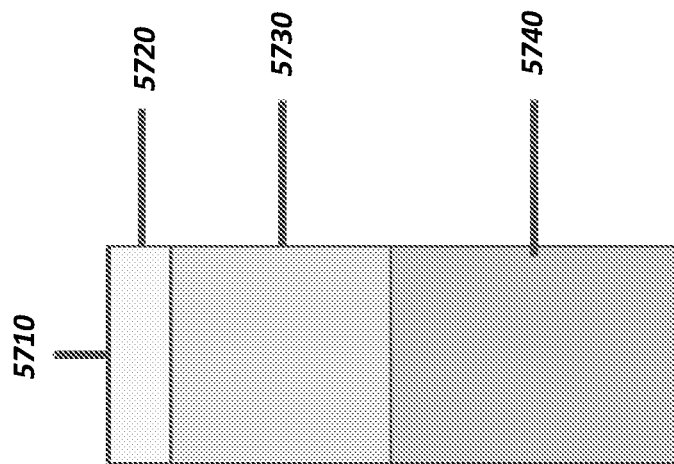
FIG. 57 is a simplified block diagram illustrating an example comparison of volumetric data structures in accordance with some embodiments.
Figure 57:
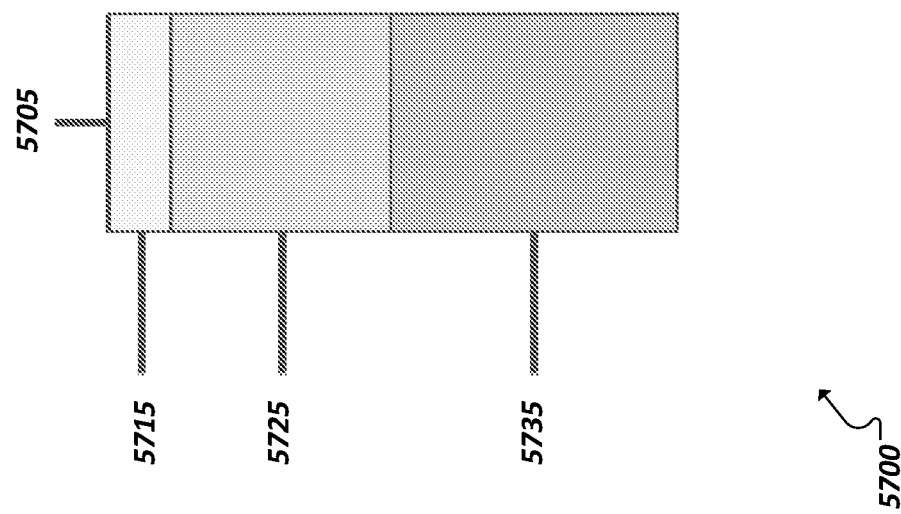
Figure 58:
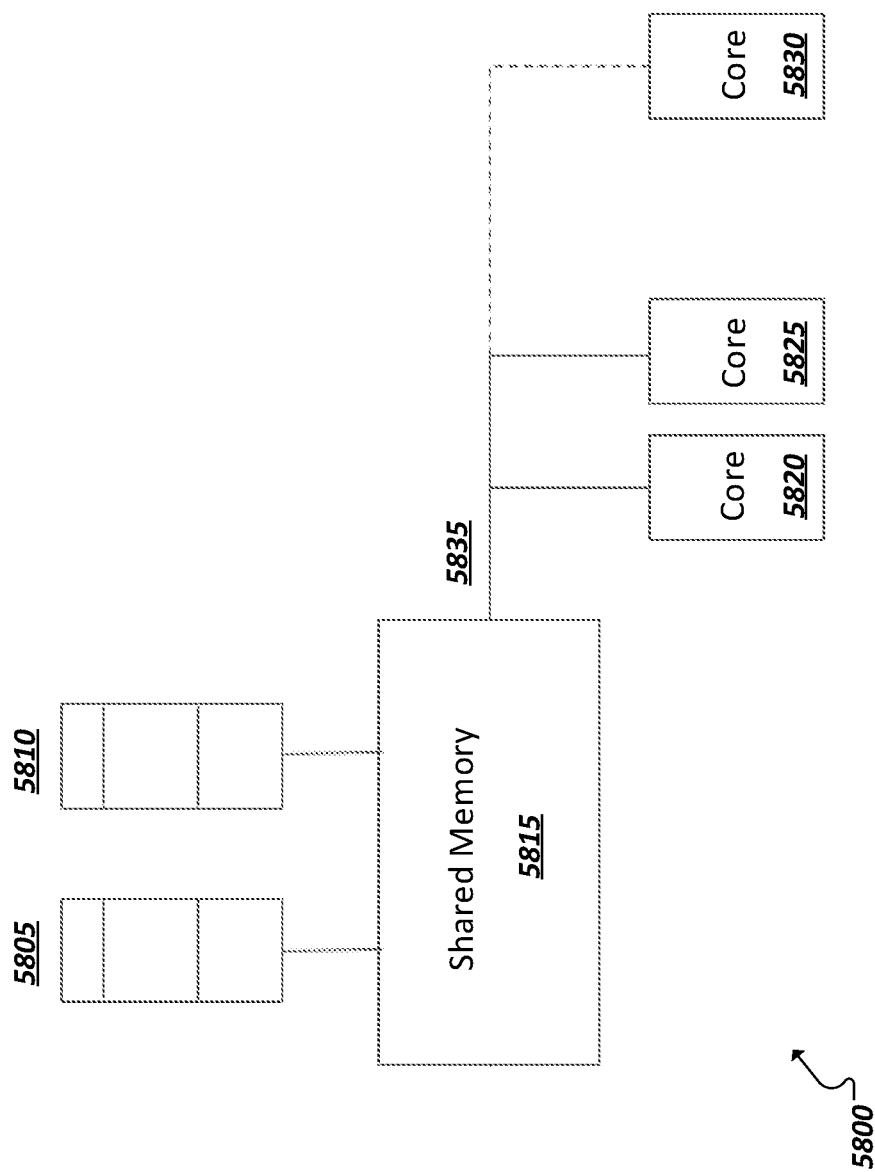
FIG. 58 is a simplified block diagram illustrating a portion of a system using example volumetric data structures.

As noted above, in some implementations, a volumetric map derived using logic on board a vehicle may be according to an SST-based volumetric mapping format, comparable to the format used to for the reference volumetric map (e.g., retrievable from a repository and representing the ground truth of a scene). For instance, as shown in the simplified block diagram 5700 of FIG. 57, As previously mentioned the two volumetric data structures 5705, 5710 may be provided, one (5705) corresponding to the reference volumetric geometry and the other (5710) representing volumetric geometry as observed using image sensors of the vehicle. The two volumetric data structures 5705, 5710 may be compared directly by comparing the 64-bit integers directly for bit to bit correspondence (which maps to a voxel-by-voxel comparison of the volumetric maps). For high speed collision avoidance, this procedure can be carried out for the lowest resolution geometry first by comparing low level entries (e.g., L0 entries 5715, 5720), with any detected differences between the entries' 5715, 5720 bit tagged (e.g., by exclusive-ORing the 64-bit integers of the entries 5715, 5720). If no differences are present the comparison can either terminate or alternately proceed to compare the 64-bit integers in the blocks of entries (e.g., 5725, 5730) of the next level of detail (e.g., L1) to compare the reference geometry to the observed geometry at a higher level of resolution. Again, based on the results of the comparison, it can be determined whether to terminate the comparison or alternatively progress to an analysis at the next highest level of resolution by comparing the next level (e.g., L2) entries (e.g., 5735, 5740), and so on until a maximum or target level of detail is reached. By terminating early at lower levels of resolution, collision avoidance can be carried out more quickly, thus allowing the drone/vehicle to advance more quickly through the scene where the scene is not very cluttered (i.e., rather than slowing or stopping the vehicle to allow time for comparisons of the higher level of detail entries (e.g., 5725 and 5730 or 5735 and 5740) to be carried out FIG. 58 is a simplified block diagram 5800 showing an example implementation of a system equipped with functionality to perform the comparisons at multiple levels of resolution between reference geometry 5805 and observed geometry 5810 which are held, in this example, in a shared memory 5815. In this example system, all comparisons between 64-bit entry integers may be independent of one another at a particular level of resolution in the tree-based volumetric data structures 5805 and 5810, these comparisons can be parallelized across multiple processors (e.g., 5820, 5825, 5830, etc.), which may each be connected to the shared memory 5815 via a bus, network, or other connection (e.g., 5835) used to facilitate sharing access to memory 5815. As mentioned, the workload can be distributed uniformly across a plurality of processors (e.g., 5820, 5825, 5830) at a particular level of resolution in the reference and observed volumetric map data 5805 and 5810. Alternatively, a first processor 5820 can process the lowest level of geometry of a comparison in parallel with processing of comparisons at the next highest level of geometry by a second processor (e.g., 5825), in parallel further with comparison processing at a third level of detail by another processor (e.g., 5830), and so on, among other example schemes and implementations (some of which may be constrained by the particular capabilities of the system (e.g., bus technology, number of processor cores, etc.).

Figure 59:
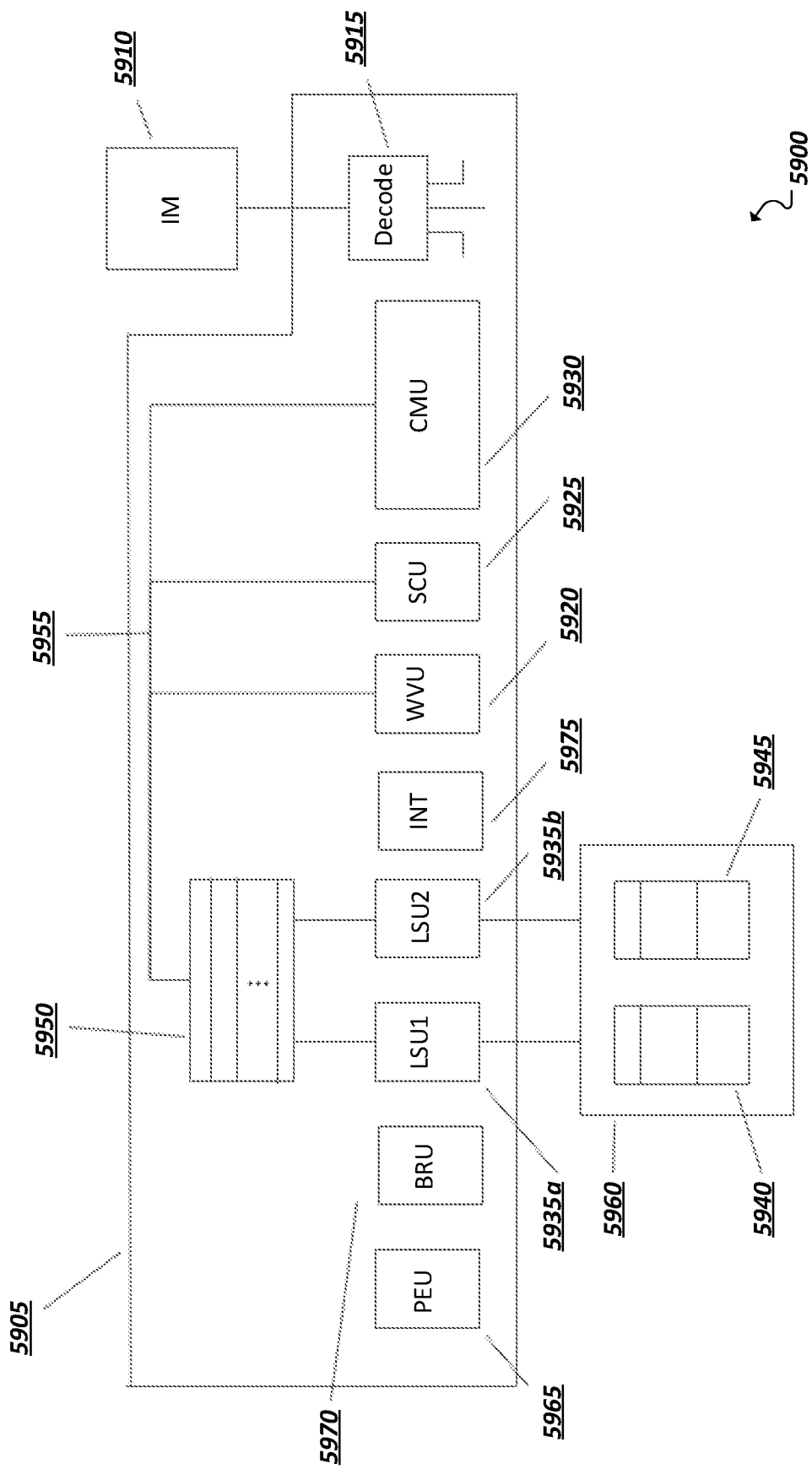
FIG. 59 is a simplified block diagram of an example processor device.

FIG. 59 is a simplified block diagram 5900 illustrating an example implementation of processors (e.g., 5820, 5825, 5830 of FIG. 58), which may be used to perform rendering and comparison operations (among other operations) in connection with path planning and collision avoidance functionality provided for a vehicle. For instance, such processors (e.g., 5905) may be implemented as a vector processor that is to be fed an instruction stream from instruction memory 5910. The stream of instructions read from the instruction memory 5910 may be decoded by an instruction decoder 5915 and the decoded signals may be distributed to a plurality of functional units. In one example, the vector processor 5905 may contain multiple functional units, such as a wide vector unit 5920 capable of operating on at least 64-bit and preferably wider data words, a scalar unit 5925 with arithmetic and logical reduction functionality capable of operating on the same width data words as the vector unit 5920, a compare and move unit (CMU) 5930 capable of operating on the same width vectors as 5920, and at least one load-store unit (LSU) 5935a-b. In this particular example, two load-store units 5935a-b are provided and communicate with a shared data memory to allow two data-words of up to the width of the vector word-length used by the functional units (e.g., 5920, 5925, 5930, etc.) to be loaded in a single clock cycle. The shared memory 5960 may be accessible to a plurality of vector processors via their respective load store units and the shared memory may be used to contain the sparse voxel tree (SVT)-based volumetric data structures (e.g., 5940, 5945) respectively describing reference and observed geometry of a particular volume. In this example the two load store ports (e.g., 5935a-b) may be used to read the reference and observed volumetric data structures 5940,

5945 into a vector register file 5950, which feeds the vector processor functional e.g., 5920, 5925, 5930, etc.) via a plurality of read and write ports (e.g., 5955) sufficient to allow all functional units to execute in parallel in a single cycle on data read from the register file 5950 and to further allow for data to be written back into the same register file at the processor clock rate, every clock cycle. In some instances, a CMU 5930 can compare a plurality of words of the same vector length as functional units (e.g., 5920, 5925, 5930, etc.) in a single clock cycle and generate condition codes based on the comparisons that are fed to a predicated execution unit 5965 that controls the execution of subsequent instructions subject to the results of the CMU 5960 comparisons. The processor 5905 may also contains a branch and repeat unit (BRU) 5970 and an integer unit 5975 to support the functions of the other functional units (e.g., 5920, 5925, 5930, etc.), among other example components and functionality.

Other processor architectures and designs may be adopted to provide functionality and perform operations such as those discussed herein. For instance, processors may be provided according to at least some of the examples and principles discussed in U.S. patent application Ser. No. 14/082,396, entitled "Apparatus, Systems, and Methods for Providing Computational Imaging Pipeline", and U.S. patent application Ser. No. 14/082,645, entitled "Apparatus, Systems, and Methods for Providing Configurable Computational Imaging Pipeline", both of which are incorporated by reference herein in their entireties.

Figure 60:
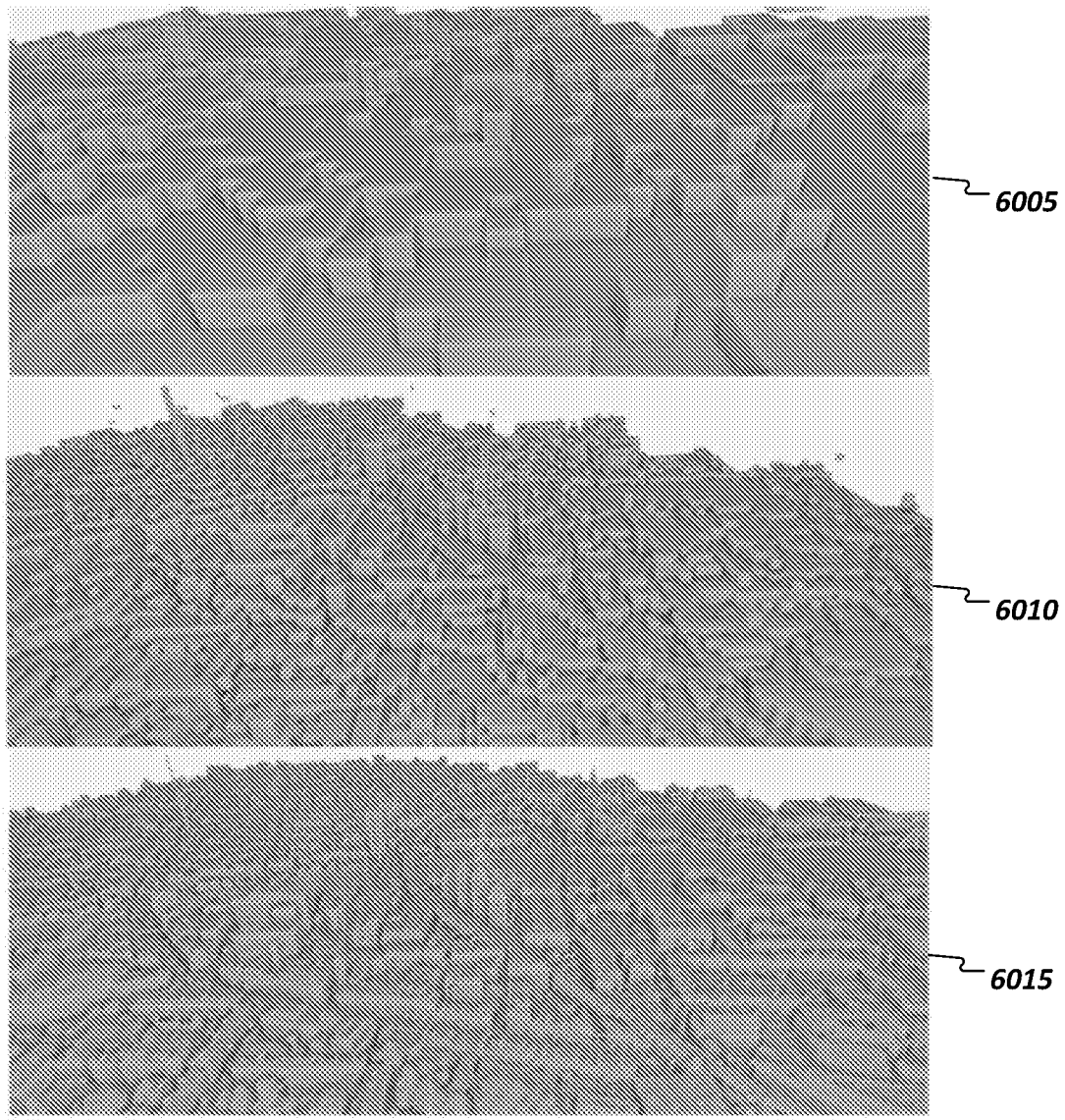
FIG. 60 shows example images generated according to multiple different levels of detail represented in an example volumetric data structure.

FIG. 60 illustrates example images generated from the rendering of an example volumetric data structure describing a volume corresponding to a cityscape at multiple ascending levels of detail. For instance, image 6005 illustrates a view of the cityscape, as described in the volumetric data structure, at a lowest level of detail (and, hence, image resolution). The shaded geometry shown in the image 6005 may correspond to voxels, which the volumetric data structure indicated to be at least partially occupied with geometry. Each of these occupied voxels may be further subdivided and described in the volumetric data structure to describe voxel volumes at this next, higher level of detail, as reflected by the image 6010 generated from the volumetric data structure entries describing geometry at this second level of detail. Further, as shown in image 6015, progressing to the next higher level of detail may exponentially increase the resolution of a resulting image 6015 (as compared with images 6005, 6010), as the geometry is represented using $64^3$ voxels as opposed to $4^3$ and $16^3$ voxels used to generate images 6005 and 6010 respectively.

Figures 61A, 61B:
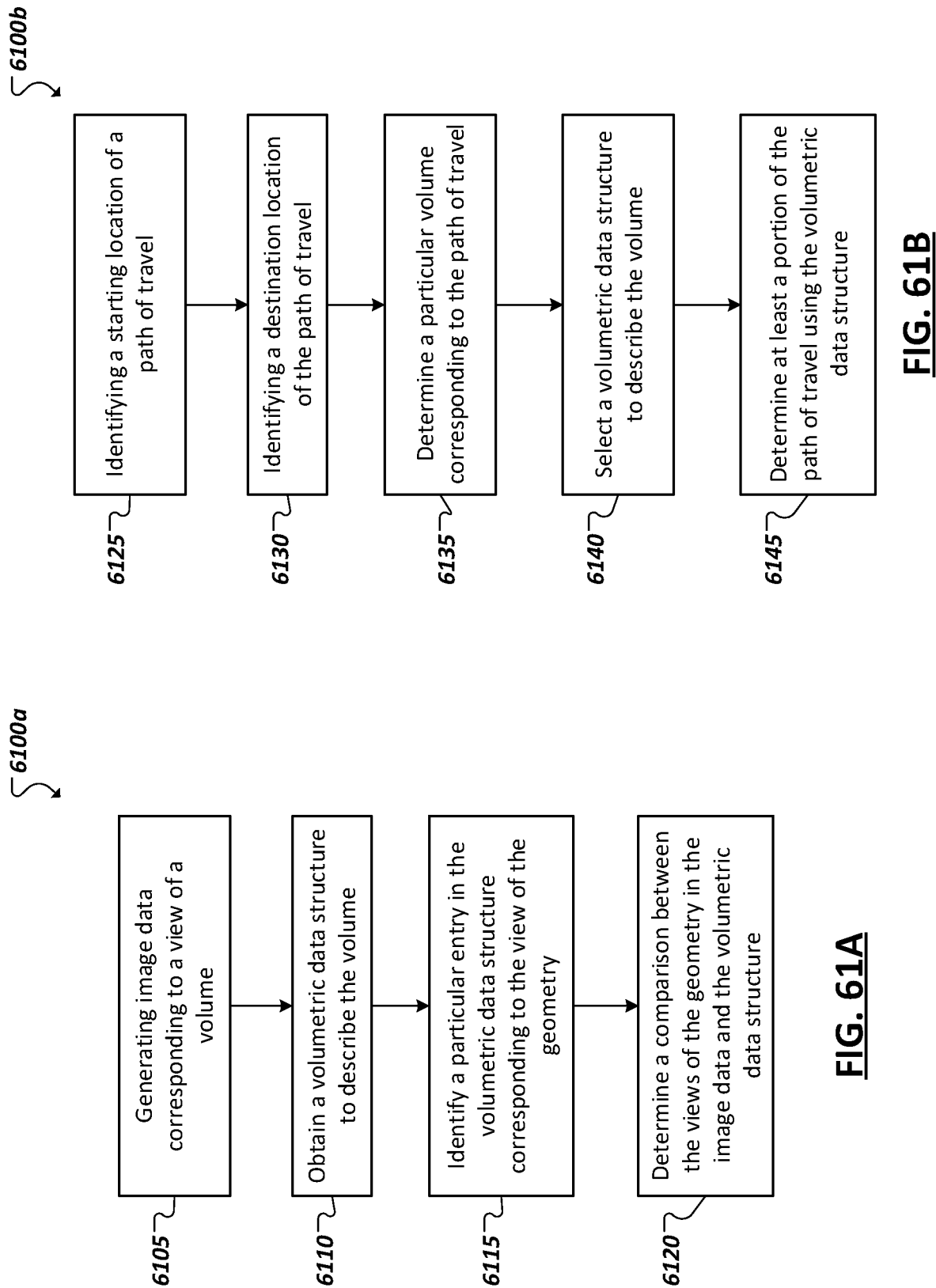
FIGS. 61A-61B are flowcharts illustrating example techniques utilizing example volumetric data structures.

FIGS. 61A-61B are flowcharts 6100a-b illustrating example techniques involving volumetric data structures, such as discussed herein. For instance, in FIG. 61A, image data may be generated 6105 corresponding to a present observed view of a particular environment. The view may capture geometry within a volume defined by coordinates within the particular environment. A volumetric data structure may be obtained 6110 that describes the volume (e.g., based on prior scanning or measuring of the volume (e.g., using stereographic image sensors, LIDAR, radar, etc.)). The volumetric data structure may be sparse-table based structure with features and formats similar to the examples discussed above. The volumetric data structure may model the volume at multiple levels of detail. Entries within the volumetric data structure may identify whether geometry is included in a particular subvolume, or voxel, of the volume. A particular one of these entries may be identified 6115 that corresponds to the view of the geometry. In some cases, this particular entry may be the entry describing voxels at a lowest level of detail or resolution, to make a quick and crude assessment of geometry within the volume. A comparison may be made 6120 between the image data and the volumetric data structure. In some cases, the image data may be implemented as, or converted to a volumetric data structure format, allowing entries of this volumetric data structure to be compared directly to the obtained volumetric data structure. In other instances, the obtained volumetric data structure may be converted to a 2D representation to permit comparison with 2D image data, among other example implementations. Comparisons of the view of the geometry described in the image data with the view of the geometry described in the obtained volumetric data structure may serve to identify deviations from expected geometry within the environment. In some cases, the image data may be used to generate a travel path and manage movement of a device (e.g., drone, car, robot, etc.) along this path (e.g., in connection with a computer vision system responsible for generating and processing the image data). In such instances, deviations between what the vision system sees and what is expected (e.g., as described in the volumetric data structure) may affect how the device is driven along the path, among other example uses.

Turning to FIG. 61B, volumetric data may be used as the basis for determining an initial path of travel for a device. For instance, a starting location (at 6125) and an ending location (at 6130) may be determined for a desired path of travel. A volume may be determined 6135, which corresponds to this path of travel and represents the size and shape of the volume in which a device may potentially travel when moving from the start to the end position (which may possibly involve navigating around known and unexpected obstacles and other deviations). A volumetric data structure may be selected 6140 (e.g., by requesting a volumetric data structure corresponding to the volume or building the volumetric data structure based on measurements and characteristics associated with the path of travel (e.g., power constraints (e.g., battery range), regulatory constraints, etc.))). The volumetric data structure may describe the volume at multiple levels of detail (e.g., according to a SST data format). The volumetric data structure may be used to determine at least a portion of the path of travel (e.g., based on identifying paths in the geometry through which a corresponding device (e.g., robot, drone, etc.) may pass).

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

FIGS. 62-67 are block diagrams of exemplary computer architectures that may be used in accordance with embodiments disclosed herein. Indeed, computing devices, processors, and other logic and circuitry of the systems described herein may incorporate all or a portion of the functionality and supporting software and/or hardware circuitry to implement such functionality. Further, other computer architecture designs known in the art for processors and computing systems may also be used beyond the examples shown here. Generally, suitable computer architectures for embodiments disclosed herein can include, but are not limited to, configurations illustrated in FIGS. 62-67.

Figure 62:
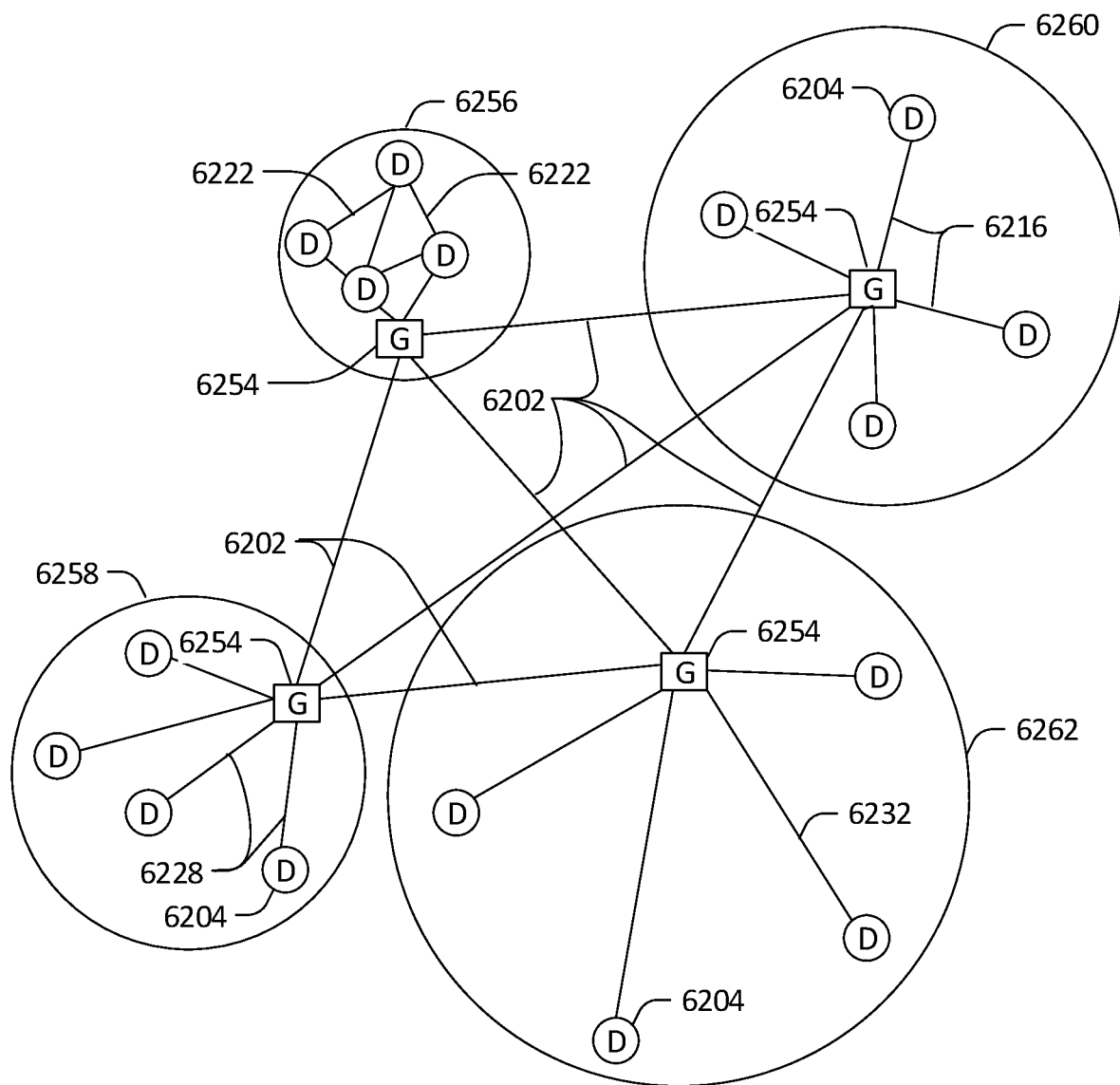
FIG. 62 is a simplified block diagram of an exemplary network with devices in accordance with at least some embodiments.

FIG. 62 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 63:
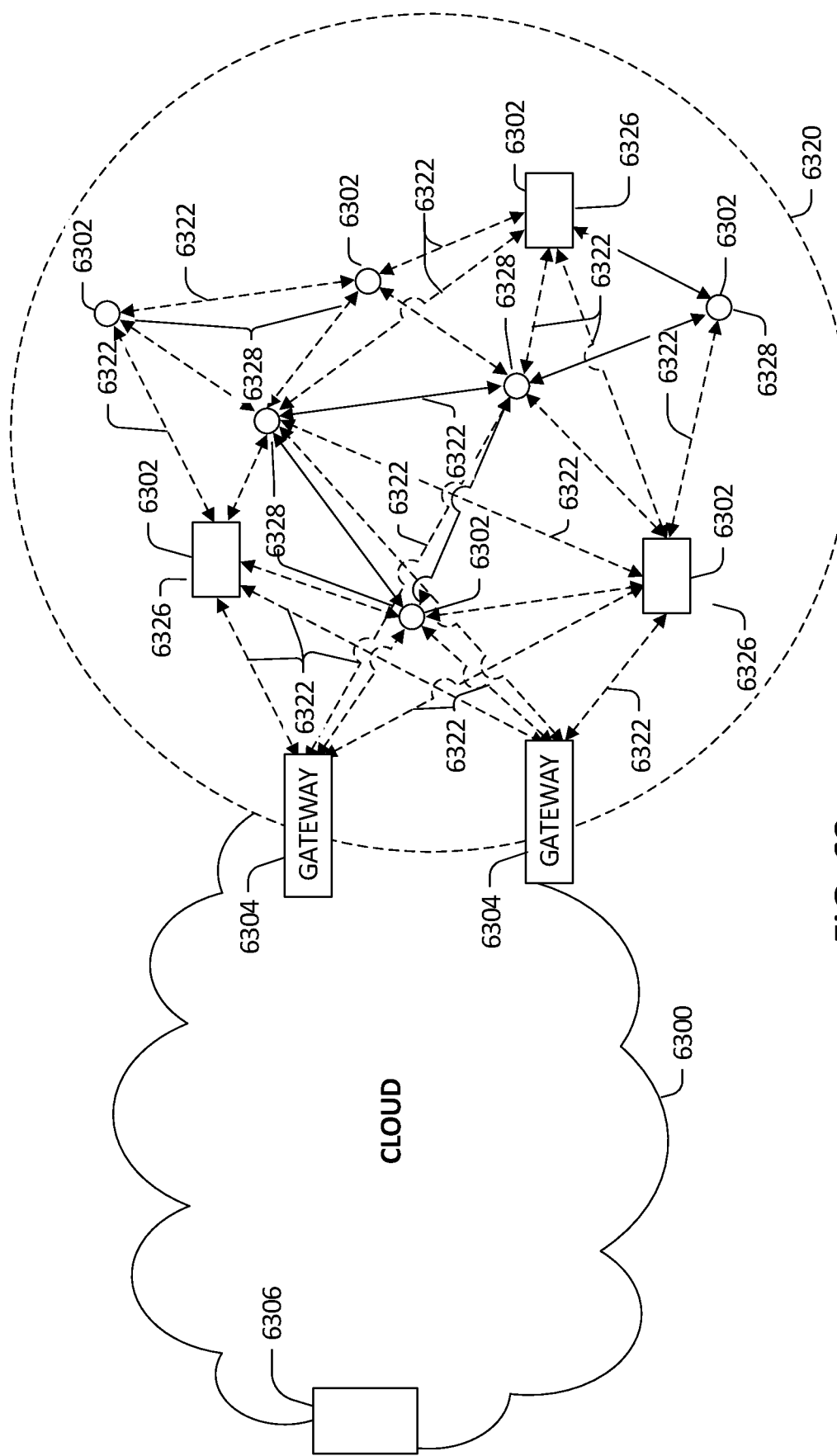
FIG. 63 is a simplified block diagram of an exemplary fog or cloud computing network in accordance with at least some embodiments.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 62 and 63, present a number of new challenges in a heterogeneous network of connectivity comprising a combination of wired and wireless technologies.

FIG. 62 specifically provides a simplified drawing of a domain topology that may be used for a number of internet-of-things (IoT) networks comprising IoT devices 6204, with the IoT networks 6256, 6258, 6260, 6262, coupled through backbone links 6202 to respective gateways 6254. For example, a number of IoT devices 6204 may communicate with a gateway 6254, and with each other through the gateway 6254. To simplify the drawing, not every IoT device 6204, or communications link (e.g., link 6216, 6222, 6228, or 6232) is labeled. The backbone links 6202 may include any number of wired or wireless technologies, including optical networks, and may be part of a local area network (LAN), a wide area network (WAN), or the Internet. Additionally, such communication links facilitate optical signal paths among both IoT devices 6204 and gateways 6254, including the use of MUXing/deMUXing components that facilitate interconnection of the various devices.

The network topology may include any number of types of IoT networks, such as a mesh network provided with the network 6256 using Bluetooth low energy (BLE) links 6222. Other types of IoT networks that may be present include a wireless local area network (WLAN) network 6258 used to communicate with IoT devices 6204 through IEEE 802.11 (Wi-Fi®) links 6228, a cellular network 6260 used to communicate with IoT devices 6204 through an LTE/LTE-A (4G) or 5G cellular network, and a low-power wide area (LPWA) network 6262, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 6204, such as over the backbone links 6202, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 6256, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 6258, for instance, may use systems that perform standards conversion to provide multi-standard connectivity, enabling IoT devices 6204 using different protocols to communicate. Further systems may provide seamless interconnectivity across a multi-standard infrastructure comprising visible Internet resources and hidden Internet resources.

Communications in the cellular network 6260, for instance, may be enhanced by systems that offload data, extend communications to more remote devices, or both. The LPWA network 6262 may include systems that perform non-Internet protocol (IP) to IP interconnections, addressing, and routing. Further, each of the IoT devices 6204 may include the appropriate transceiver for wide area communications with that device. Further, each IoT device 6204 may include other transceivers for communications using additional protocols and frequencies. This is discussed further with respect to the communication environment and hardware of an IoT processing device depicted in FIGS. 64 and 65.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 63 below.

FIG. 63 illustrates a cloud computing network in communication with a mesh network of IoT devices (devices 6302) operating as a fog device at the edge of the cloud computing network. The mesh network of IoT devices may be termed a fog 6320, operating at the edge of the cloud 6300. To simplify the diagram, not every IoT device 6302 is labeled.

The fog 6320 may be considered to be a massively interconnected network wherein a number of IoT devices 6302 are in communications with each other, for example, by radio links 6322. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T-.M.A.N.) routing protocol, or the OMA Lightweight M2M (LWM2M) protocol, among others.

Three types of IoT devices 6302 are shown in this example, gateways 6304, data aggregators 6326, and sensors 6328, although any combinations of IoT devices 6302 and functionality may be used. The gateways 6304 may be edge devices that provide communications between the cloud 6300 and the fog 6320, and may also provide the backend process function for data obtained from sensors 6328, such as motion data, flow data, temperature data, and the like. The data aggregators 6326 may collect data from any number of the sensors 6328, and perform the back end processing function for the analysis. The results, raw data, or both may be passed along to the cloud 6300 through the gateways 6304. The sensors 6328 may be full IoT devices 6302, for example, capable of both collecting data and processing the data. In some cases, the sensors 6328 may be more limited in functionality, for example, collecting the data and allowing the data aggregators 6326 or gateways 6304 to process the data.

Communications from any IoT device 6302 may be passed along a convenient path (e.g., a most convenient path) between any of the IoT devices 6302 to reach the gateways 6304. In these networks, the number of interconnections provide substantial redundancy, allowing communications to be maintained, even with the loss of a number of IoT devices 6302. Further, the use of a mesh network may allow IoT devices 6302 that are very low power or located at a distance from infrastructure to be used, as the range to connect to another IoT device 6302 may be much less than the range to connect to the gateways 6304.

The fog 6320 provided from these IoT devices 6302 may be presented to devices in the cloud 6300, such as a server 6306, as a single device located at the edge of the cloud 6300, e.g., a fog device. In this example, the alerts coming from the fog device may be sent without being identified as coming from a specific IoT device 6302 within the fog 6320. In this fashion, the fog 6320 may be considered a distributed platform that provides computing and storage resources to perform processing or data-intensive tasks such as data analytics, data aggregation, and machine-learning, among others.

In some examples, the IoT devices 6302 may be configured using an imperative programming style, e.g., with each IoT device 6302 having a specific function and communication partners. However, the IoT devices 6302 forming the fog device may be configured in a declarative programming style, allowing the IoT devices 6302 to reconfigure their operations and communications, such as to determine needed resources in response to conditions, queries, and device failures. As an example, a query from a user located at a server 6306 about the operations of a subset of equipment monitored by the IoT devices 6302 may result in the fog 6320 device selecting the IoT devices 6302, such as particular sensors 6328, needed to answer the query. The data from these sensors 6328 may then be aggregated and analyzed by any combination of the sensors 6328, data aggregators 6326, or gateways 6304, before being sent on by the fog 6320 device to the server 6306 to answer the query. In this example, IoT devices 6302 in the fog 6320 may select the sensors 6328 used based on the query, such as adding data from flow sensors or temperature sensors. Further, if some of the IoT devices 6302 are not operational, other IoT devices 6302 in the fog 6320 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein. In some implementations, one or more multiple devices may operate cooperatively to implement functionality and perform tasks described herein. In some cases, one or more host devices may supply data, provide instructions, aggregate results, or otherwise facilitate joint operations and functionality provided by multiple devices. While functionality, when implemented by a single device, may be considered functionality local to the device, in implementations of multiple devices operating as a single machine, the functionality may be considered local to the devices collectively, and this collection of devices may provide or consume results provided by other, remote machines (implemented as a single device or collection devices), among other example implementations.

Figure 64:
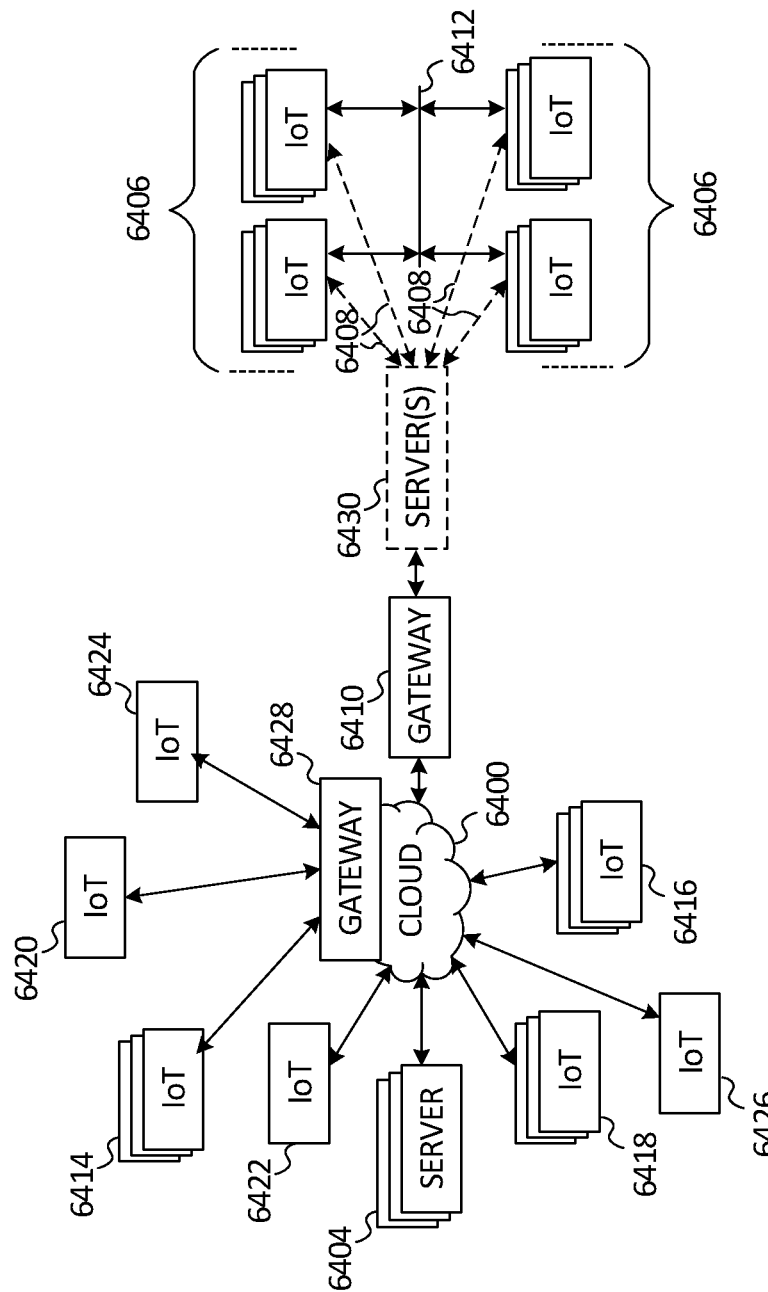
FIG. 64 is a simplified block diagram of a system including example devices in accordance with at least some embodiments.

For instance, FIG. 64 illustrates a drawing of a cloud computing network, or cloud 6400, in communication with a number of Internet of Things (IoT) devices. The cloud 6400 may represent the Internet, or may be a local area network (LAN), or a wide area network (WAN), such as a proprietary network for a company. The IoT devices may include any number of different types of devices, grouped in various combinations. For example, a traffic control group 6406 may include IoT devices along streets in a city. These IoT devices may include stoplights, traffic flow monitors, cameras, weather sensors, and the like. The traffic control group 6406, or other subgroups, may be in communication with the cloud 6400 through wired or wireless links 6408, such as LPWA links, optical links, and the like. Further, a wired or wireless sub-network 6412 may allow the IoT devices to communicate with each other, such as through a local area network, a wireless local area network, and the like. The IoT devices may use another device, such as a gateway 6410 or 6428 to communicate with remote locations such as the cloud 6400; the IoT devices may also use one or more servers 6430 to facilitate communication with the cloud 6400 or with the gateway 6410. For example, the one or more servers 6430 may operate as an intermediate network node to support a local edge cloud or fog implementation among a local area network. Further, the gateway 6428 that is depicted may operate in a cloud-to-gateway-to-many edge devices configuration, such as with the various IoT devices 6414, 6420, 6424 being constrained or dynamic to an assignment and use of resources in the cloud 6400.

Other example groups of IoT devices may include remote weather stations 6414, local information terminals 6416, alarm systems 6418, automated teller machines 6420, alarm panels 6422, or moving vehicles, such as emergency vehicles 6424 or other vehicles 6426, among many others. Each of these IoT devices may be in communication with other IoT devices, with servers 6404, with another IoT fog device or system (not shown, but depicted in FIG. 63), or a combination therein. The groups of IoT devices may be deployed in various residential, commercial, and industrial settings (including in both private or public environments).

As can be seen from FIG. 64, a large number of IoT devices may be communicating through the cloud 6400. This may allow different IoT devices to request or provide information to other devices autonomously. For example, a group of IoT devices (e.g., the traffic control group 6406) may request a current weather forecast from a group of remote weather stations 6414, which may provide the forecast without human intervention. Further, an emergency vehicle 6424 may be alerted by an automated teller machine 6420 that a burglary is in progress. As the emergency vehicle 6424 proceeds towards the automated teller machine 6420, it may access the traffic control group 6406 to request clearance to the location, for example, by lights turning red to block cross traffic at an intersection in sufficient time for the emergency vehicle 6424 to have unimpeded access to the intersection.

Clusters of IoT devices, such as the remote weather stations 6414 or the traffic control group 6406, may be equipped to communicate with other IoT devices as well as with the cloud 6400. This may allow the IoT devices to form an ad-hoc network between the devices, allowing them to function as a single device, which may be termed a fog device or system (e.g., as described above with reference to FIG. 63).

Figure 65:
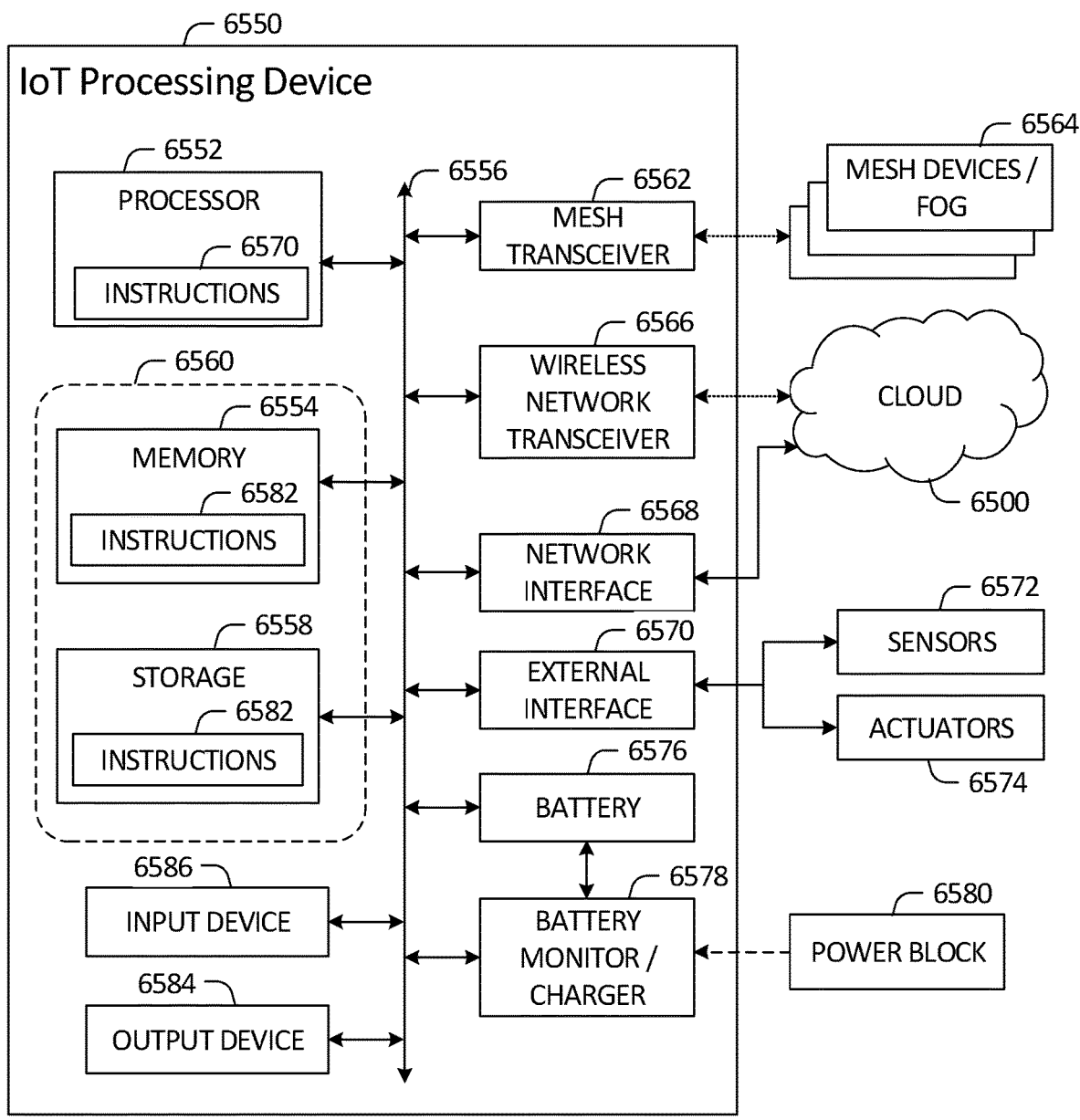
FIG. 65 is a simplified block diagram of an example processing device in accordance with at least some embodiments.

FIG. 65 is a block diagram of an example of components that may be present in an IoT device 6550 for implementing the techniques described herein. The IoT device 6550 may include any combinations of the components shown in the example or referenced in the disclosure above. The components may be implemented as ICs, portions thereof, discrete electronic devices, or other modules, logic, hardware, software, firmware, or a combination thereof adapted in the IoT device 6550, or as components otherwise incorporated within a chassis of a larger system. Additionally, the block diagram of FIG. 65 is intended to depict a high-level view of components of the IoT device 6550. However, some of the components shown may be omitted, additional components may be present, and different arrangement of the components shown may occur in other implementations.

The IoT device 6550 may include a processor 6552, which may be a microprocessor, a multi-core processor, a multithreaded processor, an ultra-low voltage processor, an embedded processor, or other known processing element. The processor 6552 may be a part of a system on a chip (SoC) in which the processor 6552 and other components are formed into a single integrated circuit, or a single package, such as the Edison™ or Galileo™ SoC boards from Intel. As an example, the processor 6552 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 6552 may communicate with a system memory 6554 over an interconnect 6556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 6558 may also couple to the processor 6552 via the interconnect 6556. In an example the storage 6558 may be implemented via a solid state disk drive (SSDD). Other devices that may be used for the storage 6558 include flash memory cards, such as SD cards, microSD cards, xD picture cards, and the like, and USB flash drives. In low power implementations, the storage 6558 may be on-die memory or registers associated with the processor 6552. However, in some examples, the storage 6558 may be implemented using a micro hard disk drive (HDD). Further, any number of new technologies may be used for the storage 6558 in addition to, or instead of, the technologies described, such resistance change memories, phase change memories, holographic memories, or chemical memories, among others.

The components may communicate over the interconnect 6556. The interconnect 6556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 6556 may be a proprietary bus, for example, used in a SoC based system. Other bus systems may be included, such as an I2C interface, an SPI interface, point to point interfaces, and a power bus, among others.

The interconnect 6556 may couple the processor 6552 to a mesh transceiver 6562, for communications with other mesh devices 6564. The mesh transceiver 6562 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 6564. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 6562 may communicate using multiple standards or radios for communications at different range. For example, the IoT device 6550 may communicate with close devices, e.g., within about 10 meters, using a local transceiver based on BLE, or another low power radio, to save power. More distant mesh devices 6564, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 6566 may be included to communicate with devices or services in the cloud 6500 via local or wide area network protocols. The wireless network transceiver 6566 may be a LPWA transceiver that follows the IEEE 802.15.4, or IEEE 802.15.4 g standards, among others. The IoT device 6550 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 6562 and wireless network transceiver 6566, as described herein. For example, the radio transceivers 6562 and 6566 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 6562 and 6566 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 6566, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 6568 may be included to provide a wired communication to the cloud 6500 or to other devices, such as the mesh devices 6564. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 6568 may be included to allow connect to a second network, for example, a NIC 6568 providing communications to the cloud over Ethernet, and a second NIC 6568 providing communications to other devices over another type of network.

The interconnect 6556 may couple the processor 6552 to an external interface 6570 that is used to connect external devices or subsystems. The external devices may include sensors 6572, such as accelerometers, level sensors, flow sensors, optical light sensors, camera sensors, temperature sensors, a global positioning system (GPS) sensors, pressure sensors, barometric pressure sensors, and the like. The external interface 6570 further may be used to connect the IoT device 6550 to actuators 6574, such as power switches, valve actuators, an audible sound generator, a visual warning device, and the like.

In some optional examples, various input/output (I/O) devices may be present within, or connected to, the IoT device 6550. For example, a display or other output device 6584 may be included to show information, such as sensor readings or actuator position. An input device 6586, such as a touch screen or keypad may be included to accept input. An output device 6584 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 6550.

A battery 6576 may power the IoT device 6550, although in examples in which the IoT device 6550 is mounted in a fixed location, it may have a power supply coupled to an electrical grid. The battery 6576 may be a lithium ion battery, or a metal-air battery, such as a zinc-air battery, an aluminum-air battery, a lithium-air battery, and the like.

A battery monitor/charger 6578 may be included in the IoT device 6550 to track the state of charge (SoCh) of the battery 6576. The battery monitor/charger 6578 may be used to monitor other parameters of the battery 6576 to provide failure predictions, such as the state of health (SoH) and the state of function (SoF) of the battery 6576. The battery monitor/charger 6578 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 6578 may communicate the information on the battery 6576 to the processor 6552 over the interconnect 6556. The battery monitor/charger 6578 may also include an analog-to-digital (ADC) convertor that allows the processor 6552 to directly monitor the voltage of the battery 6576 or the current flow from the battery 6576. The battery parameters may be used to determine actions that the IoT device 6550 may perform, such as transmission frequency, mesh network operation, sensing frequency, and the like.

A power block 6580, or other power supply coupled to a grid, may be coupled with the battery monitor/charger 6578 to charge the battery 6576. In some examples, the power block 6580 may be replaced with a wireless power receiver to obtain the power wirelessly, for example, through a loop antenna in the IoT device 6550. A wireless battery charging circuit, such as an LTC4020 chip from Linear Technologies of Milpitas, Calif., among others, may be included in the battery monitor/charger 6578. The specific charging circuits chosen depend on the size of the battery 6576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 6558 may include instructions 6582 in the form of software, firmware, or hardware commands to implement the techniques described herein. Although such instructions 6582 are shown as code blocks included in the memory 6554 and the storage 6558, it may be understood that any of the code blocks may be replaced with hardwired circuits, for example, built into an application specific integrated circuit (ASIC).

In an example, the instructions 6582 provided via the memory 6554, the storage 6558, or the processor 6552 may be embodied as a non-transitory, machine readable medium 6560 including code to direct the processor 6552 to perform electronic operations in the IoT device 6550. The processor 6552 may access the non-transitory, machine readable medium 6560 over the interconnect 6556. For instance, the non-transitory, machine readable medium 6560 may be embodied by devices described for the storage 6558 of FIG. 65 or may include specific storage units such as optical disks, flash drives, or any number of other hardware devices. The non-transitory, machine readable medium 6560 may include instructions to direct the processor 6552 to perform a specific sequence or flow of actions, for example, as described with respect to the flowchart(s) and block diagram(s) of operations and functionality depicted above.

Figure 66:
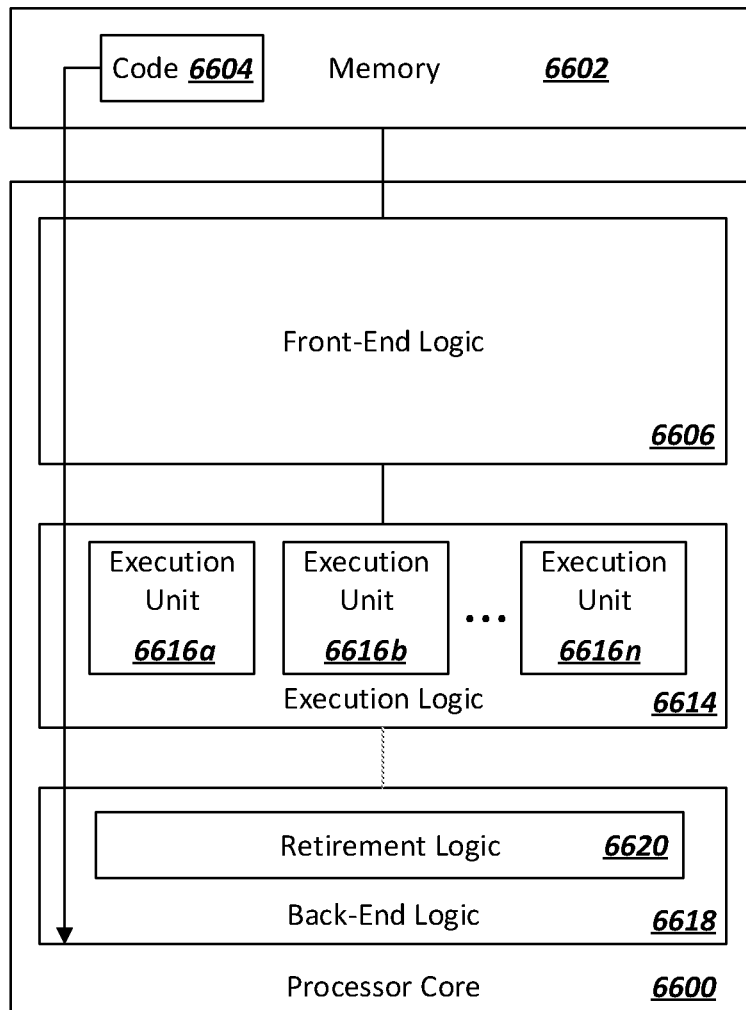
FIG. 66 is a block diagram of an exemplary processor in accordance with at least some embodiments.

FIG. 66 is an example illustration of a processor according to an embodiment. Processor 6600 is an example of a type of hardware device that can be used in connection with the implementations above. Processor 6600 may be any type of processor, such as a microprocessor, an embedded processor, a digital signal processor (DSP), a network processor, a multi-core processor, a single core processor, or other device to execute code. Although only one processor 6600 is illustrated in FIG. 66, a processing element may alternatively include more than one of processor 6600 illustrated in FIG. 66. Processor 6600 may be a single-threaded core or, for at least one embodiment, the processor 6600 may be multi-threaded in that it may include more than one hardware thread context (or "logical processor") per core.

FIG. 66 also illustrates a memory 6602 coupled to processor 6600 in accordance with an embodiment. Memory 6602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 6600 can execute any type of instructions associated with algorithms, processes, or operations detailed herein. Generally, processor 6600 can transform an element or an article (e.g., data) from one state or thing to another state or thing.

Code 6604, which may be one or more instructions to be executed by processor 6600, may be stored in memory 6602, or may be stored in software, hardware, firmware, or any suitable combination thereof, or in any other internal or external component, device, element, or object where appropriate and based on particular needs. In one example, processor 6600 can follow a program sequence of instructions indicated by code 6604. Each instruction enters a front-end logic 6606 and is processed by one or more decoders 6608. The decoder may generate, as its output, a micro operation such as a fixed width micro operation in a predefined format, or may generate other instructions, microinstructions, or control signals that reflect the original code instruction. Front-end logic 6606 also includes register renaming logic 6610 and scheduling logic 6612, which generally allocate resources and queue the operation corresponding to the instruction for execution.

Processor 6600 can also include execution logic 6614 having a set of execution units 6616a, 6616b, 6616n, etc. Some embodiments may include a number of execution units dedicated to specific functions or sets of functions. Other embodiments may include only one execution unit or one execution unit that can perform a particular function. Execution logic 6614 performs the operations specified by code instructions.

After completion of execution of the operations specified by the code instructions, back-end logic 6618 can retire the instructions of code 6604. In one embodiment, processor 6600 allows out of order execution but requires in order retirement of instructions. Retirement logic 6620 may take a variety of known forms (e.g., re-order buffers or the like). In this manner, processor 6600 is transformed during execution of code 6604, at least in terms of the output generated by the decoder, hardware registers and tables utilized by register renaming logic 6610, and any registers (not shown) modified by execution logic 6614.

Although not shown in FIG. 66, a processing element may include other elements on a chip with processor 6600. For example, a processing element may include memory control logic along with processor 6600. The processing element may include I/O control logic and/or may include I/O control logic integrated with memory control logic. The processing element may also include one or more caches. In some embodiments, non-volatile memory (such as flash memory or fuses) may also be included on the chip with processor 6600.

Figure 67:
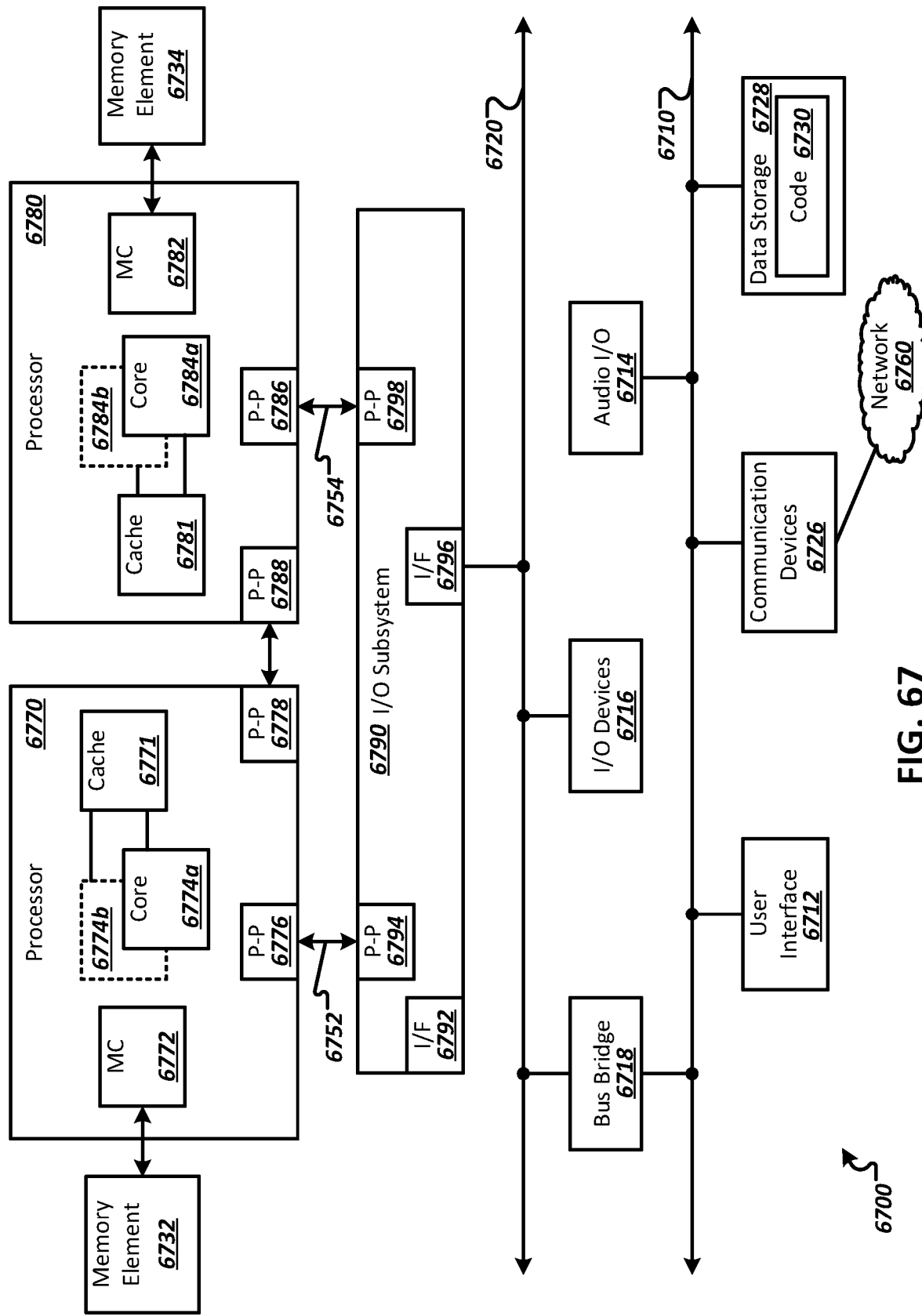
FIG. 67 is a block diagram of an exemplary computing system in accordance with at least some embodiments.

FIG. 67 illustrates a computing system 6700 that is arranged in a point-to-point (PtP) configuration according to an embodiment. In particular, FIG. 67 shows a system where processors, memory, and input/output devices are interconnected by a number of point-to-point interfaces. Generally, one or more of the computing systems described herein may be configured in the same or similar manner as computing system 6700.

Processors 6770 and 6780 may also each include integrated memory controller logic (MC) 6772 and 6782 to communicate with memory elements 6732 and 6734. In alternative embodiments, memory controller logic 6772 and 6782 may be discrete logic separate from processors 6770 and 6780. Memory elements 6732 and/or 6734 may store various data to be used by processors 6770 and 6780 in achieving operations and functionality outlined herein.

Processors 6770 and 6780 may be any type of processor, such as those discussed in connection with other figures. Processors 6770 and 6780 may exchange data via a point-to-point (PtP) interface 6750 using point-to-point interface circuits 6778 and 6788, respectively. Processors 6770 and 6780 may each exchange data with a chipset 6790 via individual point-to-point interfaces 6752 and 6754 using point-to-point interface circuits 6776, 6786, 6794, and 6798. Chipset 6790 may also exchange data with a high-performance graphics circuit 6738 via a high-performance graphics interface 6739, using an interface circuit 6792, which could be a PtP interface circuit. In alternative embodiments, any or all of the PtP links illustrated in FIG. 67 could be implemented as a multi-drop bus rather than a PtP link.

Chipset 6790 may be in communication with a bus 6720 via an interface circuit 6796. Bus 6720 may have one or more devices that communicate over it, such as a bus bridge 6718 and I/O devices 6716. Via a bus 6710, bus bridge 6718 may be in communication with other devices such as a user interface 6712 (such as a keyboard, mouse, touchscreen, or other input devices), communication devices 6726 (such as modems, network interface devices, or other types of communication devices that may communicate through a computer network 6760), audio I/O devices 6714, and/or a data storage device 6728. Data storage device 6728 may store code 6730, which may be executed by processors 6770 and/or 6780. In alternative embodiments, any portions of the bus architectures could be implemented with one or more PtP links.

The computer system depicted in FIG. 67 is a schematic illustration of an embodiment of a computing system that may be utilized to implement various embodiments discussed herein. It will be appreciated that various components of the system depicted in FIG. 67 may be combined in a system-on-a-chip (SoC) architecture or in any other suitable configuration capable of achieving the functionality and features of examples and implementations provided herein.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a vehicle including a controller to direct travel of the vehicle within an environment and a memory to store at least a portion of a volumetric data structure, where the volumetric data structure describes a particular volume within the environment at a plurality of levels of detail, a first entry in the volumetric data structure includes a first set of bits representing voxels at a first one of the plurality of levels of detail, the voxels represent subvolumes of the particular volume, values of the first set of bits indicate whether a corresponding one of the voxels at the first level of detail is at least partially occupied by respective geometry, where the volumetric data structure further includes a number of second entries representing voxels at a second level of detail higher than the first level of detail, and the voxels at the second level of detail represent subvolumes of the voxels at the first level of detail. The vehicle may further include path planning logic to identify geometry within the particular volume using the volumetric data structure; and generate path data based on the geometry to describe a path through the particular volume, where the controller is to use the path data to direct travel of the vehicle.

Example 2 may include the subject matter of example 1, further including one or more sensors to sense conditions affecting the vehicle within the environment, where the path planning logic is to assess the path data in response to one or more particular conditions sensed by the one or more sensors.

Example 3 may include the subject matter of example 2, where the one or more sensors include an image sensor.

Example 4 may include the subject matter of any one of examples 2-3, where the one or more sensors include a proximity sensor.

Example 5 may include the subject matter of any one of examples 1-4, where a particular portion of the path is based on descriptions of voxels at the first level of detail in the volumetric data structure and another portion of the path is based on descriptions of voxels at another level of detail in the volumetric data structure higher than the first level of detail.

Example 6 may include the subject matter of any one of examples 1-5, where the path data includes a two-dimensional (2D) projection of the particular volume generated from the volumetric data structure.

Example 7 may include the subject matter of example 6, where the 2D projection includes a map of an overhead view of the particular volume.

Example 8 may include the subject matter of example 6, where the 2D projection includes a view of the particular volume oriented in a current direction of travel of the vehicle.

Example 9 may include the subject matter of example 8, where generating the 2D projection includes performing ray tracing of the particular volume using the volumetric data structure, where the ray tracing is based on a current pose of the vehicle corresponding to the view.

Example 10 may include the subject matter of any one of examples 1-9, further including fetching logic to select the volumetric data structure for use in determination of the path.

Example 11 may include the subject matter of example 10, where the volumetric data structure is selected from a plurality of other volumetric data structures describing various volumes within an environment.

Example 12 may include the subject matter of any one of example 10-11, where selecting the volumetric data structure includes: determining a current location of the vehicle; determining a range of potential travel by the vehicle; and determining that the particular volume corresponds to a volume corresponding to the current location and the range.

Example 13 may include the subject matter of example 12, where the range is determined based on one of battery life of the vehicle, travel regulations governing allowed travel by the vehicle, a physical distance limit of a wireless communication link used by the vehicle, and a location of a provided destination for the vehicle.

Example 14 may include the subject matter of any one of examples 1-13, where the vehicle includes an aerial drone and the path data describes a flight plan in three dimensions.

Example 15 may include the subject matter of any one of examples 1-13, where the vehicle includes an autonomous automobile.

Example 16 may include the subject matter of any one of examples 1-15, where the path planning logic includes hardware circuitry.

Example 17 is a machine accessible storage medium having instructions stored thereon, the instructions when executed on a machine, cause the machine to: identify a starting location for a path of travel of a device; identify a destination location for the path of travel; determine a particular volume corresponding to the path of travel; obtain a particular volumetric data structure representing the particular volume, where the particular volumetric data structure describes the particular volume at a plurality of levels of detail, a first entry in the volumetric data structure includes a first set of bits representing voxels at a first one of the plurality of levels of detail, the voxels represent subvolumes of the particular volume, values of the first set of bits indicate whether a corresponding one of the voxels at the first level of detail is at least partially occupied by respective geometry, where the volumetric data structure further includes a number of second entries representing voxels at a second level of detail higher than the first level of detail, and the voxels at the second level of detail represent subvolumes of the voxels at the first level of detail; and determine at least a portion of the path of travel from the starting location to the end location based on the geometry described in the particular volumetric data structure.

Example 18 may include the subject matter of example 17, where the path of traveled is determined to avoid collisions with the geometry.

Example 19 may include the subject matter of any one of example 17-18, where the instructions, when executed, further cause a machine to: identify a change to the geometry of the particular volume described in the particular volumetric data structure; and modify the oath of travel based on the change.

Example 20 may include the subject matter of example 19, where the change to the geometry is detected by a sensor on the device.

Example 21 may include the subject matter of example 20, where the sensor includes an image sensor.

Example 22 may include the subject matter of example 21, where identifying the change to the geometry includes: rendering a two-dimensional (2D) projection of the geometry using the volumetric data structure; generated a 2D image from the image sensor; and performing a comparison of the 2D projection and the 2D image.

Example 23 may include the subject matter of example 21, where identifying the change to the geometry includes: generated an updated version of at least a portion of the particular volumetric data structure based on data collected by the image sensor; and performing a comparison between values of the particular volumetric data structure and the updated version of the particular volumetric data structure to identify the change to the geometry.

Example 24 may include the subject matter of any one of examples 17-23, where determining the portion of the path includes: identifying a level of precision for traveling the portion of the path; identifying a particular one of the plurality of levels of detail higher than the first level of detail based on the level of precision; and using at least one entry in the volumetric data structure describing voxels at the particular level of detail to determine the portion of the path based on the level of precision.

Example 25 is an apparatus including a processor device, an imaging sensor to generate image data including a view of geometry in an environment, and fetching logic to obtain at least a portion of a volumetric data structure, where the volumetric data structure describes a volume within the environment including the geometry, the volumetric data structure describes the volume at a plurality of levels of detail and includes entries to describe voxels defining subvolumes of the volume at the plurality of levels of detail, where the volumetric data structure includes a first entry to describe voxels at a lowest one of the levels of detail and further includes a number of second entries to describe voxels at a higher, second level of detail, the voxels at the second level of detail represent subvolumes of the voxels at the first level of detail, and each of the entries include bits to indicate whether a corresponding one of the voxels is at least partially occupied with the geometry. The apparatus may further include comparison logic to: identify at least one particular entry in the volumetric data structure corresponding to the view of the geometry; and determine a comparison between the view of the geometry represented in the volumetric data structure and the view of the geometry represented in the image data.

Example 26 may include the subject matter of example 25, where the volumetric data structure includes a reference volumetric data structure, the apparatus further includes conversion logic to convert the image data into a observed volumetric data structure based on a format of the reference volumetric data structure, and determining the comparison includes: identifying a particular entry in the observed volumetric data structure corresponding to the particular entry in the reference volumetric data structure; performing a bitwise comparison of the particular entries of the observed volumetric data structure and the reference volumetric data structure; and performing an action based on results of the bitwise comparison.

Example 27 may include the subject matter of example 26, where the particular entries of each of the observed volumetric data structure and the reference volumetric data structure represent voxels at a lowest one of the plurality of levels of detail, the results of the bitwise comparison indicate a match between the particular entries, and the action includes: identifying a subset of entries in each of the reference volumetric data structure and the observed volumetric data structure representing a subset of voxels at a level of detail higher than the lowest level of detail; and performing a bitwise comparison of each of the subset of entries of the observed volumetric data structure and the reference volumetric data structure.

Example 28 may include the subject matter of any one of examples 26-27, where the action includes determining that travel of a device may continue along a path based on the image data.

Example 29 may include the subject matter of example 26, where the results of the bitwise comparison indicate that additional geometry is present in the geometry observed in the image data, and the action includes changing a path of travel of a device to avoid the additional geometry.

Example 30 may include the subject matter of example 26, where the results of the bitwise comparison indicate that additional geometry is present in the geometry observed in the image data, and the action includes ignoring the additional geometry based on the geometry described in the reference volumetric data structure.

Example 31 may include the subject matter of example 30, where the image data is used to guide travel of a device and the action includes maintaining a path of travel for the device in spite of the additional geometry.

Example 32 may include the subject matter of example 25, further including conversion logic to convert the volumetric data structure to a two-dimensional (2D) projection, where the image data includes a 2D image and determining the comparison includes comparing the 2D image to the 2D projection.

Example 33 may include the subject matter of example 32, where converting the volumetric data structure to the 2D projection includes determining a pose of the imaging sensor relative to the volume, and the pose includes the pose of the imaging sensor during generation of the image data.

Example 34 may include the subject matter of any one of examples 32-33, where converting the volumetric data structure to the 2D projection includes performing ray tracing into the volume.

Example 35 may include the subject matter of any one of examples 25-34, where the volumetric data structure includes a volumetric model representing ground truth of the geometry.

Example 36 may include the subject matter of any one of examples 25-35, where the comparison logic includes hardware circuitry.

Example 37 is a method including: generating image data including a view of geometry in an environment; obtaining at least a portion of a volumetric data structure, where the volumetric data structure describes a volume within the environment including the geometry, the volumetric data structure describes the volume at a plurality of levels of detail and includes entries to describe voxels defining subvolumes of the volume at the plurality of levels of detail, where the volumetric data structure includes a first entry to describe voxels at a lowest one of the levels of detail and further includes a number of second entries to describe voxels at a higher, second level of detail, the voxels at the second level of detail represent subvolumes of the voxels at the first level of detail, and each of the entries include bits to indicate whether a corresponding one of the voxels is at least partially occupied with the geometry; identifying at least one particular entry in the volumetric data structure corresponding to the view of the geometry; and determining a comparison between the view of the geometry represented in the volumetric data structure and the view of the geometry represented in the image data.

Example 38 may include the subject matter of example 37, where the volumetric data structure includes a reference volumetric data structure, the method further includes conversion logic to convert the image data into a observed volumetric data structure based on a format of the reference volumetric data structure, and determining the comparison includes: identifying a particular entry in the observed volumetric data structure corresponding to the particular entry in the reference volumetric data structure; performing a bitwise comparison of the particular entries of the observed volumetric data structure and the reference volumetric data structure; and performing an action based on results of the bitwise comparison.

Example 39 may include the subject matter of example 38, where the particular entries of each of the observed volumetric data structure and the reference volumetric data structure represent voxels at a lowest one of the plurality of levels of detail, the results of the bitwise comparison indicate a match between the particular entries, and the action includes: identifying a subset of entries in each of the reference volumetric data structure and the observed volumetric data structure representing a subset of voxels at a level of detail higher than the lowest level of detail; and performing a bitwise comparison of each of the subset of entries of the observed volumetric data structure and the reference volumetric data structure.

Example 40 may include the subject matter of any one of examples 38-39, where the action includes determining that travel of a device may continue along a path based on the image data.

Example 41 may include the subject matter of example 38, where the results of the bitwise comparison indicate that additional geometry is present in the geometry observed in the image data, and the action includes changing a path of travel of a device to avoid the additional geometry.

Example 42 may include the subject matter of example 38, where the results of the bitwise comparison indicate that additional geometry is present in the geometry observed in the image data, and the action includes ignoring the additional geometry based on the geometry described in the reference volumetric data structure.

Example 43 may include the subject matter of example 42, where the image data is used to guide travel of a device and the action includes maintaining a path of travel for the device in spite of the additional geometry.

Example 44 may include the subject matter of example 37, further including conversion logic to convert the volumetric data structure to a two-dimensional (2D) projection, where the image data includes a 2D image and determining the comparison includes comparing the 2D image to the 2D projection.

Example 45 may include the subject matter of example 44, where converting the volumetric data structure to the 2D projection includes determining a pose of the imaging sensor relative to the volume, and the pose includes the pose of the imaging sensor during generation of the image data.

Example 46 may include the subject matter of any one of examples 44-45, where converting the volumetric data structure to the 2D projection includes performing ray tracing into the volume.

Example 47 may include the subject matter of any one of examples 37-46, where the volumetric data structure includes a volumetric model representing ground truth of the geometry.

Example 48 is a system including means to perform the method of any one of examples 37-47.

Example 49 is a method including: identifying a starting location for a path of travel of a device; identifying a destination location for the path of travel; determining a particular volume corresponding to the path of travel; obtaining a particular volumetric data structure representing the particular volume, where the particular volumetric data structure describes the particular volume at a plurality of levels of detail, a first entry in the volumetric data structure includes a first set of bits representing voxels at a first one of the plurality of levels of detail, the voxels represent subvolumes of the particular volume, values of the first set of bits indicate whether a corresponding one of the voxels at the first level of detail is at least partially occupied by respective geometry, where the volumetric data structure further includes a number of second entries representing voxels at a second level of detail higher than the first level of detail, and the voxels at the second level of detail represent subvolumes of the voxels at the first level of detail; and determining at least a portion of the path of travel from the starting location to the end location based on the geometry described in the particular volumetric data structure.

Example 50 may include the subject matter of example 49, where the path of traveled is determined to avoid collisions with the geometry.

Example 51 may include the subject matter of any one of example 49-50, further including: identifying a change to the geometry of the particular volume described in the particular volumetric data structure; and modifying the path of travel based on the change.

Example 52 may include the subject matter of example 51, where the change to the geometry is detected by a sensor on the device.

Example 53 may include the subject matter of example 52, where the sensor includes an image sensor.

Example 54 may include the subject matter of example 53, where identifying the change to the geometry includes: rendering a two-dimensional (2D) projection of the geometry using the volumetric data structure; generated a 2D image from the image sensor; and performing a comparison of the 2D projection and the 2D image.

Example 55 may include the subject matter of example 53, where identifying the change to the geometry includes: generated an updated version of at least a portion of the particular volumetric data structure based on data collected by the image sensor; and performing a comparison between values of the particular volumetric data structure and the updated version of the particular volumetric data structure to identify the change to the geometry.

Example 56 may include the subject matter of any one of examples 49-55, where determining the portion of the path includes: identifying a level of precision for traveling the portion of the path; identifying a particular one of the plurality of levels of detail higher than the first level of detail based on the level of precision; and using at least one entry in the volumetric data structure describing voxels at the particular level of detail to determine the portion of the path based on the level of precision.

Example 57 is a system including means to perform the method of any one of examples 49-56.

Example 58 is a method including: obtaining at least a portion of a volumetric data structure, where the volumetric data structure describes a particular volume within the environment at a plurality of levels of detail, a first entry in the volumetric data structure includes a first set of bits representing voxels at a first one of the plurality of levels of detail, the voxels represent subvolumes of the particular volume, values of the first set of bits indicate whether a corresponding one of the voxels at the first level of detail is at least partially occupied by respective geometry, where the volumetric data structure further includes a number of second entries representing voxels at a second level of detail higher than the first level of detail, and the voxels at the second level of detail represent subvolumes of the voxels at the first level of detail; identifying geometry within the particular volume using the volumetric data structure; and generating path data based on the geometry to describe a path through the particular volume, where a controller is to use the path data to direct travel of a device.

Example 59 may include the subject matter of example 58, further including: using one or more sensors to sense conditions affecting the vehicle within the environment; and assessing the path described in the path data in response to one or more particular conditions sensed by the one or more sensors.

Example 60 may include the subject matter of example 59, where the one or more sensors include an image sensor.

Example 61 may include the subject matter of any one of examples 59-60, where the one or more sensors include a proximity sensor.

Example 62 may include the subject matter of any one of examples 58-61, where a particular portion of the path is based on descriptions of voxels at the first level of detail in the volumetric data structure and another portion of the path is based on descriptions of voxels at another level of detail in the volumetric data structure higher than the first level of detail.

Example 63 may include the subject matter of any one of examples 58-62, where the path data includes a two-dimensional (2D) projection of the particular volume generated from the volumetric data structure.

Example 64 may include the subject matter of example 63, where the 2D projection includes a map of an overhead view of the particular volume.

Example 65 may include the subject matter of example 63, where the 2D projection includes a view of the particular volume oriented in a current direction of travel of the vehicle.

Example 66 may include the subject matter of example 65, where generating the 2D projection includes performing ray tracing of the particular volume using the volumetric data structure, where the ray tracing is based on a current pose of the vehicle corresponding to the view.

Example 67 may include the subject matter of any one of examples 58-66, further including selecting the volumetric data structure for use in determination of the path.

Example 68 may include the subject matter of example 67, where the volumetric data structure is selected from a plurality of other volumetric data structures describing various volumes within an environment.

Example 69 may include the subject matter of any one of example 67-68, where selecting the volumetric data structure includes: determining a current location of the vehicle; determining a range of potential travel by the vehicle; and determining that the particular volume corresponds to a volume corresponding to the current location and the range.

Example 70 may include the subject matter of example 69, where the range is determined based on one of battery life of the vehicle, travel regulations governing allowed travel by the vehicle, a physical distance limit of a wireless communication link used by the vehicle, and a location of a provided destination for the vehicle.

Example 71 may include the subject matter of any one of examples 58-70, where the device includes an aerial drone and the path data describes a flight plan in three dimensions.

Example 72 may include the subject matter of any one of examples 58-70, where the device includes an autonomous automobile.

Example 73 may include the subject matter of any one of examples 58-70, where the device includes at least a portion of a robot.

Example 74 is a system including means to perform the method of any one of examples 58-73

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. An apparatus comprising:
   a controller to direct travel of a device within an environment;
   a memory to store at least a portion of a volumetric data structure, wherein the volumetric data structure describes a particular volume within the environment at a plurality of levels of detail, a first entry in the volumetric data structure comprises a first set of bits representing voxels at a first one of the plurality of levels of detail, the voxels represent subvolumes of the particular volume, values of the first set of bits indicate whether a corresponding one of the voxels at the first level of detail is at least partially occupied by respective geometry, wherein the volumetric data structure further comprises a number of second entries representing voxels at a second level of detail higher than the first level of detail, and the voxels at the second level of detail represent subvolumes of the voxels at the first level of detail, wherein the first entry and the number of second entries comprise contiguous entries within the volumetric data structure;
   path planning logic to:
      identify geometry within the particular volume using the volumetric data structure; and
      generate path data based on the geometry to describe a path through the particular volume, wherein the controller is to use the path data to direct travel of the device.

2. The apparatus of claim 1, further comprising one or more sensors to sense conditions affecting the device within the environment, wherein the path planning logic is to assess the path data in response to one or more particular conditions sensed by the one or more sensors.

3. The apparatus of claim 2, wherein the one or more sensors comprise an image sensor.

4. The apparatus of claim 2, wherein the one or more sensors comprise a proximity sensor.

5. The apparatus of claim 1, wherein a particular portion of the path is based on descriptions of voxels at the first level of detail in the volumetric data structure and another portion of the path is based on descriptions of voxels at another level of detail in the volumetric data structure higher than the first level of detail.

6. The apparatus of claim 1, wherein the path data comprises a two-dimensional (2D) projection of the particular volume generated from the volumetric data structure.

7. The apparatus of claim 6, wherein the 2D projection comprises a map of an overhead view of the particular volume.

8. The apparatus of claim 6, wherein the 2D projection comprises a view of the particular volume oriented in a current direction of travel of the device.

9. The apparatus of claim 8, wherein generating the 2D projection comprises performing ray tracing of the particular volume using the volumetric data structure, wherein the ray tracing is based on a current pose of the device corresponding to the view.

10. The apparatus of claim 1, further comprising fetching logic to select the volumetric data structure for use in determination of the path.

11. The apparatus of claim 10, wherein the volumetric data structure is selected from a plurality of other volumetric data structures describing various volumes within an environment.

12. The apparatus of claim 10, wherein selecting the volumetric data structure comprises:
    determining a current location of the device;
    determining a range of potential travel by the device; and
    determining that the particular volume corresponds to a volume corresponding to the current location and the range.

13. The apparatus of claim 12, wherein the range is determined based on one of battery life of the device, travel regulations governing allowed travel by the device, a physical distance limit of a wireless communication link used by the device, and a location of a provided destination for the device.

14. The apparatus of claim 1, wherein the device comprises an aerial drone and the path data describes a flight plan in three dimensions.

15. The apparatus of claim 1, wherein the device comprises an autonomous automobile.

16. A method comprising:
    identifying a starting location for a path of travel of a device;
    identifying a destination location for the path of travel;
    determining a particular volume corresponding to the path of travel;
    obtaining a particular volumetric data structure representing the particular volume, wherein the particular volumetric data structure describes the particular volume at a plurality of levels of detail, a first entry in the volumetric data structure comprises a first set of bits representing voxels at a first one of the plurality of levels of detail, the voxels represent subvolumes of the particular volume, values of the first set of bits indicate whether a corresponding one of the voxels at the first level of detail is at least partially occupied by respective geometry, wherein the volumetric data structure further comprises a number of second entries representing voxels at a second level of detail higher than the first level of detail, and the voxels at the second level of detail represent subvolumes of the voxels at the first level of detail, wherein the first entry and the number of second entries comprise contiguous entries within the volumetric data structure; and
    determining at least a portion of the path of travel from the starting location to the end location based on the geometry described in the particular volumetric data structure.

17. At least one machine accessible storage medium having instructions stored thereon, the instructions when executed on a machine, cause the machine to:
    identify a starting location for a path of travel of a device;
    identify a destination location for the path of travel;

determine a particular volume corresponding to the path of travel;

obtain a particular volumetric data structure representing the particular volume, wherein the particular volumetric data structure describes the particular volume at a plurality of levels of detail, a first entry in the volumetric data structure comprises a first set of bits representing voxels at a first one of the plurality of levels of detail, the voxels represent subvolumes of the particular volume, values of the first set of bits indicate whether a corresponding one of the voxels at the first level of detail is at least partially occupied by respective geometry, wherein the volumetric data structure further comprises a number of second entries representing voxels at a second level of detail higher than the first level of detail, and the voxels at the second level of detail represent subvolumes of the voxels at the first level of detail, wherein the first entry and the number of second entries comprise contiguous entries within the volumetric data structure; and determine at least a portion of the path of travel from the starting location to the end location based on the geometry described in the particular volumetric data structure.

18. The storage medium of claim 17, wherein the path of traveled is determined to avoid collisions with the geometry.

19. The storage medium of claim 17, wherein the instructions, when executed, further cause a machine to:

identify a change to the geometry of the particular volume described in the particular volumetric data structure; and modify the path of travel based on the change.

20. The storage medium of claim 19, wherein identifying the change to the geometry comprises:

rendering a two-dimensional (2D) projection of the geometry using the volumetric data structure; and performing a comparison of the 2D projection and a 2D image generated by an image sensor.

21. An apparatus comprising:

a processor device;

an imaging sensor to generate image data comprising a view of geometry in an environment;

fetching logic to obtain at least a portion of a volumetric data structure, wherein the volumetric data structure describes a volume within the environment comprising the geometry, the volumetric data structure describes the volume at a plurality of levels of detail and comprises entries to describe voxels defining subvolumes of the volume at the plurality of levels of detail, wherein the volumetric data structure comprises a first entry to describe voxels at a lowest one of the levels of detail and further comprises a number of second entries to describe voxels at a higher, second level of detail, the voxels at the second level of detail represent subvolumes of the voxels at the first level of detail, and each of the entries comprise bits to indicate whether a corresponding one of the voxels is at least partially occupied with the geometry, wherein the first entry and the number of second entries comprise contiguous entries within the volumetric data structure; and comparison logic to:

identify at least one particular entry in the volumetric data structure corresponding to the view of the geometry; and determine a comparison between the view of the geometry represented in the volumetric data structure and the view of the geometry represented in the image data.

* * * * *